(12) United States Patent
Lenke

(10) Patent No.: US 12,329,710 B2
(45) Date of Patent: Jun. 17, 2025

(54) STIMULATION APPARATUS

(71) Applicant: Novoluto GmbH, Berlin (DE)

(72) Inventor: Michael Lenke, Metten (DE)

(73) Assignee: Novoluto GmbH, Berlin (DE)

( * ) Notice: Subject to any disclaimer, the term of this patent is extended or adjusted under 35 U.S.C. 154(b) by 331 days.

(21) Appl. No.: 16/339,969

(22) PCT Filed: Oct. 5, 2017

(86) PCT No.: PCT/EP2017/075400
§ 371 (c)(1),
(2) Date: Apr. 5, 2019

(87) PCT Pub. No.: WO2018/065540
PCT Pub. Date: Apr. 12, 2018

(65) Prior Publication Data
US 2020/0188221 A1     Jun. 18, 2020

(30) Foreign Application Priority Data
Oct. 5, 2016   (DE) .................... 20 2016 008 412.8

(51) Int. Cl.
*A61H 19/00*   (2006.01)
*A61H 23/02*   (2006.01)
(Continued)

(52) U.S. Cl.
CPC ......... *A61H 19/34* (2013.01); *A61H 23/0254* (2013.01); *A61H 2201/0153* (2013.01);
(Continued)

(58) Field of Classification Search
CPC ......... A61H 19/34; A61H 19/00; A61H 19/30
See application file for complete search history.

(56) References Cited

U.S. PATENT DOCUMENTS

| 15,626 A | 8/1856 | Tillotson |
|---|---|---|
| 787,443 A | 4/1905 | Godman et al. |

(Continued)

FOREIGN PATENT DOCUMENTS

| AU | 2011351297 | 7/2013 |
|---|---|---|
| AU | 2018200317 | 2/2018 |

(Continued)

OTHER PUBLICATIONS

English translation of DE102005042092A1 (Year: 2007).*
(Continued)

*Primary Examiner* — Christine H Matthews
(74) *Attorney, Agent, or Firm* — Hanley, Flight & Zimmerman, LLC

(57) ABSTRACT

The invention relates to a clitoris stimulation apparatus with improved ergonomics and comprising: a pressure field generating device having a drive unit and a hollow space, the drive unit being capable of periodically generating a pressure field with alternating positive and negative pressures in the hollow space when the drive unit varies the volume of the hollow space, said hollow space having an opening which can be placed on the clitoris; a control device designed to control the drive unit; and a sensor device designed to detect when the stimulation apparatus comes close to the clitoris or, alternatively, when the stimulation apparatus comes into contact with the clitoris, and designed to output an activation signal to the control device upon detection of any approximation or contact. The control device is designed such that the drive unit is activated in the presence of an activation signal. The pressure field generating device, the control device and the sensor device are accommodated in a housing of the stimulation apparatus and the stimulation apparatus is designed as a portable handheld appliance.

25 Claims, 24 Drawing Sheets

(51) Int. Cl.
  *H02J 7/02* (2016.01)
  *H02J 50/00* (2016.01)
  *H02J 50/10* (2016.01)

(52) U.S. Cl.
  CPC ............... *A61H 2201/0165* (2013.01); *A61H 2201/0207* (2013.01); *A61H 2201/5028* (2013.01); *A61H 2201/5092* (2013.01); *H02J 7/02* (2013.01); *H02J 50/005* (2020.01); *H02J 50/10* (2016.02)

(56) References Cited

U.S. PATENT DOCUMENTS

| | | |
|---|---|---|
| 809,810 A | 1/1906 | Jost |
| 847,360 A | 3/1907 | Osius |
| 907,749 A | 12/1908 | Davenport |
| 1,042,058 A | 10/1912 | Van Hook |
| 1,179,129 A | 4/1916 | Maxam |
| 1,378,922 A | 5/1921 | Ward |
| 1,502,440 A | 7/1924 | Robert |
| 1,730,535 A | 10/1929 | Rudolph |
| 1,732,310 A | 10/1929 | Naibert |
| 1,762,692 A | 6/1930 | Lair |
| 1,805,675 A | 5/1931 | Rudolph |
| 1,882,040 A | 10/1932 | Roehm |
| 1,898,652 A | 2/1933 | Williams |
| 1,914,290 A | 6/1933 | Popkin |
| 1,941,665 A | 1/1934 | De Walt |
| 1,964,590 A | 6/1934 | Muller |
| 1,998,696 A | 4/1935 | Andis |
| 2,017,284 A | 10/1935 | Lembright |
| 2,052,098 A | 8/1936 | Lockett |
| 2,064,418 A | 12/1936 | Derringer |
| 2,076,410 A | 4/1937 | McGerry |
| 2,112,646 A | 3/1938 | Biederman |
| 2,154,427 A | 4/1939 | Andres |
| 2,189,116 A | 2/1940 | Niemiec |
| 2,218,081 A | 10/1940 | Brichieri-colombi et al. |
| 2,218,443 A | 10/1940 | Tweddle |
| 2,234,102 A | 3/1941 | Andres |
| 2,314,590 A | 3/1943 | Mccarty |
| 2,470,660 A | 5/1949 | Snyder |
| 2,519,790 A | 8/1950 | Quinn |
| 2,561,034 A | 7/1951 | Phillips |
| 2,616,417 A | 11/1952 | Holbrook |
| 2,661,736 A | 12/1953 | Schwartz |
| 2,674,994 A | 4/1954 | Murphy |
| 3,396,720 A | 8/1968 | Shigeyuki |
| 3,818,904 A | 6/1974 | Kawada |
| 3,841,323 A | 10/1974 | Stoughton |
| 3,906,940 A | 9/1975 | Kawada |
| 3,910,262 A | 10/1975 | Stoughton |
| 4,033,338 A | 7/1977 | Igwebike |
| 4,088,128 A | 5/1978 | Mabuchi |
| 4,175,554 A | 11/1979 | Gerow |
| 4,203,431 A | 5/1980 | Abura et al. |
| 4,312,350 A | 1/1982 | Doan |
| 4,428,368 A | 1/1984 | Torii |
| 4,813,403 A | 3/1989 | Endo |
| 4,900,316 A | 2/1990 | Yamamoto |
| 5,003,966 A | 4/1991 | Saka et al. |
| D323,034 S | 1/1992 | Reinstein |
| D329,563 S | 9/1992 | Rasmussen |
| 5,336,158 A | 8/1994 | Huggins et al. |
| D351,236 S | 10/1994 | Held |
| 5,377,701 A | 1/1995 | Fang |
| 5,377,702 A | 1/1995 | Sakurai |
| D359,563 S | 6/1995 | Chi |
| 5,501,650 A | 3/1996 | Gellert |
| 5,593,381 A | 1/1997 | Tannenbaum et al. |
| 5,647,837 A | 7/1997 | McCarty |
| 5,662,593 A | 9/1997 | Tillman et al. |
| 5,690,603 A | 11/1997 | Kain |
| 5,693,002 A | 12/1997 | Tucker et al. |
| 5,725,473 A | 3/1998 | Taylor |
| 5,813,973 A | 9/1998 | Gloth |
| D402,905 S | 12/1998 | Kanza et al. |
| D414,582 S | 9/1999 | Hwang |
| D419,893 S | 2/2000 | Cheng |
| 6,099,463 A | 8/2000 | Hockhalter |
| 6,183,414 B1 | 2/2001 | Wysor et al. |
| D449,690 S | 5/2001 | Hovland et al. |
| D443,057 S | 10/2001 | Hovland et al. |
| 6,319,211 B1 | 11/2001 | Ito et al. |
| D463,862 S | 10/2002 | Lau |
| 6,464,653 B1 | 10/2002 | Hovland et al. |
| 6,517,511 B2 | 2/2003 | Yao |
| D478,385 S | 8/2003 | Dirks et al. |
| 6,666,875 B1 | 12/2003 | Sakurai et al. |
| 6,723,060 B2 | 4/2004 | Miller |
| 6,733,438 B1 | 5/2004 | Dann et al. |
| 6,758,826 B2 | 7/2004 | Luettgen et al. |
| D509,301 S | 9/2005 | Talbot et al. |
| 6,949,067 B1 | 9/2005 | Dann et al. |
| D510,441 S | 10/2005 | Harris, Jr. et al. |
| 6,964,643 B2 | 11/2005 | Hovland et al. |
| D523,561 S | 6/2006 | Telford |
| D523,562 S | 6/2006 | Telford |
| D523,963 S | 6/2006 | Telford |
| 7,079,898 B2 | 7/2006 | Cohn |
| D545,446 S | 6/2007 | Wu |
| 7,318,811 B1 | 1/2008 | Corbishley |
| 7,377,890 B2 | 5/2008 | Liu |
| 7,431,718 B2 | 10/2008 | Ikadai |
| 7,530,944 B1 | 5/2009 | Kain |
| 7,534,203 B2 | 5/2009 | Gil |
| D609,361 S | 2/2010 | McGarry et al. |
| D612,510 S | 3/2010 | Byle |
| 7,682,321 B2 | 3/2010 | Naldoni |
| D613,417 S | 4/2010 | Imboden et al. |
| D621,950 S | 8/2010 | Seki et al. |
| 7,828,717 B2 | 11/2010 | Lee |
| D637,308 S | 5/2011 | Imboden et al. |
| D637,309 S | 5/2011 | Park |
| 7,967,740 B2 | 6/2011 | Mertens et al. |
| D649,657 S | 11/2011 | Petersen et al. |
| D652,523 S | 1/2012 | Bradley et al. |
| 8,100,887 B2 | 1/2012 | Weston et al. |
| 8,147,399 B2 | 4/2012 | Gloth |
| D665,091 S | 8/2012 | Mistry et al. |
| D666,303 S | 8/2012 | Ding et al. |
| D671,226 S | 11/2012 | Aulwes et al. |
| 8,371,999 B2 | 2/2013 | DeAlva |
| 8,382,656 B1 | 2/2013 | Brown |
| D681,225 S | 4/2013 | Chen |
| D681,842 S | 5/2013 | Chang |
| D689,382 S | 9/2013 | Juhng et al. |
| D692,570 S | 10/2013 | Uzon et al. |
| 8,556,798 B2 | 10/2013 | Mertens et al. |
| 8,568,342 B2 | 10/2013 | Shaviv |
| D693,247 S | 11/2013 | Juhng et al. |
| 8,579,837 B1 | 11/2013 | Makower et al. |
| 8,647,255 B2 | 2/2014 | Levy |
| 8,708,998 B2 | 4/2014 | Weston et al. |
| D704,345 S | 5/2014 | Tai |
| D706,440 S | 6/2014 | Hahr et al. |
| D706,441 S | 6/2014 | Hahr et al. |
| D706,444 S | 6/2014 | Hahr et al. |
| D708,440 S | 7/2014 | Owen et al. |
| 8,784,297 B2 | 7/2014 | Mertens et al. |
| 8,821,421 B2 | 9/2014 | Imboden et al. |
| 8,874,215 B2 | 10/2014 | Forsell |
| 8,876,760 B2 | 11/2014 | Bosman et al. |
| D723,160 S | 2/2015 | Rodan et al. |
| D723,707 S | 3/2015 | Matsuura |
| D723,711 S | 3/2015 | Elliott |
| 9,022,925 B2 | 5/2015 | Nan |
| RE45,585 E | 6/2015 | Peddicord |
| 9,107,797 B2 | 8/2015 | Levy |
| 9,114,056 B2 | 8/2015 | Imboden et al. |
| D739,951 S | 9/2015 | Tai |
| 9,132,058 B2 | 9/2015 | Imboden et al. |
| D759,256 S | 6/2016 | Chen |
| D759,261 S | 6/2016 | Son et al. |

(56) References Cited

U.S. PATENT DOCUMENTS

| | | |
|---|---|---|
| 9,370,656 B2 | 6/2016 | Forsell |
| RE46,163 E | 9/2016 | Peddicord |
| D768,309 S | 10/2016 | Hetzel |
| D768,310 S | 10/2016 | Hetzel |
| D771,389 S | 11/2016 | Since |
| D771,828 S | 11/2016 | Sedic |
| D772,419 S | 11/2016 | Courtion et al. |
| D773,061 S | 11/2016 | Loebel et al. |
| D773,065 S | 11/2016 | Driscoll et al. |
| 9,486,388 B2 | 11/2016 | Wright, Jr. |
| 9,498,404 B2 | 11/2016 | Murison |
| D773,823 S | 12/2016 | Wong |
| D793,571 S | 8/2017 | Iurchenko |
| D794,854 S | 8/2017 | Zepter |
| D796,054 S | 8/2017 | Chen |
| D796,055 S | 8/2017 | Chen |
| 9,737,457 B2 | 8/2017 | Allen |
| 9,737,458 B1 | 8/2017 | Olivares et al. |
| D797,302 S | 9/2017 | Vahlensieck et al. |
| 9,763,851 B2 | 9/2017 | Lenke |
| D802,784 S | 11/2017 | Lee |
| D804,332 S | 12/2017 | Lim et al. |
| D805,781 S | 12/2017 | Szymanski et al. |
| 9,849,061 B2 | 12/2017 | Lenke |
| D809,150 S | 1/2018 | Nolasco et al. |
| D809,170 S | 1/2018 | Marzynski |
| 9,855,186 B2 | 1/2018 | Goldenberg et al. |
| D809,945 S | 2/2018 | Prommel et al. |
| 9,889,064 B1 | 2/2018 | Olivares et al. |
| 9,931,271 B2 | 4/2018 | Peter |
| 9,937,097 B2 | 4/2018 | Lenke |
| D822,843 S | 7/2018 | Lenke |
| D825,073 S | 8/2018 | Lenke |
| 10,085,913 B2 | 10/2018 | Blenk et al. |
| D846,754 S | 4/2019 | Nelson et al. |
| 10,342,728 B2 | 7/2019 | Nelson et al. |
| 10,675,208 B2 | 6/2020 | Nelson et al. |
| 10,857,063 B2 | 12/2020 | Lenke |
| 10,973,731 B2 | 4/2021 | Taskinen et al. |
| 11,039,978 B2 | 6/2021 | Forsell |
| 11,090,220 B2 | 8/2021 | Lenke |
| 11,103,418 B2 | 8/2021 | Lenke |
| 11,484,463 B2 | 11/2022 | Witt |
| 12,090,110 B2 | 9/2024 | Lenke |
| 2001/0041848 A1 | 11/2001 | Ito et al. |
| 2002/0120219 A1 | 8/2002 | Hovland et al. |
| 2002/0198488 A1 | 12/2002 | Yao |
| 2003/0114804 A1 | 6/2003 | Putzer |
| 2003/0125768 A1 | 7/2003 | Peter |
| 2003/0176817 A1 | 9/2003 | Chang |
| 2004/0102822 A1 | 5/2004 | Cohn |
| 2004/0193079 A1 | 9/2004 | Siddhartha |
| 2004/0236254 A1 | 11/2004 | Nichols |
| 2004/0260209 A1 | 12/2004 | Ella et al. |
| 2004/0260210 A1 | 12/2004 | Ella et al. |
| 2004/0260212 A1 | 12/2004 | Cho |
| 2005/0159684 A1 | 7/2005 | Ikadai |
| 2005/0159760 A1 | 7/2005 | Ikadai et al. |
| 2005/0203446 A1 | 9/2005 | Takashima |
| 2005/0256369 A1 | 11/2005 | Gloth |
| 2006/0089572 A1 | 4/2006 | Byon |
| 2006/0116612 A1 | 6/2006 | Drysdale |
| 2006/0229494 A1 | 10/2006 | Wu |
| 2007/0049792 A1 | 3/2007 | Levy |
| 2007/0100259 A1 | 5/2007 | Nan |
| 2007/0185553 A1 | 8/2007 | Kennedy |
| 2008/0011310 A1 | 1/2008 | Anderson et al. |
| 2008/0071138 A1 | 3/2008 | Mertens et al. |
| 2008/0091060 A1 | 4/2008 | Heilman |
| 2008/0106896 A1 | 5/2008 | Liu et al. |
| 2008/0275386 A1 | 11/2008 | Myers |
| 2008/0304984 A1 | 12/2008 | Chan |
| 2008/0312674 A1 | 12/2008 | Chen et al. |
| 2009/0016563 A1 | 1/2009 | Wei et al. |
| 2009/0038069 A1 | 2/2009 | Heilman |
| 2009/0048581 A1 | 2/2009 | Sebban |
| 2009/0069629 A1 | 3/2009 | Calvo |
| 2009/0099413 A1 | 4/2009 | Kobashikawa et al. |
| 2009/0118573 A1 | 5/2009 | Tsao |
| 2009/0275796 A1 | 11/2009 | Gil |
| 2009/0306577 A1 | 12/2009 | Akridge et al. |
| 2010/0056963 A1 | 3/2010 | Shaviv |
| 2010/0298745 A1 | 11/2010 | Liu et al. |
| 2011/0034837 A1 | 2/2011 | Lee |
| 2011/0098613 A1 | 4/2011 | Thomas et al. |
| 2011/0133910 A1 | 6/2011 | Alarcon |
| 2011/0218395 A1 | 9/2011 | Stout |
| 2011/0230802 A1 | 9/2011 | Nan |
| 2011/0288370 A1 | 11/2011 | Orten et al. |
| 2011/0295162 A1 | 12/2011 | Chang et al. |
| 2012/0150076 A1 | 6/2012 | Clarvoe |
| 2012/0330097 A1 | 12/2012 | Lee |
| 2013/0012769 A1 | 1/2013 | Carlson |
| 2013/0041295 A1 | 2/2013 | Koenig et al. |
| 2013/0109913 A1 | 5/2013 | Imboden et al. |
| 2013/0116503 A1 | 5/2013 | Mertens et al. |
| 2013/0226050 A1 | 8/2013 | Lee |
| 2013/0237751 A1 | 9/2013 | Alexander |
| 2013/0261385 A1 | 10/2013 | Zipper |
| 2013/0303975 A1 | 11/2013 | Gvodas, Jr. |
| 2014/0046127 A1 | 2/2014 | Topolovac et al. |
| 2014/0088351 A1 | 3/2014 | Murison |
| 2014/0088468 A1 | 3/2014 | Murison |
| 2014/0088470 A1 | 3/2014 | Topolovac et al. |
| 2014/0135798 A1 | 5/2014 | David |
| 2014/0142374 A1 | 5/2014 | Makower et al. |
| 2014/0179994 A1 | 6/2014 | Topolovac et al. |
| 2014/0188017 A1 | 7/2014 | Wu |
| 2014/0194794 A1 | 7/2014 | Sedic |
| 2014/0228629 A1 | 8/2014 | Baetica et al. |
| 2014/0236151 A1 | 8/2014 | Lee |
| 2014/0243590 A1 | 8/2014 | Fang et al. |
| 2014/0309565 A1 | 10/2014 | Allen |
| 2014/0350333 A1 | 11/2014 | Stout |
| 2015/0000678 A1 | 1/2015 | Buckler et al. |
| 2015/0003644 A1 | 1/2015 | George et al. |
| 2015/0105609 A1 | 4/2015 | Jochum |
| 2015/0133832 A1 | 5/2015 | Courtion et al. |
| 2015/0133833 A1 | 5/2015 | Bradley et al. |
| 2015/0164678 A1 | 6/2015 | Lee et al. |
| 2015/0174387 A1 | 6/2015 | McInnes et al. |
| 2015/0196453 A1 | 7/2015 | Wu |
| 2015/0196455 A1 | 7/2015 | Mertens et al. |
| 2015/0257921 A1 | 9/2015 | Sheffy |
| 2015/0328081 A1 | 11/2015 | Goldenberg et al. |
| 2015/0351999 A1 | 12/2015 | Brouse |
| 2015/0366751 A1 | 12/2015 | Stemple |
| 2016/0000647 A1 | 1/2016 | Eberhardt |
| 2016/0015595 A1 | 1/2016 | Blenk et al. |
| 2016/0022533 A1 | 1/2016 | Makower et al. |
| 2016/0045392 A1 | 2/2016 | Massey et al. |
| 2016/0058509 A1 | 3/2016 | Van De Wouw et al. |
| 2016/0058620 A1 | 3/2016 | George et al. |
| 2016/0074276 A1 | 3/2016 | Scheuring et al. |
| 2016/0120375 A1 | 5/2016 | Philips |
| 2016/0120737 A1 | 5/2016 | Sedic |
| 2016/0128897 A1 | 5/2016 | George et al. |
| 2016/0136036 A1 | 5/2016 | Cai |
| 2016/0151236 A1 | 6/2016 | Makower et al. |
| 2016/0175186 A1 | 6/2016 | Shadduck |
| 2016/0213557 A1 | 7/2016 | Lenke |
| 2016/0235621 A1 | 8/2016 | Choe |
| 2016/0296417 A1 | 10/2016 | Topolovac et al. |
| 2017/0027809 A1 | 2/2017 | Lenke |
| 2017/0027810 A1 | 2/2017 | Murison |
| 2017/0065483 A1 | 3/2017 | Lenke |
| 2017/0095399 A1 | 4/2017 | Lee |
| 2017/0100303 A1 | 4/2017 | Kotlov |
| 2017/0135895 A1 | 5/2017 | Jafri |
| 2017/0156971 A1 | 6/2017 | Topolovac et al. |
| 2017/0196801 A1 | 7/2017 | Ghazvini et al. |
| 2017/0202731 A1 | 7/2017 | Goldfarb et al. |
| 2017/0216135 A1 | 8/2017 | Lenke |
| 2017/0281457 A1 | 10/2017 | Witt |

(56) References Cited

U.S. PATENT DOCUMENTS

| | | |
|---|---|---|
| 2017/0319430 A1 | 11/2017 | Shadduck |
| 2017/0367925 A1 | 12/2017 | Allen |
| 2018/0031089 A1 | 2/2018 | Wong et al. |
| 2018/0031090 A1 | 2/2018 | Wong et al. |
| 2018/0071167 A1 | 3/2018 | Lee |
| 2018/0092799 A1 | 4/2018 | Lenke |
| 2018/0125748 A1 | 5/2018 | Goldenberg et al. |
| 2018/0153764 A1 | 6/2018 | Lenke |
| 2018/0243161 A1 | 8/2018 | Lenke |
| 2018/0243162 A1 | 8/2018 | Lenke |
| 2018/0325769 A1 | 11/2018 | Scheuring et al. |
| 2019/0012884 A1 | 1/2019 | Xu et al. |
| 2019/0015291 A1 | 1/2019 | Sedic |
| 2019/0083354 A1 | 3/2019 | Pahl |
| 2020/0046599 A1 | 2/2020 | Sedic |
| 2020/0069850 A1 | 3/2020 | Beadle et al. |
| 2020/0085676 A1 | 3/2020 | Haddock et al. |
| 2020/0093681 A1 | 3/2020 | Haddock et al. |
| 2020/0214932 A1 | 7/2020 | Pahl et al. |
| 2020/0237609 A1 | 7/2020 | Kirsten et al. |
| 2020/0281808 A1 | 9/2020 | Kirsten et al. |
| 2021/0038468 A1 | 2/2021 | Lenke |
| 2021/0038469 A1 | 2/2021 | Zegenhagen et al. |
| 2021/0038470 A1 | 2/2021 | Zegenhagen |
| 2021/0052463 A1 | 2/2021 | Lenke |
| 2021/0128395 A1 | 5/2021 | Witt |
| 2022/0211569 A1 | 7/2022 | Lenke |
| 2022/0211570 A1 | 7/2022 | Zegenhagen |
| 2022/0226186 A1 | 7/2022 | Lenke |

FOREIGN PATENT DOCUMENTS

| | | | |
|---|---|---|---|
| AU | 2014323661 | 3/2018 | |
| AU | 2015386680 | 3/2018 | |
| CA | 2923526 | 3/2015 | |
| CA | 2978495 | 9/2016 | |
| CA | 2943097 | 10/2017 | |
| CH | 329193 | 4/1958 | |
| CN | 2153351 | 1/1994 | |
| CN | 2157772 | 3/1994 | |
| CN | 2198900 | 5/1995 | |
| CN | 2696611 | 5/2005 | |
| CN | 2765609 | 3/2006 | |
| CN | 1299659 | 2/2007 | |
| CN | 201067499 | 6/2008 | |
| CN | 201101685 | 8/2008 | |
| CN | 201119979 | 9/2008 | |
| CN | 200139737 | 10/2008 | |
| CN | 201139737 | 10/2008 | |
| CN | 101401739 | 4/2009 | |
| CN | 101848688 | 9/2010 | |
| CN | 102151219 | 8/2011 | |
| CN | 202154785 | 3/2012 | |
| CN | 102600034 | 7/2012 | |
| CN | 102743275 | 10/2012 | |
| CN | 102743276 | 10/2012 | |
| CN | 202715029 | 2/2013 | |
| CN | 103070767 | 5/2013 | |
| CN | 103517697 | 1/2014 | |
| CN | 103961246 | 8/2014 | |
| CN | 104248500 | 12/2014 | |
| CN | 104284648 | 1/2015 | |
| CN | 204931954 | 1/2016 | |
| CN | 105616124 | 6/2016 | |
| CN | 205494128 | 8/2016 | |
| CN | 107137218 | 9/2017 | |
| CN | 108599516 | 9/2018 | |
| DE | 278733 | 8/1912 | |
| DE | 538578 | 11/1931 | |
| DE | 582196 | 8/1933 | |
| DE | 1463673 | 5/1939 | |
| DE | 856788 | 11/1952 | |
| DE | 1703184 | 7/1955 | |
| DE | 7237890 | 3/1973 | |
| DE | 3222467 | 12/1983 | |
| DE | 3515691 A1 | 2/1986 | |
| DE | 3515691 C2 | 8/1990 | |
| DE | 9309994 | 10/1993 | |
| DE | 4243876 | 6/1994 | |
| DE | 4304091 | 8/1994 | |
| DE | 4341790 | 6/1995 | |
| DE | 69108892 | 12/1995 | |
| DE | 19505047 C1 | 1/1997 | |
| DE | 19615557 A1 | 10/1997 | |
| DE | 29809041 | 11/1998 | |
| DE | 29809828 | 11/1998 | |
| DE | 19853353 | 6/2000 | |
| DE | 10011289 | 9/2001 | |
| DE | 20112384 | 10/2001 | |
| DE | 20106065 | 11/2001 | |
| DE | 10100795 | 8/2002 | |
| DE | 10218124 | 11/2003 | |
| DE | 202005004843 | 7/2005 | |
| DE | 102004017702 | 10/2005 | |
| DE | 102006016401 | 8/2007 | |
| DE | 102005042092 | 10/2007 | |
| DE | 102005042092 A1 * | 10/2007 | ............. A61H 19/44 |
| DE | 202007016874 | 2/2008 | |
| DE | 202007019339 | 1/2012 | |
| DE | 202012005414 | 6/2012 | |
| DE | 102012015471 | 2/2014 | |
| DE | 102013100943 | 7/2014 | |
| DE | 212013000027 | 8/2014 | |
| DE | 102013110501 | 3/2015 | |
| DE | 202014009296 U1 | 3/2015 | |
| DE | 202015005041 | 10/2015 | |
| DE | 202015105689 | 11/2015 | |
| DE | 102016105019 | 7/2017 | |
| DE | 202016008414 | 11/2017 | |
| DE | 202016008435 | 12/2017 | |
| DE | 102017104052 | 8/2018 | |
| DE | 202017104021 | 10/2018 | |
| DE | 202019104701 | 11/2019 | |
| EP | 0251430 | 1/1988 | |
| EP | 0365230 | 4/1990 | |
| EP | 472965 | 3/1992 | |
| EP | 0503027 | 4/1995 | |
| EP | 1477149 | 11/2004 | |
| EP | 1554947 | 7/2005 | |
| EP | 1143909 | 6/2008 | |
| EP | 2042147 | 4/2009 | |
| EP | 2645979 | 10/2013 | |
| EP | 2674142 | 12/2013 | |
| EP | 2712601 | 4/2014 | |
| EP | 2777680 | 9/2014 | |
| EP | 2895135 | 7/2015 | |
| EP | 3031438 | 6/2016 | |
| EP | 3153148 A1 | 4/2017 | |
| EP | 3260106 | 12/2017 | |
| EP | 3305266 | 4/2018 | |
| EP | 3357383 | 8/2018 | |
| EP | 2976057 | 12/2018 | |
| FR | 2627693 A1 | 9/1989 | |
| FR | 2746639 | 10/1997 | |
| GB | 191018973 | 11/1910 | |
| GB | 1049972 | 11/1966 | |
| GB | 1060507 | 3/1967 | |
| GB | 1077143 A | 7/1967 | |
| GB | 2137097 | 10/1984 | |
| JP | S4728781 Y | 8/1972 | |
| JP | 52-157289 | 11/1977 | |
| JP | 53135768 | 11/1978 | |
| JP | 53149442 | 12/1978 | |
| JP | S547433 Y | 4/1979 | |
| JP | 54115952 | 9/1979 | |
| JP | 57099986 | 6/1982 | |
| JP | H05037234 | 5/1993 | |
| JP | H6209975 | 8/1994 | |
| JP | 2555943 | 11/1997 | |
| JP | 2000197518 | 7/2000 | |
| JP | 2005288079 | 10/2005 | |
| JP | 2008-125577 | 6/2008 | |
| JP | 2011-083423 | 4/2011 | |
| JP | 2011-188921 A | 9/2011 | |

(56) References Cited

FOREIGN PATENT DOCUMENTS

| | | |
|---|---|---|
| JP | 2011188921 | 9/2011 |
| KR | 2000-0002800 | 2/2000 |
| KR | 10-2001-0093088 | 10/2001 |
| KR | 200439531 | 4/2008 |
| KR | 20130068426 | 6/2013 |
| RU | 2014059 | 6/1994 |
| RU | 2005134513 | 4/2006 |
| TW | 201507719 | 3/2015 |
| TW | 201542190 | 11/2015 |
| TW | 201603797 | 2/2016 |
| WO | WO9205758 | 4/1992 |
| WO | 00028939 | 5/2000 |
| WO | 2004004610 | 1/2004 |
| WO | 2004058134 | 7/2004 |
| WO | 2005061042 | 7/2005 |
| WO | 2005099366 | 10/2005 |
| WO | 2005110331 | 11/2005 |
| WO | 2006058291 | 6/2006 |
| WO | 2006063461 | 6/2006 |
| WO | 2007119034 | 10/2007 |
| WO | 2007121107 | 10/2007 |
| WO | 2008002625 | 1/2008 |
| WO | 2008028076 | 3/2008 |
| WO | 2008052151 | 5/2008 |
| WO | 2008107902 | 9/2008 |
| WO | 2009012172 | 1/2009 |
| WO | 2009087627 | 7/2009 |
| WO | 2010149168 | 12/2010 |
| WO | 2011146948 | 11/2011 |
| WO | 2012062256 | 5/2012 |
| WO | 2012152297 | 11/2012 |
| WO | 2013003954 | 1/2013 |
| WO | 2013067367 | 5/2013 |
| WO | 2013134388 | 9/2013 |
| WO | 2013138658 | 9/2013 |
| WO | 2013178223 | 12/2013 |
| WO | 2014008606 | 1/2014 |
| WO | 2014047718 | 4/2014 |
| WO | 2014048884 | 4/2014 |
| WO | 2014081600 | 5/2014 |
| WO | 2014085736 | 6/2014 |
| WO | 2014127531 | 8/2014 |
| WO | 2014131110 | 9/2014 |
| WO | WO2015039787 | 3/2015 |
| WO | 2015060717 | 4/2015 |
| WO | 2015070242 | 5/2015 |
| WO | 2015096179 | 7/2015 |
| WO | 2015101790 | 7/2015 |
| WO | 2016146206 | 9/2016 |
| WO | 2016162319 A1 | 10/2016 |
| WO | 2016172653 | 10/2016 |
| WO | 2017141037 | 8/2017 |
| WO | 2017158107 | 9/2017 |
| WO | 2018065540 | 4/2018 |
| WO | 2018154134 | 8/2018 |
| WO | 2018158250 | 9/2018 |
| WO | 2019158240 | 8/2019 |
| WO | 2019192660 | 10/2019 |
| WO | 2019192661 | 10/2019 |

OTHER PUBLICATIONS

English translation (Year: 2007).*
International Searching Authority, "International Search Report," issued in connection with International Application No. PCT/EP2017/075400, dated May 18, 2018, 6 pages.
International Searching Authority, "Written Opinion," issued in connection with International Application No. PCT/EP2017/075400, dated May 18, 2018, 10 pages.
IP Australia, "Opposition—Decision Issued," issued in connection with Australian Patent Application No. 2018203659 on Jan. 5, 2021, 35 pages.
International Searching Authority, "International Search Report," issued in connection with International Application No. PCT/DE2019/100309, on Jul. 15, 2019, 7 pages (includes English translation).
International Searching Authority, "Written Opinion," issued in connection with International Application No. PCT/DE2019/100309, on Jul. 15, 2019, 13 pages (includes English translation).
International Searching Authority, "International Search Report," issued in connection with International Application No. PCT/DE2019/100308, on Oct. 10, 2019, 10 pages (includes English translation).
International Searching Authority, "Written Opinion," issued in connection with International Application No. PCT/DE2019/100308, on Oct. 10, 2019, 21 pages (includes English translation).
*EIS, Inc.* v. *Wow Tech International GmbH*, "Defendants' Response to Plaintiff's Second Notice of Supplemental Authority," filed with the United States District Court for the District of Delaware in connection with Case No. 1:19-cv-01227-LPS on Aug. 21, 2020, 191 pages.
European Patent Office, "Search Report," issued in connection with European Application No. 20174260, on Sep. 22, 2020, 18 pages (includes English translation).
International Searching Authority, "International Search Report," issued in connection with International Application No. PCT/DE2019/100860, on Dec. 18, 2019, 6 pages (includes English translation).
International Searching Authority, "Written Opinion," issued in connection with International Application No. PCT/DE2019/100860, on Dec. 18, 2019, 11 pages (includes English translation).
"Decision Granting Petitioner's Request on Rehearing of Decision Denying Institution, Granting Institution of Inter Partes Review," issued by the United States Patent and Trademark Office in connection with Case IPR 2020-00007 on Sep. 25, 2020, 22 pages.
IP Australia, "Notice of Opposition," issued in connection with Australian Patent Application No. 2018222907 on Dec. 4, 2020, 110 pages.
Gillan et al., "Vaginal and Pelvic Floor Responses to Sexual Stimulation," Psychophysiology, vol. 16, No. 5 (Sep. 1979), pp. 471-481, 1 page (Abstract only provided).
"Petitioner's Reply to Patent Owner's Response," filed with the United States Patent and Trademark Office in connection with Case IPR2019-01302 on Dec. 4, 2020, 41 pages.
"Petitioner's Reply to Patent Owner's Response," Exhibit 1018, filed with the United States Patent and Trademark Office in connection with Case IPR2019-01302 on Dec. 4, 2020, 79 pages.
"Petitioner's Reply to Patent Owner's Response," Exhibit 1019, filed with the United States Patent and Trademark Office in connection with Case IPR2019-01302 on Dec. 4, 2020, 4 pages.
"Petitioner's Reply to Patent Owner's Response," Exhibit 1020, filed with the United States Patent and Trademark Office in connection with Case IPR2019-01302 on Dec. 4, 2020, 55 pages.
"Petitioner's Reply to Patent Owner's Response," Exhibit 1021, filed with the United States Patent and Trademark Office in connection with Case IPR2019-01302 on Dec. 4, 2020, 16 pages.
"Petitioner's Reply to Patent Owner's Response," Exhibit 1022, filed with the United States Patent and Trademark Office in connection with Case IPR2019-01302 on Dec. 4, 2020, 258 pages.
"Petitioner's Reply to Patent Owner's Response," Exhibit 1023, filed with the United States Patent and Trademark Office in connection with Case IPR2019-01302 on Dec. 4, 2020, 234 pages.
"Petitioner's Reply to Patent Owner's Response," Exhibit 1024, filed with the United States Patent and Trademark Office in connection with Case IPR2019-01302 on Dec. 4, 2020, 19 pages.
"Petitioner's Reply to Patent Owner's Response," Exhibit 1025, filed with the United States Patent and Trademark Office in connection with Case IPR2019-01302 on Dec. 4, 2020, 22 pages.
"Petitioner's Reply to Patent Owner's Response," Exhibit 1026, filed with the United States Patent and Trademark Office in connection with Case IPR2019-01302 on Dec. 4, 2020, 3 pages.
"Petitioner's Reply to Patent Owner's Response," Exhibit 1027, filed with the United States Patent and Trademark Office in connection with Case IPR2019-01302 on Dec. 4, 2020, 4 pages.
"Petitioner's Reply to Patent Owner's Response," Exhibit 1028, filed with the United States Patent and Trademark Office in connection with Case IPR2019-01302 on Dec. 4, 2020, 4 pages.

(56) References Cited

OTHER PUBLICATIONS

"Petitioner's Reply to Patent Owner's Response," Exhibit 1029, filed with the United States Patent and Trademark Office in connection with Case IPR2019-01302 on Dec. 4, 2020, 9 pages.
"Petitioner's Reply to Patent Owner's Response," Exhibit 1030, filed with the United States Patent and Trademark Office in connection with Case IPR2019-01302 on Dec. 4, 2020, 9 pages.
"Petitioner's Reply to Patent Owner's Response," Exhibit 1031, filed with the United States Patent and Trademark Office in connection with Case IPR2019-01302 on Dec. 4, 2020, 18 pages.
"Petitioner's Reply to Patent Owner's Response," Exhibit 1032, filed with the United States Patent and Trademark Office in connection with Case IPR2019-01302 on Dec. 4, 2020, 15 pages.
"Petitioner's Reply to Patent Owner's Response," Exhibit 1033, filed with the United States Patent and Trademark Office in connection with Case IPR2019-01302 on Dec. 4, 2020, 17 pages.
"Petitioner's Reply to Patent Owner's Response," Exhibit 1034, filed with the United States Patent and Trademark Office in connection with Case IPR2019-01302 on Dec. 4, 2020, 2 pages.
"Petitioner's Reply to Patent Owner's Response," Exhibit 1035, filed with the United States Patent and Trademark Office in connection with Case IPR2019-01302 on Dec. 4, 2020, 11 pages.
"Petitioner's Reply to Patent Owner's Response," Exhibit 1036, filed with the United States Patent and Trademark Office in connection with Case IPR2019-01302 on Dec. 4, 2020, 7 pages.
"Petitioner's Reply to Patent Owner's Response," Exhibit 1037, filed with the United States Patent and Trademark Office in connection with Case IPR2019-01302 on Dec. 4, 2020, 17 pages.
"Petitioner's Reply to Patent Owner's Response," Exhibit 1038, filed with the United States Patent and Trademark Office in connection with Case IPR2019-01302 on Dec. 4, 2020, 16 pages.
"Petitioner's Reply to Patent Owner's Response," Exhibit 1039, filed with the United States Patent and Trademark Office in connection with Case IPR2019-01302 on Dec. 4, 2020, 29 pages.
"Petitioner's Reply to Patent Owner's Response," Exhibit 1040, filed with the United States Patent and Trademark Office in connection with Case IPR2019-01302 on Dec. 4, 2020, 74 pages.
"Petitioner's Reply to Patent Owner's Response," Exhibit 1041, filed with the United States Patent and Trademark Office in connection with Case IPR2019-01302 on Dec. 4, 2020, 1 page.
"Petitioner's Reply to Patent Owner's Response," Exhibit 1042, filed with the United States Patent and Trademark Office in connection with Case IPR2019-01302 on Dec. 4, 2020, 1 page.
"Petitioner's Reply to Patent Owner's Response," Exhibit 1043, filed with the United States Patent and Trademark Office in connection with Case IPR2019-01302 on Dec. 4, 2020, 6 pages.
"Petitioner's Reply to Patent Owner's Response," Exhibit 1044, filed with the United States Patent and Trademark Office in connection with Case IPR2019-01302 on Dec. 4, 2020, 136 pages.
"Petitioner's Reply to Patent Owner's Response," Exhibit 1045, filed with the United States Patent and Trademark Office in connection with Case IPR2019-01302 on Dec. 4, 2020, 1 page.
"Petitioner's Reply to Patent Owner's Response," Exhibit 1046, filed with the United States Patent and Trademark Office in connection with Case IPR2019-01302 on Dec. 4, 2020, 1 page.
"Petitioner's Reply to Patent Owner's Response," Exhibit 1047, filed with the United States Patent and Trademark Office in connection with Case IPR2019-01302 on Dec. 4, 2020, 4 pages.
"Petitioner's Reply to Patent Owner's Response," Exhibit 1048, filed with the United States Patent and Trademark Office in connection with Case IPR2019-01302 on Dec. 4, 2020, 5 pages.
"Petitioner's Reply to Patent Owner's Response," Exhibit 1049, filed with the United States Patent and Trademark Office in connection with Case IPR2019-01302 on Dec. 4, 2020, 4 pages.
"Petitioner's Reply to Patent Owner's Response," Exhibit 1050, filed with the United States Patent and Trademark Office in connection with Case IPR2019-01302 on Dec. 4, 2020, 9 pages.
"Patent Owner's Amended Mandatory Notices Pursuant to 37 C.F.R. 42.8," filed with the United States Patent and Trademark Office in connection with Case IPR2019-01302 on Jan. 12, 2021, 9 pages.
"Patent Owner's Sur-Reply Pursuant to 37 C.F.R. 42.23," filed with the United States Patent and Trademark Office in connection with Case IPR2019-01302 on Jan. 15, 2021, 38 pages.
"Patent Owner's Sur-Reply Pursuant to 37 C.F.R. 42.23," Exhibit 2048, filed with the United States Patent and Trademark Office in connection with Case IPR2019-01302 on Jan. 15, 2021, 39 pages.
"Patent Owner's Sur-Reply Pursuant to 37 C.F.R. 42.23," Exhibit 2049, filed with the United States Patent and Trademark Office in connection with Case IPR2019-01302 on Jan. 15, 2021, 13 pages.
"Patent Owner's Sur-Reply Pursuant to 37 C.F.R. 42.23," Exhibit 2050, filed with the United States Patent and Trademark Office in connection with Case IPR2019-01302 on Jan. 15, 2021, 14 pages.
"Patent Owner's Sur-Reply Pursuant to 37 C.F.R. 42.23," Exhibit 2051, filed with the United States Patent and Trademark Office in connection with Case IPR2019-01302 on Jan. 15, 2021, 3 pages.
"Petitioner's Reply to Patent Owner's Response," filed with the United States Patent and Trademark Office in connection with Case IPR2019-01444 on Jan. 26, 2021, 41 pages.
"Petitioner's Reply to Patent Owner's Response," Exhibit 1013, filed with the United States Patent and Trademark Office in connection with Case IPR2019-01444 on Jan. 26, 2021, 32 pages.
"Petitioner's Reply to Patent Owner's Response," Exhibit 1014, filed with the United States Patent and Trademark Office in connection with Case IPR2019-01444 on Jan. 26, 2021, 29 pages.
"Petitioner's Reply to Patent Owner's Response," Exhibit 1015, filed with the United States Patent and Trademark Office in connection with Case IPR2019-01444 on Jan. 26, 2021, 196 pages.
"Petitioner's Reply to Patent Owner's Response," Exhibit 1016, filed with the United States Patent and Trademark Office in connection with Case IPR2019-01444 on Jan. 26, 2021, 253 pages.
"Petitioner's Reply to Patent Owner's Response," Exhibit 1017, filed with the United States Patent and Trademark Office in connection with Case IPR2019-01444 on Jan. 26, 2021, 88 pages.
"Petitioner's Reply to Patent Owner's Response," Exhibit 1018, filed with the United States Patent and Trademark Office in connection with Case IPR2019-01444 on Jan. 26, 2021, 93 pages.
"Petitioner's Reply to Patent Owner's Response," Exhibit 1019, filed with the United States Patent and Trademark Office in connection with Case IPR2019-01444 on Jan. 26, 2021, 4 pages.
"Petitioner's Reply to Patent Owner's Response," Exhibit 1020, filed with the United States Patent and Trademark Office in connection with Case IPR2019-01444 on Jan. 26, 2021, 41 pages.
"Petitioner's Reply to Patent Owner's Response," Exhibit 1021, filed with the United States Patent and Trademark Office in connection with Case IPR2019-01444 on Jan. 26, 2021, 16 pages.
"Petitioner's Reply to Patent Owner's Response," Exhibit 1022, filed with the United States Patent and Trademark Office in connection with Case IPR2019-01444 on Jan. 26, 2021, 258 pages.
"Petitioner's Reply to Patent Owner's Response," Exhibit 1023, filed with the United States Patent and Trademark Office in connection with Case IPR2019-01444 on Jan. 26, 2021, 234 pages.
"Petitioner's Reply to Patent Owner's Response," Exhibit 1024, filed with the United States Patent and Trademark Office in connection with Case IPR2019-01444 on Jan. 26, 2021, 11 pages.
"Petitioner's Reply to Patent Owner's Response," Exhibit 1025, filed with the United States Patent and Trademark Office in connection with Case IPR2019-01444 on Jan. 26, 2021, 6 pages.
"Petitioner's Reply to Patent Owner's Response," Exhibit 1026, filed with the United States Patent and Trademark Office in connection with Case IPR2019-01444 on Jan. 26, 2021, 3 pages.
"Petitioner's Reply to Patent Owner's Response," Exhibit 1027, filed with the United States Patent and Trademark Office in connection with Case IPR2019-01444 on Jan. 26, 2021, 4 pages.
"Petitioner's Reply to Patent Owner's Response," Exhibit 1028, filed with the United States Patent and Trademark Office in connection with Case IPR2019-01444 on Jan. 26, 2021, 4 pages.
"Petitioner's Reply to Patent Owner's Response," Exhibit 1029, filed with the United States Patent and Trademark Office in connection with Case IPR2019-01444 on Jan. 26, 2021, 9 pages.

(56) References Cited

OTHER PUBLICATIONS

"Petitioner's Reply to Patent Owner's Response," Exhibit 1030, filed with the United States Patent and Trademark Office in connection with Case IPR2019-01444 on Jan. 26, 2021, 9 pages.
"Petitioner's Reply to Patent Owner's Response," Exhibit 1031, filed with the United States Patent and Trademark Office in connection with Case IPR2019-01444 on Jan. 26, 2021, 18 pages.
"Petitioner's Reply to Patent Owner's Response," Exhibit 1032, filed with the United States Patent and Trademark Office in connection with Case IPR2019-01444 on Jan. 26, 2021, 15 pages.
"Petitioner's Reply to Patent Owner's Response," Exhibit 1033, filed with the United States Patent and Trademark Office in connection with Case IPR2019-01444 on Jan. 26, 2021, 17 pages.
"Petitioner's Reply to Patent Owner's Response," Exhibit 1034, filed with the United States Patent and Trademark Office in connection with Case IPR2019-01444 on Jan. 26, 2021, 2 pages.
"Petitioner's Reply to Patent Owner's Response," Exhibit 1035, filed with the United States Patent and Trademark Office in connection with Case IPR2019-01444 on Jan. 26, 2021, 11 pages.
"Petitioner's Reply to Patent Owner's Response," Exhibit 1036, filed with the United States Patent and Trademark Office in connection with Case IPR2019-01444 on Jan. 26, 2021, 18 pages.
"Petitioner's Reply to Patent Owner's Response," Exhibit 1037, filed with the United States Patent and Trademark Office in connection with Case IPR2019-01444 on Jan. 26, 2021, 17 pages.
"Petitioner's Reply to Patent Owner's Response," Exhibit 1038, filed with the United States Patent and Trademark Office in connection with Case IPR2019-01444 on Jan. 26, 2021, 16 pages.
"Petitioner's Reply to Patent Owner's Response," Exhibit 1039, filed with the United States Patent and Trademark Office in connection with Case IPR2019-01444 on Jan. 26, 2021, 5 pages.
"Petitioner's Reply to Patent Owner's Response," Exhibit 1040, filed with the United States Patent and Trademark Office in connection with Case IPR2019-01444 on Jan. 26, 2021, 74 pages.
"Petitioner's Reply to Patent Owner's Response," Exhibit 1041, filed with the United States Patent and Trademark Office in connection with Case IPR2019-01444 on Jan. 26, 2021, 5 pages.
"Petitioner's Reply to Patent Owner's Response," Exhibit 1043, filed with the United States Patent and Trademark Office in connection with Case IPR2019-01444 on Jan. 26, 2021, 6 pages.
"Petitioner's Reply to Patent Owner's Response," Exhibit 1044, filed with the United States Patent and Trademark Office in connection with Case IPR2019-01444 on Jan. 26, 2021, 136 pages.
"Petitioner's Reply to Patent Owner's Response," Exhibit 1045, filed with the United States Patent and Trademark Office in connection with Case IPR2019-01444 on Jan. 26, 2021, 1 page.
"Petitioner's Reply to Patent Owner's Response," Exhibit 1046, filed with the United States Patent and Trademark Office in connection with Case IPR2019-01444 on Jan. 26, 2021, 1 page.
"Petitioner's Reply to Patent Owner's Response," Exhibit 1047, filed with the United States Patent and Trademark Office in connection with Case IPR2019-01444 on Jan. 26, 2021, 4 pages.
"Petitioner's Reply to Patent Owner's Response," Exhibit 1048, filed with the United States Patent and Trademark Office in connection with Case IPR2019-01444 on Jan. 26, 2021, 5 pages.
"Petitioner's Reply to Patent Owner's Response," Exhibit 1049, filed with the United States Patent and Trademark Office in connection with Case IPR2019-01444 on Jan. 26, 2021, 4 pages.
"Petitioner's Reply to Patent Owner's Response," Exhibit 1050, filed with the United States Patent and Trademark Office in connection with Case IPR2019-01444 on Jan. 26, 2021, 12 pages.
Sparks et al., "Use of Silicone Materials to Simulate Tissue Biomechanics as Related to Deep Tissue Injury," Advances in Skin & Wound Care; vol. 28 No. 2, Feb. 2015; pp. 59-68, 10 pages.
Wu et al., "Simultaneous determination of the nonlinear-elastic properties of skin and subcutaneous tissue in unconfined compression tests," Skin Research and Technology 2007; 13: pp. 34-42, 9 pages.
Zahouani et al., "Characterization of the mechanical properties of a dermal equivalent compared with human skin in vivo by indentation and static friction tests," Skin Research and Technology 2009; 15: pp. 68-76, 9 pages.
The International Bureau of WIPO, "International Search Report and Written Opinion," issued in connection with International Application No. PCT/EP2015/067017, on Jul. 22, 2016, 34 pages (English translation included).
Linder-Ganz et al., "Assessment of mechanical conditions in subdermal tissues during sitting: a combined experimental-MRI and finite element approach," Journal of Biomechanics 40 (2007) pp. 1443-1454, 12 pages.
"valve," Merriam Webster.com, Merriam Webster, 2016, Dec. 26, 2016, 1 pg.
"can," Thefreedictionary.com, The free dictionary by Farlex, 2016, Dec. 26, 2016, 1 pg.
"pump," Merriam Webster.com, Merriam Webster, 2016, Dec. 26, 2016, 1 pg.
United States Patent and Trademark Office, "Notice of Allowance and Fee(s) Due," issued in connection with U.S. Appl. No. 15/023,471, on May 12, 2017, 10 pages.
United States Patent and Trademark Office, "Non-Final Office action," issued in connection with U.S. Appl. No. 15/302,981, on Jun. 2, 2017, 17 pages.
United States Patent and Trademark Office, "Non-Final Office action," issued in connection with U.S. Appl. No. 15/487,123, on Jun. 2, 2017, 16 pages.
United States Patent and Trademark Office, "Final Office action," issued in connection with U.S. Appl. No. 15/354,599, on Sep. 12, 2017, 47 pages.
United States Patent and Trademark Office, "Final Office action," issued in connection with U.S. Appl. No. 15/487,123, on Sep. 29, 2017, 7 pages.
United States Patent and Trademark Office, "Notice of Allowance and Fee(s) Due," issued in connection with U.S. Appl. No. 15/302,981, on Oct. 12, 2017, 5 pages.
United States Patent and Trademark Office, "Restriction Requirement," issued in connection with U.S. Appl. No. 15/719,085, on Nov. 8, 2017, 6 pages.
United States Patent and Trademark Office, "Supplemental Notice of Allowability," issued in connection with U.S. Appl. No. 15/302,981, on Nov. 17, 2017, 2 pages.
United States Patent and Trademark Office, "Notice of Allowance and Fee(s) Due," issued in connection with U.S. Appl. No. 15/487,123, on Dec. 11, 2017, 5 pages.
United States Patent and Trademark Office, "Non-Final Office action," issued in connection with U.S. Appl. No. 15/354,599, on Dec. 29, 2017, 46 pages.
United States Patent and Trademark Office, "Non-Final Office action," issued in connection with U.S. Appl. No. 15/719,085, on Jan. 25, 2018, 15 pages.
United States Patent and Trademark Office, "Corrected Notice of Allowability," issued in connection with U.S. Application No. 15/487, 123, on Mar. 13, 2018, 2 pages.
United States Patent and Trademark Office, "Notice of Allowance and Fee(s) Due," issued in connection with U.S. Appl. No. 15/719,085, on Dec. 12, 2018, 11 pages.
United States Patent and Trademark Office, "Supplemental Notice of Allowability," issued in connection with U.S. Appl. No. 15/719,085, on Jan. 11, 2019, 9 pages.
IP Australia, "Examination Report No. 2 for Standard Patent Application," issued in connection with Australian Application No. 2018200852, on Dec. 19, 2018, 4 pages.
International Searching Authority, "International Search Report and Written Opinion," issued in connection with International Application No. PCT/EP2018/082681, on Jan. 30, 2019, 21 pages (includes English machine translation of pp. 13 to 17).
United States Patent and Trademark Office, "Notice of Allowance," issued in connection with U.S. Appl. No. 15/719,085, on Mar. 20, 2019, 12 pages.

(56) References Cited

OTHER PUBLICATIONS

China National Intellectual Property Administration, "First Office Action," issued in connection with Chinese Application No. 201710927530.4, on Mar. 25, 2019, 5 pages (English translation included).
German Patent and Trademark Office, "Examination Report," issued in connection with German Application No. 10 2016 118 911.1, on Nov. 4, 2016, 10 pages. (English translation included.).
Zimmerman et al., "The Gentle Touch Receptors of Mammalian Skin," Special Section: Skin, Science, Nov. 21, 2014, vol. 346, Issue 6212, 6 pages.
Verkauf et al., "Clitoral Size in Normal Women," Obstetrics & Gynecology, vol. 80, No. 1, Jul. 1992, 4 pages.
IP Australia, "Notice of Acceptance for Patent Application," issued in connection with Australian Application No. 2017228536, on Jun. 21, 2018, 3 pages.
United States Patent and Trademark Office, "Notice of Filing Date Accorded to Petition and Time for Filing Patent Owner Preliminary Response," issued in connection with Case IPR2019-01444 on Aug. 14, 2019, 6 pages.
"Patent Owner's Amended Mandatory Notices Pursuant to 37 C.F.R. 42.8," filed with the United States Patent and Trademark Office in connection with case IPR2019-01444 on Aug. 26, 2019, 6 pages.
"Patent Owner's Amended Mandatory Notices Pursuant to 37 C.F.R. 42.8," filed with the United States Patent and Trademark Office in connection with case IPR2019-01444 on Sep. 30, 2019, 6 pages.
"Patent Owner's Amended Mandatory Notices Pursuant to 37 C.F.R. 42.8," filed with the United States Patent and Trademark Office in connection with case IPR2019-01444 on Oct. 23, 2019, 6 pages.
"Patent Owner's Mandatory Notices," filed with the United States Patent and Trademark Office in connection with case IPR2019-01444 on Aug. 21, 2019, 5 pages.
"Petitioner's Amended Mandatory Notices," filed with the United States Patent and Trademark Office in connection with case IPR2019-01444 on Oct. 8, 2019, 5 pages.
"Patent Owner's Preliminary Response Pursuant to 37 C.F.R. § 42.107," filed with the United States Patent and Trademark Office in connection with case IPR2019-01444 on Nov. 14, 2019, 88 pages.
"Patent Owner's Preliminary Response Pursuant to 37 C.F.R. § 42.107," Exhibit 2001, filed with the United States Patent and Trademark Office in connection with Case IPR2019-01444 on Nov. 14, 2019, 81 pages.
"Patent Owner's Preliminary Response Pursuant to 37 C.F.R. § 42.107," Exhibit 2002, filed with the United States Patent and Trademark Office in connection with Case IPR2019-01444 on Nov. 14, 2019, 36 pages.
"Patent Owner's Preliminary Response Pursuant to 37 C.F.R. § 42.107," Exhibit 2003, filed with the United States Patent and Trademark Office in connection with Case IPR2019-01444 on Nov. 14, 2019, 18 pages.
"Patent Owner's Preliminary Response Pursuant to 37 C.F.R. § 42.107," Exhibit 2004, filed with the United States Patent and Trademark Office in connection with Case IPR2019-01444 on Nov. 14, 2019, 97 pages.
"Patent Owner's Preliminary Response Pursuant to 37 C.F.R. § 42.107," Exhibit 2005, filed with the United States Patent and Trademark Office in connection with Case IPR2019-01444 on Nov. 14, 2019, 61 pages.
"Patent Owner's Preliminary Response Pursuant to 37 C.F.R. § 42.107," Exhibit 2006, filed with the United States Patent and Trademark Office in connection with Case IPR2019-01444 on Nov. 14, 2019, 60 pages.
"Patent Owner's Preliminary Response Pursuant to 37 C.F.R. § 42.107," Exhibit 2007, filed with the United States Patent and Trademark Office in connection with Case IPR2019-01444 on Nov. 14, 2019, 22 pages.
"Patent Owner's Preliminary Response Pursuant to 37 C.F.R. § 42.107," Exhibit 2008, filed with the United States Patent and Trademark Office in connection with Case IPR2019-01444 on Nov. 14, 2019, 12 pages.
"Patent Owner's Preliminary Response Pursuant to 37 C.F.R. § 42.107," Exhibit 2009, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2010, filed with the United States Patent and Trademark Office in connection with Case IPR2019-01444 on Nov. 14, 2019, 16 pages.
"Patent Owner's Preliminary Response Pursuant to 37 C.F.R. § 42.107," Exhibit 2011, filed with the United States Patent and Trademark Office in connection with Case IPR2019-01444 on Nov. 14, 2019, 10 pages.
"Patent Owner's Preliminary Response Pursuant to 37 C.F.R. § 42.107," Exhibit 2012, filed with the United States Patent and Trademark Office in connection with Case IPR2019-01444 on Nov. 14, 2019, 12 pages.
"Patent Owner's Preliminary Response Pursuant to 37 C.F.R. § 42.107," Exhibit 2013, filed with the United States Patent and Trademark Office in connection with Case IPR2019-01444 on Nov. 14, 2019, 9 pages.
"Patent Owner's Preliminary Response Pursuant to 37 C.F.R. § 42.107," Exhibit 2014, filed with the United States Patent and Trademark Office in connection with Case IPR2019-01444 on Nov. 14, 2019, 2 pages.
"Patent Owner's Preliminary Response Pursuant to 37 C.F.R. § 42.107," Exhibit 2015, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2016, filed with the United States Patent and Trademark Office in connection with Case IPR2019-01444 on Nov. 14, 2019, 172 pages.
"Patent Owner's Preliminary Response Pursuant to 37 C.F.R. § 42.107," Exhibit 2017, filed with the United States Patent and Trademark Office in connection with Case IPR2019-01444 on Nov. 14, 2019, 40 pages.
"Patent Owner's Preliminary Response Pursuant to 37 C.F.R. § 42.107," Exhibit 2018, filed with the United States Patent and Trademark Office in connection with Case IPR2019-01444 on Nov. 14, 2019, 153 pages.
"Patent Owner's Preliminary Response Pursuant to 37 C.F.R. § 42.107," Exhibit 2019, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2020, filed with the United States Patent and Trademark Office in connection with Case IPR2019-01444 on Nov. 14, 2019, 3 pages.
"Patent Owner's Preliminary Response Pursuant to 37 C.F.R. § 42.107," Exhibit 2021, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2022, filed with the United States Patent and Trademark Office in connection with Case IPR2019-01444 on Nov. 14, 2019, 11 pages.
"Patent Owner's Preliminary Response Pursuant to 37 C.F.R. § 42.107," Exhibit 2023, filed with the United States Patent and Trademark Office in connection with Case IPR2019-01444 on Nov. 14, 2019, 8 pages.
"Patent Owner's Preliminary Response Pursuant to 37 C.F.R. § 42.107," Exhibit 2024, filed with the United States Patent and Trademark Office in connection with Case IPR2019-01444 on Nov. 14, 2019, 20 pages.
"Patent Owner's Preliminary Response Pursuant to 37 C.F.R. § 42.107," Exhibit 2025, filed with the United States Patent and Trademark Office in connection with Case IPR2019-01444 on Nov. 14, 2019, 3 pages.

(56) References Cited

OTHER PUBLICATIONS

"Patent Owner's Preliminary Response Pursuant to 37 C.F.R. § 42.107," Exhibit 2026, filed with the United States Patent and Trademark Office in connection with Case IPR2019-01444 on Nov. 14, 2019, 9 pages.
"Patent Owner's Preliminary Response Pursuant to 37 C.F.R. § 42.107," Exhibit 2027, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2028, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2029, filed with the United States Patent and Trademark Office in connection with Case IPR2019-01444 on Nov. 14, 2019, 3 pages.
"Patent Owner's Preliminary Response Pursuant to 37 C.F.R. § 42.107," Exhibit 2030, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2031, filed with the United States Patent and Trademark Office in connection with Case IPR2019-01444 on Nov. 14, 2019, 7 pages.
"Patent Owner's Preliminary Response Pursuant to 37 C.F.R. § 42.107," Exhibit 2032, filed with the United States Patent and Trademark Office in connection with Case IPR2019-01444 on Nov. 14, 2019, 4 pages.
"Patent Owner's Preliminary Response Pursuant to 37 C.F.R. § 42.107," Exhibit 2033, filed with the United States Patent and Trademark Office in connection with Case IPR2019-01444 on Nov. 14, 2019, 25 pages.
"Patent Owner's Preliminary Response Pursuant to 37 C.F.R. § 42.107," Exhibit 2034, filed with the United States Patent and Trademark Office in connection with Case IPR2019-01444 on Nov. 14, 2019, 3 pages.
United States Patent and Trademark Office, "Notice of Filing Date Accorded to Petition and Time for Filing Patent Owner Preliminary Response," issued in connection with Case IPR2020-00007 on Oct. 8, 2019, 5 pages.
"Patent Owner's Amended Mandatory Notices Pursuant to 37 C.F.R. 42.8," filed with the United States Patent and Trademark Office in connection with case IPR2020-00007 on Oct. 23, 2019, 6 pages.
EIS, Inc. v. Wow Tech International GmbH, "Declaration of Frank Ferrari in Support of Defendants, Wow Tech International GmbH, Wow Tech Canada Ltd., and Novoluto GmbH's Consolidated Motion to Dismiss," filed with the United States District Court for the District of Delaware in connection with Case No. 1:19-cv-1277-LPS on Oct. 2, 2019, 3 pages.
EIS, Inc. v. Wow Tech International GmbH, "Declaration of Florian Holst in Support of Defendants, Wow Tech International GmbH, Wow Tech Canada Ltd., and Novoluto GmbH's Consolidated Motion to Dismiss," filed with the United States District Court for the District of Delaware in connection with Case No. 1:19-cv-1277-LPS on Oct. 2, 2019, 3 pages.
EIS, Inc. v. Wow Tech International GmbH, "Declaration Of Johannes Plettenberg in Support of Defendants, Wow Tech International GmbH, Wow Tech Canada Ltd., and Novoluto GmbH's Consolidated Motion to Dismiss," filed with the United States District Court for the District of Delaware in connection with Case No. 1:19-cv-1277-LPS on Oct. 2, 2019, 3 pages.
EIS, Inc. v. Wow Tech International GmbH, "Defendants' Opening Brief in Support of their Consolidated Motion to Dismiss Pursuant to Federal Rules of Civil Procedure 12(B)(2) and 12(B)(6)," filed with the United States District Court for the District of Delaware in connection with Case No. 1:19-cv-1277-LPS on Oct. 2, 2019, 42 pages.

The International Bureau of WIPO, "English Translation of International Report on Patentability," issued in connection with application No. PCT/EP2017/075400, on Apr. 9, 2019, 12 pages.
Israel Patent Office, "Office Action," issued in connection with Israeli Patent Application No. 254607, on Dec. 1, 2019, 6 pages (includes English translation).
Canadian Patent Office, "Office Action," issued in connection with Canadian Patent Application No. 3,051,672, on Oct. 3, 2019, 7 pages.
United States Patent and Trademark Office, "Notice of Allowance," issued in connection with U.S. Appl. No. 15/354,599, on Dec. 16, 2019, 21 pages.
"Patent Owner's Preliminary Response Pursuant to 37 C.F.R. § 42.107," filed with the United States Patent and Trademark Office in connection with case IPR2020-00007 on Jan. 8, 2020, 87 pages.
"Patent Owner's Preliminary Response Pursuant to 37 C.F.R. § 42.107," Exhibit 2001, filed with the United States Patent and Trademark Office in connection with Case IPR2020-00007 on Jan. 8, 2020, 72 pages.
"Patent Owner's Preliminary Response Pursuant to 37 C.F.R. § 42.107," Exhibit 2002, filed with the United States Patent and Trademark Office in connection with Case IPR2020-00007 on Jan. 8, 2020, 36 pages.
"Patent Owner's Preliminary Response Pursuant to 37 C.F.R. § 42.107," Exhibit 2003, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2004, filed with the United States Patent and Trademark Office in connection with Case IPR2020-00007 on Jan. 8, 2020, 62 pages.
"Patent Owner's Preliminary Response Pursuant to 37 C.F.R. § 42.107," Exhibit 2005, filed with the United States Patent and Trademark Office in connection with Case IPR2020-00007 on Jan. 8, 2020, 60 pages.
"Patent Owner's Preliminary Response Pursuant to 37 C.F.R. § 42.107," Exhibit 2006, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2007, filed with the United States Patent and Trademark Office in connection with Case IPR2020-00007 on Jan. 8, 2020, 5 pages.
"Patent Owner's Preliminary Response Pursuant to 37 C.F.R. § 42.107," Exhibit 2008, filed with the United States Patent and Trademark Office in connection with Case IPR2020-00007 on Jan. 8, 2020, 10 pages.
"Patent Owner's Preliminary Response Pursuant to 37 C.F.R. § 42.107," Exhibit 2009, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2010, filed with the United States Patent and Trademark Office in connection with Case IPR2020-00007 on Jan. 8, 2020, 14 pages.
"Patent Owner's Preliminary Response Pursuant to 37 C.F.R. § 42.107," Exhibit 2011, filed with the United States Patent and Trademark Office in connection with Case IPR2020-00007 on Jan. 8, 2020, 16 pages.
"Patent Owner's Preliminary Response Pursuant to 37 C.F.R. § 42.107," Exhibit 2012, filed with the United States Patent and Trademark Office in connection with Case IPR2020-00007 on Jan. 8, 2020, 12 pages.
"Patent Owner's Preliminary Response Pursuant to 37 C.F.R. § 42.107," Exhibit 2013, filed with the United States Patent and Trademark Office in connection with Case IPR2020-00007 on Jan. 8, 2020, 9 pages.
"Patent Owner's Preliminary Response Pursuant to 37 C.F.R. § 42.107," Exhibit 2014, filed with the United States Patent and Trademark Office in connection with Case IPR2020-00007 on Jan. 8, 2020, 2 pages.

(56) References Cited

OTHER PUBLICATIONS

"Patent Owner's Preliminary Response Pursuant to 37 C.F.R. § 42.107," Exhibit 2015, filed with the United States Patent and Trademark Office in connection with Case IPR2020-00007 on Jan. 8, 2020, 7 pages.
"Patent Owner's Preliminary Response Pursuant to 37 C.F.R. § 42.107," Exhibit 2016, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2017, filed with the United States Patent and Trademark Office in connection with Case IPR2020-00007 on Jan. 8, 2020, 77 pages.
"Patent Owner's Preliminary Response Pursuant to 37 C.F.R. § 42.107," Exhibit 2018, filed with the United States Patent and Trademark Office in connection with Case IPR2020-00007 on Jan. 8, 2020, 76 pages.
"Patent Owner's Preliminary Response Pursuant to 37 C.F.R. § 42.107," Exhibit 2019, filed with the United States Patent and Trademark Office in connection with Case IPR2020-00007 on Jan. 8, 2020, 169 pages.
"Patent Owner's Preliminary Response Pursuant to 37 C.F.R. § 42.107," Exhibit 2020, filed with the United States Patent and Trademark Office in connection with Case IPR2020-00007 on Jan. 8, 2020, 40 pages.
"Patent Owner's Preliminary Response Pursuant to 37 C.F.R. § 42.107," Exhibit 2021, filed with the United States Patent and Trademark Office in connection with Case IPR2020-00007 on Jan. 8, 2020, 7 pages.
"Patent Owner's Preliminary Response Pursuant to 37 C.F.R. § 42.107," Exhibit 2022, filed with the United States Patent and Trademark Office in connection with Case IPR2020-00007 on Jan. 8, 2020, 6 pages.
"Patent Owner's Preliminary Response Pursuant to 37 C.F.R. § 42.107," Exhibit 2023, filed with the United States Patent and Trademark Office in connection with Case IPR2020-00007 on Jan. 8, 2020, 8 pages.
"Patent Owner's Preliminary Response Pursuant to 37 C.F.R. § 42.107," Exhibit 2024, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2025, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2026, filed with the United States Patent and Trademark Office in connection with Case IPR2020-00007 on Jan. 8, 2020, 13 pages.
"Patent Owner's Preliminary Response Pursuant to 37 C.F.R. § 42.107," Exhibit 2027, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2028, filed with the United States Patent and Trademark Office in connection with Case IPR2020-00007 on Nov. 14, 2019, 7 pages.
"Patent Owner's Preliminary Response Pursuant to 37 C.F.R. § 42.107," Exhibit 2029, filed with the United States Patent and Trademark Office in connection with Case IPR2020-00007 on Jan. 8, 2020, 25 pages.
"Patent Owner's Preliminary Response Pursuant to 37 C.F.R. § 42.107," Exhibit 2030, filed with the United States Patent and Trademark Office in connection with Case IPR2020-00007 on Jan. 8, 2020, 3 pages.
"Patent Owner's Preliminary Response Pursuant to 37 C.F.R. § 42.107," Exhibit 2031, filed with the United States Patent and Trademark Office in connection with Case IPR2020-00007 on Jan. 8, 2020, 4 pages.
"Patent Owner's Preliminary Response Pursuant to 37 C.F.R. § 42.107," Exhibit 2032, filed with the United States Patent and Trademark Office in connection with Case IPR2020-00007 on Jan. 8, 2020, 4 pages.
"Decision Denying Insitution of Inter Partes Review," issued by the United States Patent and Trademark Office in connection with Case IPR2019-01302 on Jan. 13, 2020, 21 pages.
*EIS, Inc.* v. *Wow Tech International GmbH*, "Letter to the Honorable Leonard P. Stark from Jack B. Blumenfeld regarding Discovery Dispute," filed with the United States District Court for the District of Delaware in connection with Case No. 1:19-cv-1277-LPS on Dec. 5, 2019, 176 pages.
*EIS, Inc.* v. *Wow Tech International GmbH*, "Letter to the Honorable Leonard P. Stark from Paul D. Brown regarding Discovery Dispute," filed with the United States District Court for the District of Delaware in connection with Case No. 1:19-cv-1277-LPS on Dec. 6, 2019, 4 pages.
United Stated Patent and Trademark Office, "Notice of Allowance," issued in connection with U.S. Appl. No. 15/719,085, on Oct. 15, 2019, 12 pages.
United States Patent and Trademark Office, "Non-Final Office Action," issued in connection with U.S. Appl. No. 15/965,117, filed Jun. 27, 2019, 15 pages.
"English Translation of Grounds of Appeal," filed in connection with opposition of German Patent No. 102013110501.7 on Dec. 21, 2018, 44 pages (includes Eglish translation of Exhibit B1).
"English Translation of Exhibit B2 of Grounds of Appeal," filed with the German Patent and Trademark in connection with opposition of German Patent No. 102013110501.7 on Dec. 21, 2018, 11 pages.
"Evidence in Support," filed with IP Australia in connection with Australian Patent Application No. 2018203659 on Nov. 8, 2019, 245 pages.
IP Australia, "Opposition—Evidence," issued in connection with Australian Patent Application No. 2018203659 on Nov. 12, 2019, 1 page.
"Decision Denying Insitution of Inter Partes Review," issued by the United States Patent and Trademark Office in connection with Case IPR2019-01444 on Feb. 10, 2020, 16 pages.
"Summary of Opponent's Submissions," filed with IP Austrailia in connection with Australian Patent Application No. 2015386680 on Feb. 5, 2020, 39 pages.
*EIS, Inc.* v. *Wow Tech International GmbH*, "Defendant's Revised Motion to Dismiss Pursuant EIS, Inc.'s Complaint Pursuant to Federal Rule of Civil Procedure 12(b)(6)," filed with the United States District Court for the District of Delaware in connection with Case No. 1:19-cv-01227-LPS on Feb. 4, 2020, 3 pages.
*EIS, Inc.* v. *Wow Tech International GmbH*, "Defendant's Opening Brief in Support of the Revised Motion to Dismiss Pursuant to Rule 12(b)(6)," filed with the United States District Court for the District of Delaware in connection with Case No. 1:19-cv-01227-LPS on Feb. 4, 2020, 30 pages.
*EIS, Inc.* v. *Wow Tech International GmbH*, "Plaintiff EIS's Answering Brief in Opposition to Defendant's Revised Motion to Dismiss Pursuant to Rule 12(b)(6)," filed with the United States District Court for the District of Delaware in connection with Case No. 1:19-cv-01227-LPS on Feb. 4, 2020, 33 pages.
United Stated Patent and Trademark Office, "Notice of Allowance," issued in connection with U.S. Appl. No. 15/719,085, on Feb. 3, 2020, 12 pages.
European Patent Office, "Extended European Search Report," issued in connection with European Patent Application No. EP 19161328.0, on Jul. 18, 2019, 9 pages (includes English translation of written opinion).
"Petitioner's Request for Rehearing Under 37 C.F.R. 42.71," filed with the United States Patent and Trademark Office in connection with Case IPR2019-01302 on Feb. 7, 2020, 20 pages.
"Petitioner's Amended Mandatory Notices Pursuant to 37 C.F.R. 42.8," filed with the United States Patent and Trademark Office in connection with Case IPR2019-01302 on Feb. 25, 2020, 5 pages.
"Petitioner's Amended Mandatory Notices Pursuant to 37 C.F.R. 42.8," filed with the United States Patent and Trademark Office in connection with Case IPR2019-01444 on Feb. 25, 2020, 5 pages.

(56) References Cited

OTHER PUBLICATIONS

"Petitioner's Request for Rehearing Under 37 C.F.R. 42.71," filed with the United States Patent and Trademark Office in connection with Case IPR2019-01444 on Mar. 6, 2020, 19 pages.
United States Patent and Trademark Office, "Notice of Allowance," issued in connection with U.S. Appl. No. 15/719,085, dated Mar. 13, 2020, 12 pages.
*EIS, Inc.* v. *Wow Tech International GmbH*, "Defendant's Reply in Support of Their Revised Motion to Dismiss Pursuant to Rule 12(b)(6)," filed with the United States District Court for the District of Delaware in connection with Case No. 1:19-cv-01227-LPS on Mar. 10, 2020, 16 pages.
Canadian Patent Office, "Notice of Allowance," issued in connection with Canadian Patent Application No. 2978739, dated Jan. 30, 2020, 1 page.
United States Patent and Trademark Office, "Notice of Allowance," issued in connection with U.S. Appl. No. 15/965,117, dated Mar. 17, 2020, 9 pages.
Canadian Patent Office, "Office Action," issued in connection with Canadian Patent Application No. 3051672, dated Mar. 4, 2020, 4 pages.
United States Patent and Trademark Office, "Notice of Allowance," issued in connection with U.S. Appl. No. 15/354,599, dated Mar. 25, 2020, 21 pages.
Korean Patent Office, "Notice of Allowance," issued in connection with Korean Patent Application No. 10-2017-7028845, dated Mar. 30, 2020, 6 pages (inlcudes English translation).
"Order," issued by the United States Patent and Trademark Office in connection with Case IPR2019-01302 on Apr. 6, 2020, 2 pages.
"Order," issued by the United States Patent and Trademark Office in connection with Case IPR2019-01444 on Apr. 6, 2020, 2 pages.
"Decision Denying Institution of Inter Partes Review," filed with the United States Patent and Trademark Office in connection with Case IPR2020-00007 on Apr. 6, 2020, 31 pages.
United States Patent and Trademark Office, "Supplemental Notice of Allowability," issued in connection with U.S. Appl. No. 15/719,085, dated Apr. 3, 2020, 7 pages.
United States Patent and Trademark Office, "Notice of Allowance," issued in connection with U.S. Appl. No. 15/965,208, dated Apr. 8, 2020, 9 pages.
"Petition for Inter Partes Review of U.S. Pat. No. 9,937,097," filed with the United States Patent and Trademark Office on Jul. 3, 2019, 95 pages.
"Petition for Inter Partes Review of U.S. Pat. No. 9,937,097," Exhibit 1001, filed with the United States Patent and Trademark Office on Jul. 3, 2019, 18 pages.
"Petition for Inter Partes Review of U.S. Pat. No. 9,937,097," Exhibit 1002, filed with the United States Patent and Trademark Office on Jul. 3, 2019, 215 pages.
"Petition for Inter Partes Review of U.S. Pat. No. 9,937,097," Exhibit 1003, filed with the United States Patent and Trademark Office on Jul. 3, 2019, 360 pages.
"Petition for Inter Partes Review of U.S. Pat. No. 9,937,097," Exhibit 1004, filed with the United States Patent and Trademark Office on Jul. 3, 2019, 9 pages.
"Petition for Inter Partes Review of U.S. Pat. No. 9,937,097," Exhibit 1005, filed with the United States Patent and Trademark Office on Jul. 3, 2019, 34 pages.
"Petition for Inter Partes Review of U.S. Pat. No. 9,937,097," Exhibit 1006, filed with the United States Patent and Trademark Office on Jul. 3, 2019, 13 pages.
"Petition for Inter Partes Review of U.S. Pat. No. 9,937,097," Exhibit 1007, filed with the United States Patent and Trademark Office on Jul. 3, 2019, 11 pages.
"Petition for Inter Partes Review of U.S. Pat. No. 9,937,097," Exhibit 1008, filed with the United States Patent and Trademark Office on Jul. 3, 2019, 46 pages.
"Petition for Inter Partes Review of U.S. Pat. No. 9,937,097," Exhibit 1009, filed with the United States Patent and Trademark Office on Jul. 3, 2019, 1837 pages. (Uploaded in 4 parts.).
"Petition for Inter Partes Review of U.S. Pat. No. 9,937,097," Exhibit 1010, filed with the United States Patent and Trademark Office on Jul. 3, 2019, 17 pages.
"Petition for Inter Partes Review of U.S. Pat. No. 9,937,097," Exhibit 1011, filed with the United States Patent and Trademark Office on Jul. 3, 2019, 6 pages.
"Petition for Inter Partes Review of U.S. Pat. No. 9,937,097," Exhibit 1012, filed with the United States Patent and Trademark Office on Jul. 3, 2019, 47 pages.
"Petition for Inter Partes Review of U.S. Pat. No. 9,937,097," Exhibit 1013, filed with the United States Patent and Trademark Office on Jul. 3, 2019, 61 pages.
"Petition for Inter Partes Review of U.S. Pat. No. 9,937,097," Exhibit 1014, filed with the United States Patent and Trademark Office on Jul. 3, 2019, 5 pages.
"Petition for Inter Partes Review of U.S. Pat. No. 9,937,097," Exhibit 1015, filed with the United States Patent and Trademark Office on Jul. 3, 2019, 1049 pages.
United States Patent and Trademark Office, "Notice of Allowance," issued in connection with U.S. Appl. No. 15/719,085, dated on Apr. 21, 2020, 12 pages.
"Petitioner's Amended Mandatory Notices Pursuant to 37 C.F.R. 42.8," filed with the United States Patent and Trademark Office in connection with Case IPR2020-00007 on Feb. 25, 2020, 5 pages.
China National Intellectual Property Administration, "Second Office Action," issued in connection with Chinese Patent Application No. 201710927530.4, dated Apr. 16, 2020, 6 pages (English Translation Included).
United States Patent and Trademark Office, "Notice of Allowance," issued in connection with U.S. Appl. No. 15/719,085, dated May 6, 2020, 12 pages.
United States Patent and Trademark Office, "Notice of Allowance," issued in connection with U.S. Appl. No. 15/354,599, dated on May 6, 2020, 21 pages.
"Petitioner's Request for Rehearing Under 37 C.F.R. 42.71," filed with the United States Patent and Trademark Office in connection with Case IPR2020-00007 on May 6, 2020, 20 pages.
"Petitioner's Amended Mandatory Notices Pursuant to 37 C.F.R. 42.8," filed with the United States Patent and Trademark Office in connection with Case IPR2019-01302 on Apr. 17, 2020, 5 pages.
"Petitioner's Amended Mandatory Notices Pursuant to 37 C.F.R. 42.8," filed with the United States Patent and Trademark Office in connection with Case IPR2019-01444 on Apr. 17, 2020, 5 pages.
United States Patent and Trademark Office, "Notice of Allowance," issued in connection with U.S. Appl. No. 15/965,117, dated May 14, 2020, 9 pages.
United States Patent and Trademark Office, "Notice of Allowance," issued in connection with U.S. Appl. No. 15/965,208, dated May 15, 2020, 9 pages.
United States Patent and Trademark Office, "Supplemental Notice of Allowability," issued in connection with U.S. Appl. No. 15/719,085, dated May 12, 2020, 6 pages.
United States Patent and Trademark Office, "Supplemental Notice of Allowability," issued in connection with U.S. Appl. No. 15/719,085, dated May 27, 2020, 6 pages.
United States Patent and Trademark Office, "Corrected Notice of Allowability," issued in connection with U.S. Appl. No. 15/354,599, dated May 27, 2020, 19 pages.
United States Patent and Trademark Office, "Corrected Notice of Allowability," issued in connection with U.S. Appl. No. 15/965,117, dated Jun. 15, 2020, 3 pages.
United States Patent and Trademark Office, "Corrected Notice of Allowability," issued in connection with U.S. Appl. No. 15/965,208, mailed on Jun. 12, 2020, 11 pages.
"Decision Granting Petitioner's Request on Rehearing of Decision Denying Institution, Granting Institution of Inter Partes Review," issued by the United States Patent and Trademark Office in connection with Case IPR2019-01302 on Jun. 17, 2020, 9 pages.
*EIS, Inc.* v. *Wow Tech International GmbH*, "Notice of Supplemental Authority in Support of Plaintiff EIS Inc.'s Opposition to Defendants' Motion to Dismiss," filed with the United States District Court for the District of Delaware in connection with Case No. 1:19-cv-01227-LPS on Jun. 19, 2020, 13 pages.

(56) References Cited

OTHER PUBLICATIONS

*EIS, Inc.* v. *Wow Tech International GmbH*, "Defendant's Response to Plaintiff Notice of Supplemental Authority," filed with the United States District Court for the District of Delaware in connection with Case No. 1:19-cv-01227-LPS on Jun. 23, 2020, 8 pages.
*EIS GmbH* v. *USPTO*, "Complaint," filed with the United States District Court for the Eastern District of Virgina in connection with Case No. 1:20-cv-00430-LMB-TCB on Apr. 17, 2020, 636 pages.
*EIS GmbH* v. *USPTO*, "Amended Complaint," filed with the United States District Court for the Eastern District of Virgina in connection with Case No. 1:20-cv-00430-LMB-TCB on Jun. 25, 2020, 577 pages.
United States Patent and Trademark Office, "Corrected Notice of Allowability," issued in connection with U.S. Appl. No. 15/354,599, dated Jul. 13, 2020, 2 pages.
United States Patent and Trademark Office, "Corrected Notice of Allowability," issued in connection with U.S. Appl. No. 15/354,599, dated Aug. 3, 2020, 2 pages.
United States and Trademark Office, "Corrected Notice of Allowabilty," issued in connection with U.S. Appl. No. 15/965,117, dated Jul. 22, 2020, 3 pages.
United States Patent and Trademark Office, "Supplemental Notice of Allowability," issued in connection with U.S. Appl. No. 15/719,085, dated Jul. 27, 2020, 2 pages.
United States Patent and Trademark Office, "Corrected Notice of Allowability," issued in connection with U.S. Appl. No. 15/965,208, dated Jul. 22, 2020, 3 pages.
"Decision Granting Petitioner's Request on Rehearing of Decision Denying Institution, Granting Institution of Inter Partes Review," issued by the United States Patent and Trademark Office in connection with Case IPR2019-01444 on Aug. 11, 2020, 13 pages.
*EIS, Inc.* v. *Wow Tech International GmbH*, "Notice of Supplemental Authority in Support of Plaintiff EIS Inc.'s Opposition to Defendants' Motion to Dismiss," filed with the United States District Court for the District of Delaware in connection with Case No. 1:19-cv-01227-LPS on Aug. 14, 2020, 17 pages.
Canadian Patent Office, "Office Action," issued in connection with Canadian Patent Application No. 2978495, dated Apr. 14, 2020, 4 pages.
"Minutes of the Public Hearing in Opposition Proceedings Before the Patent Division 44 of the German Patent and Trademark Office," issued in connection with opposition of German Patent No. 102013110501.7, Apr. 17, 2018, 6 pages (includes English translation).
*EIS, Inc.* v. *Wow Tech International GmbH, et al.*, "First Amended Complaint," filed with the United States District Court for the District of Delware, case No. 1:19-cv-01227-LPS, Sep. 9, 2019, 40 pages.
*EIS, Inc.* v. *Wow Tech International GmbH, et al.*, "First Amended Complaint—Exhibits 1-31," filed with the United States District Court for the District of Delware, case No. 1:19-cv-01227-LPS, Sep. 9, 2019, 527 pages.
"Petition for Inter Partes Review of U.S. Pat. No. 9,849,061," filed with the United States Patent and Trademark Office on Oct. 2, 2019, 97 pages.
"Petition for Inter Partes Review of U.S. Pat. No. 9,849,061," Exhibit 1001, filed with the United States Patent and Trademark Office on Oct. 2, 2019, 18 pages.
"Petition for Inter Partes Review of U.S. Pat. No. 9,849,061," Exhibit 1002, filed with the United States Patent and Trademark Office on Oct. 2, 2019, 137 pages. (Uploaded in 5 parts).
"Petition for Inter Partes Review of U.S. Pat. No. 9,849,061," Exhibit 1003, filed with the United States Patent and Trademark Office on Oct. 2, 2019, 1,367 pages. (Uploaded in 5 parts).
"Petition for Inter Partes Review of U.S. Pat. No. 9,849,061," Exhibit 1004, filed with the United States Patent and Trademark Office on Oct. 2, 2019, 9 pages.
"Petition for Inter Partes Review of U.S. Pat. No. 9,849,061," Exhibit 1006, filed with the United States Patent and Trademark Office on Oct. 2, 2019, 34 pages.

"Petition for Inter Partes Review of U.S. Pat. No. 9,849,061," Exhibit 1007, filed with the United States Patent and Trademark Office on Oct. 2, 2019, 22 pages.
"Petition for Inter Partes Review of U.S. Pat. No. 9,849,061," Exhibit 1008, filed with the United States Patent and Trademark Office on Oct. 2, 2019, 40 pages.
"Petition for Inter Partes Review of U.S. Pat. No. 9,849,061," Exhibit 1010, filed with the United States Patent and Trademark Office on Oct. 2, 2019, 5 pages.
"Petition for Inter Partes Review of U.S. Pat. No. 9,849,061," Exhibit 1011, filed with the United States Patent and Trademark Office on Oct. 2, 2019, 17 pages.
"Petition for Inter Partes Review of U.S. Pat. No. 9,849,061," Exhibit 1012, filed with the United States Patent and Trademark Office on Oct. 2, 2019, 61 pages.
"Petition for Inter Partes Review of U.S. Pat. No. 9,849,061," Exhibit 1013, filed with the United States Patent and Trademark Office on Oct. 2, 2019, 46 pages.
"Notification of an Opposition," issued by the European Patent Office in connection with European Patent No. EP2976057 on Sep. 12, 2019, opposition filed by EIS GmbH, 132 pages (includes English translation).
"Notification of an Opposition," issued by the European Patent Office in connection with European Patent No. EP2976057 on Sep. 10, 2019, opposition filed by Fun Factory Ltd., 117 pages (includes English translation).
"Notification of an Opposition," issued by the European Patent Office in connection with European Patent No. EP2976057 on Sep. 12, 2019, opposition filed by Hu Xiaorong, 35 pages (includes English translation).
"Opposition to a European Patent," filed with the European Patent Office by EIS GmbH in connection with European Patent No. EP3308762 on Sep. 11, 2019, 95 pages (includes English translation).
"Opposition to a European Patent," filed with the European Patent Office by Fun Factory Ltd. in connection with European Patent No. EP3308762 on Sep. 11, 2019, 124 pages (includes English translation).
IP Australia, "Examination Report," issued in connection with Australian Application No. 2018222907 on Sep. 3, 2019, 4 pages.
IP Australia, "Examination Report," issued in connection with Austrailian Application No. 2019201070 on Jul. 9, 2019, 4 pages.
Korean Patent Office, "Office Action," issued in connection with Korean Application No. 10-2017-0129112 on Aug. 29, 2019, 9 pages (includes English summary of Office action).
Korean Patent Office, "Office Action," issued in connection with Korean Application No. 10-2017-7028845 on Sep. 18, 2019, 7 pages (includes English summary of Office action).
European Patent Office, "Notice of Submission of Third Party Observation," issued in connection with European Application No. EP17202394.7 on Jul. 9, 2019, 5 pages (copy of submission in English).
"Opposition Document," filed in connection with opposition of German Patent No. 102013110501.7 on Jan. 24, 2018, 69 pages (includes English translation).
*EIS, Inc.* v. *Wow Tech International GmbH, et al.*, "Defendants' Consolidated Motion to Dismiss EIS, Inc.'s Complaint Pursuant to Federal Rules Of Civil Procedure 12(B)(2) and 12(b)(6)," filed with the United States District Court for the District of Delaware in connection with Case No. 1:19-cv-1277-LPS on Oct. 2, 2019, 3 pages.
United States Patent and Trademark Office, "Corrected Notice of Allowability," issued in connection with U.S. Appl. No. 15/354,599 on Nov. 12, 2019, 2 pages.
German Patent and Trademark Office, "English Translation of Invitation to Speak," issued in connection with opposition of German Patent No. 102013110501.7 on Nov. 17, 2016, 20 pages.
"English Translation of Patentee Submission," filed with the German Patent and Trademark Office in connection with opposition of German Patent No. 102013110501.7 on Sep. 18, 2017, 38 pages.
"English Translation of Submission of Opponent," filed with the German Patent and Trademark Office in connection with opposition of German Patent No. 102013110501.7 on Oct. 5, 2017, 6 pages.

(56) References Cited

OTHER PUBLICATIONS

"English Translation of Submission of Opponent," filed with the German Patent and Trademark Office in connection with opposition of German Patent No. 102013110501.7 on Nov. 13, 2017, 8 pages.
German Patent and Trademark Office, "English Translation of Summons to Attend Oral Proceedings," issued in connection with opposition of German Patent No. 102013110501.7 on Nov. 28, 2017, 3 pages.
"English Translation of Patentee Submission," filed with the German Patent and Trademark Office in connection with opposition of German Patent No. 102013110501.7 on Jan. 30, 2018, 5 pages.
German Patent and Trademark Office, "English Translation of Additions to Summons," issued in connection with opposition of German Patent No. 102013110501.7 on Nov. 24, 2017, 1 page.
German Patent and Trademark Office, "English Translation of Summons to Attend Oral Proceedings," issued in connection with opposition of German Patent No. 102013110501.7 on Feb. 2, 2018, 3 pages.
"English Translation of Opponent Submission," filed with the German Patent and Trademark Office in connection with opposition of German Patent No. 102013110501.7 on Mar. 14, 2018, 5 pages.
"English Translation of Patentee Submission," filed with the German Patent and Trademark Office in connection with opposition of German Patent No. 102013110501.7 on Apr. 3, 2018, 2 pages.
"English Translation of Patentee Submission," filed with the German Patent and Trademark Office, in connection with opposition of German Patent No. 102013110501.7 on Apr. 12, 2018, 45 pages.
"English Translation of Auxiliary Request 1," filed with the German Patent and Trademark Office in connection with opposition of German Patent No. 2013110501.7 on Apr. 16, 2018, 5 pages.
"English Translation of Auxiliary Request 2," filed with the German Patent and Trademark Office in connection with opposition of German Patent No. 2013110501.7 on Apr. 16, 2018, 6 pages.
"English Translation of Auxiliary Request 3," filed with the German Patent and Trademark Office in connection with opposition of German Patent No. 2013110501.7 on Apr. 16, 2018, 5 pages.
*Novoluto GmbH* v. *EIS GmbH*, "Judgment," issued by the German Court in connection with German litigation proceeding on Dec. 14, 2017, 71 pages (includes English translation).
*Novoluto GmbH* v. *EIS GmbH*, "Transcript," filed with the German Court in connection German litigation proceeding on Jul. 20, 2017, 44 pages (includes English translation).
*Novoluto GmbH* v. *EIS GmbH*, "Complaint," filed the German Court in connection German litigation proceeding on Aug. 5, 2016, 75 pages (includes English translation).
United States Patent and Trademark Office, "Notice of Filing Date Accorded to Petition and Time for Filing Patent Owner Preliminary Response," issued in connection with Case IPR2019-01302 on Jul. 18, 2019, 5 pages.
"Patent Owner's Amended Mandatory Notices Pursuant to 37 C.F.R. 42.8," filed with the United States Patent and Trademark Office in connection with Case IPR2019-01302 on Sep. 3, 2019, 6 pages.
"Patent Owner's Amended Mandatory Notices Pursuant to 37 C.F.R. 42.8," filed with the United States Patent and Trademark Office in connection with Case IPR2019-01302 on Sep. 30, 2019, 6 pages.
"Patent Owner's Amended Mandatory Notices Pursuant to 37 C.F.R. 42.8," filed with the United States Patent and Trademark Office in connection with Case IPR2019-01302 on Oct. 18, 2019, 6 pages.
"Patent Owner's Mandatory Notices," filed with the United States Patent and Trademark Office in connection with Case IPR2019-01302 on Jul. 24, 2019, 4 pages.
"Patent Owner's Updated Mandatory Notices," filed with the United States Patent and Trademark Office in connection with Case IPR2019-01302 on Aug. 21, 2019, 4 pages.
"Petitioner's Amended Mandatory Notices Pursuant To 37 C.F.R. 42.8," filed with the United States Patent and Trademark Office in connection with Case IPR2019-01302 on Oct. 8, 2019, 5 pages.
"Patent Owner's Preliminary Response Pursuant To 37 C.F.R. § 42.107," filed with the United States Patent and Trademark Office in connection with Case IPR2019-01302 on Oct. 18, 2019, 85 pages.
"Patent Owner's Preliminary Response Pursuant to 37 C.F.R. § 42.107," Exhibit 2001, filed with the United States Patent and Trademark Office in connection with Case IPR2019-01302 on Oct. 18, 2019, 80 pages.
"Patent Owner's Preliminary Response Pursuant to 37 C.F.R. § 42.107," Exhibit 2002, filed with the United States Patent and Trademark Office in connection with Case IPR2019-01302 on Oct. 18, 2019, 30 pages.
"Patent Owner's Preliminary Response Pursuant to 37 C.F.R. § 42.107," Exhibit 2003, filed with the United States Patent and Trademark Office in connection with Case IPR2019-01302 on Oct. 18, 2019, 18 pages.
"Patent Owner's Preliminary Response Pursuant to 37 C.F.R. § 42.107," Exhibit 2004, filed with the United States Patent and Trademark Office in connection with Case IPR2019-01302 on Oct. 18, 2019, 47 pages.
"Patent Owner's Preliminary Response Pursuant to 37 C.F.R. § 42.107," Exhibit 2005, filed with the United States Patent and Trademark Office in connection with Case IPR2019-01302 on Oct. 18, 2019, 60 pages.
"Patent Owner's Preliminary Response Pursuant to 37 C.F.R. § 42.107," Exhibit 2006, filed with the United States Patent and Trademark Office in connection with Case IPR2019-01302 on Oct. 18, 2019, 19 pages.
"Patent Owner's Preliminary Response Pursuant to 37 C.F.R. § 42.107," Exhibit 2007, filed with the United States Patent and Trademark Office in connection with Case IPR2019-01302 on Oct. 18, 2019, 16 pages.
"Patent Owner's Preliminary Response Pursuant to 37 C.F.R. § 42.107," Exhibit 2008, filed with the United States Patent and Trademark Office in connection with Case IPR2019-01302 on Oct. 18, 2019, 10 pages.
"Patent Owner's Preliminary Response Pursuant to 37 C.F.R. § 42.107," Exhibit 2009, filed with the United States Patent and Trademark Office in connection with Case IPR2019-01302 on Oct. 18, 2019, 12 pages.
"Patent Owner's Preliminary Response Pursuant to 37 C.F.R. § 42.107," Exhibit 2010, filed with the United States Patent and Trademark Office in connection with Case IPR2019-01302 on Oct. 18, 2019, 9 pages.
"Patent Owner's Preliminary Response Pursuant to 37 C.F.R. § 42.107," Exhibit 2011, filed with the United States Patent and Trademark Office in connection with Case IPR2019-01302 on Oct. 18, 2019, 2 pages.
"Patent Owner's Preliminary Response Pursuant to 37 C.F.R. § 42.107," Exhibit 2012, filed with the United States Patent and Trademark Office in connection with Case IPR2019-01302 on Oct. 18, 2019, 7 pages.
"Patent Owner's Preliminary Response Pursuant to 37 C.F.R. § 42.107," Exhibit 2013, filed with the United States Patent and Trademark Office in connection with Case IPR2019-01302 on Oct. 18, 2019, 4 pages.
"Patent Owner's Preliminary Response Pursuant to 37 C.F.R. § 42.107," Exhibit 2014, filed with the United States Patent and Trademark Office in connection with Case IPR2019-01302 on Oct. 18, 2019, 77 pages.
"Patent Owner's Preliminary Response Pursuant to 37 C.F.R. § 42.107," Exhibit 2015, filed with the United States Patent and Trademark Office in connection with Case IPR2019-01302 on Oct. 18, 2019, 76 pages.
"Patent Owner's Preliminary Response Pursuant to 37 C.F.R. § 42.107," Exhibit 2016, filed with the United States Patent and Trademark Office in connection with Case IPR2019-01302 on Oct. 18, 2019, 169 pages.
"Patent Owner's Preliminary Response Pursuant to 37 C.F.R. § 42.107," Exhibit 2017, filed with the United States Patent and Trademark Office in connection with Case IPR2019-01302 on Oct. 18, 2019, 40 pages.

(56) References Cited

OTHER PUBLICATIONS

"Patent Owner's Preliminary Response Pursuant to 37 C.F.R. § 42.107," Exhibit 2018, filed with the United States Patent and Trademark Office in connection with Case IPR2019-01302 on Oct. 18, 2019, 15 pages.
"Patent Owner's Preliminary Response Pursuant to 37 C.F.R. § 42.107," Exhibit 2019, filed with the United States Patent and Trademark Office in connection with Case IPR2019-01302 on Oct. 18, 2019, 8 pages.
"Patent Owner's Preliminary Response Pursuant to 37 C.F.R. § 42.107," Exhibit 2020, filed with the United States Patent and Trademark Office in connection with Case IPR2019-01302 on Oct. 18, 2019, 11 pages.
"Patent Owner's Preliminary Response Pursuant to 37 C.F.R. § 42.107," Exhibit 2021, filed with the United States Patent and Trademark Office in connection with Case IPR2019-01302 on Oct. 18, 2019, 25 pages.
"Patent Owner's Preliminary Response Pursuant to 37 C.F.R. § 42.107," Exhibit 2022, filed with the United States Patent and Trademark Office in connection with Case IPR2019-01302 on Oct. 18, 2019, 97 pages.
"Patent Owner's Preliminary Response Pursuant to 37 C.F.R. § 42.107," Exhibit 2023, filed with the United States Patent and Trademark Office in connection with Case IPR2019-01302 on Oct. 18, 2019, 4 pages.
"Patent Owner's Preliminary Response Pursuant to 37 C.F.R. § 42.107," Exhibit 2024, filed with the United States Patent and Trademark Office in connection with Case IPR2019-01302 on Oct. 18, 2019, 7 pages.
"Patent Owner's Preliminary Response Pursuant to 37 C.F.R. § 42.107," Exhibit 2025, filed with the United States Patent and Trademark Office in connection with Case IPR2019-01302 on Oct. 18, 2019, 1 page.
European Patent Office, "Extended European Search Report," issued in connection with European Application No. 17190856.9, on May 14, 2018, 30 pages. (English translation included.).
European Patent Office, "European Search Report," issued in connection with European Application No. 17190856.9, on Feb. 2, 2018, 34 pages. (English translation included.).
The International Bureau of WIPO, "International Report on Patentability," issued in connection with International Application No. PCT/EP2017/075399, on Apr. 9, 2019, 15 pages.
International Searching Authority, "Written Opinion," issued in connection with International Application No. PCT/EP2017/075399, on Apr. 25, 2018, 14 pages.
International Searching Authority, "International Search Report," issued in connection with International Application No. PCT/EP2017/075399, on Apr. 25, 2018, 9 pages. (English Translation Included.).
IP Australia, "Examination Report No. 1 for Standard Patent Application," issued in connection with Australian Application No. 2015386680, on Nov. 15, 2017, 3 pages.
IP Australia, "Examination Report No. 1 for Standard Patent Application," issued in connection with Australian Application No. 2018203659, on Dec. 14, 2018, 2 pages.
Canadian Patent Office, "Office Action," issued in connection with Canadian Application No. 2,978,495, on Nov. 20, 2017, 4 pages.
Canadian Patent Office, "Office Action," issued in connection with Canadian Application No. 2,978,495, on Apr. 11, 2018, 4 pages.
China National Intellectual Property Administration, "First Office Action," issued in connection with Chinese Application No. 201580077725.3, on Feb. 3, 2019, 5 pages (English translation included).
German Patent and Trademark Office, "Examination Report," issued in connection with German Application No. 10 2015 103 694.0, on Mar. 24, 2015, 8 pages. (English translation included.).
German Patent and Trademark Office, "Examination Report," issued in connection with German Application No. 10 2015 103 694.0, on Dec. 7, 2016, 12 pages. (English translation included.).
European Patent Office, "Extended European Search Report," issued in connection with European Patent Application No. 18175171.0, on Sep. 14, 2018, 28 pages. (English translation included.).
European Patent Office, "Communication Pursuant to Article 94 (3) EPC," issued in connection with European Application No. 18175171.0, on Jun. 14, 2019, 8 pages. (English translation included.).
New Zealand Intellectual Property Office, "First Examination Report," issued in connection with NZ Application No. 735229, on May 2, 2018, 4 pages.
New Zealand Intellectual Property Office, "Further Examination Report," issued in connection with NZ Application No. 735229, on Dec. 17, 2018, 3 pages.
The International Bureau of WIPO, "International Preliminary Report on Patentability," issued in connection with International Application No. PCT/EP2015/067017, on Sep. 19, 2017, 13 pages. (corresponds to English translation of Written Opinion for International Application No. PCT/EP2015/067017 dated Jul. 22, 2016, cited as NPL 4 in IDS filed on Jul. 21, 2022).
IP Australia, "Examination Report No. 1 for Standard Patent Application," issued in connection with Australian Patent Application No. 2014323661, on Mar. 2, 2017, 4 pages.
IP Australia, "Examination Report No. 1 for Standard Patent Application," issued in connection with Australian Application No. 2018200852, on Feb. 15, 2018, 5 pages.
Canadian Patent Office, "Office Action," issued in connection with Candian Patent Application No. 2,923,526, on May 24, 2018, 5 pages.
Canadian Patent Office, "Office Action," issued in connection with Candian Patent Application No. 2,923,526, on Oct. 16, 2018, 3 pages.
China National Intellectual Property Administration, "First Office Action," issued in connection with Chinese Patent Application No. 201480052194.8, on Sep. 28, 2016, 7 pages. (English Translation Included.).
China National Intellectual Property Administration, "Second Office Action," issued in connection with Chinese Patent Application No. 201480052194.8, on Jan. 3, 2017, 10 pages. (English Translation Included.).
China National Intellectual Property Administration, "Third Office Action," issued in connection with Chinese Patent Application No. 201480052194.8, on Jul. 4, 2017, 11 pages. (English Translation Included.).
China National Intellectual Property Administration, "First Office Action," issued in connection with Chinese Patent Application No. 201710709587.7, on Feb. 28, 2019, 5 pages. (English Translation Included.).
German Patent and Trademark Office, "Office Action," issued in connection with German Patent Application No. 10 2013 110 501.7, on Oct. 1, 2013, 8 pages. (English translation included.).
German Patent and Trademark Office, "Office Action," issued in connection with German Patent Application No. 10 2013 110 501.7, on Apr. 15, 2014, 8 pages. (English translation included.).
German Patent and Trademark Office, "Office Action," issued in connection with German Patent Application No. 10 2013 110 501.7, on Feb. 6, 2015, 10 pages. (English translation included.).
German Patent and Trademark Office, "Office Action," issued in connection with German Patent Application No. 10 2013 110 501.7, on Nov. 18, 2015, 8 pages. (English translation included.).
German Patent and Trademark Office, "Office Action," issued in connection with German Patent Application No. 10 2013 022 511.6, on May 9, 2019, 16 pages. (English translation included.).
German Patent and Trademark Office, "Office Action," issued in connection with German Patent Application No. 10 2013 022 512.4, on May 3, 2019, 14 pages. (English translation included.).
German Patent and Trademark Office, "Office Action," issued in connection with German Patent Application No. 10 2013 022 520.5, on May 9, 2019, 14 pages. (English translation included.).
European Patent Office, "Communication Pursuant to Article 94 (3) EPC," issued in connection with European Application No. 14741640.8, on Aug. 23, 2016, 8 pages. (English translation included.).
European Patent Office, "Communication Pursuant to Article 94 (3) EPC," issued in connection with European Application No. 14741640.8, on Mar. 8, 2018, 12 pages. (English translation included.).

(56) References Cited

OTHER PUBLICATIONS

European Patent Office, "Communication Pursuant to Article 94 (3) EPC," issued in connection with European Application No. 17202385.5, on May 18, 2018, 12 pages. (English translation included.).
European Patent Office, "Result of the Consultation" issued in connection with European Application No. 17202385.5, on Jul. 18, 2018, 6 pages. (English translation included.).
European Patent Office, "Search Report," issued in connection with European Application No. 17202385.5, on Mar. 8, 2018, 6 pages. (English translation included.).
European Patent Office, "Communication Pursuant to Article 94 (3) EPC," issued in connection with European Application No. 17202394.7, on May 18, 2018, 12 pages. (English translation included.).
European Patent Office, "Result of the Consultation" issued in connection with European Application No. 17202394.7, on Jul. 18, 2018, 6 pages. (English translation included.).
European Patent Office, "Search Report," issued in connection with European Application No. 17202394.7, on Mar. 8, 2018, 8 pages. (English translation included.).
European Patent Office, "Communication Pursuant to Article 94 (3) EPC," issued in connection with European Application No. 18206800.7, on Apr. 8, 2019, 10 pages. (English translation included.).
European Patent Office, "Search Report," issued in connection with European Application No. 18206800.7, on Feb. 27, 2019, 8 pages. (English translation included.).
International Searching Authority, "Written Opinion of the International Searching Authority," issued in connection with International Application No. PCT/EP2014/065734, on Sep. 25, 2014, 19 pages. (English Translation Included.).
The International Bureau of WIPO, "International Preliminary Report on Patentability," issued in connection with International Application No. PCT/EP2014/065734, on Mar. 29, 2016, 7 pages. (corresponds to English translation of Written Opinion for International Application No. PCT/EP2014/065734 dated Sep. 25, 2014, cited herein as NPL43).
United States Patent and Trademark Office, "Notice of Allowance and Fee(s) Due," issued in connection with Design U.S. Appl. No. 29/590,450, on May 8, 2018, 7 pages.
United States Patent and Trademark Office, "Notice of Allowance and Fee(s) Due," issued in connection with Design U.S. Appl. No. 35/502,986, on May 1, 2018, 9 pages.
United Stated Patent and Trademark Office, "Notice of Allowance and Fee(s) Due," issued in connection with U.S. Appl. No. 15/719,085, on Jul. 3, 2019, 12 pages.
European Patent Office, "Examination Report," issued in connection with application No. 15748202.7 on Jun. 24, 2019, 8 pages (English translation included).
"Petition for Inter Partes Review of U.S. Pat. No. 9,763,851," filed with the United States Patent and Trademark Office on Jul. 31, 2019, 87 pages.
"Petition for Inter Partes Review of U.S. Pat. No. 9,763,851," Exhibit 1001, filed with the United States Patent and Trademark Office on Jul. 31, 2019, 17 pages.
"Petition for Inter Partes Review of U.S. Pat. No. 9,763,851," Exhibit 1002, filed with the United States Patent and Trademark Office on Jul. 31, 2019, 109 pages.
"Petition for Inter Partes Review of U.S. Pat. No. 9,763,851," Exhibit 1003 Part 1, filed with the United States Patent and Trademark Office on Jul. 31, 2019, 649 pages.
"Petition for Inter Partes Review of U.S. Pat. No. 9,763,851," Exhibit 1003 Part 2, filed with the United States Patent and Trademark Office on Jul. 31, 2019, 663 pages.
"Petition for Inter Partes Review of U.S. Pat. No. 9,763,851," Exhibit 1004, filed with the United States Patent and Trademark Office on Jul. 31, 2019, 11 pages.
"Petition for Inter Partes Review of U.S. Pat. No. 9,763,851," Exhibit 1005, filed with the United States Patent and Trademark Office on Jul. 31, 2019, 34 pages.
"Petition for Inter Partes Review of U.S. Pat. No. 9,763,851," Exhibit 1006, filed with the United States Patent and Trademark Office on Jul. 31, 2019, 46 pages.
"Petition for Inter Partes Review of U.S. Pat. No. 9,763,851," Exhibit 1007, filed with the United States Patent and Trademark Office on Jul. 31, 2019, 36 pages.
"Petition for Inter Partes Review of U.S. Pat. No. 9,763,851," Exhibit 1008, filed with the United States Patent and Trademark Office on Jul. 31, 2019, 46 pages.
"Petition for Inter Partes Review of U.S. Pat. No. 9,763,851," Exhibit 1009, filed with the United States Patent and Trademark Office on Jul. 31, 2019, 5 pages.
"Petition for Inter Partes Review of U.S. Pat. No. 9,763,851," Exhibit 1010, filed with the United States Patent and Trademark Office on Jul. 31, 2019, 61 pages.
"Petition for Inter Partes Review of U.S. Pat. No. 9,763,851," Exhibit 1011, filed with the United States Patent and Trademark Office on Jul. 31, 2019, 6 pages.
"Petition for Inter Partes Review of U.S. Pat. No. 9,763,851," Exhibit 1012, filed with the United States Patent and Trademark Office on Jul. 31, 2019, 1049 pages. (Uploaded in 3 parts.).
United States Patent and Trademark Office, "Non-Final Office Action," issued in connection with U.S. Appl. No. 15/965,208, on Aug. 22, 2019, 17 pages.
United States Patent and Trademark Office, "Notice of Allowance and Fee(s) Due," issued in connection with U.S. Appl. No. 15/354,599, on Aug. 29, 2019, 19 pages.
IP Australia, "Notice of Opposition," issued in connection with Australian Patent Application No. 2015386680 on Jun. 21, 2018, 4 pages.
"Opponent's Letter," filed with IP Australia in connection with Australian Patent Application No. 2015386680 on Jun. 28, 2019, 10 pages.
IP Australia, "General Correspondence," issued in connection with Australian Patent Application No. 2015386680 on Jul. 24, 2019, 2 pages.
"Opponent's Letter," filed with IP Australia in connection with Australian Patent Application No. 2015386680 on Aug. 7, 2019, 2 pages.
IP Australia, "Reg, 5.23," issued in connection with Australian Patent Application No. 2015386680 on Aug. 16, 2019, 4 pages.
"Statement of Grounds and Particulars of Opposition," filed with IP Australia in connection with Australian Patent Application No. 201803659 on Aug. 14, 2019, 15 pages.
"Exhibit D1," filed with IP Australia in connection with Australian Patent Application No. 2018203659 on Aug. 14, 2019, 9 pages.
"Exhibit D2," filed with IP Australia in connection with Australian Patent Application No. 2018203659 on Aug. 14, 2019, 9 pages.
"Exhibit D3," filed with IP Australia in connection with Australian Patent Application No. 2018203659 on Aug. 14, 2019, 51 pages.
"Exhibit D4," filed with IP Australia in connection with Australian Patent Application No. 2018203659 on Aug. 14, 2019, 6 pages.
"Exhibit D5," filed with IP Australia in connection with Australian Patent Application No. 2018203659 on Aug. 14, 2019, 5 pages.
"Exhibit D6," filed with IP Australia in connection with Australian Patent Application No. 2018203659 on Aug. 14, 2019, 3 pages.
"Exhibit D7," filed with IP Australia in connection with Australian Patent Application No. 2018203659 on Aug. 14, 2019, 28 pages.
"Exhibit D8," filed with IP Australia in connection with Australian Patent Application No. 2018203659 on Aug. 14, 2019, 8 pages.
"Exhibit D9," filed with IP Australia in connection with Australian Patent Application No. 2018203659 on Aug. 14, 2019, 11 pages.
"Exhibit D10," filed with IP Australia in connection with Australian Patent Application No. 2018203659 on Aug. 14, 2019, 33 pages.
"Exhibit D11," filed with IP Australia in connection with Australian Patent Application No. 2018203659 on Aug. 14, 2019, 2 pages.
"Exhibit D12," filed with IP Australia in connection with Australian Patent Application No. 2018203659 on Aug. 14, 2019, 9 pages.
IP Australia, "Opposition—Statement or Grounds and Particulars," issued in connection with Australian Patent Application No. 2018203659 on Aug. 15, 2019, 1 page.

(56) References Cited

OTHER PUBLICATIONS

*EIS, Inc.* v. *Wow Tech International GmbH*, "Memorandum Opinion," issued by the United States District Court for the District of Delaware in connection with Case No. 1:19-cv-01227-LPS on Nov. 30, 2020, 26 pages.
*EIS, Inc.* v. *Wow Tech International GmbH*, "Second Amended Complaint," filed with the United States District Court for the District of Delaware in connection with Case No. 1:19-cv-01227-LPS on Dec. 22, 2020, 748 pages. (Uploaded in two parts.).
European Patent Office, "Notification under Article 94 (3) EPC," issued in connection with European Application No. 18206800.7, on Nov. 12, 2020, 10 pages. (English translation included.).
"Notification of an Opposition," issued by the European Patent Office in connection with European Patent No. EP3405158 on Oct. 5, 2020, opposition filed by EIS GmbH, 88 pages (includes English translation).
Mexican Institute of IP, "First Office Action," issued in connection with Mexican Patent Application No. MX/a/2017/012780, dated Jan. 8, 2021, 5 pages (includes English translation).
"Patent Owner's Sur-Reply Pursuant to 37 C.F.R. 42.23," filed with the United States Patent and Trademark Office in connection with Case IPR2019-01444 on Mar. 9, 2021, 38 pages.
"Patent Owner's Sur-Reply Pursuant to 37 C.F.R. 42.23, Exhibit 2061," filed with the United States Patent and Trademark Office in connection with Case IPR2019-01444 on Mar. 9, 2021, 39 pages.
"Petitioner's Reply to Patent Owner's Response," filed with the United States Patent and Trademark Office in connection with Case IPR2020-00007 on Mar. 12, 2021, 39 pages.
"Petitioner's Reply to Patent Owner's Response, Exhibit 1014" filed with the United States Patent and Trademark Office in connection with Case IPR2020-00007 on Mar. 12, 2021, 177 pages.
"Petitioner's Reply to Patent Owner's Response, Exhibit 1017" filed with the United States Patent and Trademark Office in connection with Case IPR2020-00007 on Mar. 12, 2021, 192 pages.
"Petitioner's Reply to Patent Owner's Response, Exhibit 1018" filed with the United States Patent and Trademark Office in connection with Case IPR2020-00007 on Mar. 12, 2021, 74 pages.
"Petitioner's Reply to Patent Owner's Response, Exhibit 1020" filed with the United States Patent and Trademark Office in connection with Case IPR2020-00007 on Mar. 12, 2021, 42 pages.
"Petitioner's Reply to Patent Owner's Response, Exhibit 1036" filed with the United States Patent and Trademark Office in connection with Case IPR2020-00007 on Mar. 12, 2021, 7 pages.
"Petitioner's Reply to Patent Owner's Response, Exhibit 1037" filed with the United States Patent and Trademark Office in connection with Case IPR2020-00007 on Mar. 12, 2021, 3 pages.
"Petitioner's Reply to Patent Owner's Response, Exhibit 1043" filed with the United States Patent and Trademark Office in connection with Case IPR2020-00007 on Mar. 12, 2021, 8 pages.
IP Australia, "Opposition—Section 104 Amendments," issued in connection with Australian Patent Application No. 2018203659 on Mar. 23, 2021, 6 pages.
"Opponent's Reply," filed with the European Patent Office by Fun Factory GmbH in connection with European Patent No. EP2976057 on Apr. 9, 2021, 233 pages (includes English translation).
"Opponent's Reply, Exhibit A2," filed with the European Patent Office by Fun Factory GmbH in connection with European Patent No. EP2976057 on Apr. 9, 2021, 24 pages (includes English translation).
"Opponent's Reply, Exhibit D34," filed with the European Patent Office by Fun Factory GmbH in connection with European Patent No. EP2976057 on Apr. 9, 2021, 1 page.
"Opponent's Reply, Exhibit D35," filed with the European Patent Office by Fun Factory GmbH in connection with European Patent No. EP2976057 on Apr. 9, 2021, 10 pages (includes English translation).
"Opponent's Reply, Exhibit E4," filed with the European Patent Office by Fun Factory GmbH in connection with European Patent No. EP2976057 on Apr. 9, 2021, 7 pages (includes English translation).

"Opponent's Reply," filed with the European Patent Office by Fun Factory GmbH in connection with European Patent No. EP3308762 on Apr. 9, 2021, 119 pages (includes English translation).
"Opponent's Reply," filed with the European Patent Office by EIS GmbH in connection with European Patent No. EP3308762 on Apr. 9, 2021, 111 pages (includes English translation).
Patent Owner's Sur-Reply Pursuant to 37 C.F.R. 42.23, filed with the United States Patent and Trademark Office in connection with Case IPR2020-00007 on Apr. 23, 2021, 40 pages.
"Opposition to a European Patent," filed with the European Patent Office by Fun Factory GmbH in connection with European Patent No. EP3305266 on Feb. 11, 2021, 138 pages (includes English translation).
"Opposition to a European Patent, Exhibit D15" filed with the European Patent Office by Fun Factory GmbH in connection with European Patent No. EP3305266 on Feb. 11, 2021, 62 pages (includes English translation).
"Opposition to a European Patent," filed with the European Patent Office by EIS GmbH in connection with European Patent No. EP3305266 on Feb. 15, 2021, 199 pages (includes English translation).
"Opposition to a European Patent, Exhibit E36" filed with the European Patent Office by EIS GmbH in connection with European Patent No. EP3305266 on Feb. 15, 2021, 2 pages.
"Statement of Grounds and Particulars of Opposition," filed with IP Australia in connection with Australian Patent Application No. 2018222907 on Feb. 24, 2021, 15 pages.
"Evidence in Support," filed with IP Australia by EIS GmbH in connection with Australian Patent Application No. 2018222907 on May 18, 2021, 53 pages.
Canadian Patent Office, "Office Action," issued in connection with Canadian Application No. 2,978,739, on Jan. 25, 2018, 5 pages.
European Patent Office, "Message," issued in connection with opposition of European Patent No. EP3308762 on Jun. 4, 2021, 40 pages (includes English translation).
European Patent Office, "Message," issued in connection with opposition of European Patent No. EP2976057 on Jun. 1, 2021, 35 pages (includes English translation).
United States Patent and Trademark Office, "Judgment, Final Written Decision," issued in connection with Case IPR2019-01302 on Jun. 14, 2021, 75 pages.
German Patent and Trademark Office, "Examination Report," issued in connection with German Application No. 10 2015 017 096.1, on Aug. 13, 2021, 23 pages (includes English translation).
United States Patent and Trademark Office, "Judgment, Final Written Decision," issued in connection with Case IPR2020-00007 on Sep. 23, 2021, 78 pages.
"Petitioner's Notice of Appeal," filed with the United States Patent and Trademark Office in connection with Case IPR2019-01302 on Aug. 13, 2021, 80 pages.
"Opposition to a German Patent," filed with the German Patent and Trademark Office by Fun Factory GmbH in connection with German Patent No. 10 2013 022 393.8 on Sep. 9, 2021, 175 pages (includes English translation).
"Opposition to a German Patent, Exhibit 5A," filed with the German Patent and Trademark Office by Fun Factory GmbH in connection with German Patent No. 10 2013 022 393.8 on Sep. 9, 2021, 10 pages.
*EIS Inc.* v. *IntiHealth Ger GmbH et al.*, "Plaintiff EIS Inc"s Answer and Affirmative Defenses to Defendant Novoluto"s Counterclaims," filed with the United States District Court for the District of Delaware, case No. 1:19-cv-01227-LPS, Nov. 12, 2021, 53 pages.
*EIS Inc.* v. *IntiHealth Ger GmbH et al.*, "Plaintiff EIS Inc"s Answer and Affirmative Defenses to Defendant Novoluto"s Counterclaims, Exhibit A," filed with the United States District Court for the District of Delaware, case No. 1:19-cv-01227-LPS, Nov. 12, 2021, 95 pages.
*EIS Inc.* v. *IntiHealth Ger GmbH et al.*, "Plaintiff EIS Inc"s Answer and Affirmative Defenses to Defendant Novoluto"s Counterclaims, Exhibit B," filed with the United States District Court for the District of Delaware, case No. 1:19-cv-01227-LPS, Nov. 12, 2021, 91 pages.

(56) References Cited

OTHER PUBLICATIONS

*EIS Inc. v. IntiHealth Ger GmbH et al.*, "Plaintiff EIS Inc"'s Answer and Affirmative Defenses to Defendant Novoluto"'s Counterclaims, Exhibit C," filed with the United States District Court for the District of Delaware, case No. 1:19-cv-01227-LPS, Nov. 12, 2021, 88 pages.
*EIS Inc. v. IntiHealth Ger GmbH et al.*, "Plaintiff EIS Inc"'s Answer and Affirmative Defenses to Defendant Novoluto"'s Counterclaims, Exhibit D," filed with the United States District Court for the District of Delaware, case No. 1:19-cv-01227-LPS, Nov. 12, 2021, 5 pages.
*EIS Inc. v. IntiHealth Ger GmbH et al.*, "Plaintiff EIS Inc"'s Answer and Affirmative Defenses to Defendant Novoluto"'s Counterclaims, Exhibit E," filed with the United States District Court for the District of Delaware, case No. 1:19-cv-01227-LPS, Nov. 12, 2021, 7 pages.
*EIS Inc. v. IntiHealth Ger GmbH et al.*, "Plaintiff EIS Inc"'s Answer and Affirmative Defenses to Defendant Novoluto"'s Counterclaims, Exhibit F," filed with the United States District Court for the District of Delaware, case No. 1:19-cv-01227-LPS, Nov. 12, 2021, 6 pages.
*EIS Inc. v. IntiHealth Ger GmbH et al.*, "Plaintiff EIS Inc"'s Answer and Affirmative Defenses to Defendant Novoluto"'s Counterclaims, Exhibit G," filed with the United States District Court for the District of Delaware, case No. 1:19-cv-01227-LPS, Nov. 12, 2021, 9 pages.
*EIS Inc. v. IntiHealth Ger GmbH et al.*, "Plaintiff EIS Inc"'s Answer and Affirmative Defenses to Defendant Novoluto"'s Counterclaims, Exhibit H," filed with the United States District Court for the District of Delaware, case No. 1:19-cv-01227-LPS, Nov. 12, 2021, 54 pages.
*EIS Inc. v. IntiHealth Ger GmbH et al.*, "Plaintiff EIS Inc"'s Answer and Affirmative Defenses to Defendant Novoluto"'s Counterclaims, Exhibit I," filed with the United States District Court for the District of Delaware, case No. 1:19-cv-01227-LPS, Nov. 12, 2021, 17 pages.
*EIS Inc. v. IntiHealth Ger GmbH et al.*, "Plaintiff EIS Inc"'s Answer and Affirmative Defenses to Defendant Novoluto"'s Counterclaims, Exhibit J," filed with the United States District Court for the District of Delaware, case No. 1:19-cv-01227-LPS, Nov. 12, 2021, 30 pages.
*EIS Inc. v. IntiHealth Ger GmbH et al.*, "Letter to The Honorable Leonard P. Stark from Paul D. Brown regarding Motion to Strike Invalidity Contentions," filed with the United States District Court for the District of Delaware in connection with Case No. 1:19-cv-1227-LPS on Nov. 17, 2021, 3 pages.
*EIS Inc. v. IntiHealth Ger GmbH et al.*, "Letter to The Honorable Leonard P. Stark from Paul D. Brown regarding Motion to Strike Invalidity Contentions, Exhibit 1," filed with the United States District Court for the District of Delaware in connection with Case No. 1:19-cv-1227-LPS on Nov. 17, 2021, 382 pages.
Josefson, D., FDA Approves Device for Female Sexual Dysfunction, 320 BMJ 7247 at 1427 (2000).
*EIS Inc. v. IntiHealth Ger GmbH et al.*, "Letter to the Honorable Leonard P. Stark in Opposition to Defendants' Motion to Strike EIS's Initial Invalidity Contentions," filed with the United States District Court for the District of Delaware in connection with Case No. 1:19-cv-1227-LPS on Nov. 30, 2021, 7 pages.
*EIS Inc. v. IntiHealth Ger GmbH et al.*, "Letter to the Honorable Leonard P. Stark from Gregory E. Stuhlman, Esquire Regarding Motion to Strike Invalidity Contentions," filed with the United States District Court for the District of Delaware in connection with Case No. 1:19-cv-1227-LPS on Dec. 3, 2021, 2 pages.
*EIS Inc. v. IntiHealth Ger GmbH et al.*, "Counterclaim Defendants EIS GmbH, Triple A Import GmbH, and Triple A Marketing GmbH's Answer and Affirmative Defenses to Defendant Novoluto's Counterclaims," filed with the United States District Court for the District of Delaware in connection with Case No. 1:19-cv-1227-LPS on Dec. 13, 2021, 54 pages.
*EIS Inc. v. IntiHealth Ger GmbH et al.*, "Plaintiff EIS Inc.'s Opening Brief in Support of its Motion for Temporary Restraining Order and Preliminary Injunction (Public Version)," filed with the United States District Court for the District of Delaware in connection with Case No. 1:19-cv-1227-LPS on Dec. 15, 2021, 26 pages.
*EIS Inc. v. IntiHealth Ger GmbH et al.*, "Plaintiff EIS Inc.'s Opening Brief in Support of its Motion for Temporary Restraining Order and Preliminary Injunction (Public Version), Exhibit A-12" filed with the United States District Court for the District of Delaware in connection with Case No. 1:19-cv-1227-LPS on Dec. 15, 2021, 22 pages.
*EIS Inc. v. IntiHealth Ger GmbH et al.*, "Letter to the Honorable Leonard P. Stark Regarding Motion for Temporary Restraining Order (Public Version)," filed with the United States District Court for the District of Delaware in connection with Case No. 1:19-cv-1227-LPS on Dec. 15, 2021, 6 pages.
*EIS Inc. v. IntiHealth Ger GmbH et al.*, "Letter to the Honorable Leonard P. Stark Regarding Reply in Support of Plaintiff EIS's Inc.'s Motion for Temporary Restraining Order and Preliminary Injunction (Public Version)," filed with the United States District Court for the District of Delaware in connection with Case No. 1:19-cv-1227-LPS on Dec. 15, 2021, 4 pages.
United States Patent and Trademark Office, "Final Office Action," issued in connection with U.S. Appl. No. 15/965,117, on Dec. 6, 2018, 15 pages.
United States Patent and Trademark Office, "Final Office Action," issued in connection with U.S. Appl. No. 15/965,208, on Dec. 10, 2018, 19 pages.
United States Patent and Tradmark Office, "Non-Final Office action," issued in connection with U.S. Appl. No. 15/354,599, on Nov. 13, 2018, 34 pages.
New Zealand Intellectual Property Office, "Further Examination Report," issued in connection with NZ Application No. 735229, on Aug. 23, 2018, 4 pages.
Singapore Patent Office, "Written Opinion," issued in connection with Singapore Application No. 11201707395T, on Jul. 24, 2018, 8 pages.
"Statement of Grounds and Particulars of Opposition," filed with the Australian Patent Office in connection with Australian Patent Application No. 2015386680 on Sep. 21, 2018, 11 pages.
Taiwan Patent Office, "English Translation of Office Action," issued in connection with Taiwanese Application No. 106132654, on Aug. 9, 2018, 3 pages.
United States Patent and Trademark Office, "Non-Final Office action," issued in connection with U.S. Appl. No. 15/719,085 on Aug. 31, 2018, 17 pages.
European Patent Office, "Search Report," issued in connection with European U.S. Appl. No. 17/190,856, on Apr. 27, 2018, 9 pages (includes English translation).
Singapore Patent Office, "Search Report and Written Opinion," issued in connection with Singapore Application No. 10201707736X, on May 18, 2018, 9 pages.
United States Patent and Trademark Office, "Final Office action," issued in connection with U.S. Appl. No. 15/354,599, on Jun. 28, 2018, 39 pages.
United States Patent Trademark Office, "Non-Final Office action," issued in connection with U.S. Appl. No. 15/965,117, on Jun. 29, 2018, 32 pages.
United States Patent and Trademark Office, "Non-Final Office action," issued connection with U.S. Appl. No. 15/965,208, on Jun. 29, 2018, 31 pages.
United States Patent and Trademark Office, "Final Office action," issued in connection with U.S. Appl. No. 15/719,085, on May 7, 2018, 14 pages.
Canadian Patent Office, "Office Action," issued in connection with Canadian Application No. 2,978,739, on Jun. 12, 2018, 4 pages.
United States Patent and Trademark Office, "Non-Final Office Action," issued in connection with U.S. Appl. No. 16/811,907, dated Jul. 22, 2022, 30 pages.
*EIS, Inc. v. Wow Tech International GmbH*, "Third Amended Complaint," filed with the United States District Court for the District of Delaware in connection with Case No. 1:19-cv-01227-LPS on Sep. 16, 2021, 753 pages. (uploaded in 5 parts).

(56) References Cited

OTHER PUBLICATIONS

"Opposition to a European Patent, Exhibit D11" filed with the European Patent Office by Fun Factory GmbH in connection with European Patent No. EP3305266 on Feb. 11, 2021, 7 pages.

"Opposition to a European Patent, Exhibit D11a" filed with the European Patent Office by Fun Factory GmbH in connection with European Patent No. EP3305266 on Feb. 11, 2021, 18 pages (includes English Translation).

"Opposition to a European Patent, Exhibit D12" filed with the European Patent Office by Fun Factory GmbH in connection with European Patent No. EP3305266 on Feb. 11, 2021, 176 pages.

"Opposition to a European Patent, Exhibit D12a" filed with the European Patent Office by Fun Factory GmbH in connection with European Patent No. EP3305266 on Feb. 11, 2021, 2 pages.

"Opposition to a European Patent, Exhibit D13" filed with the European Patent Office by Fun Factory GmbH in connection with European Patent No. EP3305266 on Feb. 11, 2021, 5 pages.

"Opposition to a European Patent, Exhibit D1a" filed with the European Patent Office by EIS GmbH in connection with European Patent No. EP3305266 on Feb. 15, 2021, 2 pages (includes English translation).

"Opposition to a European Patent, Exhibit E1" filed with the European Patent Office by EIS GmbH in connection with European Patent No. EP3305266 on Feb. 15, 2021, 3 pages (includes English translation).

"Opposition to a European Patent, Exhibit E2" filed with the European Patent Office by EIS GmbH in connection with European Patent No. EP3305266 on Feb. 15, 2021, 218 pages (includes English translation). (uploaded in 4 parts, each part with a corresponding translation).

"Opposition to a European Patent, Exhibit E3" filed with the European Patent Office by EIS GmbH in connection with European Patent No. EP3305266 on Feb. 15, 2021, 176 pages.

"Opposition to a European Patent, Exhibit E4" filed with the European Patent Office by EIS GmbH in connection with European Patent No. EP3305266 on Feb. 15, 2021, 157 pages (includes English translation).(uploaded in 3 parts, each part with a corresponding translation).

"Opposition to a European Patent, Exhibit E5" filed with the European Patent Office by EIS GmbH in connection with European Patent No. EP3305266 on Feb. 15, 2021, 152 pages.

"Opposition to a European Patent, Exhibit E6" filed with the European Patent Office by EIS GmbH in connection with European Patent No. EP3305266 on Feb. 15, 2021, 102 pages.

"Opposition to a European Patent, Exhibit E7" filed with the European Patent Office by EIS GmbH in connection with European Patent No. EP3305266 on Feb. 15, 2021, 3 pages.

"Opposition to a European Patent, Exhibit E8" filed with the European Patent Office by EIS GmbH in connection with European Patent No. EP3305266 on Feb. 15, 2021, 206 pages.

"Opposition to a European Patent, Exhibit E8a" filed with the European Patent Office by EIS GmbH in connection with European Patent No. EP3305266 on Feb. 15, 2021, 2 pages.

"Opposition to a European Patent, Exhibit E9" filed with the European Patent Office by EIS GmbH in connection with European Patent No. EP3305266 on Feb. 15, 2021, 161 pages (includes English translation). (uploaded in 3 parts, each part with a corresponding translation).

"Opposition to a European Patent, Exhibit E9a" filed with the European Patent Office by EIS GmbH in connection with European Patent No. EP3305266 on Feb. 15, 2021, 5 pages (includes English translation).

"Opposition to a European Patent, Exhibit E10" filed with the European Patent Office by EIS GmbH in connection with European Patent No. EP3305266 on Feb. 15, 2021, 1 page.

"Opposition to a European Patent, Exhibit E10a" filed with the European Patent Office by EIS GmbH in connection with European Patent No. EP3305266 on Feb. 15, 2021, 2 pages.

"Opposition to a European Patent, Exhibit E11" filed with the European Patent Office by EIS GmbH in connection with European Patent No. e EP3305266 on Feb. 15, 2021, 278 pages (includes English translation). (uploaded in 7 parts, each part with a corresponding translation).

"Opposition to a European Patent, Exhibit E11a" filed with the European Patent Office by EIS GmbH in connection with European Patent No. EP3305266 on Feb. 15, 2021, 2 pages.

"Opposition to a European Patent, Exhibit E12" filed with the European Patent Office by EIS GmbH in connection with European Patent No. EP3305266 on Feb. 15, 2021, 2 pages (includes English translation).

"Opposition to a European Patent, Exhibit E13" filed with the European Patent Office by EIS GmbH in connection with European Patent No. EP3305266 on Feb. 15, 2021, 2 pages (includes English translation).

"Opposition to a European Patent, Exhibit E14" filed with the European Patent Office by EIS GmbH in connection with European Patent No. EP3305266 on Feb. 15, 2021, 24 pages.

"Opposition to a European Patent, Exhibit E15" filed with the European Patent Office by EIS GmbH in connection with European Patent No. EP3305266 on Feb. 15, 2021, 4 pages (includes English translation).

"Opposition to a European Patent, Exhibit E16" filed with the European Patent Office by EIS GmbH in connection with European Patent No. EP3305266 on Feb. 15, 2021, 1 page.

"Opposition to a European Patent, Exhibit E17" filed with the European Patent Office by EIS GmbH in connection with European Patent No. EP3305266 on Feb. 15, 2021, 2 pages (includes English translation).

"Opposition to a European Patent, Exhibit E18" filed with the European Patent Office by EIS GmbH in connection with European Patent No. EP3305266 on Feb. 15, 2021, 1 page.

"Opposition to a European Patent, Exhibit E19" filed with the European Patent Office by EIS GmbH in connection with European Patent No. EP3305266 on Feb. 15, 2021, 3 pages.

"Opposition to a European Patent, Exhibit E20" filed with the European Patent Office by EIS GmbH in connection with European Patent No. EP3305266 on Feb. 15, 2021, 1 page.

"Opposition to a European Patent, Exhibit E21" filed with the European Patent Office by EIS GmbH in connection with European Patent No. EP3305266 on Feb. 15, 2021, 1 page.

"Opposition to a European Patent, Exhibit E21a" filed with the European Patent Office by EIS GmbH in connection with European Patent No. EP3305266 on Feb. 15, 2021, 2 pages (includes English translation).

"Opposition to a European Patent, Exhibit E22" filed with the European Patent Office by EIS GmbH in connection with European Patent No. EP3305266 on Feb. 15, 2021, 1 page.

"Opposition to a European Patent, Exhibit E22a" filed with the European Patent Office by EIS GmbH in connection with European Patent No. EP3305266 on Feb. 15, 2021, 2 pages (includes English translation).

"Opposition to a European Patent, Exhibit E23" filed with the European Patent Office by EIS GmbH in connection with European Patent No. EP3305266 on Feb. 15, 2021, 2 pages.

"Opposition to a European Patent, Exhibit E24a" filed with the European Patent Office by EIS GmbH in connection with European Patent No. EP3305266 on Feb. 15, 2021, 1 page.

"Opposition to a European Patent, Exhibit E24b" filed with the European Patent Office by EIS GmbH in connection with European Patent No. EP3305266 on Feb. 15, 2021, 1 page.

"Opposition to a European Patent, Exhibit E25" filed with the European Patent Office by EIS GmbH in connection with European Patent No. EP3305266 on Feb. 15, 2021, 3 pages (includes English translation).

"Opposition to a European Patent, Exhibit E26" filed with the European Patent Office by EIS GmbH in connection with European Patent No. EP3305266 on Feb. 15, 2021, 3 pages (includes English translation).

"Opposition to a European Patent, Exhibit E27" filed with the European Patent Office by EIS GmbH in connection with European Patent No. EP3305266 on Feb. 15, 2021, 3 pages (includes English translation).

(56) References Cited

OTHER PUBLICATIONS

"Opposition to a European Patent, Exhibit E28" filed with the European Patent Office by EIS GmbH in connection with European Patent No. EP3305266 on Feb. 15, 2021, 1 page.
"Opposition to a European Patent, Exhibit E29" filed with the European Patent Office by EIS GmbH in connection with European Patent No. EP3305266 on Feb. 15, 2021, 1 page.
"Opposition to a European Patent, Exhibit E30" filed with the European Patent Office by EIS GmbH in connection with European Patent No. EP3305266 on Feb. 15, 2021, 2 pages (includes English translation).
"Opposition to a European Patent, Exhibit E31a" filed with the European Patent Office by EIS GmbH in connection with European Patent No. EP3305266 on Feb. 15, 2021, 4 pages.
"Opposition to a European Patent, Exhibit E32" filed with the European Patent Office by EIS GmbH in connection with European Patent No. EP3305266 on Feb. 15, 2021, 10 pages (includes English translation).
"Opposition to a European Patent, Exhibit E33" filed with the European Patent Office by EIS GmbH in connection with European Patent No. EP3305266 on Feb. 15, 2021, 11 pages (includes English translation).
"Opposition to a European Patent, Exhibit E34" filed with the European Patent Office by EIS GmbH in connection with European Patent No. EP3305266 on Feb. 15, 2021, 6 pages (includes English translation).
"Opposition to a European Patent, Exhibit E35" filed with the European Patent Office by EIS GmbH in connection with European Patent No. EP3305266 on Feb. 15, 2021, 2 pages (includes English translation).
"Statement of Grounds and Particulars of Opposition Exhibit E3" filed with IP Australia in connection with Australian Patent Application No. 2018222907 on Feb. 24, 2021, 176 pages.
"Statement of Grounds and Particulars of Opposition Exhibit E5" filed with IP Australia in connection with Australian Patent Application No. 2018222907 on Feb. 24, 2021, 152 pages.
"Statement of Grounds and Particulars of Opposition Exhibit E6" filed with IP Australia in connection with Australian Patent Application No. 2018222907 on Feb. 24, 2021, 102 pages.
"Statement of Grounds and Particulars of Opposition Exhibit E8" filed with IP Australia in connection with Australian Patent Application No. 2018222907 on Feb. 24, 2021, 206 pages.
"Statement of Grounds and Particulars of Opposition Exhibit E8a" filed with IP Australia in connection with Australian Patent Application No. 2018222907 on Feb. 24, 2021, 2 pages.
"Statement of Grounds and Particulars of Opposition Exhibit E10" filed with IP Australia in connection with Australian Patent Application No. 2018222907 on Feb. 24, 2021, 174 pages.
"Statement of Grounds and Particulars of Opposition Exhibit E10a" filed with IP Australia in connection with Australian Patent Application No. 2018222907 on Feb. 24, 2021, 2 pages.
United States Patent and Trademark Office, "Notice of Allowance," issued in connection with U.S. Appl. No. 15/888,568, dated Aug. 26, 2022, 8 pages.
"Brief for Appellant EIS GmbH" filed with the United States Court of Appeals for the Federal Circuit in connection with cases 2021-2215, 2022-1020, and 2022-1191 (Consolidated Appeal from the United States Patent and Trademark Office, Patent Trial and Appeal Board in Nos. IPR2019-01302, IPR2019-01444, and IPR2020-00007), filed Apr. 25, 2022, 321 pages (uploaded in 3 parts).
"Brief of Appellee Novoluto GmbH," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007), filed Jun. 21, 2022, 52 pages.
"Appellant's Reply Brief," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019- 01444, and IPR2020-00007), filed Aug. 2, 2022, 26 pages.
"Joint Appendix, vol. I of II," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007), filed Aug. 9, 2022, 674 pages (uploaded in 9 parts).
"Joint Appendix, vol. II of II," filed with the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007), filed Aug. 9, 2022, 682 pages (uploaded in 9 parts).
United States Patent and Trademark Office, "Office Communication Concerning Third Party Submission Under 37 C.F.R. § 1.290," issued in connection with U.S. Appl. No. 17/029,974, dated May 23, 2022, 19 pages.
*EIS Inc.* v. *IntiHealth Ger GmbH et al.*, "Joint Claim Construction Brief (Redacted—Public Version)," filed with the United States District Court for the District of Delaware in connection with Case No. 1:19-cv-1227-VAC-MPT on Jul. 7, 2022, 101 pages.
*EIS Inc.* v. *IntiHealth Ger GmbH et al.*, "Appendix to Joint Claim Construction Brief, vol. 1 of 2, Exhibits 12, 13, 15-20, and 22-50," filed with the United States District Court for the District of Delaware in connection with Case No. 1:19-cv-1227-VAC-MPT on Jun. 30, 2022, 869 pages (uploaded in 3 parts).
*EIS Inc.* v. *IntiHealth Ger GmbH et al.*, "Appendix to Joint Claim Construction Brief, vol. 2 of 2, Exhibits 51-41," filed with the United States District Court for the District of Delaware in connection with Case No. 1:19-cv-1227-VAC-MPT on Jun. 30, 2022, 261 pages.
*EIS Inc.* v. *IntiHealth Ger GmbH et al.*, "Exhibits 14 and 21 to Appendix Joint Claim Construction Brief (Redacted—Public Version)," filed with the United States District Court for the District of Delaware in connection with Case No. 1:19-cv-1227-VAC-MPT on Jul. 7, 2022, 25 pages.
*EIS Inc.* v. *IntiHealth Ger GmbH et al.*, "Plaintiff and Counterclaim-Defendants' Comments and Objections on Novoluto's Technology Tutorial," filed with the United States District Court for the District of Delaware in connection with Case No. 1:19-cv-1227-VAC-MPT on Jun. 30, 2022, 8 pages.
"Complaint Response," filed with the German Patent and Trademark in connection with opposition of German Patent No. 102013110501.7 on Apr. 14, 2022, 71 pages (includes English translation).
"Complaint Response, Exhibit ES2," filed with the German Patent and Trademark in connection with opposition of German Patent No. 102013110501.7 on Apr. 14, 2022, 82 pages.
"Accession of the Alleged Patent Infringer According to Art. 105 EPC," filed with the European Patent Office by Triple A Sales GmBH in connection with European Patent No. EP2976057 on May 3, 2022, 86 pages (includes English translation).
"Accession of the Alleged Patent Infringer According to Art. 105 EPC, Exhibit B1," filed with the European Patent Office by Triple A Sales GmBH in connection with European Patent No. EP2976057 on May 3, 2022, 16 pages (includes English translation).
"Accession of the Alleged Patent Infringer According to Art. 105 EPC, Exhibit B2," filed with the European Patent Office by Triple A Sales GmBH in connection with European Patent No. EP2976057 on May 3, 2022, 4 pages (includes English translation).
"Accession of the Alleged Patent Infringer According to Art. 105 EPC, Exhibit B3," filed with the European Patent Office by Triple A Sales GmBH in connection with European Patent No. EP2976057 on May 3, 2022, 12 pages (includes English translation).
"Accession of the Alleged Patent Infringer According to Art. 105 EPC, Exhibit B4," filed with the European Patent Office by Triple A Sales GmBH in connection with European Patent No. EP2976057 on May 3, 2022, 1 page.
"Accession of the Alleged Patent Infringer According to Art. 105 EPC, Exhibit B5," filed with the European Patent Office by Triple

(56) References Cited

OTHER PUBLICATIONS

A Sales GmBH in connection with European Patent No. EP2976057 on May 3, 2022, 2 pages (includes English translation).
"Accession of the Alleged Patent Infringer According to Art. 105 EPC, Exhibit 50," filed with the European Patent Office by Triple A Sales GmBH in connection with European Patent No. EP2976057 on May 3, 2022, 24 pages.
"Accession of the Alleged Patent Infringer According to Art. 105 EPC, Exhibit 50A," filed with the European Patent Office by Triple A Sales GmBH in connection with European Patent No. EP2976057 on May 3, 2022, 24 pages.
"Accession of the Alleged Patent Infringer According to Art. 105 EPC, Exhibit 51," filed with the European Patent Office by Triple A Sales GmBH in connection with European Patent No. EP2976057 on May 3, 2022, 18 pages (includes English translation).
"Accession of the Alleged Patent Infringer According to Art. 105 EPC," filed with the European Patent Office by Triple A Sales GmBH in connection with European Patent No. 3308762 on May 3, 2022, 82 pages (includes English translation).
"Accession of the Alleged Patent Infringer According to Art. 105 EPC, Exhibit B1," filed with the European Patent Office by Triple A Sales GmBH in connection with European Patent No. EP3308762 on May 3, 2022, 16 pages includes English translation.
"Accession of the Alleged Patent Infringer According to Art. 105 EPC, Exhibit B2," filed with the European Patent Office by Triple A Sales GmBH in connection with European Patent No. EP3308762 on May 3, 2022, 4 pages (includes English translation).
"Accession of the Alleged Patent Infringer According to Art. 105 EPC, Exhibit B3," filed with the European Patent Office by Triple A Sales GmBH in connection with European Patent No. EP3308762 on May 3, 2022, 12 pages (includes English translation).
"Accession of the Alleged Patent Infringer According to Art. 105 EPC, Exhibit B4," filed with the European Patent Office by Triple A Sales GmBH in connection with European Patent No. EP3308762 on May 3, 2022, 1 page.
"Accession of the Alleged Patent Infringer According to Art. 105 EPC, Exhibit B5," filed with the European Patent Office by Triple A Sales GmBH in connection with European Patent No. EP3308762 on May 3, 2022, 2 pages (includes English translation).
"Accession of the Alleged Patent Infringer According to Art. 105 EPC, Exhibit 43," filed with the European Patent Office by Triple A Sales GmBH in connection with European Patent No. EP3308762 on May 3, 2022, 24 pages.
"Accession of the Alleged Patent Infringer According to Art. 105 EPC, Exhibit 43A," filed with the European Patent Office by Triple A Sales GmBH in connection with European Patent No. EP3308762 on May 3, 2022, 24 pages.
"Accession of the Alleged Patent Infringer According to Art. 105 EPC, Exhibit 44," filed with the European Patent Office by Triple A Sales GmBH in connection with European Patent No. EP3308762 on May 3, 2022, 12 pages.
"Appeal Letter," filed with the European Patent Office by Novoluto GmBH in connection with European Patent No. EP2976057 on Jul. 20, 2022. 148 pages (includes English translation).
"Appeal Letter," filed with the European Patent Office by Novoluto GmBH in connection with European Patent No. EP3308762 on Jul. 20, 2022. 148 pages (includes English translation).
Chinese National Intellectual Property Adminstration, "Fourth Office Action," issued in connection with Chinese Patent Application No. 201480052194.8, dated Oct. 10, 2022, 17 pages (includes English translation).
New Zealand Intellectual Property Office, "Office Action," issued in connection with NZ Application No. 735370, on Mar. 1, 2018, 5 pages.
European Patent Office, "Search Report," issued in connection with European Application No. 17202394.7, on Mar. 8, 2018, 4 pages.
European Patent Office, "Announcement According to Article 94 ( 3 ) EPU," issued in connection with European Application No. 14741640.8, on Mar. 8, 2018, 12 pages (includes English translation).

IP Australia, "Examination Report," issued in connection with Australian Application No. 2017228536, on Dec. 20, 2017, 5 pages.
United States Patent and Trademark Office, "Notice of Allowance," issued in connection with U.S. Appl. No. 15/888,568, dated May 11, 2022, 8 pages.
International Searching Authority, "Partial International Search Report," issued in connection with International Application No. PCT/EP2017/075400, on Mar. 6, 2018, 46 pages (includes English translation).
International Searching Authority, "Partial International Search Report," issued in connection with International Application No. PCT/EP2017/075399, on Mar. 1, 2018, 34 pages (includes English translation).
United States Patent and Trademark Office, "Non-Final Office action," issued in connection with U.S. Appl. No. 15/023,471, on Aug. 26, 2016, 26 pages.
United States Patent and Trademark Office, "Final Office action," issued in connection with U.S. Appl. No. 15/023,471, on Jan. 6, 2017, 28 pages.
United States Patent and Trademark Office, "Non-final Office action," issued in connection with U.S. Appl. No. 15/354,599, on Feb. 24, 2017, 38 pages.
Maria M. Kettenring, "Erotische Partnermassage", Grafe und User Publishers, 2004, 5 pages (includes English summary).
"Gesundheitsminister. Mehr Sex gegen Bluthochdruck," http://www.heilpraxisnet.delnaturheilpraxis/sex-gegen-bluthochdruck-665.php, Apr. 2010, 2 pages (English translation included).
Beate Lakotta, "Schmerz und Gluckseligkeit, Der Spiegel", pp. 136-138, Jun. 2006, 7 pages (English translation included).
"Sex hilflt gegen Erkaltung," Focus Online, Dec. 5, 2004; 2 pages (English translation included).
United States Patent and Trademark Office, "Non-Final Office action," issued in connection with U.S. Appl. No. 15/888,568, on Jan. 10, 2019, 15 pages.
United States Patent and Trademark Office, "Final Office Action," issued in connection with U.S. Appl. No. 15/888,568 on Oct. 29, 2019, 7 pages.
United States Patent and Trademark Office, "Final Office Action," issued in connection with U.S. Appl. No. 15/888,568, dated Apr. 16, 2020, 7 pages.
United States Patent and Trademark Office, "Final Office Action," issued in connection with U.S. Appl. No. 15/888,568, dated on Oct. 28, 2020, 7 pages.
United States Patent and Trademark Office, "Notice of Allowance," issued in connection with U.S. Appl. No. 15/888,568, dated Feb. 8, 2021, 8 pages.
United States Patent and Trademark Office, "Supplemental Notice of Allowability," issued in connection with U.S. Appl. No. 15/888,568, dated Apr. 5, 2021, 3 pages.
United States Patent and Trademark Office, "Supplemental Notice of Allowability," issued in connection with U.S. Appl. No. 15/888,568, dated on Apr. 26, 2021, 3 pages.
United States Patent and Trademark Office, "Corrected Notice of Allowability," issued in connection with U.S. Appl. No. 15/888,568, dated May 26, 2021, 3 pages.
United States Patent and Trademark Office, "Corrected Notice of Allowability," issued in connection with U.S. Appl. No. 15/888,568, dated Jul. 2, 2021, 3 pages.
United States Patent and Trademark Office, "Notice of Allowance," issued in connection with U.S. Appl. No. 15/888,568, dated Aug. 10, 2021, 8 pages.
United States Patent and Trademark Office, "Corrected Notice of Allowability," issued in connection with U.S. Appl. No. 15/888,568, dated Oct. 12, 2021, 3 pages.
United States Patent and Trademark Office, "Notice of Allowance," issued in connection with U.S. Appl. No. 15/888,568, dated Dec. 1, 2021, 8 pages.
United States Patent and Trademark Office, "Corrected Notice of Allowability," issued in connection with U.S. Appl. No. 15/888,568, dated Dec. 30, 2021, 3 pages.
United States Patent and Trademark Office, "Corrected Notice of Allowability," issued in connection with U.S. Appl. No. 15/888,568, dated Mar. 24, 2022, 3 pages.

(56) References Cited

OTHER PUBLICATIONS

"Accompanying Letter for Later Submitted Documents" filed with the European Patent Office by Fun Factory GmbH in connection with European Patent No. EP2976057 on Mar. 2, 2022, 24 pages (includes English translation).
"Accompanying Letter for Later Submitted Documents, Exhibits 50 and 50a" filed with the European Patent Office by Fun Factory GmbH in connection with European Patent No. EP2976057 on Mar. 2, 2022, 48 pages.
"Accompanying Letter for Later Submitted Documents" filed with the European Patent Office by Fun Factory GmbH in connection with European Patent No. EP3308762 on Mar. 2, 2022, 24 pages (includes English translation).
"Accompanying Letter for Later Submitted Documents, Exhibits 43 and 43a" filed with the European Patent Office by Fun Factory GmbH in connection with European Patent No. EP3308762 on Mar. 2, 2022, 48 pages.
"Notification of an Opposition," issued by the European Patent Office in connection with European Patent No. EP3685809 on Mar. 4, 2022, opposition filed by EIS GmbH, 179 pages (includes English translation).
EIS Inc. v. IntiHealth Ger GmbH et al., "Joint Claim Construction Chart," filed with the United States District Court for the District of Delaware, case No. 1:19-cv-01227-VAC-MPT, Mar. 23, 2022, 13 pages.
EIS Inc. v. IntiHealth Ger GmbH et al., "Appendix to Joint Claim Construction Chart," filed with the United States District Court for the District of Delaware, case No. 1:19-cv-01227-VAC-MPT, Mar. 23, 2022, 267 pages (uploaded in two parts).
United States Patent and Trademark Office, "Restriction Requirement" issued in connection with U.S. Appl. No. 16/752,283, dated Apr. 19, 2022, 6 pages.
"Grounds of Appeal," filed with the European Patent Office by Fun Factory GmbH in connection with European Patent No. EP2976057 on Jan. 3, 2022, 203 pages (includes English translation).
"Grounds of Appeal," filed with the European Patent Office by EIS GmBH in connection with European Patent No. EP2976057 on Jan. 3, 2022, 279 pages (includes English translation).
"Grounds of Appeal, Exhibit B1a" filed with the European Patent Office by EIS GmBH in connection with European Patent No. EP2976057 on Jan. 3, 2022, 2 pages (includes English translation).
"Grounds of Appeal, Exhibit D41" filed with the European Patent Office by EIS GmBH in connection with European Patent No. EP2976057 on Jan. 3, 2022, 2 pages (includes English translation).
"Grounds of Appeal, Exhibit D42" filed with the European Patent Office by EIS GmBH in connection with European Patent No. EP2976057 on Jan. 3, 2022, 18 pages (includes English translation).
"Grounds of Appeal, Exhibit D43" filed with the European Patent Office by EIS GmBH in connection with European Patent No. EP2976057 on Jan. 3, 2022, 12 pages (includes English translation).
"Grounds of Appeal, Exhibit D44" filed with the European Patent Office by EIS GmBH in connection with European Patent No. EP2976057 on Jan. 3, 2022, 11 pages (includes English translation).
"Grounds of Appeal, Exhibit D45" filed with the European Patent Office by EIS GmBH in connection with European Patent No. EP2976057 on Jan. 3, 2022, 4 pages (includes English translation).
"Grounds of Appeal, Exhibit D46" filed with the European Patent Office by EIS GmBH in connection with European Patent No. EP2976057 on Jan. 3, 2022, 13 pages.
"Grounds of Appeal, Exhibit D47" filed with the European Patent Office by EIS GmBH in connection with European Patent No. EP2976057 on Jan. 3, 2022, 3 pages.
"Grounds of Appeal, Exhibit D48" filed with the European Patent Office by EIS GmBH in connection with European Patent No. EP2976057 on Jan. 3, 2022, 4 pages (includes English translation).
"Grounds of Appeal, Exhibit D49" filed with the European Patent Office by EIS GmBH in connection with European Patent No. EP2976057 on Jan. 3, 2022, 4 pages (includes English translation).
"Grounds of Appeal," filed with the European Patent Office by Fun Factory GmBH in connection with European Patent No. EP3308762 on Jan. 3, 2022, 198 pages (includes English translation).
"Grounds of Appeal," filed with the European Patent Office by EIS GmBH in connection with European Patent No. EP3308762 on Jan. 3, 2022, 270 pages (includes English translation).
"Grounds of Appeal, Exhibit B1a" filed with the European Patent Office by EIS GmBH in connection with European Patent No. EP3308762 on Jan. 3, 2022, 2 pages (includes English translation).
"Grounds of Appeal, Exhibit D40" filed with the European Patent Office by EIS GmBH in connection with European Patent No. EP3308762 on Jan. 3, 2022, 4 pages (includes English translation).
"Grounds of Appeal, Exhibit D41" filed with the European Patent Office by EIS GmBH in connection with European Patent No. EP3308762 on Jan. 3, 2022, 4 pages (includes English translation).
"Grounds of Appeal, Exhibit D42" filed with the European Patent Office by EIS GmBH in connection with European Patent No. EP3308762 on Jan. 3, 2022, 4 pages (includes English translation).
"Follow-up to Statement of Complaint," filed with the European Patent Office by EIS GmBH in connection with European Patent No. EP2976057 on Apr. 26, 2022, 47 pages (includes English translation).
"Follow-up to Statement of Complaint, Exhibit D51," filed with the European Patent Office by EIS GmBH in connection with European Patent No. EP2976057 on Apr. 26, 2022, 17 pages (includes English translation).
"Follow-up to Statement of Complaint, Exhibit B4," filed with the European Patent Office by EIS GmBH in connection with European Patent No. EP2976057 on Apr. 26, 2022, 14 pages (includes English translation).
"Follow-up to Statement of Complaint," filed with the European Patent Office by EIS GmBH in connection with European Patent No. EP3308762 on Apr. 26, 2022, 46 pages (includes English translation).
"Follow-up to Statement of Complaint, Exhibit D44," filed with the European Patent Office by EIS GmBH in connection with European Patent No. EP3308762 on Apr. 26, 2022, 17 pages (includes English translation).
"Follow-up to Statement of Complaint, Exhibit B4," filed with the European Patent Office by EIS GmBH in connection with European Patent No. EP3308762 on Apr. 26, 2022, 18 pages (includes English translation).
"Preliminary Court Opinion," issued by the German Federal Patent Court in connection with appeal regarding German Patent No. 102013110501.7 on Dec. 14, 2022, 46 pages (includes English translation).
"Minutes of Oral Proceeding," issued by the German Federal Patent Court in connection with appeal regarding German Patent No. 102013110501.7 on Jan. 31, 2023, 9 pages (includes English translation).
EIS Inc. v. IntiHealth Ger GmbH et al., "Official Transcript of Markman Hearing Held on Nov. 21, 2022," issued on Nov. 29, 2022, in connection with Case No. 1:19-cv-1227-GBW before the United States District Court for the District of Delaware, 208 pages.
EIS Inc. v. IntiHealth Ger GmbH et al., "Defendants' Motion and Memorandum in Support of Its Motion for Leave to File Early Motion for Partial Summary Judgment," filed with the United States District Court for the District of Delaware in connection with Case No. 1:19-cv-1227-GBW on Dec. 20, 2022, 21 pages.
Novoluto GmbH v. Uccellini LLC, "Novoluto GmbH's Notice that Claim Construction Briefing and Hearing Are Unnecessary," filed with the United States District Court for the District of Oregon in connection with Case No. 6:20-cv-02284-MK on Dec. 22, 2022, 29 pages.
EIS Inc. v. IntiHealth Ger GmbH et al., "Order," issued by the United States District Court for the District of Delaware in connection with Case No. 1:19-cv-1227-GBW on Jan. 9, 2023, 2 pages.
EIS Inc. v. IntiHealth Ger GmbH et al., "Memorandum Opinion," issued by the United States District Court for the District of Delaware in connection with Case No. 1:19-cv-1227-GBW on Jan. 9, 2023, 47 pages.
EIS Inc. v. IntiHealth Ger GmbH et al., "Plaintiff's Answering Brief in Opposition to Defendants' Motion for Leave to File Early Motion

(56) References Cited

OTHER PUBLICATIONS for Partial Summary Judgment," filed with the United States District Court for the District of Delaware in connection with Case No. 1:19-cv-1227-GBW on Jan. 10, 2023, 24 pages.
*EIS Inc.* v. *IntiHealth Ger GmbH et al.*, "Defendants' Reply In Support Of Its Motion For Leave To File Early Motion For Partial Summary Judgment," filed with the United States District Court for the District of Delaware in connection with Case No. 1:19-cv-1227-GBW on Jan. 17, 2023, 6 pages.
*EIS Inc.* v. *IntiHealth Ger GmbH et al.*, "Plaintiff And Counterclaim—Defendants' Motion To Strike Untimely Doctrine Of Equivalents Allegations," filed with the United States District Court for the District of Delaware in connection with Case No. 1:19-cv-1227-GBW on Mar. 6, 2023, 3 pages.
*EIS Inc.* v. *IntiHealth Ger GmbH et al.*, "Letter To The Honorable Gregory B. Williams Regarding Counterclaim—Defendants' Motion To Strike Untimely Doctrine Of Equivalents Allegations," filed with the United States District Court for the District of Delaware in connection with Case No. 1:19-cv-1227-GBW on Mar. 6, 2023, 25 pages.
United States Patent and Trademark Office, "Non-Final Office Action," issued in connection with U.S. Appl. No. 16/752,283, dated Jan. 19, 2023, 16 pages.
United States Patent and Trademark Office, "Notice of Allowance," issued in connection with U.S. Appl. No. 15/888,568, dated Jan. 18, 2023, 8 pages.
United States Patent and Trademark Office, "Non-Final Office Action," issued in connection with U.S. Appl. No. 17/029,974, dated Feb. 28, 2023, 100 pages.
*Novoluto GmbH* v. *Uccellini LLC*, "First Amended Complaint," filed with the United States District Court for the District of Oregon in connection with Case No. 6:20-cv-02284-MK on Feb. 4, 2022, 368 pages (uploaded in 3 parts).
*Novoluto GmbH* v. *Uccellini LLC*, "Answer and Affirmative Defenses to First Amended Complaint," filed with the United States District Court for the District of Oregon in connection with Case No. 6:20-cv-02284-MK on Feb. 17, 2022, 18 pages.
"Notification of an Opposition," issued by the European Patent Office in connection with European Patent No. EP375106 on Oct. 11, 2022, opposition filed by EIS GmbH, 128 pages (includes English translation).
"Opposition to a European Patent, Exhibit D6" filed with the European Patent Office by EIS GmbH in connection with European Patent No. EP375106 on Oct. 5, 2022, 18 pages (includes English translation).
"Opposition to a European Patent, Exhibit D7" filed with the European Patent Office by EIS GmbH in connection with European Patent No. EP375106 on Oct. 5, 2022, 18 pages (includes English translation).
"Opposition to a European Patent, Exhibit D8" filed with the European Patent Office by EIS GmbH in connection with European Patent No. EP375106 on Oct. 5, 2022, 18 pages (includes English translation).
Smith, J., "Fetish Fantasy Series Clit Pump: PD323100," May 21, 2013, https://www.youtube.com/watch?v=zJbKY1SQDas, 1 page.
Funkycondom, "Jesse's Vibro Pussy Sucker," Feb. 5, 2011, https://www.youtube.com/watch?v=-YpufGFnKHQ, 1 page.
SexToyCanada, "Dr. Laura Berman Selene Vibrating Clitoral Pump Product Demo," Jun. 20, 2013, https://www.youtube.com/watch?v=4ZMybp0yWxU, 1 page.
Novelties for Lovers, "Dr. Laura Berman—Intimate Basics—Selene—Vibrating Clit Pump," Feb. 16, 2014, https://www.youtube.com/watch?v=-t85zgK2wHg, 1 page.
SexToyCanada, "Dr Laura Berman Intimate Basics Collection Thea Waterproof Silicone Clitoral PumpProduct D," Nov. 4, 2014, https://www.youtube.com/watch?v=K5jfBESc8p0.
SexToySuperMall, "Advanced Clitoral Pump," Sep. 1, 2009, https://www.youtube.com/watch?v=rlEaFHeiDCI, 1 page.
Discreetfantasy, "Advanced Clitoral Pumps: SE062350," May 14, 2013, https://www.youtube.com/watch?v=E8a8J6TjENE, 1 page.
Pipedream, "Fetish Fantasy Series: Vibrating Stimulators," 2012, http://web.archive.org/web/20121105173055/http://www.pipedreamproducts.com/showsection-20b.php?Section=04&Sub1=Vibrating%20Stimulators, 3 pages.
Extreme Restraints, "The Clit Intensifier Pump," 2022, https://www.extremerestraints.com/the-clit-intensifier-pump.html, 6 pages.
Extreme Restraints, "Unique Vibrators," 2012, http://web.archive.org/web/20120104164504/http:/www.extremerestraints.com/unique-vibrators_85/, 2 pages.
Katherine McAlpine, "Balls, Cups and Discs: A History of Vibrators and Massage Machines, 1900-1940, Dissertation 2012," available at https://www.academia.edu/28556168/Balls_Cups_and_Discs_A_history_of_vibrators_and_massage_machines_1900_1940_Dissertation_2012, 41 pages.
CalExotics, Intimate Pump Vibro Pussy Sucker, 2022, https://calexotics.com/intimate-pump-vibro-pussy-sucker/, 5 pages.
MySexToySpot.com, "Clit Suckers & Pussy Pumps," 2013, available at https://web.archive.org/web/20131214165302/http://mysextoyspot.com/Extras/Pussy-Pumps-Pelvic-Exercisers/Clit-Suckers-Pussy-Pumps, 2 pages.
California Exotic Novelties, "Couture Collection," 2009, available at https://web.archive.org/web/20100628224310/calexotics.com/index.php, 3 pages.
Schroder, M. et al., "Clitoral Therapy Device for Treatment of Sexual Dysfunction In Irradiated Cervical Cancer Patients," 2005, International Journal of Radiation Oncology Biology Physics, 61(4), pp. 1078-1086, 9 pages.
Cellulite, "A Little Cellulite: Primer for the Beauty Vital 1000/1002/3000 and the TheraVac," Oct. 31, 2013, available at https://www.yumpu.com/de/document/read/21185793/c-e-1-1-u-1-i-t-e-mag-frenkel-midovital, 10 pages (English translation provided upon request).
*EIS Inc.* v. *IntiHealth Ger GmbH et al.*, "Letter to The Honorable Gregory B. Williams from Gregory E. Stuhlman, Esquire Regarding Notifying the Court that Wow Tech Will Present Live Expert Witnesses at the Upcoming Claim Construction Hearing," filed with the United States District Court for the District of Delaware in connection with Case No. 1:19-cv-1227-GBW on Nov. 11, 2022, 2 pages.
*EIS Inc.* v. *IntiHealth Ger GmbH et al.*, "Letter to The Honorable Gregory B. Williams from Brian P. Egan Regarding Claim Construction Disputes," filed with the United States District Court for the District of Delaware in connection with Case No. 1:19-cv-1227-GBW on Nov. 16, 2022, 6 pages.
United States Patent and Trademark Office, "Final Office Action," issued in connection with U.S. Appl. No. 16/811,907, dated Apr. 7, 2023, 32 pages.
*EIS Inc.* v. *IntiHealth Ger GmbH et al.*, "Memorandum Opinion," issued by the United States District Court for the District of Delaware in connection with Case No. 1:19-cv-1227-GBW on Aug. 23, 2023, unsealed on Sep. 5, 2023, 22 pages.
*EIS Inc.* v. *IntiHealth Ger GmbH et al.*, "Letter to The Honorable Gregory B. Williams from Brian P. Eagan Regarding Case Narrowing," filed with the United States District Court for the District of Delaware in connection with Case No. 1:19-cv-1227-GBW on Sep. 7, 2023, 3 pages.
*EIS Inc.* v. *IntiHealth Ger GmbH et al.*, "Letter to The Honorable Gregory B. Williams Regarding IPR," filed with the United States District Court for the District of Delaware in connection with Case No. 1:19-cv-1227-GBW on Sep. 12, 2023, 3 pages.
*EIS Inc.* v. *IntiHealth Ger GmbH et al.*, "Redacted Public Version of Jury Verdict," posted by the United States District Court for the District of Delaware in connection with Case No. 1:19-cv-1227-GBW on Sep. 15, 2023, 17 pages.
*EIS Inc.* v. *IntiHealth Ger GmbH et al.*, "Letter to the Honorable Gregory B. Williams Regarding IPR (Redacted Public Version)," filed with the United States District Court for the District of Delaware in connection with Case No. 1:19-cv-1227-GBW on Sep. 26, 2023, 20 pages.
*EIS Inc.* v. *IntiHealth Ger GmbH et al.*, "Joint Motion to Seal and Redact Memorandum Order (Redacted Public Version)," filed with

(56) References Cited

OTHER PUBLICATIONS the United States District Court for the District of Delaware in connection with Case No. 1:19-cv-1227-GBW on Sep. 26, 2023, 68 pages.

EIS Inc. v. IntiHealth Ger GmbH et al., "Post-Trial Status Report," filed with the United States District Court for the District of Delaware in connection with Case No. 1:19-cv-1227-GBW on Sep. 26, 2023, 19 pages.

EIS Inc. v. IntiHealth Ger GmbH et al., "Memorandum Opinion," issued by the United States District Court for the District of Delaware in connection with Case No. 1:19-cv-1227-GBW on Aug. 30, 2023, unsealed on Sep. 28, 2023, 14 pages.

United States Patent and Trademark Office, "Final Office Action," issued in connection with U.S. Appl. No. 16/752,283, dated Oct. 11, 2023, 17 pages.

United States Patent and Trademark Office, "Notice of Allowance," issued in connection with U.S. Appl. No. 15/888,568, dated Oct. 19, 2023, 9 pages.

EIS Inc. v. IntiHealth Ger GmbH et al., "Defendants' Statement Of Undisputed Material Facts In Support Of Its Opposition To Plaintiff's And Counterclaimdefendants' Motion For Partial Summary Judgment (No. 4)," filed with the United States District Court for the District of Delaware in connection with Case No. 1:19-cv-1227-GBW on Jun. 2, 2023, 5 pages.

EIS Inc. v. IntiHealth Ger GmbH et al., "Defendants' Statement Of Undisputed Material Facts In Support Of Its Opposition To Plaintiff And Counterclaimdefendants' Motion For Partial Summary Judgment (No. 5)," filed with the United States District Court for the District of Delaware in connection with Case No. 1:19-cv-1227-GBW on Jun. 2, 2023, 4 pages.

EIS Inc. v. IntiHealth Ger GmbH et al., "Plaintiff's And Counterclaim Defendants' Reply In Support Of Its Daubert Motion To Exclude Opinions Of Robert L. Stoll," filed with the United States District Court for the District of Delaware in connection with Case No. 1:19-cv-1227-GBW on Jun. 9, 2023, 9 pages.

EIS Inc. v. IntiHealth Ger GmbH et al., "Plaintiff's And Counterclaim Defendants' Reply In Support Of Their Daubert Motion To Exclude Certain "Stimulation Device" Opinions," filed with the United States District Court for the District of Delaware in connection with Case No. 1:19-cv-1227-GBW on Jun. 9, 2023, 5 pages.

EIS Inc. v. IntiHealth Ger GmbH et al., "Plaintiff's And Counterclaim Defendants' Reply In Support Of Their Daubert Motion To Exclude Certain Opinions Of Drs. Cameron And Herbenick," filed with the United States District Court for the District of Delaware in connection with Case No. 1:19-cv-1227-GBW on Jun. 9, 2023, 7 pages.

EIS Inc. v. IntiHealth Ger GmbH et al. "Declaration Of Allan M. Soobert In Support Of Plaintiff And Counterclaim Defendants' Reply In Support Of Their Daubert Motion To Exclude Certain Opinions Of Drs. Cameron And Herbenick," filed with the United States District Court for the District of Delaware in connection with Case No. 1:19-cv-1227-GBW on Jun. 9, 2023, 92 pages.

EIS Inc. v. IntiHealth Ger GmbH et al. "Plaintiff's And Counterclaim Defendants' Reply In Support Of Its Daubert Motion To Exclude Opinions Of Dr. Debra Herbenick," filed with the United States District Court for the District of Delaware in connection with Case No. 1:19-cv-1227-GBW on Jun. 9, 2023, 5 pages.

EIS Inc. v. IntiHealth Ger GmbH et al., "Plaintiff's And Counterclaim Defendants' Reply In Support Of Their Motion For Partial Summary Judgment As To Effective Filing Date Of The Asserted Claims Of U.S. Pat. Nos. 11,090,220, 11,103,418, 9,937,097 (No. 2)," filed with the United States District Court for the District of Delaware in connection with Case No. 1:19-cv-1227-GBW on Jun. 9, 2023, 16 pages (includes publicly available version of Exhibit N retrieved from PACER).

EIS Inc. v. IntiHealth Ger GmbH et al., "Plaintiff's And Counterclaim Defendants' Response To Defendants' Statement Of Material Facts Regarding Motion No. 2 For Partial Summary Judgment That The Asserted Claims Of U.S. Pat. Nos. 11,090,220, 11,103,418, 9,937,097 Are Not Entitled To An Effective Filing Date Of Their Respective Earliest U.S. Parent Patents," filed with the United States District Court for the District of Delaware in connection with Case No. 1:19-cv-1227-GBW on Jun. 9, 2023, 7 pages.

EIS Inc. v. IntiHealth Ger GmbH et al., "Plaintiff's And Counterclaim Defendants' Reply In Support Of Their Motion For Partial Summary Judgment Of Noninfringement Of All Asserted Claims Of U.S. Pat. No. 9,763,851 (No. 4)," filed with the United States District Court for the District of Delaware in connection with Case No. 1:19-cv-1227-GBW on Jun. 9, 2023, 7 pages.

EIS Inc. v. IntiHealth Ger GmbH et al., "Plaintiff's And Counterclaim Defendants' Response To Defendant's Statement Of Undisputed Material Facts In Support Of Its Opposition To Plaintiff And Counterclaim—Defendants' Motion For Partial Summary Judgment (No. 4)," filed with the United States District Court for the District of Delaware in connection with Case No. 1:19-cv-1227-GBW on Jun. 9, 2023, 5 pages.

EIS Inc. v. IntiHealth Ger GmbH et al., "Plaintiff's And Counterclaim Defendants' Reply In Support Of Their Motion No. 5 For Partial Summary Judgment Of Invalidity Of The Asserted Claims Of U.S. Pat. Nos. 11,090,220 And 11,103,418," filed with the United States District Court for the District of Delaware in connection with Case No. 1:19-cv-1227-GBW on Jun. 9, 2023, 5 pages.

EIS Inc. v. IntiHealth Ger GmbH et al., "Plaintiff's And Counterclaim Defendants' Response To Defendant's Statement Of Undisputed Material Facts In Support Of Its Opposition To Plaintiff And Counterclaim—Defendants' Motion For Partial Summary Judgment (No. 5)," filed with the United States District Court for the District of Delaware in connection with Case No. 1:19-cv-1227-GBW on Jun. 9, 2023, 6 pages.

EIS Inc. v. IntiHealth Ger GmbH et al., "Memorandum Order," issued by the United States District Court for the District of Delaware in connection with Case No. 1:19-cv-1227-GBW on Jun. 13, 2023, 3 pages.

EIS Inc. v. IntiHealth Ger GmbH et al., "Plaintiff EIS, Inc.'s Notice Of Subsequent Authority In Support Of Its Opposition To Defendants' Motion To Strike EIS's Election Of Prior-Art Based Invalidity Arguments (Redacted Public Version)," filed with the United States District Court for the District of Delaware in connection with Case No. 1:19-cv-1227-GBW on May 11, 2023, 1,179 pages (uploaded in 6 parts).

EIS Inc. v. IntiHealth Ger GmbH et al., "Letter To The Honorable Gregory B. Williams Regarding Counterclaim-Defendants' Motion To Strike Untimely Discovery And Expert Disclosures (Redacted Public Version)," filed with the United States District Court for the District of Delaware in connection with Case No. 1:19-cv-1227-GBW on May 16, 2023, 173 pages.

EIS Inc. v. IntiHealth Ger GmbH et al., "Plaintiff's And Counterclaim Defendants' Opening Brief In Support Of Their Daubert Motion To Exclude Opinions Of Robert L. Stoll (Redacted Public Version)," filed with the United States District Court for the District of Delaware in connection with Case No. 1:19-cv-1227-GBW on May 17, 2023, 16 pages.

EIS Inc. v. IntiHealth Ger GmbH et al., "Declaration Of Allan M. Soobert In Support Of Plaintiff's And Counterclaim Defendants' Daubert Motion To Exclude Opinions Of Robert L. Stoll (Redacted Public Version)," filed with the United States District Court for the District of Delaware in connection with Case No. 1:19-cv-1227-GBW on May 17, 2023, 111 pages.

EIS Inc. v. IntiHealth Ger GmbH et al., "Plaintiff's And Counterclaim Defendants' Opening Brief In Support Of Their Daubert Motion To Exclude Certain "Stimulation Device" Opinions (Public Version)," filed with the United States District Court for the District of Delaware in connection with Case No. 1:19-cv-1227-GBW on May 19, 2023, 9 pages.

EIS Inc. v. IntiHealth Ger GmbH et al., "Declaration Of Allan M. Soobert In Support Of Plaintiff's And Counterclaim Defendants' Opening Brief In Support Of Their Daubert Motion To Exclude Certain "Stimulation Device" Opinions (Public Version)," filed with the United States District Court for the District of Delaware in connection with Case No. 1:19-cv-1227-GBW on May 19, 2023, 498 pages (uploaded in 2 parts).

EIS Inc. v. IntiHealth Ger GmbH et al., "Plaintiff's And Counterclaim Defendants' Opening Brief In Support Of Their Daubert

(56) References Cited

OTHER PUBLICATIONS

Motion To Exclude Certain Opinions Of Drs. Cameron And Herbenick (Public Version)," filed with the United States District Court for the District of Delaware in connection with Case No. 1:19-cv-1227-GBW on May 19, 2023, 9 pages.

*EIS Inc.* v. *IntiHealth Ger GmbH et al.*, "Declaration Of Allan M. Soobert In Support Of Plaintiff's And Counterclaim Defendants' Daubert Motion To Exclude Certain Opinions Of Drs. Cameron And Herbenick (Public Version)," filed with the United States District Court for the District of Delaware in connection with Case No. 1:19-cv-1227-GBW on May 19, 2023, 125 pages (uploaded in 2 parts).

*EIS Inc.* v. *IntiHealth Ger GmbH et al.*, "Plaintiff's And Counterclaim Defendants' Opening Brief In Support Of Their Daubert Motion To Exclude The Opinions Of Dr. Debra Herbenick (Public Version)," filed with the United States District Court for the District of Delaware in connection with Case No. 1:19-cv-1227-GBW on May 19, 2023, 8 pages.

*EIS Inc.* v. *IntiHealth Ger GmbH et al.*, "Declaration Of Allan M. Soobert In Support Of Plaintiff's And Counterclaim Defendants' Daubert Motion To Exclude The Opinions Of Dr. Debra Herbenick (Public Version)," filed with the United States District Court for the District of Delaware in connection with Case No. 1:19-cv-1227-GBW on May 19, 2023, 697 pages (uploaded in 3 parts).

*EIS Inc.* v. *IntiHealth Ger GmbH et al.*, "Plaintiff's And Counterclaim Defendants' Brief In Support Of Motion No. 2 For Partial Summary Judgment That The Asserted Claims Of U.S. Pat. Nos. 11,090,220, 11,103,418, 9,937,097 Are Not Entitled To An Effective Filing Date Of Their Respective Earliest U.S. Parent Patents (Public Version)," filed with the United States District Court for the District of Delaware in connection with Case No. 1:19-cv-1227-GBW on May 19, 2023, 10 pages.

*EIS Inc.* v. *IntiHealth Ger GmbH et al.*, "Declaration Of Allan M. Soobert In Support Of Plaintiff's And Counterclaim Defendants' Motion No. 2 For Partial Summary Judgment That The Asserted Claims Of U.S. Pat. Nos. 11,090,220, 11,103,418, 9,937,097 Are Not Entitled To An Effective Filing Date Of Their Respective Earliest U.S. Parent Patents (Public Version)," filed with the United States District Court for the District of Delaware in connection with Case No. 1:19-cv-1227-GBW on May 19, 2023, 274 pages (uploaded in 2 parts).

*EIS Inc.* v. *IntiHealth Ger GmbH et al.*, "Plaintiff's And Counterclaim Defendants' Concise Statement Of Facts In Support Of Motion No. 2 For Partial Summary Judgment That The Asserted Claims Of U.S. Pat. Nos. 11,090,220, 11,103,418, 9,937,097 Are Not Entitled To An Effective Filing Date Of Their Respective Earliest U.S. Parent Patents (Public Version)," filed with the United States District Court for the District of Delaware in connection with Case No. 1:19-cv-1227-GBW on May 19, 2023, 8 pages.

*EIS Inc.* v. *IntiHealth Ger GmbH et al.*, "Plaintiff's And Counterclaim Defendants' Brief In Support Of Motion No. 4 For Partial Summary Judgment Of Noninfringement Of All Asserted Claims Of U.S. Pat. No. 9,763,851 (Public Version)," filed with the United States District Court for the District of Delaware in connection with Case No. 1:19-cv-1227-GBW on May 19, 2023, 10 pages.

*EIS Inc.* v. *IntiHealth Ger GmbH et al.*, "Declaration Of Allan M. Soobert In Support Of Plaintiff's And Counterclaim Defendants' Motion No. 4 For Partial Summary Judgment Of Noninfringement Of All Asserted Claims Of U.S. Pat. No. 9,763,851 (Public Version)," filed with the United States District Court for the District of Delaware in connection with Case No. 1:19-cv-1227-GBW on May 19, 2023, 182 pages (uploaded in 3 parts).

*EIS Inc.* v. *IntiHealth Ger GmbH et al.*, "Plaintiff's Concise Statement Of Facts In Support Of Motion No. 4 For Partial Summary Judgment Of Noninfringement Of All Asserted Claims Of U.S. Pat. No. 9,763,851 (Public Version)," filed with the United States District Court for the District of Delaware in connection with Case No. 1:19-cv-1227-GBW on May 19, 2023, 8 pages.

*EIS Inc.* v. *IntiHealth Ger GmbH et al.*, "Plaintiff's And Counterclaim Defendants' Brief In Support Of Their Motion No. 5 For Partial Summary Judgment Of Invalidity Of The Asserted Claims Of U.S. Pat. Nos. 11,090,220 And 11,103,418 (Public Version)," filed with the United States District Court for the District of Delaware in connection with Case No. 1:19-cv-1227-GBW on May 19, 2023, 6 pages.

*EIS Inc.* v. *IntiHealth Ger GmbH et al.*, "Declaration Of Allan M. Soobert In Support Of Plaintiff's And Counterclaim Defendants' Motion No. 5 For Partial Summary Of Invalidity Of The Asserted Claims Of U.S. Pat. Nos. 11,090,220 And 11,103,418 (Public Version)," filed with the United States District Court for the District of Delaware in connection with Case No. 1:19-cv-1227-GBW on May 19, 2023, 168 pages (uploaded in 2 parts).

*EIS Inc.* v. *IntiHealth Ger GmbH et al.*, "Plaintiff's And Counterclaim Defendants' Concise Statement Of Facts In Support Of Their Motion No. 5 For Partial Summary Judgment Of Invalidity Of The Asserted Claims Of U.S. Pat. Nos. 11,090,220 And 11,103,418 (Public Version)," filed with the United States District Court for the District of Delaware in connection with Case No. 1:19-cv-1227-GBW on May 19, 2023, 4 pages.

*EIS Inc.* v. *IntiHealth Ger GmbH et al.*, "Reply Letter To The Honorable Gregory B. Williams In Support Of Counterclaim—Defendants' Motion To Strike Untimely Discovery And Expert Disclosures," filed with the United States District Court for the District of Delaware in connection with Case No. 1:19-cv-1227-GBW on May 19, 2023, 28 pages.

*EIS Inc.* v. *IntiHealth Ger GmbH et al.*, "Plaintiff's And Counterclaim Defendants' Brief In Support Of Their Inequitable Conduct And Unclean Hands Defenses (Redacted Public Version)," filed with the United States District Court for the District of Delaware in connection with Case No. 1:19-cv-1227-GBW on Nov. 17, 2023, 33 pages.

*EIS Inc.* v. *IntiHealth Ger GmbH et al.*, "Plaintiff's And Counterclaim Defendants' Proposed Findings Of Fact And Conclusions Of Law Regarding Defendants' Inequitable Conduct And Unclean Hands Defenses (Redacted Public Version)," filed with the United States District Court for the District of Delaware in connection with Case No. 1:19- CV-1227-GBW on Nov. 17, 2023, 29 pages.

*EIS Inc.* v. *IntiHealth Ger GmbH et al.*, "Declaration Of Allan M. Soobert In Support Of Plaintiff's And Counterclaim Defendants' Brief In Support Of Their Inequitable Conduct And Unclean Hands Defenses (Redacted Public Version)," filed with the United States District Court for the District of Delaware in connection with Case No. 1:19-cv-1227-GBW on Nov. 17, 2023, 50 pages.

*EIS Inc.* v. *IntiHealth Ger GmbH et al.*, "Defendants' And Counterclaimant's Response To Plaintiff's Opening Brief On Its Unenforceability Defenses (Redacted Public Version)," filed with the United States District Court for the District of Delaware in connection with Case No. 1:19-cv-1227-GBW on Dec. 15, 2023, 37 pages.

*EIS Inc.* v. *IntiHealth Ger GmbH et al.*, "Declaration Of Califf T. Cooper In Support Of Defendants' And Counterclaimants' Opening Brief On Plaintiff's Unenforceability Defenses (Redacted Public Version)," filed with the United States District Court for the District of Delaware in connection with Case No. 1:19-cv-1227-GBW on Dec. 15, 2023, 37 pages.

*EIS Inc.* v. *IntiHealth Ger GmbH et al.*, "Defendants' Proposed Findings Of Fact And Conclusions Of Law In Support Of Its Response To Plaintiff's Opening Brief On Its Unenforceability Defenses (Redacted Public Version)," filed with the United States District Court for the District of Delaware in connection with Case No. 1:19-cv-1227-GBW on Dec. 15, 2023, 22 pages.

*EIS Inc.* v. *IntiHealth Ger GmbH et al.*, "Plaintiff's And Counterclaim Defendants' Reply Brief In Support Of Their Inequitable Conduct And Unclean Hands Defenses," filed with the United States District Court for the District of Delaware in connection with Case No. 1:19-cv-1227-GBW on Dec. 22, 2023, 17 pages.

*EIS Inc.* v. *IntiHealth Ger GmbH et al.*, "Declaration Of Allan M. Soobert In Support Of Plaintiff's And Counterclaim Defendants' Reply Brief In Support Of Their Inequitable Conduct And Unclean Hands Defenses," filed with the United States District Court for the District of Delaware in connection with Case No. 1:19-cv-1227-GBW on Dec. 22, 2023, 56 pages.

(56) References Cited

OTHER PUBLICATIONS

United States Patent and Trademark Office, "Final Office Action," issued in connection with U.S. Appl. No. 17/029,974, dated Nov. 24, 2023, 98 pages.
United States Patent and Trademark Office, "Final Office Action," issued in connection with U.S. Appl. No. 17/461,470, dated Dec. 20, 2023, 37 pages.
United States Patent and Trademark Office, "Final Office Action," issued in connection with U.S. Appl. No. 17/403,609, dated Dec. 21, 2023, 22 pages.
United States Patent and Trademark Office, "Non-Final Office Action," issued in connection with U.S. Appl. No. 17/044,501, dated Dec. 21, 2023, 16 pages.
United States Patent and Trademark Office, "Non-Final Office Action," issued in connection with U.S. Appl. No. 17/044,503, dated Dec. 21, 2023, 11 pages.
Eros by NuGyn, Inc., May 31, 2011, available at https://www.youtube.com/watch?v=N9c3fv6vfeg, 1 page.
EIS Inc. v. IntiHealth Ger GmbH et al., "Plaintiff's And Counterclaim Defendants' Answering Brief In Opposition To Defendants' Summary Judgment And Daubert Motions (Redacted Public Version)," filed with the United States District Court for the District of Delaware in connection with Case No. 1:19-cv-1227-GBW on Jun. 16, 2023, 61 pages.
EIS Inc. v. IntiHealth Ger GmbH et al., "Plaintiff And Counterclaim Defendants' Statement Of Material Facts And Responsive Statement Of Material Facts (Redacted Public Version)," filed with the United States District Court for the District of Delaware in connection with Case No. 1:19-cv-1227-GBW on Jun. 16, 2023, 28 pages.
EIS Inc. v. IntiHealth Ger GmbH et al., "Declaration Of Allan M. Soobert In Support Of Plaintiff And Counterclaim Defendants' Opposition To Defendants' Motions For Partial Summary Judgment And Daubert Motions and Exhibits A-C," filed with the United States District Court for the District of Delaware in connection with Case No. 1:19-cv-1227-GBW on Jun. 16, 2023, 62 pages.
EIS Inc. v. IntiHealth Ger GmbH et al., "Exhibit D filed with Declaration Of Allan M. Soobert In Support Of Plaintiff And Counterclaim Defendants' Opposition To Defendants' Motions For Partial Summary Judgment And Daubert Motions," filed with the United States District Court for the District of Delaware in connection with Case No. 1:19-cv-1227-GBW on Jun. 16, 2023, 124 pages (uploaded in 4 parts).
EIS Inc. v. IntiHealth Ger GmbH et al., "Exhibits E filed with Declaration Of Allan M. Soobert In Support Of Plaintiff And Counterclaim Defendants' Opposition To Defendants' Motions For Partial Summary Judgment And Daubert Motions," filed with the United States District Court for the District of Delaware in connection with Case No. 1:19-cv-1227-GBW on Jun. 16, 2023, 91 pages.
EIS Inc. v. IntiHealth Ger GmbH et al., "Exhibit F filed with Declaration Of Allan M. Soobert In Support Of Plaintiff And Counterclaim Defendants' Opposition To Defendants' Motions For Partial Summary Judgment And Daubert Motions," filed with the United States District Court for the District of Delaware in connection with Case No. 1:19-cv-1227-GBW on Jun. 16, 2023, 40 pages.
EIS Inc. v. IntiHealth Ger GmbH et al., "Exhibit G filed with Declaration Of Allan M. Soobert In Support Of Plaintiff And Counterclaim Defendants' Opposition To Defendants' Motions For Partial Summary Judgment And Daubert Motions," filed with the United States District Court for the District of Delaware in connection with Case No. 1:19-cv-1227-GBW on Jun. 16, 2023, 110 pages.
EIS Inc. v. IntiHealth Ger GmbH et al., "Exhibit H filed with Declaration Of Allan M. Soobert In Support Of Plaintiff And Counterclaim Defendants' Opposition To Defendants' Motions For Partial Summary Judgment And Daubert Motions," filed with the United States District Court for the District of Delaware in connection with Case No. 1:19-cv-1227-GBW on Jun. 16, 2023, 116 pages.
EIS Inc. v. IntiHealth Ger GmbH et al., "Exhibit I-N filed with Declaration Of Allan M. Soobert In Support Of Plaintiff And Counterclaim Defendants' Opposition To Defendants' Motions For Partial Summary Judgment And Daubert Motions," filed with the United States District Court for the District of Delaware in connection with Case No. 1:19-cv-1227-GBW on Jun. 16, 2023, 101 pages.
EIS Inc. v. IntiHealth Ger GmbH et al., "Exhibits O-S filed with Declaration Of Allan M. Soobert In Support Of Plaintiff And Counterclaim Defendants' Opposition To Defendants' Motions For Partial Summary Judgment And Daubert Motions," filed with the United States District Court for the District of Delaware in connection with Case No. 1:19-cv-1227-GBW on Jun. 16, 2023, 119 pages.
EIS Inc. v. IntiHealth Ger GmbH et al., "Exhibit T filed with Declaration Of Allan M. Soobert In Support Of Plaintiff And Counterclaim Defendants' Opposition To Defendants' Motions For Partial Summary Judgment And Daubert Motions," filed with the United States District Court for the District of Delaware in connection with Case No. 1:19-cv-1227-GBW on Jun. 16, 2023, 325 pages.
EIS Inc. v. IntiHealth Ger GmbH et al., "Exhibit U filed with Declaration Of Allan M. Soobert In Support Of Plaintiff And Counterclaim Defendants' Opposition To Defendants' Motions For Partial Summary Judgment And Daubert Motions," filed with the United States District Court for the District of Delaware in connection with Case No. 1:19-cv-1227-GBW on Jun. 16, 2023, 275 pages.
EIS Inc. v. IntiHealth Ger GmbH et al., "Exhibits V-AP filed with Declaration Of Allan M. Soobert In Support Of Plaintiff And Counterclaim Defendants' Opposition To Defendants' Motions For Partial Summary Judgment And Daubert Motions," filed with the United States District Court for the District of Delaware in connection with Case No. 1:19-cv-1227-GBW on Jun. 16, 2023, 140 pages.
EIS Inc. v. IntiHealth Ger GmbH et al., "Exhibits AQ-BX filed with Declaration Of Allan M. Soobert In Support Of Plaintiff And Counterclaim Defendants' Opposition To Defendants' Motions For Partial Summary Judgment And Daubert Motions," filed with the United States District Court for the District of Delaware in connection with Case No. 1:19-cv-1227-GBW on Jun. 16, 2023, 230 pages.
"Grounds on Appeal," issued by the German Federal Patent Court in connection with appeal regarding German Patent No. 102013110501.7 on May 22, 2023, 67 pages (includes English translation).
European Patent Office, Board of Appeals, "Oral Proceedings: Minutes," issued in connection with opposition of European Patent No. EP2976057 on May 24, 2023, 14 pages (includes English translation).
European Patent Office, Board of Appeals, "Decision of May 16, 2023," issued in connection with opposition of European Patent No. EP2976057 on Jun. 21, 2023, 46 pages (includes English translation).
European Patent Office, Board of Appeals, "Oral Proceedings: Minutes," issued in connection with opposition of European Patent No. EP3308762 on May 24, 2023, 16 pages (includes English translation).
European Patent Office, Board of Appeals, "Decision of May 16, 2023," issued in connection with opposition of European Patent No. EP3308762 on Jun. 21, 2023, 48 pages (includes English translation).
EIS Inc. v. IntiHealth Ger GmbH et al., "Letter to The Honorable Gregory B. Williams from Jack B. Blumenfeld Regarding Discovery Dispute (Redacted Public Version)," filed with the United States District Court for the District of Delaware in connection with Case No. 1:19-cv-1227-GBW on Apr. 6, 2023 (redacted version filed Apr. 13, 2023), 433 pages (uploaded in 4 parts).
EIS Inc. v. IntiHealth Ger GmbH et al., "Defendant-Counterclaimant Novoluto's Reply Letter to The Honorable Gregory B. Williams Regarding Alleged Privilege Waiver by Defendants,"

(56) References Cited

OTHER PUBLICATIONS filed with the United States District Court for the District of Delaware in connection with Case No. 1:19-cv-1227-GBW on Apr. 12, 2023, 4 pages.

United States Patent and Trademark Office, "Non-Final Office Action," issued in connection with U.S. Appl. No. 17/403,609, dated Mar. 16, 2023, 6 pages.

United States Patent and Trademark Office, "Non-Final Office Action," issued in connection with U.S. Appl. No. 17/461,470, dated Mar. 16, 2023, 6 pages.

EIS Inc. v. IntiHealth Ger GmbH et al., "Plaintiff's Letter Brief In Opposition To Defendants' Motion To Strike Portions Of Dr. Abraham's Reports On Invalidity," filed with the United States District Court for the District of Delaware in connection with Case No. 1:19-cv-1227-GBW on Jul. 6, 2023, 8 pages.

EIS Inc. v. IntiHealth Ger GmbH et al., "Defendant Novoluto's Concise Statement Of Material Facts In Support Of Its Motion For Summary Judgment Of IPR Estoppel (Redacted Public Version)," filed with the United States District Court for the District of Delaware in connection with Case No. 1:19-cv-1227-GBW on Aug. 4, 2023, 8 pages.

EIS Inc. v. IntiHealth Ger GmbH et al., "Defendants' And Counterclaim Defendants' Answering Brief In Opposition To Defendants' Motion For Summary Judgment Of IPR Estoppel (Redacted Public Version)," filed with the United States District Court for the District of Delaware in connection with Case No. 1:19-cv-1227-GBW on Aug. 14, 2023, 16 pages.

EIS Inc. v. IntiHealth Ger GmbH et al., "Declaration Of Allan M. Soobert In Support Of Plaintiff And Counterclaim Defendants' Opposition To Defendants' Motion For Summary Judgment Of IPR Estoppel vol. 1 of 2 (Redacted Public Version) and Exhibit A (attachments 1-9)," filed with the United States District Court for the District of Delaware in connection with Case No. 1:19-cv-1227-GBW on Aug. 14, 2023, 239 pages.

EIS Inc. v. IntiHealth Ger GmbH et al., "Exhibit A (attachments 10-18) filed with Declaration Of Allan M. Soobert In Support Of Plaintiff And Counterclaim Defendants' Opposition To Defendants' Motion For Summary Judgment Of IPR Estoppel vol. 1 of 2 (Redacted Public Version)," filed with the United States District Court for the District of Delaware in connection with Case No. 1:19-cv-1227-GBW on Aug. 14, 2023, 236 pages.

EIS Inc. v. IntiHealth Ger GmbH et al., "Exhibit A (attachments 19-23) filed with Declaration Of Allan M. Soobert In Support Of Plaintiff And Counterclaim Defendants' Opposition To Defendants' Motion For Summary Judgment Of IPR Estoppel vol. 1 of 2 (Redacted Public Version)," filed with the United States District Court for the District of Delaware in connection with Case No. 1:19-cv-1227-GBW on Aug. 14, 2023, 239 pages.

EIS Inc. v. IntiHealth Ger GmbH et al., "Declaration Of Allan M. Soobert In Support Of Plaintiff And Counterclaim Defendants' Opposition To Defendants' Motion For Summary Judgment Of IPR Estoppel vol. 2 of 2 (Redacted Public Version) and Exhibit A (attachments 23-29)," filed with the United States District Court for the District of Delaware in connection with Case No. 1:19-cv-1227-GBW on Aug. 14, 2023, 266 pages.

EIS Inc. v. IntiHealth Ger GmbH et al., "Exhibits B-D filed with Declaration Of Allan M. Soobert In Support Of Plaintiff And Counterclaim Defendants' Opposition To Defendants' Motion For Summary Judgment Of IPR Estoppel vol. 2 of 2 (Redacted Public Version)," filed with the United States District Court for the District of Delaware in connection with Case No. 1:19-cv-1227-GBW on Aug. 14, 2023, 204 pages.

EIS Inc. v. IntiHealth Ger GmbH et al., "Plaintiff's And Counterclaim Defendants' Statement Of Material Facts And Responsive Statement Of Material Facts (Redacted Public Version)," filed with the United States District Court for the District of Delaware in connection with Case No. 1:19-cv-1227-GBW on Aug. 14, 2023, 9 pages.

European Patent Office, "Transmittal of Decision / Summons," issued in connection with opposition of European Patent No. 3405158 on Jun. 14, 2021, 27 pages (includes English translation).

"Written Submission in Preparation to/during Oral Proceedings," filed with the European Patent Office by EIS GmBH in connection with opposition of European Patent No. 3405158 on Dec. 7, 2021, 82 pages (includes English translation).

European Patent Office, "Transmittal of Decision / Summons," issued in connection with opposition of European Patent No. 3405158 on May 18, 2022, 67 pages (includes English translation).

IP Australia, "Examination Report," issued in connection with Australian Application No. 2017341098 on Jan. 27, 2022, 5 pages.

IP Australia, "Examination Report," issued in connection with Australian Application No. 2017341098 on May 10, 2022, 6 pages.

IP Australia, "Examination Report," issued in connection with Australian Application No. 2017341098 on Sep. 20, 2022, 5 pages.

Canadian Patent Office, "Office Action," issued in connection with Canadian Patent Application No. 3022347 on Dec. 5, 2019, 6 pages.

China National Intellectual Property Adminstration, "Office Action," issued in connection with Chinese Patent Application No. 201780062062.7 on Jul. 18, 2019, 2 pages (includes English translation).

European Patent Office, "Transmittal of Decision / Summons," issued in connection with opposition of European Patent No. 3705106 on Jun. 13, 2023, 37 pages (includes English translation).

"Written submission in preparation to/during oral proceedings," filed with the European Patent Office by EIS GmBH in connection with European Patent No. 3705106 on Dec. 8, 2023, 56 pages (includes English translation).

European Patent Office, "Decision Revoking the European Patent," issued in connection with opposition of European Patent No. 3705106 on Mar. 19, 2024, 192 pages (includes English translation).

European Patent Office, "Information About the Result of Oral Proceedings," issued in connection with opposition of European Patent No. 3705106 on Feb. 8, 2024, 34 pages (includes English translation).

European Patent Office, "Decision Revoking the European Patent," issued in connection with opposition of European Patent No. 3305266 on Mar. 28, 2024, 303 pages (includes English translation).

"Written Request for Invalidation and Exhibits," filed by third party with the Chinese National Intellectual Property Administration in connection with Chinese Patent Application No. 201480052194.8 on Aug. 16, 2023, 74 pages (includes English translation of written request for invalidation).

"Supplemental Opinion," filed by third party with the Chinese National Intellectual Property Administration in connection with Chinese Patent Application No. 201480052194.8 on Sep. 11, 2023, 64 pages (includes English translation).

"Written Request for Invalidation and Exhibits," filed by third party with the Chinese National Intellectual Property Administration in connection with Chinese Patent Application No. 201480052194.8 on Sep. 25, 2023, 85 pages (includes English translation of written request for invalidation).

"Written Request for Invalidation and Exhibits," filed by third party with the Chinese National Intellectual Property Administration in connection with Chinese Patent Application No. 201480052194.8 on Oct. 18, 2023, 79 pages (includes English translation of written request for invalidation).

China National Intellectual Property Administration, "Reexamination Decision," issued in connection with Chinese Patent Application No. 201580077725.3, dated Dec. 21, 2023, 19 pages (includes English translation).

China National Intellectual Property Administration, "Fourth Office Action," issued in connection with Chinese Application No. CN201710709587.7, on Feb. 28, 2024, 10 pages (includes English translation).

European Patent Office, "Notification under Article 94 (3) EPC," issued in connection with European Application No. 19161328.0 on Nov. 2, 2020, 8 pages (includes English translation).

European Patent Office, "Extended European Search Report," issued in connection with European Patent Application No. 21216838.9 on Apr. 5, 2022, 15 pages (includes English translation).

(56) References Cited

OTHER PUBLICATIONS

IP Australia, "Examination Report," issued in connection with Australian Application No. 2020201615 on Feb. 9, 2024, 8 pages.
United States Patent and Trademark Office, "Notice of Allowance," issued in connection with U.S. Appl. No. 16/811,907, dated Feb. 16, 2024, 16 pages.
IP Australia, "Examination Report," issued in connection with Australian Application No. 2019250096 on Jul. 1, 2022, 4 pages.
IP Australia, "Examination Report," issued in connection with Australian Application No. 2019250096 on Oct. 25, 2022, 5 pages.
Canadian Patent Office, "Office Action," issued in connection with Canadian Patent Application No. 3098337 on Mar. 18, 2022, 5 pages.
Canadian Patent Office, "Office Action," issued in connection with Canadian Patent Application No. 3098337 on Jan. 19, 2023, 4 pages.
German Patent and Trademark Office, "Examination Report," issued in connection with German Application No. 102018107939 on Mar. 29, 2019, 12 pages (includes English translation).
IP Australia, "Examination Report," issued in connection with Australian Application No. 2019247064 on Feb. 25, 2022, 4 pages.
IP Australia, "Examination Report," issued in connection with Australian Application No. 2019247064 on Jul. 15, 2022, 4 pages.
Canadian Patent Office, "Office Action," issued in connection with Canadian Patent Application No. 3095965 on Feb. 8, 2022, 5 pages.
Canadian Patent Office, "Office Action," issued in connection with Canadian Patent Application No. 3095965 on Jan. 23, 2023, 5 pages.
Canadian Patent Office, "Office Action," issued in connection with Canadian Patent Application No. 3,095,965 on Apr. 10, 2024, 5 pages.
European Patent Office, "Notification under Article 94 (3) EPC," issued in connection with European Application No. 19787154.4 on Apr. 19, 2023, 10 pages (includes English translation).
German Patent and Trademark Office, "Examination Report," issued in connection with German Application No. 10 2018 107 961.3 on May 23, 2019, 22 pages (includes English translation).
European Patent Office, "Extended European Search Report," issued in connection with European Patent Application No. EP 19153494.0 on Sep. 17, 2019, 12 pages (includes English translation).
European Patent Office, "Notification under Article 94 (3) EPC," issued in connection with European Application No. 19153494.0 on Jun. 4, 2020, 8 pages (includes English translation).
European Patent Office, "Extended European Search Report," issued in connection with European Patent Application No. 21175706.7 on Sep. 20, 2021, 12 pages (includes English translation).
European Patent Office, "Transmittal of Decision/Summons," issued in connection with opposition of European Patent No. 3685809 on Oct. 25, 2022, 35 pages (includes English translation).
"Written Submission in Preparation to/during Oral Proceedings," filed with the European Patent Office by EIS GmBH in connection with opposition of European Patent No. 3685809 on Mar. 24, 2023, 44 pages (includes English translation).
European Patent Office, "Transmittal of Decision / Summons," issued in connection with opposition of European Patent No. 3685809 on Jun. 22, 2023, 283 pages (includes English translation).
"Statement of Grounds of Appeal," filed with the European Patent Office by EIS GmBH in connection with opposition of European Patent No. 3685809 on Nov. 1, 2023, 188 pages (includes English translation).
United States Patent and Trademark Office, "Advisory Action," issued in connection with U.S. Appl. No. 16/752,283, dated Jan. 31, 2024, 5 pages.
United States Patent and Trademark Office, "Notice of Allowance," issued in connection with U.S. Appl. No. 16/752,283, dated Apr. 15, 2024, 9 pages.
*EIS Inc.* v. *IntiHealth Ger GmbH et al.*, "Defendant/Counterclaimant Novoluto Gmbh's Motion To Strike Plaintiff And Counterclaim—Defendants' Election Of Prior-Art-Based Invalidity Arguments Pursuant To IPR Estoppel, 35 U.S.C. § 315(E)(2)," filed with the United States District Court for the District of Delaware in connection with Case No. 1:19-cv-1227-GBW on Mar. 9, 2023, 3 pages.
*EIS Inc.* v. *IntiHealth Ger GmbH et al.*, "Letter to The Honorable Gregory B. Williams from Paul D. Brown Regarding Defendant and Counterclaimant Novoluto GmbH's Motion to Strike," filed with the United States District Court for the District of Delaware in connection with Case No. 1:19-cv-1227-GBW on Mar. 9, 2023, 640 pages.
*EIS Inc.* v. *IntiHealth Ger GmbH et al.*, "Letter to The Honorable Gregory B. Williams from Paul D. Brown Regarding Response to Counterclaim Defendants' Motion to Strike Doctrine of Equivalents Allegations," filed with the United States District Court for the District of Delaware in connection with Case No. 1:19-cv-1227-GBW on Mar. 13, 2023, 2 pages.
*EIS Inc.* v. *IntiHealth Ger GmbH et al.*, "Letter to The Honorable Gregory B. Williams from Jack B. Blumenfeld Regarding Opposition to Defendants' Motion to Strike EIS's Election of Prior-Art-Based Invalidity Arguments," filed with the United States District Court for the District of Delaware in connection with Case No. 1:19-cv-1227-GBW on Mar. 20, 2023, 16 pages.
*EIS Inc.* v. *IntiHealth Ger GmbH et al.*, "Letter to The Honorable Gregory B. Williams from Gregory E. Stuhlman, Esquire Regarding Reply Letter Regarding Defendant-Counterclaimant Novoluto GmbH's Motion to Strike Plaintiff's and Counterclaim-Defendants' Election of Prior-Art-Based Invalidity Arguments Pursuant to IPR Estoppel," filed with the United States District Court for the District of Delaware in connection with Case No. 1:19-cv-1227-GBW on Mar. 21, 2023, 9 pages.
*EIS Inc.* v. *IntiHealth Ger GmbH et al.*, "Letter to The Honorable Gregory B. Williams from Jack B. Blumenfeld Regarding Response to the Court's Oral Order," filed with the United States District Court for the District of Delaware in connection with Case No. 1:19-cv-1227-GBW on Mar. 30, 2023, 1 page.
*Novoluto GmbH* v. *Uccellini LLC*, "Motion for Entry of Default and for Leave to Move for Default Judgment Pursuant to Fed. R. Civ. P. 55(b)(2)," filed with the United States District Court for the District of Oregon in connection with Case No. 6:20-cv-02284-MK on Mar. 15, 2023, 5 pages.
*Novoluto GmbH* v. *Uccellini LLC*, "Declaration of Tammy J. Terry in Support of Motion for Entry of Default and for Leave to Move for Default Judgment," filed with the United States District Court for the District of Oregon in connection with Case No. 6:20-cv-02284-MK on Mar. 15, 2023, 3 pages.
"Judgment," issued by the United States Court of Appeals for the Federal Circuit in connection with cases 2021-2215, 2022-1020, and 2022-1191 (Consolidated Appeal from the United States Patent and Trademark Office, Patent Trial and Appeal Board of Inter Partes Review Nos. IPR2019-01302, IPR2019-01444, and IPR2020-00007) on Mar. 13, 2023, 2 pages.
United States Patent and Trademark Office, "Office Action," issued in connection with U.S. Appl. No. 17/044,503, dated Jul. 5, 2024, 8 pages.
United States Patent and Trademark Office, "Office Action," issued in connection with U.S. Appl. No. 17/044,501, dated Jul. 5, 2024, 15 pages.
United States Patent and Trademark Office, "Office Action," issued in connection with U.S. Appl. No. 17/461,470, dated Jul. 9, 2024, 44 pages.
United States Patent and Trademark Office, "Office Action," issued in connection with U.S. Appl. No. 17/403,609, dated Aug. 6, 2024, 45 pages.
United States Patent and Trademark Office, "Notice of Allowance," issued in connection with U.S. Appl. No. 16/811,907 dated Oct. 30, 2023, 15 pages.
"Opposition to a European Patent," filed with the European Patent Office by EIS GmbH in connection with European Patent No. 3267960 on Mar. 7, 2024, 236 pages (includes English translation).
"Opposition to a European Patent, Exhibit D3" filed with the European Patent Office by EIS GmbH in connection with European Patent No. 3267960 on Mar. 7, 2024, 6 pages (includes English translation).

(56) References Cited

OTHER PUBLICATIONS

"Opposition to a European Patent, Exhibit D4" filed with the European Patent Office by EIS GmbH in connection with European Patent No. 3267960 on Mar. 7, 2024, 4 pages (includes English translation).
"Opposition to a European Patent, Exhibit D5" filed with the European Patent Office by EIS GmbH in connection with European Patent No. 3267960 on Mar. 7, 2024, 46 pages (includes English translation).
"Opposition to a European Patent, Exhibit D6" filed with the European Patent Office by EIS GmbH in connection with European Patent No. 3267960 on Mar. 7, 2024, 25 pages (includes English translation).
"Opposition to a European Patent, Exhibit D7" filed with the European Patent Office by EIS GmbH in connection with European Patent No. 3267960 on Mar. 7, 2024, 43 pages (includes English translation).
"Opposition to a European Patent, Exhibit D9" filed with the European Patent Office by EIS GmbH in connection with European Patent No. 3267960 on Mar. 7, 2024, 4 pages (includes English translation).
"Opposition to a European Patent, Exhibit D13" filed with the European Patent Office by EIS GmbH in connection with European Patent No. 3267960 on Mar. 7, 2024, 4 pages (includes English translation).
European Patent Office, "Brief Communication—Opposition Proceedings," issued in connection with opposition of European Patent No. 3267960 on Mar. 22, 2024, 6 pages (includes English translation).
"Opposition to a European Patent," filed with the European Patent Office by EIS GmbH in connection with European Patent No. 3400926 on Mar. 7, 2024, 236 pages (includes English translation).
"Opposition to a European Patent, Exhibit D18" filed with the European Patent Office by EIS GmbH in connection with European Patent No. 3400926 on Mar. 7, 2024, 2 pages (includes English translation).
"Opponent Comments Regarding Final Determination," filed with the Australian in connection with opposition of Australian Patent Application No. 2018203659 on Feb. 18, 2022, 11 pages.
IP Australia, "Opposition—Decision Issued," issued in connection with Australian Patent Application No. 2018203659 on Apr. 28, 2022, 7 pages.
IP Australia, "Examination Report No. 1 for Standard Patent Application," issued in connection with Australian Application No. 2022203319, on Aug. 1, 2023, 6 pages.
"Opposition to a European Patent," filed with the European Patent Office in connection with opposition of European Patent No. 3773954 on Sep. 27, 2024, 116 pages (includes English translation).
"Opposition to a European Patent, Exhibit D1," filed with the European Patent Office action in connection with opposition of European Patent No. 3773954 on Sep. 27, 2024, 4 pages (includes English translation).
IP Australia, "Examination Report No. 1 for Standard Patent Application," issued in connection with Australian Application No. 2020200457, on Aug. 29, 2024, 4 pages.
IP Australia, "Examination Report No. 2 for Standard Patent Application," issued in connection with Australian Application No. 2020200457, on Oct. 22, 2024, 5 pages.
European Patent Office, "Extended European Search Report," issued in connection with European Patent Application No. 24195102.9, dated Nov. 14, 2024, 17 pages (includes English translation).
*Novoluto GmbH* v. *XR, LLC*, "Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 31 pages.
*Novoluto GmbH* v. *XR, LLC*, "Exhibit 1 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 18 pages.
*Novoluto GmbH* v. *XR, LLC*, "Exhibit 2 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 10 pages.
*Novoluto GmbH* v. *XR, LLC*, "Exhibit 3 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 10 pages.
*Novoluto GmbH* v. *XR, LLC*, "Exhibit 4 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 10 pages.
*Novoluto GmbH* v. *XR, LLC*, "Exhibit 5 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 18 pages.
*Novoluto GmbH* v. *XR, LLC*, "Exhibit 6 filed with Answer, Affirmative Defenses and Counterclaims of Defendant XR, LLC and Request for Jury Trial," filed with the United States District Court for the Central District of California, Southern Division, in connection with Case No. 8:24-cv-01907-JDE on Oct. 11, 2024, 12 pages.
European Patent Office, "Summons to Attend Oral Proceedings," issued in connection with opposition of European Patent No. 3267960 on Oct. 18, 2024, 48 pages (includes English translation).
European Patent Office, "Summons to Attend Oral Proceedings," issued in connection with opposition of European Patent No. 3400926 on Dec. 5, 2024, 66 pages (includes English translation).
"Opposition to a European Patent," filed with the European Patent Office action in connection with opposition of European Patent No. 3998055 on Dec. 23, 2024, 237 pages (includes English translation).
"Opposition to a European Patent," filed with the European Patent Office action in connection with opposition of European Patent No. 3773406 on Dec. 27, 2024, 176 pages (includes English translation).
"Opposition to a European Patent, Exhibit D7" filed with the European Patent Office action in connection with opposition of European Patent No. 3773406 on Dec. 27, 2024, 10 pages (includes English translation).
"Opposition to a European Patent, Exhibit D10" filed with the European Patent Office action in connection with opposition of European Patent No. 3773406 on Dec. 27, 2024, 30 pages (includes English translation).
United States Patent and Trademark Office, "Office Action," issued in connection with U.S. Appl. No. 17/601,392, dated Dec. 4, 2024, 12 pages.
"Response to the Complaint," filed with the European Patent Office in connection with opposition of European Patent No. EP3705106 on Nov. 19, 2024, 212 pages (includes English translation).

\* cited by examiner

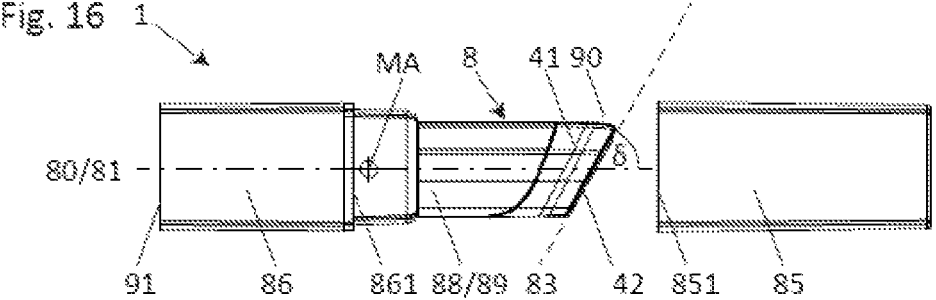
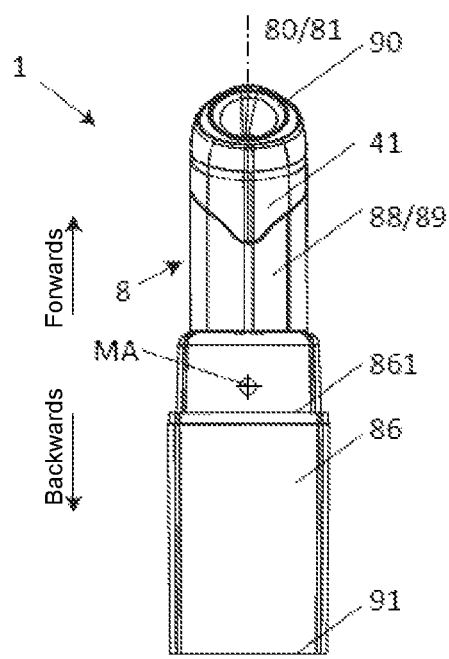
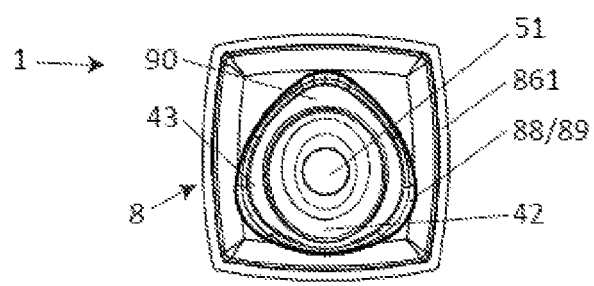

STIMULATION APPARATUS

RELATED APPLICATIONS

This patent claims the benefit under 35 U.S.C. § 371 of International Patent Application Serial No. PCT/EP2017/075400, filed Oct. 5, 2017, which claims priority to German Patent Application 20 2016 008 412.8, filed on Oct. 5, 2016, both of which are hereby incorporated herein by reference in their entireties.

The present invention relates to an improved stimulation apparatus for erogenous zones, in particular for the clitoris, systems having a stimulation apparatus, and methods for sexual stimulation.

The erogenous zones of the human body can be (sexually) stimulated with a variety of aids. For example, vibrators are thus used to apply a stimulus to a particular area of the skin by direct contact. This form of stimulation, however, can lead to irritations or skin inflammations. Direct contact with the intimate zones with such aids may also not be desired for personal reasons, such as hygiene or because of personal reservations.

In particular, direct stimulation of the clitoris, for example using a clitoral massage vibrator, is problematic. The clitoris is usually a woman's most sensitive erogenous zone. The entire clitoris is highly innervated, whereby it is particularly touch-sensitive and responsive to sexual stimuli. In this context, the clitoral glans, in which the nerve cords of the two crura meet, should be emphasized in particular. Thus, on the one hand, frequent application of a clitoral massage vibrator for direct stimulation leads to habituation effects or conditioning of the stimulated erogenous zone, while, on the other, the first applications of such a device may require certain practice or familiarization.

Furthermore, medical studies conducted in 2006 identified the female clitoris as the definitive starting point of the female climax, and, for the first time, neurologically proved the different qualities of sensation of clitoral (and vaginal) orgasm, as the "Spiegel" magazine explains in its edition from 06/2006 on pages 136 to 138 in the article for women entitled "Schmerz und Glükseligkeit" ("Pain and Bliss"). Thus, according to the most recent medical research, the stimulation of the clitoris, and not the vagina, is considered as the starting point of the sexual arousal of the woman and thus as the key to female "sexual pleasure".

Furthermore, the sensitivity of the human erogenous zones, such as the clitoris, the inner and outer labia or the nipples, here differs greatly from one individual to the next. The individual can be so sensitive that direct stimulation is only possible after extensive foreplay, and even then, only very delicately, or may not be possible at all. Furthermore, the sensitivity of the corresponding zone can change dramatically from one situation to another or even during one sexual act.

For the above reasons, different indirect forms of stimulation are usual practice as alternatives for direct stimulation.

For indirect stimulation of erogenous zones, and particularly the clitoris, conventional vacuum apparatuses are used to stimulate the erogenous zones of the person concerned without directly contacting the main area to be stimulated. Thus, for example, vacuum pumps for the primary or secondary female sexual organs are known, which usually have a suction cup for placing on the appropriate area and a hand pump. The negative pressure exerted on the clitoris by this type of apparatus, for example, generates a negative pressure in the clitoris itself which is usually below the systolic blood pressure. This difference in pressure results in an enlargement of the clitoris and/or stimulates the blood flow in the affected area. This vascular clitoral engorgement serves both to promote desire by increasing sensitivity and for visual and tactile manipulation. The improved blood circulation also results in an increased secretion of vaginal moisture, which makes stimulation more pleasurable. However, the manual operation of the hand pump is often onerous or irksome. In addition, the long-term or uninterrupted application of negative pressure with this device category may also result in habituation effects, which limit the effectiveness of the apparatus in the long term. In addition, purely an increase of the blood flow in the clitoris is often not sufficient to obtain the climax; thus, vacuum pumps are often only used as foreplay in order to achieve the climax by a subsequent direct (pressure) massage of the erogenous zones.

Electrically driven vacuum pumps are also increasingly used instead of a manually operated vacuum pump. As an example of this, WO 2006/05 82 91 A2 discloses an apparatus for sexual therapy, wherein the arrangement comprises a tubular suction chamber for the clitoris, an electrical vacuum source (vacuum pump) and a plurality of air flow openings. Operation of the vacuum pump generates an ongoing air flow or air exchange in the chamber, in the area of the clitoris. Here, this has the disadvantageous effect of suctioning the vaginal moisture, which is increased as a result of the negative pressure, thus having a drying effect on the stimulated skin parts. Likewise, the suctioned moist air leads to contamination of the vacuum arrangement that is downstream in terms of flow, for example the vacuum pump. Such arrangements with vacuum pumps may thus be problematic from the point of view of hygiene, as vacuum pumps and the associated valves or ventilation components often have dead spaces and/or are difficult to clean. Furthermore, the apparatus serves to treat the blood vessels in the clitoris and not to provide stimulation up to sexual climax.

U.S. Pat. No. 6,099,463 A discloses an apparatus for stimulation of the clitoris having a tubular suction chamber, a vacuum source or a vacuum pump and several valves by means of which the size of the vacuum is controlled. Here, the vacuum can also be used in a cyclical form in order to obtain a stimulation effect, wherein habituation effects can also be expected with this apparatus because of the use of a continuous vacuum. The disadvantages of hygiene and dehydration of the area of skin to be stimulated that were previously explained also exist here. Similarly, the pressure arrangement having several valves, vacuum pumps etc. is relatively complex.

U.S. Pat. No. 6,464,653 B1 discloses therapeutic apparatuses and methods that generate a clitoral engorgement with the aid of a vacuum generated by a vacuum pump to assist in the treatment of clitoral disorders such as incontinence. A control valve or modulator that can be appropriately covered by a finger is used to manually adjust or vary the level of vacuum in the suction chamber. This requires the user's attention and may be irksome or distracting under certain circumstances. This relatively complex apparatus having further valves also has the disadvantages relating to hygiene and dehydration that were mentioned above, with the apparatus moreover serving for long-term therapeutic purposes and not for short-term sexual stimulation.

WO 2008/02 80 76 A2 discloses a therapeutic apparatus for women, which mainly serves to treat sexual disorders. The apparatus includes a combination of indirect stimulation by means of a vacuum chamber and direct stimulation by means of mechanical vibrators and oscillators. This apparatus is held and handled in the manner of a pistol grip or a traditional telephone receiver.

The negative pressure in this therapeutic apparatus is used to increase blood flow in the clitoris, while the actual stimulation or massage of the region of skin takes place by means of mechanical vibrations/oscillations. Thus, a suction cup for placing on the region of skin to be stimulated is internally connected to a motor via a mechanical connection. The suction cup is extended by the motor after activating the apparatus, wherein the volume of the suction cup increases. The resulting volume of the suction cup and thus the strength of the vacuum can be adjusted by means of control elements on the apparatus. The air displaced in the apparatus by the suction process is outwardly discharged again via a tube. In this apparatus, the vacuum has only one supporting function, while the actual stimulation takes place in a direct manner, which leads to the disadvantages of direct stimulation explained above.

US 2013/001 276 9 A1 discloses an apparatus in which a pulsing positive pressure for stimulation is used as an air pressure massage. A pump or compressor thus produces a pulsing positive pressure which is directed towards the erogenous zones to be stimulated by means of a nozzle. In this apparatus, the affected region of skin disadvantageously dries out severely or completely. Also, there is usually a temperature difference between the temperature of the air supplied and the temperature of the area of skin to be stimulated, which may be seen to be distracting in some circumstances. With this apparatus, the problems of hygiene described above also emerge, wherein, in this case, pathogens or germs or other contaminants can also potentially be transported directly to the genital area of the user.

U.S. Pat. No. 1,898,652 A further discloses a "pulsator" which operates by means of an air jet in order to massage areas of skin.

EP 0 365 230 A2 discloses a suction apparatus having a suction pump, a suction valve and an outlet valve.

WO 2004/004610 A1 discloses a portable penile aneurysm enhancer.

U.S. Pat. No. 3,910,262 discloses a therapeutic apparatus for producing male and female orgasms.

U.S. Pat. No. 2,112,646 discloses an apparatus for treating diseases of the genital organs.

DE 14 63 673 U discloses a massage apparatus.

The apparatuses of the prior art mentioned above have the common disadvantage that the complexity of the arrangements generating negative pressure or positive pressure may be high and these apparatuses may have problems in respect of hygiene.

Furthermore, the apparatuses of the prior art have the further common disadvantage in that habituation effects occur in the event of long-term, continuous or frequently recurring application of negative pressures.

A further disadvantage of some of the previously described vacuum apparatuses is, firstly, that the negative pressure has to be limited by means of a control valve or a vacuum pump and, secondly, that the negative pressure is supposed to be relieved by means of manually opening a release valve before the suction cup is detached from the skin. Should one of the valves have a technical defect and/or the user operate the device incorrectly, there is a risk of injury in certain circumstances.

DE 10 2013 110 501 A1 discloses a stimulation apparatus which addresses the problems mentioned above and which will be explained in detail below. The features of the subsequently explained prior art by the same applicant can be arbitrarily combined with the embodiments and aspects of the present invention.

FIGS. 1 to 3 show the stimulation apparatus of DE 10 2013 110 501 A1 which is implemented as a handheld apparatus. With this apparatus of DE 10 2013 110 501 A1, a pressure field is produced made of negative and positive pressures in a chamber (labelled second chamber 4a), which is particularly suitable for stimulating the clitoris.

With reference to FIG. 1, a front view of a first embodiment of the stimulation apparatus 100 of DE 10 2013 110 501 A1 is explained in detail, wherein, in FIG. 2, a perspective view and, in FIG. 3, a cross-section through the stimulation apparatus 1 of a first embodiment of DE 10 2013 110 501 A1 are shown.

Said stimulation apparatus 1a is a preferably portable electric or small device which has a housing 8a, a pressure field generation device 2a, operating elements 71a, a display 72a, an on/off switch 74a, a bushing 75a, an optional battery 76a and optional illumination 9a.

The housing 8a is preferably implemented in such a way that it can be held with one hand and it does not have any sharp or pointed edges. Furthermore, the housing 8a can consist of plastic, for example polycarbonate (PC) or acrylonitrile butadiene styrene (ABS). In addition, the gripping regions or even the entire housing can be supplemented by or formed from a haptically advantageous silicone. The housing 8a is preferably formed to be at least water-repellent or splash-proof, for example protection class IP 24.

Such a housing 8a resembling the shape of a cuboid having an extension or the shape of a traditional telephone receiver (for example a receiver of a W48 Bakelit telephone device) can also be held by hand, much like a telephone receiver. Here, the housing is at least extensively enclosed by the hand, which represents a non-ergonomic handheld position. The result of this with such conventional housings is the requirement that these have to be formed in such a way that they have a sufficiently large size in order to allow them to be enclosed by the hand.

For example, the external periphery (for example measured in the middle and in the peripheral direction) in the housing 8a of the prior art is more than 14 cm in order to allow it to be enclosed by the hand and thus to hold the apparatus above the erogenous zone to be stimulated. As a result, the housing 8a is deemed to be bulky.

The size of the housing disadvantageously results in an increased material cost, an increased weight and also increased tool costs, for example for an injection moulding tool for larger plastic parts.

The operating elements 71a which are shown in FIGS. 1 to 3 serve to set the type of operation of the device, i.e. to set the modulation pattern of the pressure field. The operating elements 71a can be implemented, for example, as at least one push button, as at least one rotation switch or as at least one touch-sensitive switch. Furthermore, the operating elements 71a can provide an optical feedback for activation, for example by means of light diodes (LEDs) integrated in the switch.

An optional display 72a provides information to the user about the device state and/or setting state. The display 72a can be formed, for example, from a plurality of light diodes, or as an LCD display. The displayed information can be, for example, the charging state of an optional battery or the current setting of the modulation pattern.

The on/off switch 74a serves to activate and deactivate the stimulation apparatus 1a. This on/off switch 74a can be, for example, a push button, which switches the stimulation apparatus 1a on or off by being pressed for a longer time, or an engaging sliding switch.

A bushing 75a serves for the external current supply of the stimulation apparatus 1 via an external plug 73a, which is connected, for example, to an external network adapter. In order to ensure the spray water resistance of the stimulation apparatus 1, instead of the bushing, a magnetically inductive transformer can preferably be provided, which allows a transfer of current into the stimulation apparatus 1 without an electrically conductive contact. Preferably, the stimulation apparatus 1a additionally has a battery, for example a nickel-metal hydride battery (NiMH) for wireless operation. Alternatively, a longer current supply wire can also be guided out of the stimulation apparatus.

The pressure field production device 2a of an embodiment of DE 10 2013 110 501 A1 has a first chamber 3a inside the stimulation apparatus 1, a second chamber 4a for placing on a body part 11a to be stimulated, and a connection element 5a, which connects the first chamber 3a to the second chamber 4a.

A drive unit 6a, for example an electric motor, drives the first chamber 3a via an axis 61a and by means of an eccentric cam 62a (or additionally by means of a connecting rod) in such a way that the volume of the first chamber 3 is changed correspondingly to the rotation of the axis 61a of the drive unit 6a.

A control device controls the drive unit 6a, the operating elements 71a and the display 72a. Here, the control device and the drive unit 6a are supplied with current by the internal battery 76a and/or the external current supply 73a.

An optional lighting device 9a is provided on or in the housing 8a. Here, the lighting device 9a preferably serves to illuminate the inside of the second chamber 4a. The lighting device 9a can either be switched on by the user or, when activating the stimulation apparatus 1a, is activated automatically. Furthermore, the lighting device 9a can be formed from the energy-saving light diodes. The lighting device can, for example, serve as an orientation aid for the user of the stimulation apparatus 1a in the dark or as additional optical stimulation.

With reference to FIG. 3, the longitudinal axis 80a of the housing 8a (which extends from the upper end of the housing to the lower end of the housing 8), the alignment axis 81a of the preferred direction of the media flow when operating the drive unit 6a, the axis or drive shaft of the motor axis 82a, and the opening plane 83a of the opening 42a of the second chamber 4a are drawn in to illustrate the geometry of the housing 8a.

The angle of intersection α between the longitudinal axis 80a and alignment axis 81a is about 90 degrees. As a result, this kind of arrangement is called an L-shaped arrangement in the following. The opening plane 83a is arranged to be virtually parallel to the longitudinal axis 80a of the housing 8. In addition, it is noted that, in FIGS. 1 to 6, because of this L-shaped arrangement, the front side of the stimulation apparatus 1a is called a different side from the one in the stimulation apparatus 1 according to the invention (cf. FIG. 7 to 17, for example). With the intended use of the stimulation apparatus 1a of DE 10 2013 110 501 A1 for stimulating the clitoris, the user of the device now has to pull the opening 42a over the clitoral glans so that it fits exactly, and place the edge of the opening 42a on the skin surrounding the clitoral glans with a desired degree of tightness (whereby a gap between the affected area of skin and the edge of the opening, for example, can remain).

Here, as a result of the anatomy of the user and the L-shaped arrangement previously explained, a holding position of the hand emerges which has regularly been deemed not to be ergonomic or comfortable according to the understanding of the inventor.

The exact positioning of the opening of the stimulation apparatus of DE 10 2013 110 501 A1 above the (virtually point-shaped) clitoral glans also constitutes a problematic process for the user in conventional apparatuses since the stimulation effect is greatly dependent on the "exact fit" positioning of the opening. Thus, the users regularly miss the optimum position, with which a considerable manual effort is associated, which can be seen as disruptive.

In particular, the user will often want to exactly proportion the contact pressure of the stimulation apparatus 1a on the skin surrounding the clitoral glans (which is very sensitive), for example, depending on the state of arousal, wherein the weight of the stimulation apparatus 1a has to be delicately cushioned by the gripping hand.

In addition, the stimulation apparatus 1a must also be balanced above the virtually point-shaped clitoral glans, which is difficult because of the centre of mass of the stimulation apparatus 1a, which is arranged to be laterally offset relative to the clitoral glans in the longitudinal direction of the housing 8a. Thus, the user has to compensate not only the total weight, but also the tilting moment of the housing 8a. This is also seen as disturbing or not ergonomic.

In addition, the stimulation apparatus 1a is also seen as too heavy and too large.

Thus, the housing is comparatively bulky or large in terms of the preferred usage, since the stimulation apparatus 1a is used between or on the labia of the woman in spatially confined surroundings. For example, the user often has to stretch out both legs when using the stimulation apparatus which makes the accessibility of the clitoral glans yet more difficult since the thighs are virtually parallel.

Here, slight touches of the bulky housing 8a with the female body, for example with the thighs, can also be seen as disturbing.

In addition, there is also the circumstance that, in some circumstances, a different person may also want to hold the device in order to stimulate the user. Because of the shape of the housing 8a and anatomy of the user, this leads to an inconvenient holding position for the other person as well.

Furthermore, the housing 8a receives vibrations or oscillations that are generated because of the movement of the eccentric cam by means of the electric motor. These oscillations have a preferred direction that is perpendicular to the axis 82a and parallel to the alignment axis 81a. Thus, the wall 41a of the second chamber 4a vibrates or oscillates, said second chamber 4a abutting on the skin surrounding the clitoral glans with its front edge, in the direction of the body of the user, along with the housing, wherein these additional vibrations or oscillations are often unwanted.

Furthermore, the apparatus 8a can be regularly seen as loud during operation.

The problems of lacking ergonomics that are explained above can also be present with the vacuum apparatus of US 2009/0118573 since this has a housing which is held in the manner of a pistol grip. Thus, the longitudinal axis of the apparatus here is also perpendicular to the axis of use. In the same way, disturbing oscillations or vibrations are generated here in the direction of the area of skin that is to be treated.

U.S. Pat. No. 5,377,701 A also discloses a vacuum apparatus having a housing that is held in the manner of a pistol grip.

With reference to FIGS. 4, 5 and 6, an embodiment of DE 20 2015 105 689 U1 is explained below. In FIG. 4, a front view of the first embodiment of the stimulation apparatus 1*b* is shown having an appendage 140*b* in a straight position, wherein furthermore, in FIG. 5, a side view of the stimulation apparatus 1 is shown having the appendage 140*b* in an angled position and, in FIG. 6, a cross-section through the stimulation apparatus 1*b* of the first embodiment of DE 20 2015 105 689 U1 is shown.

The first embodiment of the stimulation apparatus 1*b* is a preferably portable electric or small device which has a housing 8*b*, a pressure field generation device 2*b*, an optional on/off switch 74*b* and an optional lighting device 9*b*.

The housing 8*b* is preferably implemented in such a way that it can be held with one hand and it does not have any sharp or pointed edges. Furthermore, the housing 8*b* can consist of a plastic, for example polycarbonate (PC) or acrylonitrile butadiene styrene (ABS). In addition, the gripping regions or even the entire housing can be supplemented by a haptically advantageous silicone or consist of this. The housing 8*b* is preferably formed to be at least water-repellent or splash proof, for example protection class IP 24. The dotted line in FIG. 5 further specifies an optional side edge of the housing 8*b*.

The optional on/off switch 74*b* serves to activate and deactivate the stimulation apparatus 1*b*. This on/off switch can be, for example, a push button which switches the stimulation apparatus on or off when pressed for a long time, or an engaging sliding switch. Alternatively, the stimulation apparatus 1*b* can be switched on and off by remote control.

The pressure field generation device 2*b* of a first embodiment has a first chamber 3*b* inside the stimulation apparatus 1*b*, a second chamber 4*b* for placing over a body part 11*b* to be stimulated, and a connection element 5*b* which connects the first chamber 3*b* to the second chamber 4*b*.

A drive unit 6*b*, for example an electric motor, drives the first chamber 3*b* via an axis 61*b* and by means of an eccentric cam 62*b* (or alternatively by means of a connecting rod) in such a way that the volume of the first chamber 3*b* can be changed to correspond to the rotation of the axis 61*b* of the drive unit 6*b*.

Thus here, as with DE 10 2013 110 501 A1, the alignment axis 81*b* of the opening 42*b* of the second chamber 4*b* is also arranged at a right angle to the longitudinal axis 80*b* of the housing 8*b*. The angle of intersection 3 between the longitudinal axis 80*b* and the alignment axis 81*b* here is about 90 degrees and constitutes an L-shaped arrangement. The opening plane 83*b* is arranged to be virtually parallel to the longitudinal axis 80*b* of the housing 8*b*.

Thus, the housing 8*b* also has the same disadvantages which were previously described in more detail with reference to the housing 8*a* of DE 10 2013 110 501 A1.

A control device controls the drive unit 6*b*, optional control elements 71*b* and at least one optional display 72*b*. Here, the control device and the drive unit 6*b* are supplied with current, for example by the internal battery 76*b* and/or the external current supply 73*b*.

The stimulation apparatus 1 of DE 20 2015 105 689 U1, depicted in FIG. 4 to 6, further has at least one appendage 140*b*. This appendage 140*b*, which is preferably a component of the housing 8*b*, is optionally able to be moved or bent relative to the housing part in which the pressure field generation device 2*b* is contained. Here, the appendage can be angled or even rotated by means of a joint 141*b*. The joint 141*b* can be formed, for example, as a plastically deformable plastic part, as a setting joint or as a hinge. FIG. 5 shows an example of a bent position of the appendage 140*b* relative to the section of the housing 8*b* of the stimulation apparatus 1 in which the pressure field generation device 2*b* is contained. Alternatively, the appendage can also be formed to be rigid or immovable.

The appendage 140*b* is preferably a stimulation means for inserting in the human body, for example in the vagina or other bodily orifices as well. Here, the appendage 140*b* is formed as a conventional dildo, for example. Alternatively, the appendage can be formed in such a way that it is adjusted to the human anatomy of a different bodily orifice, for example to the mouth. In addition, the appendage 140*b* can be formed in such a way that it can also be used as a hand grip in order to hold the stimulation apparatus 1*b*. However, holding the apparatus 1*b* on the appendage behind a joint is impractical since the joint impedes metering of the corresponding forces.

Thus, even if the stimulation apparatus 1*b*, as shown in FIG. 5, having an appendage 140*b* is to be held in a bent shape, the stimulation apparatus 1*b* has a holding position in the manner of a pistol grip which is inconvenient and also disadvantageous, as is described above in more detail.

In addition, the appendage 140*b* can optionally have a vibration apparatus 142*b* which can be switched on or controllable. The vibration apparatus 142*b* shifts the appendage in mechanical oscillations which support the direct stimulation effect of the appendage 140*b*.

The appendage 140*b* is optionally applied to the section of the housing 8 which receives the pressure field generation device 2*b* in such a way that the (entire) housing 8 of the stimulation apparatus 1*b* is formed to be consistent. Thus, the housing 8 creates the impression that it is formed as one piece or one part, for example by means of the flexible and/or seamless connection elements of the housing 8. Alternatively, the housing 8*b* incl. the appendage 140*b* can have a silicone covering.

In a straight or not bent orientation of the appendage 140*b*, as is shown in FIG. 4, the stimulation apparatus 1*b* can be held or even inserted into bodily orifices. If the appendage 140*b*, as is shown in FIG. 5, is bent, for example after insertion, the opening 42*b* can be guided in this way to the body part 11*b* to be stimulated. In this bent position of the stimulation apparatus 1*b*, both a direct and indirect stimulation of at least one erogenous zone of the body can take place simultaneously. Here, the body part 11*b* to be stimulated can be located between the appendage 140*b* and the pressure field generation device 2*b*. This kind of "hands-free" holding of the stimulation apparatus 1*b* by means of the vagina (and possibly the two thighs, between which the stimulation apparatus 1*b* can be clamped), however, is unwanted by the user in certain circumstances. It is thus preferable to hold the stimulation apparatus in general by hand, and not with other body parts.

Furthermore, an optional lighting device 9*b* can be provided on or in the housing 8*b*. Here, the lighting device 9*b* preferably serves to illuminate the inside of the second chamber 4*b*. The lighting device 9*b* can be either switched on by the user or can be automatically activated when the stimulation apparatus 1*b* is activated. Furthermore, the lighting device 9*b* can be formed from energy-saving light diodes, for example. The lighting device can serve, for example, as orientation aids for the user of the stimulation apparatus 1*b* in the dark or as additional optical stimulation.

The stimulation apparatuses of DE 10 2013 110 501 A1 and DE 20 2015 105 689 U1 additionally have the common disadvantage that there is far too much dead space or unused volume inside the respective housing 8*a* and 8*b* because of the basic design described above. Thus, these apparatuses are implemented in a comparatively voluminous and correspondingly large manner. The housing size further leads to an increased material expenditure for the housing.

Thus, with the stimulation apparatuses of DE 10 2013 110 501 A1 and DE 20 2015 105 689 U1, there is the possibility for improvement in terms of the ergonomics of these apparatuses.

For example, there is the possibility for improvement in terms of the battery life of the stimulation apparatuses of the prior art.

Furthermore, a device (with the product name "Womanizer W 500 Pro") was developed by the applicant which is not formed to be shaped like a dumbbell, rather it is flat and shaped like a computer mouse (i.e. the shape of the housing greatly resembles the shape of a computer mouse). This stimulation apparatus, however, has the same disadvantages because of the geometric similarities with the stimulation apparatus of DE 10 2013 110 501 A1, these disadvantages having been explained above. In particular, this product also has an L-shaped arrangement.

Those apparatuses which are moulded or formed in the manner of a pistol grip (and/or having a bent housing and an accompanying L-shaped arrangement) also have the ergonomic disadvantages described above.

Thus, when considering the problems described above, the object underlying the invention is to specify an optimised stimulation apparatus which is more ergonomic.

The ergonomics of the stimulation apparatus relate, for example, to the aspects of weight, volume, battery life, the holding position of the hand, compactness, handling, comfort during use, suitability for use and transportability of the stimulation apparatus according to the invention.

2. The object underlying the invention is achieved by the stimulation apparatus according to claim 1. Advantageous developments and embodiments are the subject of the further independent and dependent claims.

In accordance with a preferred embodiment, a stimulation apparatus for the clitoris is provided, said apparatus comprising the following: a pressure field generation device having a drive unit and having a hollow space, wherein a pressure field made of temporally alternating negative and positive pressures can be generated in the hollow space by means of the drive unit by a change in volume of the hollow space, wherein the hollow space has an opening for placing over the clitoris, a control device, which can control the drive unit, and a sensor device, which can detect when the stimulation apparatus is in the vicinity of the clitoris or which alternatively can detect contact of the stimulation apparatus with the clitoris and which can emit an activation signal to the control device in the event that a proximity or contact of this kind is detected, and wherein the control device is designed in such a way that the drive unit is activated when an activation signal is present, and wherein the pressure field generation device, the control device, and the sensor device are received in a housing of the stimulation apparatus, and wherein the stimulation apparatus is embodied as a portable hand-held device.

The stimulation apparatus is advantageously thus activated only in the case in which the clitoris is located in the vicinity of the opening of the stimulation apparatus or covers this opening. The battery is thus advantageously protected, since the stimulation apparatus is not operated continuously after being switched on, as is provided in the prior art, but instead is operated only when it is possible to act on the clitoris.

In the apparatuses of the prior art, the stimulation apparatus is usually switched on and only then moved toward the clitoris. In this case the noise generated in particular by the drive unit in the hollow space of the stimulation apparatus can propagate outwardly, undamped, through the opening of the hollow space, wherein this can be seen to be disruptive. In accordance with the invention, however, the drive unit of the stimulation apparatus is activated only when the opening of the stimulation apparatus is obscured or covered. Consequently, the noise from the hollow space of the stimulation apparatus is heavily damped outwardly. In addition, the period of time for which the stimulation apparatus is in operation is reduced. As a result, the noise level of the stimulation apparatus perceptible by the user is advantageously reduced.

In accordance with a development of the invention the sensor device is a capacitive, acoustic, or optical sensor, preferably a proximity sensor, which is designed in such a way that it is possible to detect when the apparatus is moved toward the clitoris, with the clitoris in front of the opening. This has the advantage that a defined measurement region can be provided, within which the presence or absence of the clitoris can be reliably detected.

An acoustic sensor or preferably an acoustic proximity sensor can operate for example by the known ultrasound propagation measurement principle. An optical sensor or preferably an optical proximity sensor can operate for example by the known infrared measurement principles. A capacitive sensor can operate by the known capacitive measurement principles.

More specifically, in the case of a capacitive sensor, the following is/are measured: a change in capacitance at a measurement electrode, a capacitance at the measurement electrode, or the change in capacitance and at the same time the capacitance at the measurement electrode. On this basis, a measurement signal is generated, which is representative for the distance of a surface from the measurement electrode. In the case of the aforementioned principles, and activation signal can preferably be generated by a comparison of the measured variables with a threshold value, which activation signal indicates whether or not the clitoris has reached the vicinity of the stimulation apparatus beyond a predetermined measure.

A capacitive sensor for example can comprise at least one measurement electrode. The capacitance at the measurement electrode is dependent on how far away a surface is from the measurement electrode or whether a surface is placed against the measurement electrode. For example, a surface can be a surface of an object, such as the surface of the clitoris. The surface of the clitoris and the surface of the measurement electrode can be considered fundamentally as two opposite surfaces of a capacitor. The capacitance of this capacitor is dependent on various factors, in particular the distance between these surfaces. The capacitive sensor can be set in such a way that it transmits the activation signal to the control device for example if a predetermined threshold value of the capacitance and/or the change in capacitance is exceeded or undershot.

The capacitive sensor can additionally comprise a (preferably adjustable or programmable) control logic, which generates or calculates the activation signal from a measurement value obtained from the measurement electrode. In addition, a reference measurement electrode can be provided in order to improve the measurement accuracy. Furthermore, a guard electrode can be provided in order to avoid interfering effects.

In a particular embodiment of the capacitive sensor a plurality of measurement electrodes, for example two measurement electrodes, of the capacitive sensor can be provided, wherein the capacitive sensor can be formed in such a way that it outputs the activation signal only if a change in capacitance and/or capacitance lying above a predetermined threshold value are/is measured simultaneously at both measurement electrodes. The reliability of the sensor devices thus improved.

Furthermore, the sensor device can be configured alternatively as a UWB sensor unit. A UWB sensor unit (UWB=ultra wide band) shall be understood in this context to mean in particular a sensor unit that is intended to output and/or to receive electromagnetic signals with a mean frequency between 30 MHz and 15 GHz and a bandwidth of at least 500 MHz, typically of a few GHz. By means of an embodiment of the sensor device as UWB sensor unit, a particularly high content of information with regard to the characterising physical measurand of the body can be obtained advantageously. For example, a distinction can thus be made between a human body and an object. A spectral power density of the UWB sensor unit is preferably at most −41.3 dBm/Hz EIRP (Equivalent Isotropic Radiated Power), such that interference with other devices operated at frequencies between 30 MHz and 15 GHz can be avoided advantageously.

In this context it is proposed that the UWB sensor unit is intended to be operated at a mean frequency which varies discreetly within a predefined frequency range. In contrast to a wide band excitation of the frequency range, the UWB sensor unit is preferably excited here discreetly in the form of a pulse-like excitation thereof, wherein the mean frequency successively assumes various, discrete values in the predefined frequency range. Frequency intervals between two successive excitation frequencies preferably assume different values so as to satisfy the provisions of regulating authorities particularly effectively. A "mean frequency" of the UWB sensor unit shall be understood in this context in particular to mean a frequency that constitutes an arithmetic mean of two frequencies at which a spectral power density is reduced relative to a maximum spectral power density of the UWB sensor system by approximately 6 dB, preferably 10 dB. By varying the mean frequency of the UWB sensor unit, the information content with regard to the characterising physical variable or vicinity of the clitoris can be increased by measurements in different frequency ranges, thus making the sensor device more reliable.

In an advantageous embodiment the UWB sensing unit is intended to be operated at a mean frequency varying periodically within a predefined frequency range. Here, the frequency range can be scanned by a continuous variation of the mean frequency. It is advantageous, however, if the UWB sensor unit is excited in an excitation sequence starting from a lower limit of the frequency range with discrete values of the mean frequency, wherein the mean frequency is increased in steps until an upper limit of the frequency range is reached, with this excitation sequence being repeated periodically.

It is also proposed that the sensor device preferably has a coplanar antenna. A "coplanar antenna" shall be understood in this context to mean in particular an antenna that is formed by strip conductor elements known per se, which are arranged in a plane on a dielectric carrier. The coplanar antenna can preferably be formed as a patch antenna or spiral antenna. In principle, however, the use of other designs appearing expedient to a person skilled in the art is also conceivable. An antenna of this kind can be mounted advantageously and in a simple manner inside the housing in the vicinity of the opening. By equipping the sensor device with a coplanar antenna, the concentration of a sensitivity range of the sensor device to a certain measurement region in front of the opening can further advantageously be achieved. Furthermore, a coplanar antenna of this kind can also be formed in an annular manner and can be arranged around the hollow space according to the invention. In addition, a coplanar antenna of this kind can also be used in the case of a capacitive sensor as a measurement electrode.

In accordance with a development of the invention the sensor device is designed in such a way that it can generate and detect an electromagnetic field, wherein this field is arranged along the alignment axis of the flow in the hollow space according to the invention (this will be explained in greater detail further below) and in front of the opening of the hollow space.

In accordance with a development of the invention the sensing unit is designed in such a way that, alternatively or additionally to that described above, it can detect contact between a wall, which forms the opening, and the skin of the clitoris. This can be implemented for example by means of a conductivity measurement between two electrodes provided in the wall. A sensor of this kind with a capacitive measurement principle it is also conceivable if the measurement region is very small. This has the advantage that contact between the body and the stimulation apparatus can be detected by means of a simple solution, in such a way that only contact of the skin with the wall leads to activation of the drive unit. The noise from the hollow space is thus damped to an even greater extent, since the drive unit is only energised if the hollow space is at least largely closed.

In accordance with an embodiment of the invention a stimulation apparatus is provided which comprises the following: a pressure field generation device having a drive unit and having a hollow space, wherein a pressure field made of temporally alternating negative and positive pressures can be generated in the hollow space by means of the drive unit by a change in volume of the hollow space, wherein the hollow space has an opening for placing over the clitoris, a control device, which can control the drive unit, wherein the hollow space has a wall made of a flexible material, the wall forming the opening of the hollow space, and wherein the stimulation apparatus has a heating element used to heat the wall of the stimulation apparatus, wherein the pressure field generation device, the control device, and the sensor device are received in a housing of the stimulation apparatus, wherein the stimulation apparatus is embodied as a portable hand-held device.

Here, the part of the housing (i.e. the wall forming the opening to be placed over the clitoris) that contacts the skin or the sensitive clitoris can be preheated advantageously. The temperature of the housing part can thus be adapted or approximated to the temperature of the skin, whereby the placement of the housing part is considered to be less disruptive. The clitoral region is in particular sensitive to temperature differences.

Furthermore, the wall or the housing part can be designed with a heating element in the form of a semiconductor of high electrical resistance which is integrated as an extended electrical conductor on or in the plastic material of the housing part itself. When a potential difference is applied to this semiconductor, a current flows, the losses of which heat the conductor and consequently the wall by way of heat conduction.

With preferable integration of the semiconductor directly in a removable silicone head, the electrical conductor can be contacted with the control device. This electrical contact can be implemented for example via magnetic connectors with permanent magnets. The heating element is thus exchangeable with the head.

In accordance with a development of the invention the heating element is received in the wall or is arranged in the housing in the immediate vicinity of the wall.

In order to reduce the energy required for heating and the necessary warm-up time, the heating element can be thermally insulated in respect of undesired heat conduction, i.e. in the direction of the interior of the stimulation apparatus. This thermal heat barrier can be provided for example using glass or mineral wool or a suitable plastics material.

Alternatively, a charging station or also a case for the stimulation apparatus with a heating element having a negative form of the stimulation apparatus can be provided in order to heat up the stimulation apparatus from the outside prior to its operation.

Alternatively to the heating element, which preferably can consist of a semiconductor or a heating wire, the wall can be heated by means of inductively generated eddy currents. The wall can be provided for this purpose with a grid and/or with conductor tracks made of a ferromagnetic material that is a good heat conductor, wherein the stimulation apparatus is designed in such a way that eddy currents are induced in these conductor tracks. For this purpose, an electric coil for establishing a magnetic field can be provided, which coil is arranged in such a way that the magnetic field can act on the grid or the conductor tracks.

In accordance with a development of the invention the wall forms part of the outer wall of the housing, wherein the wall can be embodied exchangeably as the head of the stimulation apparatus. For example, the head can thus be removed in order to make the hollow space according to the invention accessible for cleaning. Differently shaped heads can also be used. The hygiene and versatility of use of the stimulation apparatus are thus advantageously improved.

In a development of the invention the above-mentioned features can be provided in the case of the pin-shaped stimulation apparatus explained later in greater detail or the stimulation apparatus with random generator explained hereinafter.

In accordance with an embodiment of the invention a stimulation apparatus for the clitoris is provided, said apparatus comprising the following:
a pressure field generation device having a drive unit and having a hollow space, wherein a pressure field made up of a plurality of predefined stimulation patterns can be generated in the hollow space by means of the drive unit by a change in volume of the hollow space, wherein the stimulation patterns are made up of temporally alternating negative and positive pressures, and wherein the hollow space has an opening for placing over the clitoris, a control device, which can control the drive unit and which comprises the plurality of predefined stimulation patterns and a random generator, wherein the control device is designed in such a way that the sequence of stimulation patterns is set randomly by the random generator when the drive unit is activated, wherein the pressure field generation device, the control device, and the sensor device are received in a housing of the stimulation apparatus, wherein the stimulation apparatus is embodied as a portable hand-held device.

The sequence of stimulation patterns according to the invention is understood in particular to mean a temporal sequence of individual previously stored patterns. However, duration of the individual patterns, the selection of the pattern, and also the intensity of the patterns can also be subsumed. As a result of the random sequence of stimulation patterns according to the invention, habituation effects are avoided, since the user cannot anticipate the patterns.

A method is also provided for stimulation of the clitoris using a stimulation apparatus comprising the following: a pressure field generation device having a drive unit and having a hollow space, a control device and a sensor device, wherein the hollow space has an opening for placement over the clitoris; said method having the following steps:
switching on of the stimulation apparatus by the user, wherein the stimulation apparatus, once switched on, is in a standby mode, in which the drive unit is not activated;
detecting by means of the sensor device of the stimulation apparatus whether the opening is in the vicinity of the clitoris or alternatively whether the stimulation apparatus is in contact with the clitoris;
generating an activation signal if a proximity or contact of the above kind has been detected by the sensor device;
outputting the activation signal to the control device;
activating the drive unit if the control device receives the activation signal;
generating a pressure field made of temporally alternating negative and positive pressures at the opening for stimulation of the clitoris by the drive unit of the pressure field generation device, if the drive unit is activated.

The function and the advantages of the method are the same as those already discussed above in respect of the associated apparatus. In particular, the generation of noise during use of the stimulation apparatus is reduced.

The method serves solely for sexual pleasure and is not intended for therapeutic or medical purposes.

According to a further embodiment of the invention, a stimulation apparatus for erogenous zones, in particular the clitoris, is provided, having a housing which is substantially (rod-shaped or) pin-shaped, a pressure field generation device having a drive unit that generates a pressure field made of temporally alternating negative and positive pressures in a hollow space, a control device which controls the drive unit; wherein the housing has a longitudinal axis which extends from a front end of the housing up to a back end of the housing, and an opening for placing over the clitoris is provided in the front end of the housing, and wherein the hollow space is arranged inside the housing and is connected to the opening of the housing.

The longitudinal axis of the housing of the stimulation apparatus according to the invention is an imaginary axis that extends from a front end of the elongate housing up to a back end of the elongate housing (which is spaced apart axially relative to this front end). Preferably, the longitudinal axis runs in parallel to the length of the housing.

Regularly, but not exclusively, the longitudinal axis can be an axis running in the longitudinal direction relative to the longest extent of the stimulation apparatus.

The longitudinal axis corresponds, for example, to the direction of the greatest total extent of the housing.

Preferably, the longitudinal axis is also the longitudinal central axis which extends roughly centrally through the stimulation apparatus.

Furthermore, the longitudinal axis is preferably also substantially an axis of symmetry of the stimulation apparatus or of the housing. Thus, the housing in terms of its basic shape is formed, for example, to be extensively cylindrical. Switches, bushings or similar small details do not come into consideration when considering the symmetry.

In addition, a housing is then formed to be elongate or stretched out when its length is at least three (3) times or even n times the width and/or height. Preferably, the factor n has the value four (4), five (5), six (6) or seven (7). The greater the factor n is, the more elongated or stretched out the housing is formed to be.

Alternatively, the housing of the stimulation apparatus according to the invention can thus be said to be configured (formed) in a stretched-out manner if it can be received in an imaginary cylinder whose diameter is, for example, smaller by the factor 3, preferably 4, 5, 6, or 7 than its length.

The front end of the housing is the end of the housing which is arranged to be adjacent to or over the erogenous zone when using the stimulation apparatus, i.e. it is the "active" end having the opening for stimulation in the stimulation apparatus according to the invention.

The rear or back end of the housing is the end of the housing which is arranged opposite the front end in the longitudinal direction. This back end is, for example, the "passive" end of the housing, i.e. generally, a simple terminating end of the housing. Operating elements can be arranged on the back end.

According to the invention, a pressure field generation device of the stimulation apparatus has a hollow space having an opening for placing on a body part or on the erogenous zone, preferably over the clitoris.

Thus, the hollow chamber is pulled over the clitoral glans such that the clitoral glans is received in the hollow space. This placement can take place in a sealing manner, or also only in a partial or extensively sealing manner, when, for example, a gap remains open between the wall of the opening and the skin of the erogenous zone.

The front end of the housing preferably has a placement region for placing the stimulation apparatus on the erogenous zone. The placement region is characterized by a resting surface which comes into contact with the skin when using the stimulation apparatus.

The hollow space according to the invention defines a volume inside the housing for a medium, for example air. This hollow space is separated from the rest of the inside of the housing by flexible and/or rigid walls.

Furthermore, the hollow space is connected to the opening of the housing. Thus, the hollow space has the opening (of the housing) for placing over the erogenous zone to be stimulated.

The pressure field according to the invention is formed in this hollow space, said pressure field having temporally alternating negative and positive pressures relative to a reference pressure, wherein this will be described in more detail later (for example with reference to FIGS. 40 $a$) to $c$)).

When generating the pressure field, the hollow chamber has a flow system according to the invention which has flows that are temporally alternating and are regularly opposing one another. This is explained in more detail later by FIGS. 21 and 22.

The hollow chamber according to the invention can have, for example, at least one first chamber and at least one second chamber and at least one connection element that connects the first chamber to the second chamber. Here, the term "first chamber" functionally refers to the part of the hollow space in which the drive device can act upon the hollow space, for example by changing the volume. The term "second chamber" functionally refers to the part of the hollow space which has the opening for placing over the erogenous zone, and in which the pressure field according to the invention can act on the erogenous zone. The chambers according to the invention are thus not respectively structurally completely separated spaces or compartments of the hollow space, but only functional sections of a hollow space. Thus, the connection element can also only represent a marginal tapering or narrowing in the form of an individual outlet opening between the two chambers.

A pressure field can be generated in the second chamber by the formation according to the invention of chambers that communicate in terms of flow via at least one connection element by changing the volume of the first chamber in a simple manner, said pressure field being temporarily aimed at the region of skin to be stimulated.

A pressure field in the sense of the invention is a temporally changing field of media pressures which, at times, has positive pressures and, at times, has negative pressures wherein a negative pressure is a media pressure that lies below the reference pressure, and a positive pressure is a media pressure that lies above the reference pressure. As a result, the medium moves forwards and backwards in an alternating manner in the hollow space according to the invention, whereby the pressure field is generated.

The medium is usually in the form of gas, preferably air, however, alternatively or additionally for example, it can be a fluid medium, water or a commercially available lubricant. For example, the chambers according to the invention can be filled with the lubricant before using the stimulation apparatus. In this way, stimulation of the corresponding region of skin takes place by means of a suitable skin-friendly fluid instead of air, which may be desired depending on the individual preference of the user. As a further example, the stimulation apparatus can also be used underwater with water as the medium (for example in the bath or in the swimming pool). Preferably, the stimulation apparatus is formed to be waterproof. If air is the medium, a kind of air column is moved forwards and backwards in the hollow space according to the invention.

The reference pressure is usually the pressure surrounding the stimulation apparatus present at the start of usage (i.e. before placing the stimulation apparatus on the region of skin to be stimulated). With the preferred use of the stimulation apparatus with air, the reference pressure is the currently present/prevailing air pressure or the normal pressure.

For example, when using the apparatus under usual standard conditions, the reference pressure can be approx. 1 bar, wherein, as a result, a negative pressure according to the invention can be 0.7 bar (measured absolutely) or −0.3 bar (measured relatively), for example, and a positive pressure according to the invention can be 1.3 bar (measured absolutely) or +0.3 bar (measured relatively).

By means of the pressure field according to the invention, the area of skin to be stimulated is stimulated, on the one hand, in terms of its blood flow, while, on the other hand, it is indirectly stimulated. Thus, two advantageous effects are combined. Because of the increased blood flow, the erogenous zone of the person concerned is more sensitive, while, in addition, a kinetic effect is generated that serves to stimulate the erogenous zones, for example sexual arousal until climax. The stimulation effect is generated by means of the effect of the pressure field on the surface of the area of skin to be stimulated. In this manner, the stimulation effect created by the pressure field is generated indirectly, i.e. without a solid body, for example a vibrator, directly touching the part of the skin to be stimulated.

By means of the exemplary usage of the pressure field changing temporally in accordance with the invention, an excitation of the clitoris that usually takes place during sexual intercourse is imitated by means of the pressure field.

Here, a changing stimulus is also generated on the clitoris as a result of the cohabital movement. Thus, it is a realistic imitation of the natural cohabital act, wherein medical statements confirm that the usage of the pressure field according to the invention leads to neither habituation effects nor to addiction. This is grounded, in particular, in the alternating use of negative and positive pressures (or also in the non-continuous use of only one kind of pressure).

Furthermore, the maximum useable pressure is regularly limited by the maximum resilience of the region of skin to be stimulated. For example, an excessive negative pressure, particularly with erogenous zones such as the clitoris, poses the risk of painful injuries. Stimulation apparatuses that function exclusively by means of negative pressures are usually limited to this maximum in their functionality. In contrast, an extended working range of the stimulation-triggering pressure field or effect is created according to the invention by means of the combination of positive and negative pressures, since the working range of the pressure can, from now on, be used in the positive and in the negative range up to a maximum without the danger of an unintentional excess.

By means of the alignment of the at least one connection element corresponding to an alignment axis on the skin region to be stimulated, the pressure field can act directly on the target region, wherein the pressure field is influenced for example significantly by the configuration of the at least one connection element and the at least one opening from the connection element into the second chamber, and can thus be adjusted depending on the use of the stimulation apparatus. Thus, an opening of the connection element can lie opposite the body part to be stimulated, preferably directly opposite. Thus, the pressure field that is generated in the second chamber is generated in the immediate proximity of the erogenous zone, preferably the clitoral glans, and is directed at this.

For example, in a stimulation apparatus which is intended for the clitoris, the connection element can have an individual passage opening having the effect of a nozzle on the clitoral glans between the first and second chamber. The individual passage opening can be, for example, an individual constriction in the hollow space. Furthermore, the connection element can be formed as a nozzle. The nozzle accelerates the medium when generating the positive pressure of the pressure field. Preferably, the nozzle also directs the media flow towards the clitoris, when the positive pressure is generated in the hollow space. Such a nozzle can be formed or shaped as a truncated cone or in a rounded manner for example, as will be described below with reference to several figures.

Alternatively, the connection element can consist of several, for example four, passage openings between the chambers, when a larger area of the skin region is to be stimulated.

Furthermore, after placing the hollow space (and the second chamber, for example) that is half open or partially open on the skin region to be stimulated, there is an intrinsically closed system of the media or air flow in the pressure field generation device, i.e. the flow system according to the invention. Thus, the medium or the air is moved forwards and backwards significantly in the chambers or in the hollow space, while an exchange with media or air from outside the system is at least extensively avoided. Thus, the first chamber is connected exclusively to the second chamber (via or by means of the connection element). Thus, there are no other (fluidic) connections of the first chamber than those to the second chamber; for example, there is no direct connection of the first chamber with the surroundings of the device via a pressure valve or via an air removal channel.

For example, the temperature of the air in the flow system according to the invention can be quickly adjusted to the skin temperature, while the disturbing supply of new (for example cold) air from outside the system, as can be the case with the prior art, inter alia when using vacuum pumps or fans, is avoided. In addition, drying effects are avoided, since in a closed system there is little or no removal of stimulation-encouraging fluid, for example bodily fluid.

Furthermore, the pressure field generation device according to the invention has the advantage of increased hygiene and improved cleaning capability because of the simple construction as a hollow space that is closed (to the rest of the inside of the housing). In particular, the present invention avoids valves or pumps/compressors having potential dead spaces and parts that cannot be cleaned. Thus, the pressure field generation device according to the invention is easy to dean. For example, cleaning the stimulation apparatus can take place in a simple manner by filling the first chamber with a cleaning fluid and activating the pressure field. Alternatively, the front part of the hollow space and the second chamber, for example, can be arranged such that they can be exchanged, which also simplifies cleaning of the two chambers.

Furthermore, the hollow space of the pressure field generation device according to the invention, for example the chambers according to the invention and the connection element, can be produced to be one part, wherein this consists for example of a single plastic moulding (e.g. rubber or silicone). As further alternatives, the first chamber, the second chamber and the connection element can be embodied to be two or three parts. Preferably, each functional unit of the hollow space is a separate component, which simplifies the construction. As a further example, the one bracket of the first chamber, a complementary flexible wall of the first chamber, the second chamber and the connection element can each constitute a separate component of the pressure field generation device.

In addition, the construction according to the invention leads to avoiding complex elements in terms of flow, such as valves, for example, which leads to a simplification of the production. The stimulation apparatus according to the invention thus does not have any valves.

Furthermore, the stimulation apparatus according to the invention has a drive unit which controls the hollow space in such a way that a pressure field is generated in the region of the opening of the hollow space, said region serving to stimulate the erogenous zones. Similarly, the stimulation apparatus according to the invention has a control unit which controls the drive unit.

Preferably, the volume of the first chamber is changed in such a way that the pressure field is formed for stimulation via the connection element in the second chamber.

Furthermore, the transported volume is constructively limited by the maximum possible volume change which can be caused by the drive unit.

Consequently, the maximum positive or negative pressure the stimulation apparatus can build up in the second chamber is limited due to the dimensions of the components of the pressure field generation device and the drive. In particular, the maximum positive or negative pressure can be limited to an amount that minimizes or rules out any risk of injury for the areas of skin to be stimulated. As a result, a safety valve that is usual in the prior art, or a manual intervention in the stimulation process by the user, such as the opening of a release valve, is for example rendered unnecessary.

Furthermore, the variation over time in the pressure field or the modulation of the pressure field by the control device is controlled largely or completely automatically. Thus, the modulation of the pressure field, such as intensity, time profile or sequence, can be previously stored in the control device. Preferably, the variation over time in the pressure field can have a regular or recurring (stimulation) pattern, such as pulses at a predetermined cycle rate or regularly alternating pulse sequences. This allows the user's interaction with the stimulation apparatus to be limited in accordance with the invention to switching on and off and selecting the stimulation pattern, while the stimulation apparatus automatically executes the preferred stimulation pattern. Thus, in accordance with the invention, the complexity of using the stimulation apparatus is low, when compared with conventional (medical) vacuum stimulation apparatuses. Alternatively or in addition, the stimulation pattern of the stimulation apparatus can be individually configured by the user during or before operation.

Preferably, the modulation pattern can be generated and changed by means of a voltage or current control of an electric motor by adjusting and/or varying the number of revolutions of the electric motor. When the number of revolutions is consequently changed, the number of strokes of an eccentric cam which is mounted on the shaft changes, as well as the number of strokes of the corresponding flexible wall.

Preferably, the opening of the housing and the hollow space is arranged in such a way that the longitudinal axis of the housing penetrates the opening of the hollow space. Thus, the imaginary longitudinal axis of the housing intersects an imaginary surface which is spanned by the inside of the opening or a surface which is surrounded by the front or outermost edge of the opening of the housing. This front edge preferably serves for placement on the skin. This imaginary surface can be formed to be planar or flat (for example as a planar circular surface or a planar oval surface) or curved (for example concavely).

In accordance with the invention, it is thus provided that the large-volume pistol housing of the generic type (including corresponding dead volumes) or the conventional large-volume housing is replaced by an L-shaped arrangement, by an elongate, compact, preferably pin- or rod-shaped housing which can be held and guided by the operating person in the manner of a highlighter or pen. Thus, the opening according to the invention of the stimulation apparatus is provided on the "active" end, similar to with a pen.

Thus, not only is a more sensitive and more relaxed grip of the stimulation apparatus possible, but also the spatial positioning of the stimulation apparatus above the erogenous zone, for example above the clitoris, is clearly made easier for the user or even for a third person.

Furthermore, the inventors have recognised that the stimulation effect can be varied significantly by the placement angle and the pressing pressure. Depending on how tightly the opening is placed on the erogenous zone or the area of skin to be stimulated, the pressure ratios inside the hollow space clearly vary. For example, measurements of the inventors have shown that the maximum negative and positive pressures inside the hollow space are more than 30 or 50 times greater in the event of a completely sealed placement of the opening than when the opening is not placed very tightly, for example with a small gap facing outwards. Therefore, the user can set the intensity of the stimulation effect by means of the position of the placement of the opening over the erogenous zone or by means of the inclination of the stimulation apparatus, without here having to carry out (distracting) adjustments, for example, in terms of the modulation pattern on the device by means of operating elements. For example, it is regularly the wish of the user that the intensity of the stimulation effect increases during the course of the use of the stimulation apparatus.

As a result, the handling of the housing and, in particular, the positionability of the opening of the hollow space, also play an important role when adjusting the intensity of the stimulation effect during use. Thus, the arrangement according to the invention having an elongate, pin-shaped housing shape (and having the opening of the hollow space/the housing on the front end of the housing) facilitates the overall stimulation effect of the pressure field during use, since the intensity of the stimulation can now clearly be adjusted in a more delicate manner, according to the respective current requirement of the user.

In other words, it is advantageous that the placing angle of the opening can be manually set in a delicate manner relative to the erogenous zone or skin surface because of the housing design according to the invention, since the placing angle can be determined all the more precisely, the longer the housing is.

Since the user no longer holds the stimulation apparatus according to the invention in the manner of a handle (for example in the style of a tennis racket)—as explained above—but in the manner of a pen or pommel, the housing can be formed to be smaller.

It is thus no longer necessary to form the housing to be so large, in particular in the peripheral direction (and also in the longitudinal direction), that it is possible to enclose it by hand. That is to say, the periphery of the housing no longer has to be so big in the longitudinal direction, as is the case with conventional telephone receiver style housings with an L-shaped arrangement, in order to allow a one-sided, comfortable grip with the hand, but rather the periphery of the housing according to the invention can dearly become smaller, since guiding the stimulation apparatus according to the invention between thumb and forefinger, for example, is sufficient.

In addition, as a result of the reduction of the housing that has been achieved, material, and thus weight, can be saved.

It is also easier for the user to balance the stimulation apparatus above the erogenous zones, since an elongate, compact and lighter housing can also be aligned more easily relative to the centre of mass of the housing, and, in addition, the housing can also come to rest in the hand in the crook between thumb and forefinger, whereby the weight of the housing can come to rest at least partially on the hand.

Alternatively, guiding the stimulation apparatus according to the invention can also take place by means of holding the longitudinal housing on its back end (i.e. similar to holding a walking stick, which has a pommel). This is also a comfortable holding position for the hand, in particular when the anatomical conditions of the user are taken into consideration. Such a handling of the stimulation apparatus was, up until now, not possible with the L-shaped arrangements of the prior art.

Optionally, a pommel or a thickening (which is ball-shaped, for example) can be provided for this purpose on the back end. In this way, a more delicate and more relaxed guiding of the stimulation apparatus is also made possible.

As a result of the opening of the hollow space or the housing of the stimulation apparatus according to the invention being arranged on the front end of the housing, in contrast to the common L-shaped arrangements, the stimulation apparatus can also be guided in such a way that contact of any other housing parts with the skin can be avoided.

Furthermore, an elongate, hollow housing is not necessary, in comparison to usual L-shaped arrangements, which saves space, since, in comparison to conventional apparatuses, less dead space is present (in particular in the region between the pressure field generation device and the drive unit, which are usually perpendicular to one another in the prior art in their direction of extent). Therefore, the stimulation apparatus according to the invention can also be formed or shaped to be more compact.

Furthermore, the housing is formed to be elongate in the shape of a pin or in the shape of a rod in such a way that it can be guided manually in the manner of a pen for placement over the erogenous zone, in particular the clitoris (or clitoral glans).

Among other things, this offers the advantage that the actuation of the elongate stimulation apparatus that is shaped like a rod or pin, for example, is more trusted by the user as a result of previous practice (for example with a pen) and can be carried out in a more ergonomically simple manner.

According to a development of the invention, a stimulation apparatus is provided, wherein the opening defines an opening plane that forms an angle with the longitudinal axis of the housing that is greater than about 30 degrees (alternatively greater than 45 degrees), preferably between about 35 and about 65 degrees (alternatively: 40 to 50 degrees), in particular between about 55 degrees and about 65 degrees, or greater than about 80 degrees, in particular about 90 degrees.

Thus, the opening according to the invention is detached, for example at a pointed angle relative to the longitudinal axis of the stimulation apparatus. This angled arrangement of the opening of the hollow space is advantageous since it takes the female anatomy into consideration and allows a more relaxed and more comfortable handling. For example, in particular when placing the stimulation apparatus over the clitoris, the holding arm of the user can be bent more sharply. If the user is also lying in a horizontal position when using the stimulation apparatus according to the invention, then the stimulation apparatus can be held in a steeper or vertical position, which simplifies balancing of the stimulation apparatus over the clitoris, since, among other things, the tilting moment is smaller.

Alternatively, the opening plane is formed to be perpendicular or approximately perpendicular to the longitudinal axis, which is also advantageous for the manipulability of the apparatus. The term "approximately" in terms of angle specifications, in this disclosure, generally means an angle exactness of ±1 degree of the angle.

According to a development of the invention, the opening of the housing is arranged in such a way that the longitudinal axis of the housing penetrates (through) the opening of the housing.

A housing that has been formed according to the geometric principle above is still more delicate and intuitive to handle. Thus, there is the "active" end, which serves for stimulation, in the longitudinal axis of the housing, whereby the "rotation and pivot point" of application is easier for the user to ascertain. In the same way, the housing design is simplified since the housing can now be formed asymmetrically (in terms of length) for example, whereby the production becomes more cost efficient.

According to a development of the invention, a stimulation apparatus is provided, wherein the hollow space can be controlled by means of the drive unit or can be supplied with forces in such a way that a pressure field that preferably acts in the direction of the longitudinal axis of the housing is generated in the hollow space, said pressure field being aligned, by means of the opening of the hollow space, with the erogenous zone for the stimulation thereof. Thus, the pressure field is aligned with the longitudinal axis of the stimulation apparatus, whereby an accurate and delicate positioning of the stimulating pressure field is advantageously facilitated. In particular, an "aiming" for a target region or the erogenous zone along the elongate housing is again facilitated and can take place more intuitively.

According to a development of the invention, the hollow space can be set up by means of the pressure field in such a way that the longitudinal axis of the stimulation apparatus intersects or penetrates the pressure field. A housing formed according to the geometric principle above having the hollow space is more delicate and intuitive to handle.

According to a development of the invention, a stimulation apparatus is provided, wherein the housing has a central section, that is designed for holding the stimulation apparatus with one hand, adjacent to the front end in the longitudinal direction, said section being formed and arranged to extend along the longitudinal axis and in the peripheral direction around the longitudinal axis, in particular only across a peripheral section.

As a result of this central section, again holding the stimulation apparatus in the manner of a pen is encouraged. Furthermore, the central section can comprise a haptically advantageous material, for example rubber or silicone, so that it can be gripped better. Furthermore, the central section directly or immediately connects to the front end, whereby the elongate stimulation apparatus can comprise a haptically advantageous material not only on the front end, but also in the section behind it. This takes into consideration that, in the central section, there is an increased probability that this can also come into contact with other parts of the skin, for example the thighs or the labia of the user. Thus, the stimulation apparatus is formed to be haptically (and tactilely) and ergonomically advantageous.

The central section can also be formed, in particular, only across a peripheral section, which saves material and coating expenditure, for example. Thus, the central section can be provided only for the resting surface of the finger.

According to a development of the invention, a stimulation apparatus is provided, wherein the central section extends over at least 30%, preferably over at least 40%, further preferably at least 50% of the axial extent of the longitudinal axis 80 and optionally up to a maximum of 70% of the axial extent of the longitudinal axis.

Tests by the inventor have proved that a certain minimum length of the central section is required in order to sufficiently provide an area for gripping with fingers.

According to a development of the invention, a stimulation apparatus is provided, wherein the stimulation apparatus has a centre of mass that is arranged closer to the back end than the front end, as considered in the longitudinal direction.

When holding the stimulation apparatus in the hand in the ways described in more detail above in the manner a pen or in the manner of a pommel, it is advantageous when the centre of mass is closer to the back end, as considered in the longitudinal direction, than to the front end. Thus, the front (lighter) end, for example, can be moved in an easier and more delicate manner, when the (heavier) back end rests on the outer surface of the hand or in the inner surface of the hand.

According to a development of the invention, a stimulation apparatus is provided, wherein the longitudinal axis represents an approximate axis of symmetry of the housing. Such a symmetry leads to advantages in terms of production, for example it is possible to use the parts for the housing multiple times (for example, half shells can be used); or the construction of the product is simplified. In addition, a housing having such an axis of symmetry has a centre of mass which can be arranged on or adjacent to the longitudinal axis, which, in turn, improves the ability of the housing the be handled and balanced.

According to a development of the invention, a stimulation apparatus is provided, wherein the hollow space has a wall, which consists of a flexible material, and the wall forms the opening of the housing, and the wall on the front end also forms the outer wall of the housing. Thus, this wall preferably forms the resting surface of the housing on the skin.

Thus, not only the direct (front) contact surface of the wall of the opening of the hollow space with the corresponding part of skin is formed from a flexible (haptically and tactilely advantageous) material, such as silicone or rubber, for example, but the outside of the front end of the housing of the stimulation apparatus according to the invention is also correspondingly formed. This improves the tactile perception that the user obtains from the housing. For example, the outer labia can be brought into contact with the (outer) wall of the front end, when the stimulation apparatus is placed over the clitoris.

According to a development of the invention, a stimulation apparatus is provided, wherein the hollow space has an alignment axis which is defined by the alignment of the flow(s) of the medium when generating the pressure field (or the positive pressure) in the region of the opening; and the alignment axis intersects the longitudinal axis at an angle which is less than or equal to 50 degrees, preferably less than or equal to 35 degrees; or the alignment axis is arranged substantially in parallel to the longitudinal axis. If the hollow space, for example, is formed cylindrically behind the opening of the housing running into the depths of the housing, then the flows, for example, can be directed towards and away from the opening, alternating temporally, along the direction of the central axis of this cylinder.

Thus, the alignment axis is arranged in parallel or having a small (flat) angle in relation to the longitudinal axis of the stimulation apparatus. The handling, in particular the kind of delicate alignment of the pressure field generating the stimulation, is thus improved, according to experiments by the inventor.

According to a development of the invention, a stimulation apparatus is provided, wherein the drive unit is an electric motor having a drive shaft or axis; and the central axis of the drive shaft or axis of the electric motor is arranged substantially in parallel to the alignment axis, which preferably aims at the erogenous zone to be stimulated. It is also preferred that the central axis of the drive shaft of the electric motor is arranged in parallel to the longitudinal axis.

The electric motor and the eccentric cam arranged on the axis is the source of oscillations or vibrations which are aligned substantially perpendicular to the axis because of the unbalance of this arrangement. The axis of rotation of the eccentric cam often does not correspond to the main inertia axis. As a result, the axis of the motor vibrates or oscillates and thus the motor and consequently also the housing do so too, substantially in a direction that is perpendicular or at a right angle to the central axis of the axis of the motor. In conventional L-shaped arrangements, the erogenous zone to be stimulated is consequently found in the substantial propagation region or in the direction of these oscillations or vibrations. With reference to FIG. 3 of the prior art, the substantial propagation direction corresponds to the oscillations or vibrations of the axis 81*a*. As a result, these oscillations transfer to the body of the user via the wall of the hollow space and via the contact surface of the wall, which can disturb the user.

On the other hand, the oscillations or vibrations in the axial direction of the motor axis are clearly less pronounced than when perpendicular thereto. The previous development uses this knowledge, wherein the alignment axis and thus the erogenous zone are arranged in the axial direction of the motor axis. In this direction, the oscillations or vibrations of the electric motor having the eccentric cam are thus less pronounced, and do not disturb the user, or disturb her substantially less.

Preferably, the alignment axis and the central axis of the axis of the electric motor are aligned to be coaxial to each other, wherein oscillations or vibrations are the least pronounced in this kind of arrangement.

Alternatively, the alignment axis and the central axis of the axis of the electric motor can form an angle of the axes relative to each other of ≤30 degrees, preferably ≤15 degrees, wherein tests have shown that, even with the above angle ranges, a perceptible reduction of the pronouncement or strength of the vibrations or oscillations of the opening of the hollow space/housing takes place.

According to a development of the invention, a stimulation apparatus is provided, wherein the pressure field generation device has a flexible wall, which can be displaced by the drive device; and the direction of the displacement of the flexible wall by the drive unit is provided at an angle of preferably >45 degrees ≤90 degrees, in particular 90 degrees, relative to the alignment axis.

Not only the motor having the eccentric cam generates unwanted oscillations or vibrations, but also unwanted oscillations or vibrations are generated on the flexible wall of the hollow space. These vibrations or oscillations also have a propagation direction in the direction of the displacement of the flexible wall. Thus, analogously to considerations in terms of the vibrations or oscillations of the eccentric cam, the previous arrangement according to the invention can also again reduce the vibrations or oscillations.

According to a development of the invention, a stimulation apparatus is provided, wherein the pressure field generation device is formed in such a way that it has at least one damping element.

This represents a further measure in order to reduce the vibrations or oscillations of the stimulation apparatus or the pressure field generation device. Such a damping element is a silicone bearing which is arranged between the eccentric cam and the flexible wall. Alternatively, the damping element can be a silicone or rubber damper (which is preferably formed in a hollow cylindrical shape in such a way that it can be inserted in screw connections) that is arranged between the fixing points of the pressure field generation device and the complementary suspension bracket of the housing. Similarly, the damping element can also alternatively be a sheathing of the motor made of an elastic material. For example, the motor can be wrapped in sponge and fixed in the housing.

According to a development of the invention, a stimulation apparatus is provided, wherein the damping element is arranged between the opening and the electric motor or the flexible wall mechanically or in terms of flow in such a way that vibrations and/or sounds that are generated inside the housing are damped in the direction of the opening.

In the arrangement presented above, the damping element is preferably a cushion-shaped or cuboid attenuator made of silicone or rubber, which is arranged in the longitudinal direction between the motor (or the flexible wall) and the opening. The damping element here preferably covers a large part of the cross-sectional area of the housing, as considered in the longitudinal direction, in order to provide an effective damping effect. Here, the mechanical oscillations or vibrations, i.e. those transferred via the solid body, are damped in the longitudinal direction of the housing. The damping element can here be inserted or arranged in particular adjacent to the front end of the housing in the internal space of the housing or, for example, between the front end and the central section of the housing.

Alternatively or additionally, if the damping element is used as a damping element in terms of flow, then the acoustic oscillations in the medium, which are generated in the first chamber, can be damped (for example, the flexible wall oscillates; in addition, there are unwanted flow sounds on edges or narrow points in the hollow space). Thus, the damping element can be used as a sound damper in terms of flow, wherein the damping element has a channel in which acoustic oscillations, in particular in a frequency range of ten to a few hundred Hertz, are effectively damped (for example by more than 6 dB).

According to a development of the invention, a stimulation apparatus is provided, wherein the damping element has a channel which runs in an S-shape, and/or the channel is coated or lined with a sound-damping material on its inner wall.

The two measures carried out above of the S-shaped course and the coating having a sound-damping material serve to improve the sound-damping effect of the damping element. Because of the S-shaped course, a sound wave from the first chamber can no longer outwardly propagate in a straight line and in an undamped manner. Thus, the volume of the stimulation apparatus during operation is reduced.

Preferably, the two openings of the S-shaped channel have opening planes running in parallel to each other.

According to a development of the invention, a stimulation apparatus is provided, wherein the damping element consists at least partially of silicone, vinyl or rubber. These are materials by means of which the necessary components can be produced cost effectively and in different shapes, while at the same time these materials have good (acoustic and mechanical) damping properties.

According to a development of the invention, a stimulation apparatus is provided, wherein the housing has the central section adjacent to the front end, said central section having at least two gripping surfaces.

The two gripping surfaces can be used by the user as orientation aids as to how the fingers are to be placed on the housing of the stimulation apparatus. In addition, these gripping surfaces can also be provided with a rubber coating or a "grip", in order to improve the hold of the stimulation apparatus or in order to prevent slippage when the stimulation apparatus has become greasy or slippery, for example due to liquids (lubricant, etc.).

According to a development of the invention, a stimulation apparatus is provided, wherein the housing has the central section adjacent to the front end, the central section being formed completely as a gripping section.

Preferably, the whole central section can thus be formed as a gripping section, so that the user has a high degree of freedom in how she holds the stimulation apparatus. It is preferred that the central section is therefore formed completely out of silicone or rubber or consists of silicone or rubber, or, on the other hand, the central section is coated completely or in a patterned manner by a material that offers the user a good hold for the hand.

According to a development of the invention, a stimulation apparatus is provided, wherein the central section has an external contour which is formed to be round, oval, of equal thickness or a regular polygon, as considered in the cross-sectional direction or in the cross-sectional plane of the central section.

The external contours according to the invention offer the advantage that they are relatively simple to manufacture and are advantageous haptically. In particular, an external contour that is of equal thickness in the longitudinal direction of the housing and the central section can be guided easily by hand, since the surfaces fit well into the anatomy of the hand. An external contour in the shape of a Reuleaux triangle is therefore particularly preferred, wherein the three outer edges or corners can additionally be rounded off easily. Here, it is also advantageous that material is saved, since a cylinder having an equal external radius has more wall surface area.

According to a development of the invention, a stimulation apparatus is provided, wherein the front end of the housing consists of silicone or rubber, and is preferably formed exchangeably as the head of the stimulation apparatus.

An exchangeable front end has the advantage that it can be easily replaced when closing, or also that cleaning the stimulation apparatus after use is made easier.

According to a development of the invention, a stimulation apparatus is provided, wherein the silicone of the front end is medical silicon having a pressure elastic modulus less than $0.1$ N/mm$^2$, preferably less than $0.05$ N/mm, in particular less than $0.01$ N/mm$^2$.

The head of the pressure field generation device can consist, in particular, of silicone, preferably of silicone rubber or silicone elastomer, which can be relatively elastic or soft.

Conventionally, the silicones are used in common stimulation apparatuses for the clitoris which have an elastic modulus (E-modulus) of more than $0.5$ N/mm$^2$ (or a thrust modulus/G-modulus of more than $0.2$ N/mm$^2$) so that they remain permanently stabile and can be permanently fixed.

The citations (cf. Linder-Ganz E, Shabshin N, Itzchak Y, Gefen A. Assessment of mechanical conditions in sub-dermal tissues during sitting: a combined experimental-MRI and finite element approach; and: Zahouani H, Pailler-Mattei C, Sohm B, Vargiolu R, Cenizo V, Debret R. Characterization of the mechanical properties of a dermal equivalent compared with human skin in vivo by indentation and static friction tests. Skin Res Technol 2009; 15:68-76; and Wu J Z, Cutlip R G, Andrew M E, Dong R G. Simultaneous determination of the nonlinear-elastic properties of skin and subcutaneous tissue in unconfined compression tests. Skin Res Technol 2007; 13:34-42; and Jessica L. Sparks, PhD; Nicholas A. Vavalle, M S; Krysten E. Kasting; Benjamin Long, M S; Martin L. Tanaka, PhD; Phillip A. Sanger, PhD; Karen Schnell, MSN; and Teresa A. Conner-Kerr, PhD, Use of Silicone Materials to Simulate Tissue Biomechanics as Related to Deep Tissue Injury, ADVANCES IN SKIN & WOUND CARE & VOL. 28 NO. 2, 2015) state values of the shear modulus (G modulus) of the skin in the range of about 2.8 m-31.9 kPa (approx. $0.0028$ N/mm$^2$-$0.0319$ N/mm$^2$).

With the regions of skin concerning the clitoris, it can be assumed that these have a shear modulus (G modulus) that is preferably settled in the low region between approx. 2.8 kPa and 15 kPa (c. 0.0028 N/mm$^2$-0.015 N/mm$^2$).

Because of the clear difference presented above of the elasticity moduli or the shear moduli of silicone relative to skin, in common stimulation apparatuses having silicone heads, the edge of the opening 42 of the second chamber (4a and 4b) is often seen as too "hard" by the users of stimulation apparatuses for the clitoris.

It is tactilely advantageous if the silicone material has elastic properties which correspond or at least come close to the elastic properties of the human skin and the tissue lying below. As a result of this adjustment of the elastic properties, the silicone head is seen as more pleasant and softer.

As a result, it is advantageous when the silicone head according to the invention consists of a silicone which has an elastic modulus (E modulus) of less than 0.1 N/mm2. Analogously, this would correspond to a shear modulus (G modulus) of less than 0.04 N/mm2. A yet softer or more elastic material is also seen as even more pleasant.

Corresponding softer silicone heads can be fixed permanently on the stimulation apparatus according to the invention by means of a support piece (that is integrally formed with the silicone head and adhered thereto) or a support body. Several silicone heads can be supplied with the stimulation apparatus 1 for exchange once worn.

According to a development of the invention, a stimulation apparatus is provided, wherein the silicone of the front end has additives, in particular stabilisers or dyes.

Preferably, when producing the front end from silicone, coloured pastes can additionally be added which give the silicone the red colour (for example RAL 3020) or red-violet (RAL 4002) colour.

When producing the silicone head according to the invention, a platinum-catalysed addition crosslinking can also be used. Here, it is advantageous that here there is no smell or taste to the silicone, and a quick vulcanisation and thus short cycle times can be achieved.

According to a development of the invention, a stimulation apparatus is provided, wherein the housing is completely or partially encased by a layer made of silicone, rubber or vinyl. Thus, further parts of the stimulation apparatus can also be formed to be haptically advantageous in order to facilitate further kinds of handling or holding with the hand.

According to a development of the invention, a stimulation apparatus is provided, in which a cup-shaped (or half-open) cap, which can be applied to or fitted on the housing, such that the cap covers at least the opening of the hollow space, is provided.

Such a cap improves the transportability and the hygiene of the stimulation apparatus, since the opening of the hollow space is covered. Since the opening of the hollow space is regularly used in the private parts, the cap according to the invention protects the opening, and thus also the hollow space, from dirt ingress. If the front end of the stimulation apparatus is also formed from (soft) silicone, then this end is sensitive towards mechanical loads. Thus, the cap also protects the front end of the stimulation apparatus from mechanical damages.

The cap according to the invention can have a cross-sectional shape which corresponds to the external cross-sectional shape of the housing. For example, the cross-sectional shape of the cap can be of equal thickness, round, oval or in the form of a regular polygon.

According to a development of the invention, a stimulation apparatus is provided, wherein the cap according to the invention is dimensioned in such a way that it can be put or placed on the stimulation apparatus up to a stop, such that the front end and the central section are covered (preferably completely) by the cap.

Thus, advantageously, not only the opening and the front end of the stimulation apparatus can be covered and protected by the cap, but also the grip regions, which can also consist of sensitive silicone or are coated with rubber.

According to a development of the invention, a stimulation apparatus is provided, wherein the housing is set up in such a way that it is provided to be waterproof, preferably IP67, and the hollow space of the pressure field generation device is provided to waterproof, preferably IP67, in comparison to the inside of the stimulation apparatus.

Thus, the hollow space in particular, in comparison to the rest of the inside of the stimulation apparatus, is sealed in such a way that it corresponds to the (standardised EU) IP67 specifications. This is therefore possible with the stimulation apparatus according to the invention, since the hollow space according to the invention has only one single opening to the outside of the housing, and, on the other hand, no opening (for example via a valve) into the (further) housing interior With such a sealing according to IP67, further usage possibilities of the stimulation apparatus, for example in a swimming pool, open up, wherein, because of the relatively high IP classification, the reliability of the apparatus is also ensured. Furthermore, all bushings possibly present for the current supply are to be sealed, for example by means of corresponding plugs which can be inserted in the bushings.

According to a development, the hollow space of the pressure field generation device has at least one first chamber and at least one second chamber having the opening for placing over the erogenous zone and at least one connection element having at least one opening into the second chamber, wherein the connection element connects the first chamber to the second chamber; and wherein the drive unit can change the volume of the first chamber by displacing the flexible wall in such a way that the pressure field is generated via the connection element in the second chamber, said pressure field serving for stimulation.

According to a development of the invention, a system having a stimulation apparatus and a bracket for storing and charging the stimulation apparatus is provided, wherein the charging bracket has an (inductive) bracket-side charging coil, and the stimulation apparatus has a complementary stimulation-device-side charging coil, and the battery of the stimulation apparatus can be charged by means of inductive coupling of these charging coils when the stimulation apparatus is deposited in or on the loading bracket, wherein the stimulation apparatus does not have any bushing for supplying current.

This allows a wireless or cable-less charging of the stimulation apparatus according to the invention. In this case too, no connections of the stimulation apparatus are necessary in order to provide it with energy, for example in order to charge its battery. The stimulation apparatus is then formed to be free from bushings or connector free.

According to a development of the invention, a system having a stimulation apparatus, as is described above, is provided, wherein the bracket-side charging coil and the stimulation-device-side charging coil are arranged in such a way that these are arranged to be adjacent to each other when the stimulation apparatus is deposited in or on the charging bracket.

According to a development of the invention, the stimulation apparatus is set up without a pistol grip.

According to a development of the invention, the stimulation apparatus is set up without valves.

Furthermore, the use of the stimulation apparatus for sexual pleasure and not for medical or therapeutic purposes is proposed.

In the present invention, the methods described below in more detail serve for stimulation of erogenous zones for sexual pleasure, therefore the methods do not serve for medical, for example therapeutic, purposes.

According to a further aspect of the invention, the use of the stimulation apparatus according to the invention as a sex toy for stimulating the female clitoris is proposed according to a further aspect of the invention. As explained at the start, the female clitoris is a particularly sensitive erogenous zone for the woman, which is why the use according to the invention of an indirect positive pressure stimulation in combination with a negative pressure stimulation for the clitoris seems to be particularly advantageous for stimulating to orgasm or to the sexual high point.

According to a development, the stimulation apparatus, preferably in the front end and the central section, is formed uniformly. Here, uniformly means, in particular, that the transitions between the individual housing sections are formed to be gap-free. Preferably, the transitions from the front end to the central section (and vice versa) are seamless or gap-free, or at least retain their shape. This improves the hygiene and the operability of the stimulation apparatus.

The previously described features and functions of the present invention and further aspects and features are subsequently described further by means of a detailed description of preferred embodiments with reference to the attached figures. In the figures, the same features/elements and features/elements with the same function are characterised by the same reference numerals.

BRIEF DESCRIPTION OF THE DRAWINGS

Shown is/are:

FIG. 16 a side view of a lying stimulation apparatus according to the invention of a seventh embodiment with an open cap;

FIG. 17 a side view of a standing stimulation apparatus according to the invention of a seventh embodiment without a cap;

FIG. 18 a view of a stimulation apparatus according to the invention of a seventh embodiment, from the front;

DESCRIPTION OF PREFERRED EMBODIMENTS AND ASPECTS OF THE INVENTION

Figure 1:
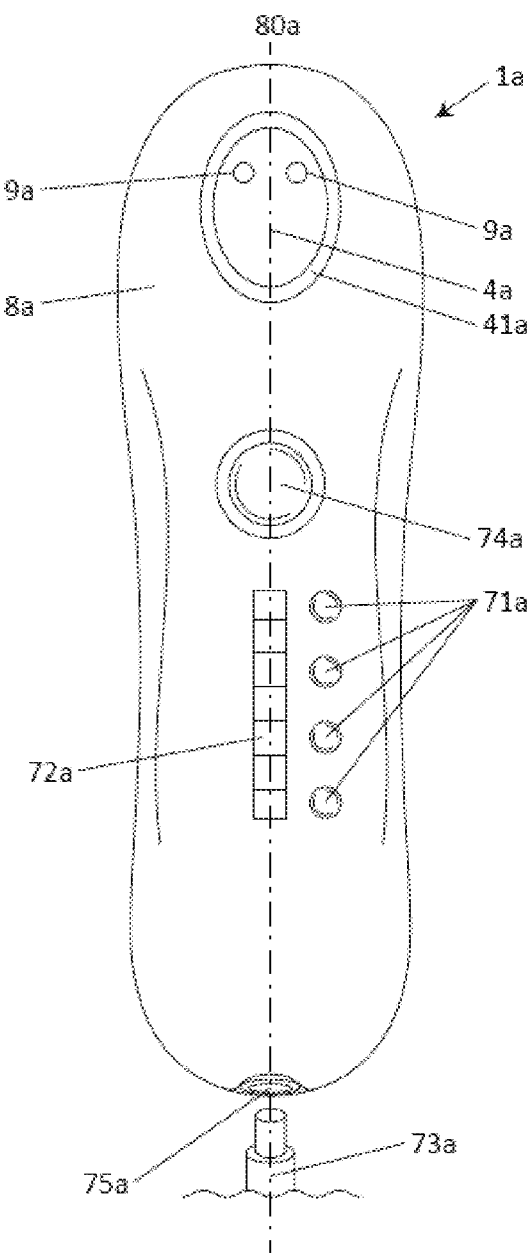
FIG. 1 a front view of an embodiment of a stimulation apparatus of the prior art.
Figure 2:
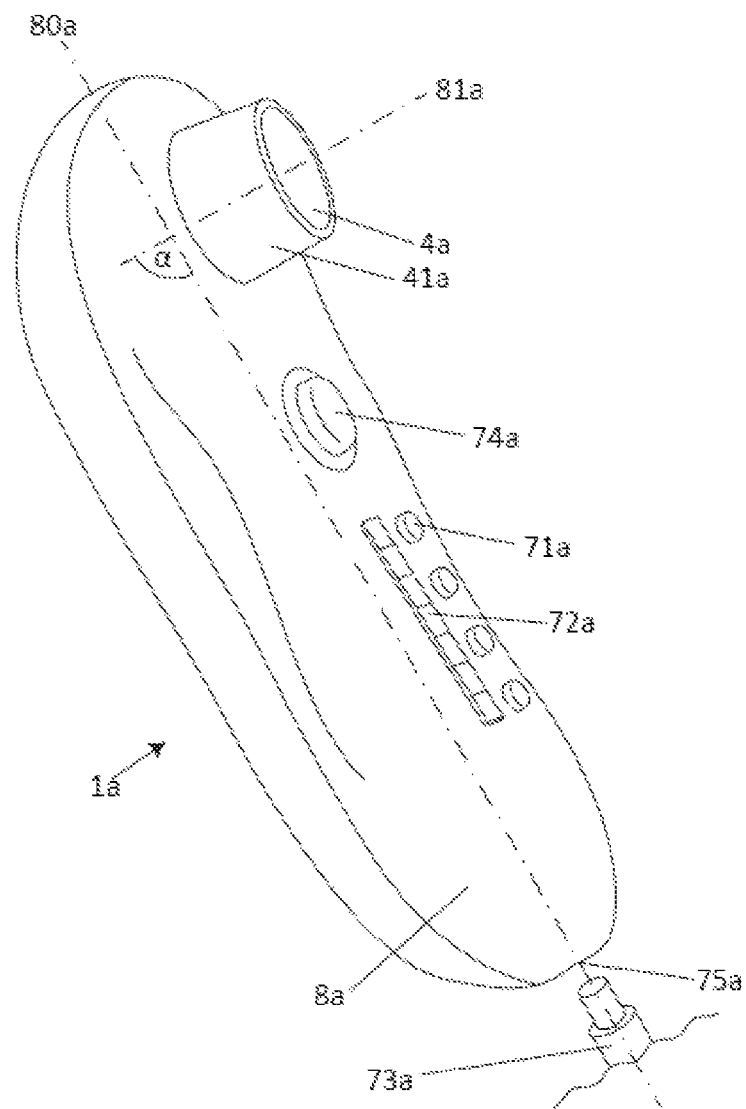
FIG. 2 a perspective side view of a stimulation apparatus of the prior art.

In the section below, the same or identical features, which have already been described in more detail in terms of the preceding embodiment or with reference to a preceding aspect are not explained again in order to avoid repetitions. The same reference numerals refer, in general, to the same features, or those with a corresponding function.

With reference to FIG. 7 *a*), a side view of a stimulation apparatus 1 according to the invention of a first embodiment and, with reference to FIG. 7 *b*), a view of the stimulation apparatus 1 according to the invention of FIG. 7 *a*) from behind are explained in more detail.

FIGS. 7 *a*) and 7 *b*) show an elongate and rod-shaped stimulation apparatus 1 having a housing 8 (for example made of ABS plastic), and a front end 90, a back end 91, wherein the stimulation apparatus 1 is formed to be circular in terms of its cross section or in terms of the external contour in its cross-section plane. In the back end, an on/off switch 74 is provided, which optionally has a lighting element for displaying the switching state. An optional display 72 can relay the current setting of the modulation pattern or the strength of the stimulating pressure field. A central section 88 is optionally coated with silicone, while a gripping surface 89 (and a further gripping surface 89 on the side facing away that is not depicted in more detail) in the form of an elongate oval surface (for example as a Lamé oval) determines the preferred placement position for the finger and ensures a good hold for the finger. These gripping surfaces 89 can be shown by colour, for example, or an additional rubber coating can be applied on the surface of the central section 88.

A cup-shaped cap 85 that is complementary to the front end 90 or that fits in terms of shape is formed in such a way that—much like a cap of a pen—it can be placed on the front end 90. The cap 85 covers (and protects) the front head or the wall 41 and the opening 42 of the stimulation apparatus 1 in the placed-on state and reaches up to the transition or the intersection of the wall 41 on the front end 90 relative to the central section 88 in the longitudinal direction.

Preferably, the outer diameter of the cap 85 in the transverse direction is the same as the outer diameter of the housing 8 in the transverse direction.

The opening 42 of the stimulation apparatus 1 is arranged in the front end 90, wherein the longitudinal axis 80 penetrates the opening 42. The directions "to the front" and "to the back" are correspondingly shown by the arrows in the Figure. The front end 90 is the "active" end which is used for the stimulation by means of the pressure field.

The opening 42 is formed to be chamfered or at an angle in relation to the longitudinal axis 80, which is why the opening plane 83 (which is defined by the outer edges of the opening) is intersected by the longitudinal axis 80 at an angle δ. This angle is preferably 60 degrees (±5 degrees). The axis labelled with the reference numeral 81 depicts the alignment axis 81 of the hollow space 10 of the stimulation apparatus 1 according to the invention. Thus, the hollow space 10 and the opening 42 are formed in terms of flow in the region of the opening 42 in such a way that the pressure field has preferred directions in term of flow (of the forward and backward movement of the medium) at the opening 42 of the housing 8 along the alignment axis 81 in the non-placed state of the stimulation apparatus 1.

The on/off switch 74 can preferably be formed to be embedded in the housing 8 so that it does not protrude from the housing 8.

Figure 7A:
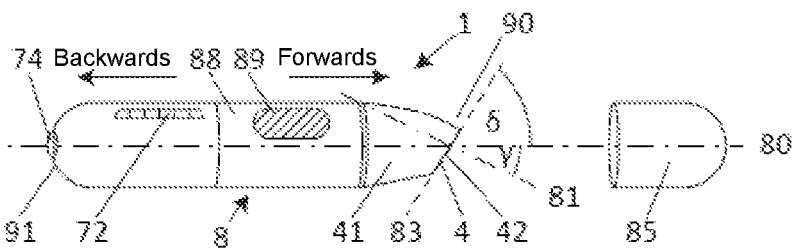
FIG. 7a a side view of a stimulation apparatus according to the invention of a first embodiment.
Figure 7B:
FIG. 7b a view of the stimulation apparatus according to the invention from FIG. 7a, from behind.

The longitudinal axis 80 is an imaginary line between the front end 90 and the back end 91, which presently also depicts the axis of symmetry for the basic shape of the housing 8 in FIGS. 7*a* and 7*b*. In these symmetry considerations, operating elements 74, displays 72 or gripping surfaces 89 are not taken into consideration, and represent only marginal adjustments of the basic shape of the housing 8.

The alignment axis 81 preferably intersects the longitudinal axis 80 at an angle γ of about 30 degrees, while the opening plane 83 is arranged at a right angle to the alignment angle 81.

Thus, the stimulation apparatus 1 according to the invention has a compact, narrowly elongate construction. This leads to weight savings and an ergonomic operability of the apparatus 1. Preferably, the stimulation apparatus 1 of FIGS. 7 *a*) and 7 *b*) is implemented to be waterproof (IP67). Therefore and because of the simple external shape of the stimulation apparatus 1, it is easy to clean.

Figure 8A:
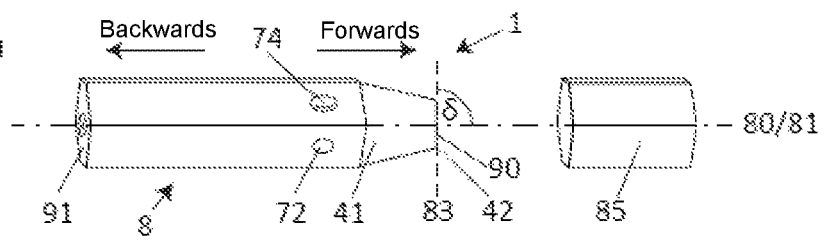
FIG. 8a a side view of a stimulation apparatus according to the invention of a second embodiment.
Figure 8B:
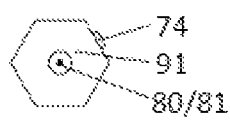
FIG. 8b a view of the stimulation apparatus according to the invention from FIG. 8a, from behind.

With reference to FIG. 8 *a*), a side view of a stimulation apparatus according to the invention of a second embodiment and, with reference to FIG. 8 *b*), a view of the stimulation apparatus according to the invention of FIG. 8 *a*) from behind are explained in more detail.

The second embodiment has a regular hexagonal housing 8 which has a flat back end 91. Thus, this housing 8 can be advantageously picked up or put down as well, without it rolling away. The housing shape thus serves as roll prevention. The opening plane of the opening 42 in the front end 90 of the housing 8 is arranged to be at a right angle (cf. angle δ) to the longitudinal axis 80. In this embodiment, the alignment axis 81 coincides with the longitudinal axis 80. The on/off switch 74 and the display 72 are arranged to be adjacent to the front end 80. The cap 85 is formed analogously to the first embodiment and fits correspondingly to the housing shape of the housing 8 of the second embodiment.

Figure 9A:
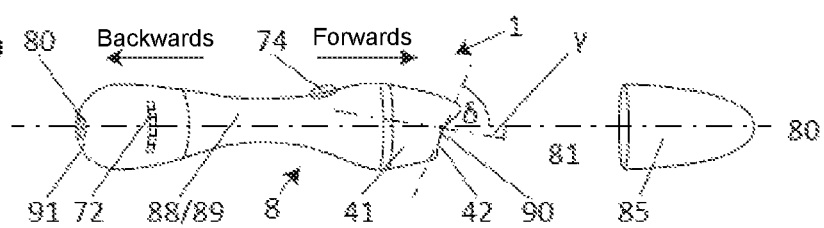
FIG. 9a a side view of a stimulation apparatus according to the invention of a third embodiment.
Figure 9B:
FIG. 9b a view of the stimulation apparatus according to the invention from FIG. 9a, from behind.

With reference to FIG. 9 *a*), a side view of a stimulation apparatus according to the invention of a third embodiment and, with reference to FIG. 9 *b*), a view of the stimulation apparatus according to the invention of FIG. 9 a) from behind are explained in more detail.

The housing 8 of this embodiment is formed to be somewhat centrally waisted, and tapers correspondingly towards the centre. The two swellings or bulges—as considered in the longitudinal direction of the housing 8—to the left and right of the central tapering preferably both have the same maximum radius in the transverse direction. The housing 8 thus has a shape similar to that of a dog bone.

The cross-sectional shape of the housing 8 is approximately oval, and is preferably retained with the same width/height ratio across the entire length of the housing 8. This leads to the housing 8 lying comfortably in the hand, and not easily rolling away if the stimulation apparatus 1 is put down.

At the same time, the central section 88 forms the gripping surface 89 over its entire surface, wherein this preferably provides a rubbery coating. Furthermore, the central section 88 is formed via wide parts of the housing 8 in the longitudinal direction. In synergy with the waisted shape of the housing 8, this leads to an ergonomic handling of the housing 8, since the housing 8 comes to rest in the narrow region in the middle in or on the hand, when the housing 8 is guided in the manner of a writing device. In addition, thumb and index finger rest on the front swelling of the housing 8 in this gripping position, which is more ergonomic.

In addition, the stimulation apparatus 1 has the swelling or pommel-like cross-section enlargement on the back end 91. This advantageously leads to the stimulation apparatus 1 having a kind of "pommel" or "head" on the back end 91, at which point the stimulation apparatus 1 can be held comfortably in a closed hand (for example in a fist hold), which also represents an ergonomic holding.

Alternatively, the swelling of the housing 8 can have a larger maximum radius in the transverse direction on the back end 91, like the front swelling.

The opening 42 of the hollow space of the stimulation apparatus 1 has a slightly concave opening plane, since the front end of the opening 42 runs slightly wavy or wave-shaped in the front end 90 of the housing 8. In this case, the emerging opening plane is also slightly concavely curved or arched. Such a curvature of the opening plane leads to the opening 42 being able to be placed more pleasantly over the area of skin that is also (slightly) curved or not even, said area of skin surrounding the female clitoral glans. Thus, the opening plane 42 is adjusted in terms of its shape to the anatomy of the clitoris in such a way that the opening 42 can be placed in a form-fitting manner or fitting to the area of the skin which surrounds the clitoral glans without significant pressing pressure. The angle of intersection δ of the opening plane 83 with the longitudinal axis 80 is determined in terms of the intersection point with the longitudinal axis 80, and is the smallest possible angle. An angle range of about 65 to 75 degrees was experimentally determined as the optimal angle δ for the use of such a curved opening plane 83 for using on the clitoris 12.

The cap 85 is formed to be analogous to the first embodiment, and fits correspondingly to the housing shape of the housing 8 of the third embodiment.

The angle of intersection γ between the alignment axis 81 and the longitudinal axis 81 is a pointed angle. Preferably, this is about 3 to 12 degrees, which, after experiments, has generally been proven to be a more pleasant angle range for handling for the user.

With reference to FIG. 10 a), a side view of a stimulation apparatus according to the invention of a fourth embodiment is explained in more detail and, with reference to FIG. 10 b), a view of the stimulation apparatus according to the invention of FIG. 10 a) from behind is explained in more detail.

Figure 10A:
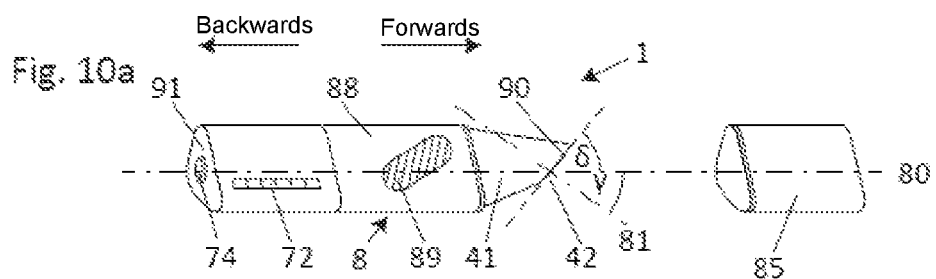
FIG. 10a a side view of a stimulation apparatus according to the invention of a fourth embodiment.
Figure 10B:
FIG. 10b a view of the stimulation apparatus according to the invention from FIG. 10a, from behind.

FIG. 10a shows a housing that is triangular in terms of its cross-section, which is formed to be elongate. Preferably, the external shape is designed to be of equal thickness in the cross-section direction to save material and weight. Thus, on the one hand, a very light and compact housing can be realised, while on the other hand, a triangular housing of equal thickness fits well to the anatomy when holding the housing 8 with thumb and index finger in the manner of a writing device, and is therefore ergonomic.

The on/off switch, in turn, is realised to be embedded in the back end 91 of the housing 8 so that the apparatus 1 can be placed upright on a table for example, by means of the flat back end.

The gripping surfaces 89 (one of which is not depicted in more detail, since this is arranged to be covered on the side of the triangle that is of equal thickness that is facing away) are realised to be elongate ovals, and arranged in such a way that they constitute the support surface of the finger on the housing 8 when the housing 8 is guided in the manner of a writing device. The two gripping surfaces are thus arranged to be asymmetrical. The gripping surface 89 depicted in FIG. 10a is provided for the thumb of a left-handed person. The gripping surface not depicted in more detail would be arranged to correspond to the (imaginary) position of an index finger on the other side of the triangle in an elongate oval shape rather than in the direction of the longitudinal axis 80 of the housing 8. Thus, the gripping surfaces can be adjusted in terms of their flat arrangement fundamentally to the anatomy of the hand and the finger of the users (particularly preferably after determining whether the present user is right-handed or left-handed).

In addition, the gripping surfaces 89 can also be formed as trough-shaped indents in the central section 89. Alternatively, the gripping surfaces 89 can have corresponding rubber coatings in order to improve the grip of the apparatus.

The cap 85 according to the invention is formed to be analogous to the first embodiment, and fits correspondingly to the housing shape of the housing 8 of the third embodiment and continues the housing shape in the longitudinal direction 80.

Figure 11A:
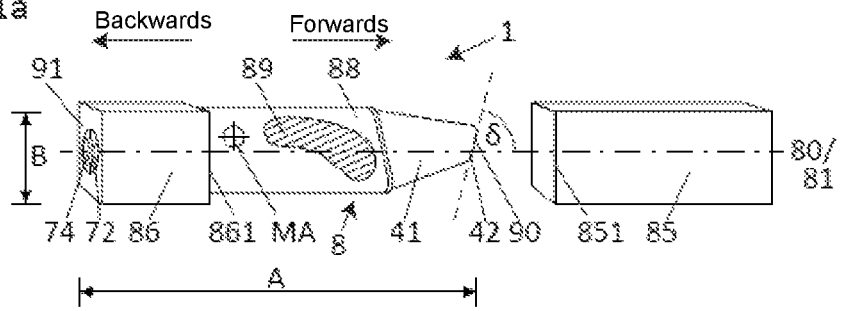
FIG. 11a a side view of the stimulation apparatus according to the invention of a fifth embodiment.
Figure 11B:
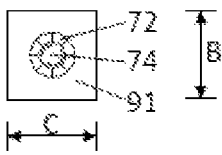
FIG. 11b a view of the stimulation apparatus according to the invention from FIG. 11a, from behind.

With reference to FIG. 11 a), a side view of a stimulation apparatus according to the invention of a fifth embodiment and, with reference to FIG. 11 b), a view of the stimulation apparatus according to the invention of FIG. 11 a) from behind are explained in more detail.

In the fifth embodiment, the external shape of the cross-section changes at the transition between the central section 88 to a back section 86. The central section 88 is preferably implemented to be triangular in terms of its cross-section, having rounded corners or edges (in particular of equal thickness; alternatively, the central section 88 of this embodiment can also be formed to be round or oval). The back section 86 is preferably formed to be cuboid or square in terms of cross-section (alternatively, it can be formed to be rectangular or even spherical; the latter leads to forming a ball or button-shaped holding pommel on the back end 91 of the stimulation apparatus 1). Here, these parts are preferably arranged in the back section 86 of the housing 8, said parts being heavy or having a high weight, for example the battery. Thus, the centre of mass MA of the housing 8 of the stimulation apparatus 1 is further placed towards the back in the direction of the back end 91, which leads to better handling.

The ratio of length A to width B (which is the same as height C) of the housing is preferably ≥3.5 (three point five), in particular a 3.9 (three point nine). Because of this elongate embodiment, the housing 8 can be handled more easily and more ergonomically.

The display 72 is implemented on the back end 91 of the housing 8 in the form of an LED display surrounding the on/off switch. Thus, the user intuitively associates the display of the switching state with the corresponding on/off switch, and vice versa.

Thus, the fifth embodiment is preferably characterised in that the external contour of the housing 8 changes from the central section 88 to the back section 86. In other words, the fifth embodiment is preferably characterised in that the central section 88 has a different external contour to that of the back section 86.

In comparison to the caps 85 of the first to the fourth embodiment, the cap 85 of the fifth embodiment is formed to be longer. When the cap 85 of the fifth embodiment is placed on the housing 8, then not only the front end 90 is surrounded by the wall 42, but also the central section 88. Thus, the edge 851 of the cap 85 abuts on the edge 861 of the back section 86, when the cap 85 is placed on the housing 8. If this cap 85 is placed on completely, then the stimulation apparatus 1 provides a uniform, elongate cuboid impression, on the basis of which it is not immediately recognisable what the purpose is of the apparatus 1 contained. Therefore, in the present discrete, light and compact design of the stimulation apparatus 1, the stimulation apparatus 1 can be taken in the handbag in a discrete and hygienic manner, for example.

The angle δ between the plane of the opening 42 of the hollow space and the longitudinal axis 80 is about 80 degrees, preferably about 80 to 90 degrees, in particular about 90 degrees.

In the fifth embodiment, the alignment axis 81 can further preferably coincide with the longitudinal axis 80, i.e. these are preferably arranged coaxially relative to each other.

Below, with reference to FIG. 12 a), a side view of a stimulation apparatus according to the invention of a sixth embodiment, with reference to FIG. 12 b), a view of a stimulation apparatus according to the invention of the sixth embodiment from the front, and, with reference to FIG. 12 c), a view of a stimulation apparatus according to the invention of the sixth embodiment from behind, and, with reference to FIG. 13, a perspective view of a 3D wireframe model of the sixth embodiment of the stimulation apparatus according to the invention are explained in more detail.

In terms of its basic principle, this sixth embodiment is similar to the fifth embodiment, to which reference is made.

Figure 12A:
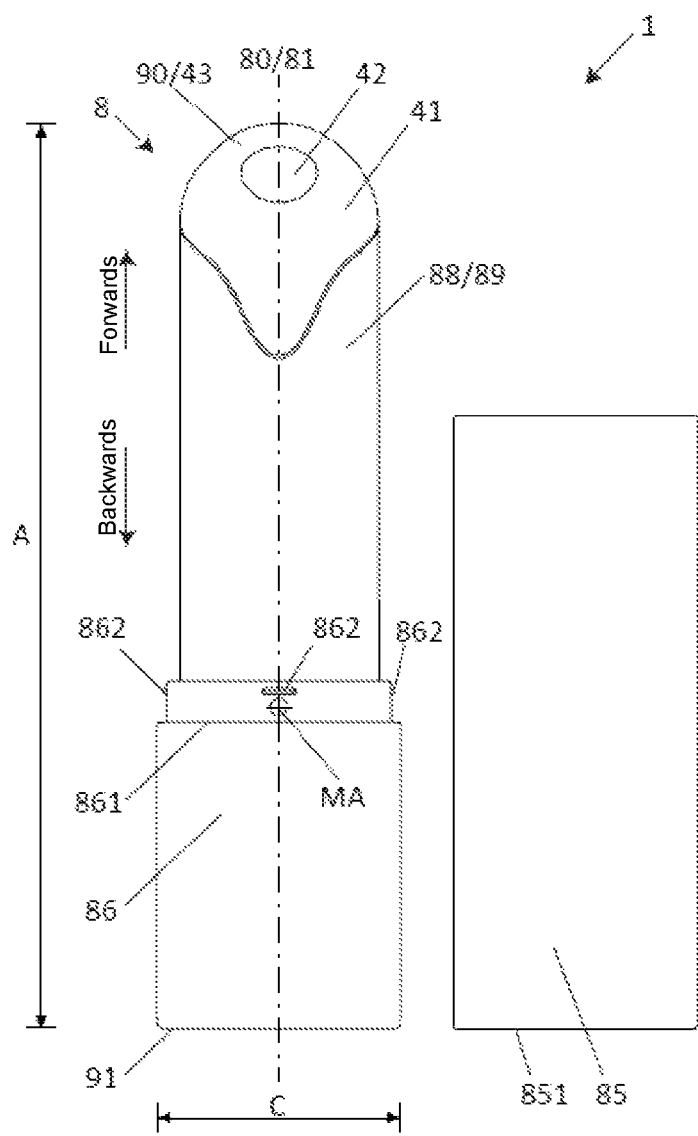
FIG. 12a a side view of a stimulation apparatus according to the invention of a sixth embodiment.

An elongate housing 8, which is presently depicted standing upright in FIG. 12a, extends along a longitudinal axis 80 and has the opening 42 of a second chamber 4 on the front end 90. Furthermore, the housing on the front end 90 has a (flat) resting region 43 which comes into contact with the skin.

Latching closures 862 are provided for fixing the cuboid and hollow cap 85, said latching closures 862 latching when the cap 85 is pushed over the front end 90 and over the central section 88 of the housing 8 up to the opposite contact of the stop edges 861 and 851. In FIG. 12a, the cap 85 is depicted next to the housing 8 only for simplification.

The centre of mass MA of the stimulation apparatus 1 is in the back section 86, whereby this can be handled better. Furthermore, the centre of mass is preferably set up in such a way that it is in on the longitudinal axis 80. This also improves the handling of the stimulation apparatus 1, since the lateral tipping moments are reduced or avoided. In addition, the previously explained position of the centre of mass could be calibrated or set up by means of additional (small) weight elements inside the housing 8.

The longitudinal axis 80 represents an axis of symmetry for the cap 85, for the back section 86 and for the central section 88.

For example, the housing is about 4 cm wide (reference numeral C), and about 12 cm long (reference numeral A). Alternatively, the housing is about 3 cm wide, for example, (reference numeral C) and about 12.5 cm long (reference numeral A). Thus, it has been shown in the development of the stimulation apparatus that the resulting internal volume of the housing with the previous alternative dimensions of the housing 8 has precisely sufficient space in order to receive the components (motor, battery, control device etc.) of the stimulation apparatus 1.

Figure 12B:
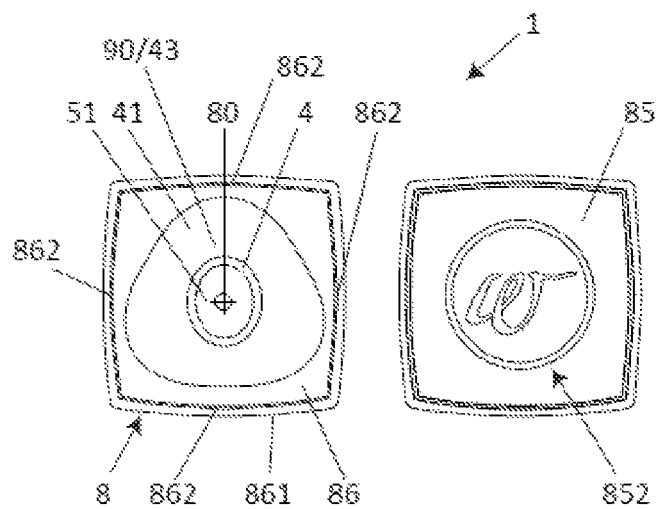
FIG. 12b a view of a stimulation apparatus according to the invention of a sixth embodiment, from the front.
Figure 12C:
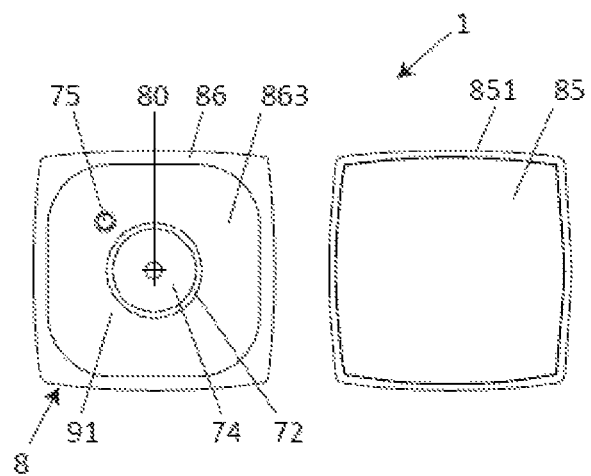
FIG. 12c a view of a stimulation apparatus according to the invention of a sixth embodiment, from behind.

With reference to FIG. 12 b), which shows a view of the stimulation apparatus 1 (or on the left side of FIG. 12 b), the housing 8 and on the right side of FIG. 12b, the cap 85) from in front, the external contour of the central section 88 and the head of the stimulation apparatus 1 having the opening 42 can be seen. These are implemented to be approximately of equal thickness, which leads to the corresponding advantages that have been described previously.

The opening 51 of the connection element 5 into the second chamber 4 is formed to be oval. The second chamber is arranged along the longitudinal axis 80 in such a way that the alignment axis 81 of the hollow space according to the invention is in parallel to (preferably coaxially with) the longitudinal axis 80 of the housing 8. The second chamber 4 is provided having its corresponding wall 41 to be able to be placed or exchanged. The opening 42 of the second chamber 4 is implemented to be oval. The second chamber 4 widens in terms of flow of a diffuser from the opening 51 in the direction of the opening 42, in order to facilitate the formation of the positive pressure of the pressure field according to the invention.

Furthermore, in FIG. 12 b), on the right-hand side, a top view of the cap 85 according to the invention is depicted. This has a square base cross-section, which is designed to be slightly bulged. In the middle on the end surface of the cap, space is provided for a logo 852.

FIG. 12 c) shows a view from behind of the stimulation apparatus 1 (or, on the left-hand side, a back view of the housing 8 and, on the right-hand side, a back view into the cap 85). On the back side of the housing 8, in the middle within a repositioned or embedded end surface 863, an on/off switch 74 having a corresponding light ring 72 is provided as a display. Furthermore, a bushing 75 for the connection of a current supply is provided. This bushing can be closed with a correspondingly sealing stop.

Figure 13:
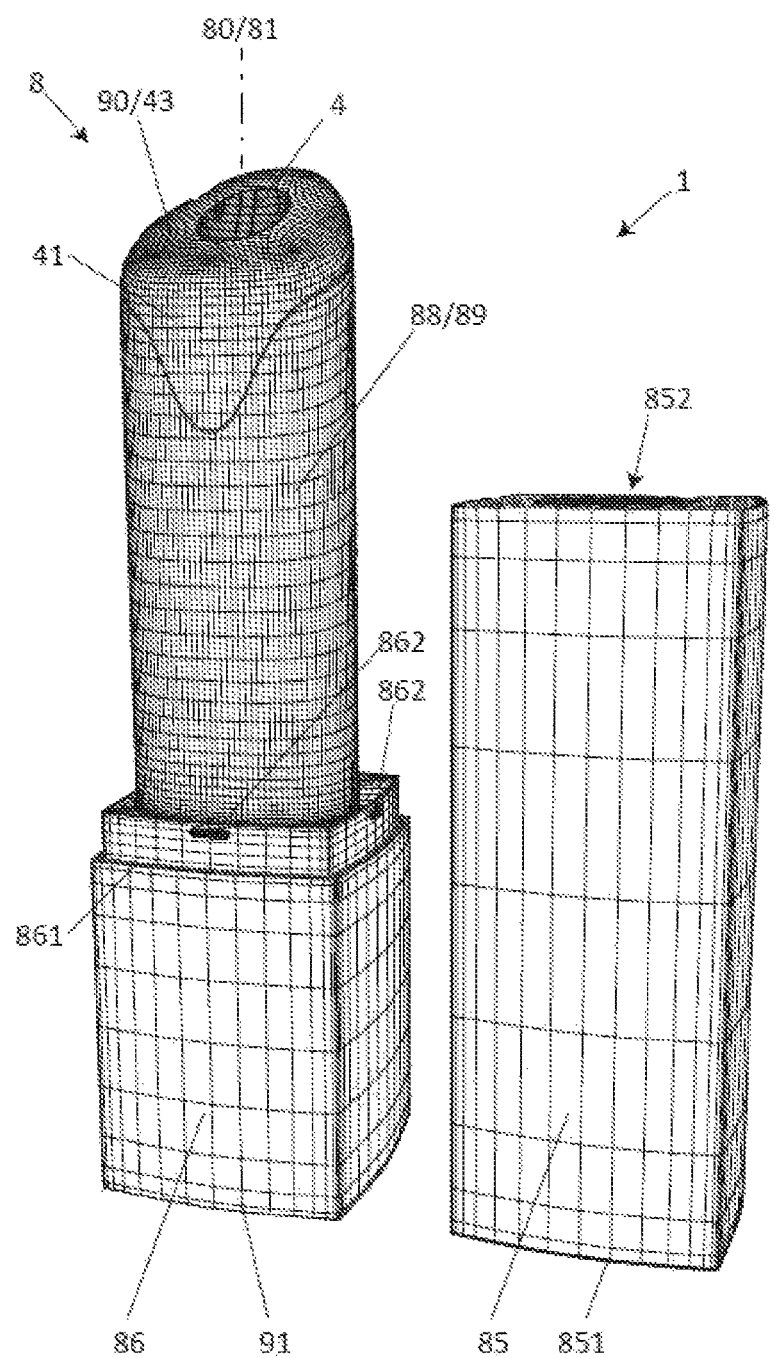
FIG. 13 a perspective view of a 3D wireframe model of the sixth embodiment of the stimulation apparatus according to the invention.

The perspective view of the sixth embodiment of FIG. 13 represents, in particular, the slightly slanted, widely implemented front surface of the wall 41 of the pressure field generation device 2. With the preferably widened support surface 43 or the placing region 43 of the wall 41 for placing over the clitoris, the pressure is distributed across the surface, which is more pleasant during use. Thus, the usual relatively sharp and uncomfortable edges of openings of stimulation apparatuses of the prior art are replaced by the resting surface 43 or the placing region 43 according to the invention, which has a surface which is arranged (approximately) in parallel to the opening plane 83 and completely surrounds the opening 42.

Figure 14:
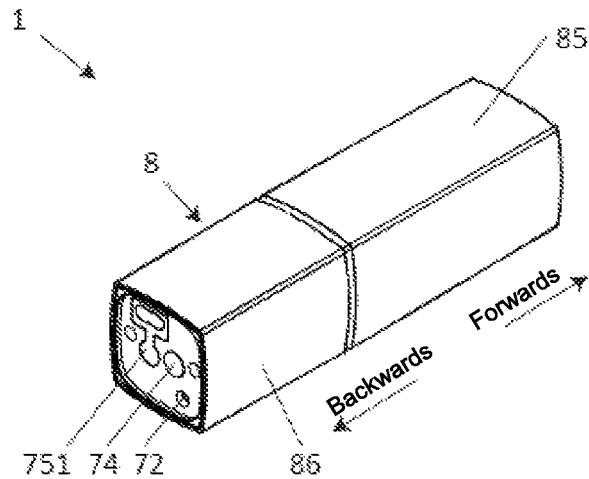
FIG. 14 a perspective view of a stimulation apparatus according to the invention of a seventh embodiment with a closed cap.
Figure 15:
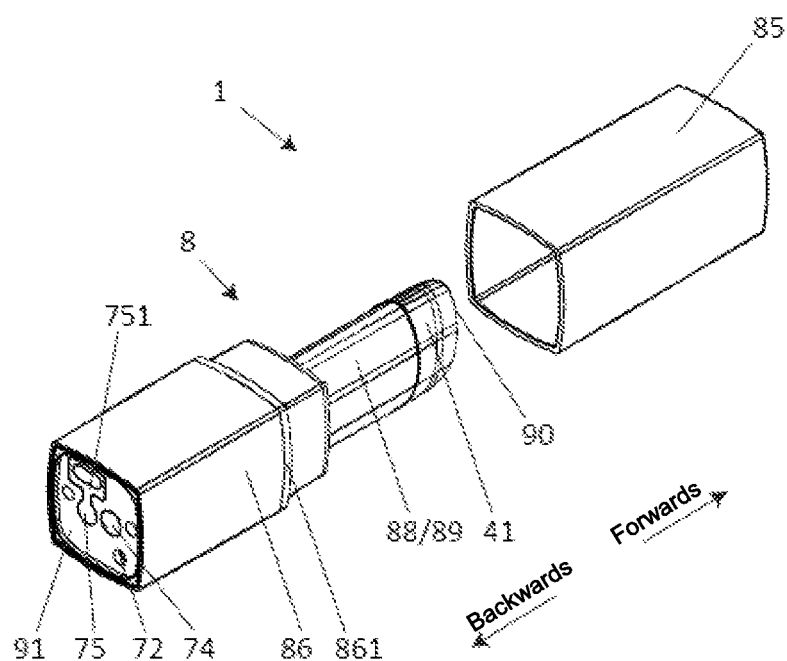
FIG. 15 a perspective view of a stimulation apparatus according to the invention of a seventh embodiment with a cap open forwards.

With reference to FIGS. 14 to 18, a seventh embodiment of the present invention is explained in more detail. FIG. 14 shows a perspective view of a stimulation apparatus according to the invention of a seventh embodiment having a closed cap. FIG. 15 shows a perspective view of a stimulation apparatus 1 according to the invention of the seventh embodiment having an opened cap. FIG. 16 shows a side view of a (lying) stimulation apparatus according to the invention of the seventh embodiment having an opened cap. FIG. 17 shows a side view of a (standing) stimulation apparatus according to the invention of a seventh embodiment without a cap. FIG. 18 shows a view of the stimulation apparatus according to the invention of the seventh embodiment from the front.

The seventh embodiment is provided to be very similar to the sixth embodiment. Therefore, only the differences relative to one another are explained in more detail below.

In the back end 19, the bushing 75 for the current supply having a latch-like plug-bushing closure 751 (preferably made of silicone or rubber) is set up in such a way that the closure 751 can seal or caulk the bushing in a waterproof manner (IP 67).

The display 72 is implemented in the form of a transparent viewing panel and an LED behind it. The on/off switch is preferably simultaneously the operating element, by means of which the modulation of the pressure field can be set. Thus, the stimulation apparatus is switched on or off by means of a long press in each case, whereas a short press changes the modulation.

The central section 88 is implemented to be approximately of equal thickness and coated with silicone. Thus, the whole central section 88 constitutes a coherent gripping surface 89. The wall 41 is continued in a seamless or transition-free manner by means of the central section 88, wherein the head and the central section 88 of the housing 8 has the same external contour in cross-section.

With reference to FIGS. 16 and 17, it can be seen that the back section 86 tapers forwards in a step-like manner, in particular so that the cap 85 can be placed on the housing 8 in a form-fitting manner. The head of the stimulation apparatus is implemented to be slanted or slightly curved, wherein the opening plane 83 of the opening 42 intersects the longitudinal axis 80 at an angle δ. The angle δ of this embodiment is about 60 degrees (60 degrees ±10 degrees). Preferably, the angle δ of this embodiment ranges from about 40 to 70 degrees, in particular ranges from about 55 to 65 degrees.

The longitudinal axis is presently an axis of symmetry for the cap 85 and the basic shape of the back section 86 of the housing.

The centre of mass MA is preferably in the back section 86 of the housing 8.

FIG. 18 shows a view of the housing 8 of the seventh embodiment from the front. Thus, the opening 51 inside the hollow space is formed to be circular in the cross-sectional direction. Furthermore, a widened resting surface 43, which intersects the opening plane 83 at a slight angle, is provided. The opening 42 is, in turn, provided to be oval.

Figure 19:
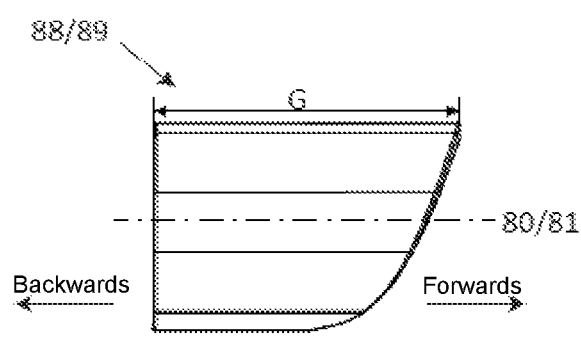
FIG. 19 a side view of a gripping part according to the invention of the seventh embodiment.
Figure 20:
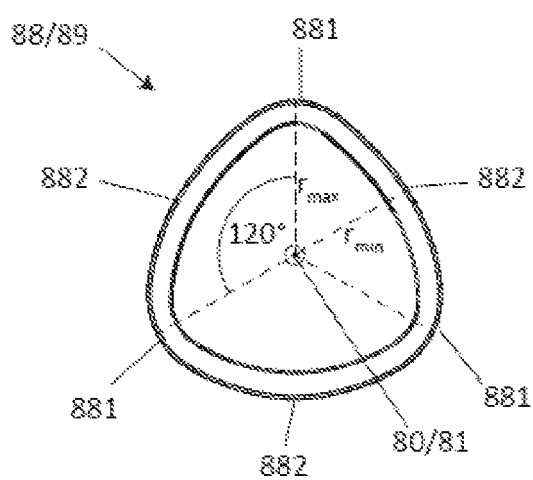
FIG. 20 a sectional view of a gripping part according to the invention of the seventh embodiment in the transverse direction of the housing FIG. 21 a schematic cross-section through a pressure field generation device of an aspect of the present invention.

With reference to FIG. 19, a side view of a central section 88 or a gripping part having a gripping surface 89 according to the invention of the seventh embodiment is explained in more detail and, with reference to FIG. 20, a sectional view in the cross-sectional direction of the housing of the central section 88 according to the invention or a gripping part having a gripping surface 89 of the seventh embodiment is explained in more detail. Thus, the central section 88 is preferably implemented in one piece as a single component of the stimulation apparatus 1.

The central section 88 has a length G which is at least 30%, preferably at least 40% of the total length A of the housing 8 (which is measured without the cap 85).

The external contour of equal thickness which is shown (cf. FIG. 20, reference numerals 882 and 881) of the central section 88 does not have any sharp outer edges or hard corners in the longitudinal direction in comparison to Reuleaux triangles, but is implemented to be rounded throughout (cf. reference numeral 881). The total diameter of the central section 88 is r-min at each point plus r-max.

The longitudinal axis 80 of the housing 8 constitutes a central axis for the central section 88.

Figure 21:
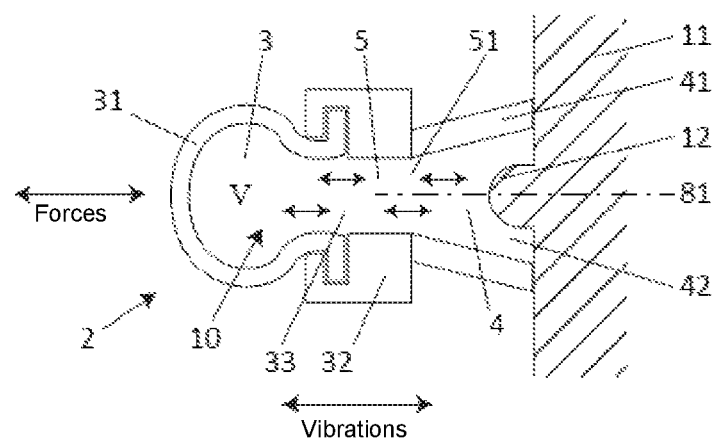

With reference to FIG. 21, a schematic cross-section is explained in more detail by a principal pressure field generation device of one aspect of the present invention.

A hollow space 10 forms an at least extensively closed unit (i.e. an at least closed volume) after placing the stimulation apparatus over the relevant body part 11 to be stimulated, preferably the clitoris 12. There is a medium, preferably air, in the hollow space.

This hollow space can be functionally divided into a first chamber 3, a second chamber 4 and a connection element 5.

Here, the term "first chamber 3" functionally refers to the part of the hollow space at which the drive unit 6 can act on the hollow space, for example by means of a regular volume change. Thus, the volume of the first chamber 3 is alternately enlarged and reduced.

The term "second chamber 4" further functionally refers to the part of the hollow space which has the opening 42 for placing over the erogenous zone, and in which the pressure field according to the invention can act on the erogenous zone or on the clitoris (or clitoral glans) 12. The chambers 3 and 4 according to the invention should thus not be understood in such a way that they constitute spaces or departments of the hollow space which are each completely separated in terms of structure. The two chambers 3 and 4 are connected via the connection element 5, for example in the form of a straight (and preferably rigid) channel (in terms of flow). Preferably, the connection element 5 can also represent only a slight tapering or narrowing in the form of an individual outlet opening or a wide channel between the two chambers 3 and 4 having two openings 33 and 51. The two openings preferably have a common central axis.

The first chamber 3 has a flexible wall 31 which can be supplied with and displaced by forces by means of the drive unit 6. The flexible wall 31 is fixed in a bracket 32. This bracket 32 preferably consists of a rigid plastic.

Because of the regular volume change by means of the drive unit 6, a flow system is formed in the hollow space 10.

In detail, the pressure field generation device 2 has an opening 42 for placing over the clitoris 12 and a flexible wall 31, wherein the pressure field generation device 2 is set up in such a way that, when the opening 42 is placed over the clitoris 12, an at least extensively closed flow system is formed in the pressure field generation device 2, and the drive unit 6 acts on the flexible wall 31 with forces during control in such a way that this is displaced away from the clitoris 12 in a first direction and towards the clitoris 12 in a second direction, in a temporally alternating manner, whereby media flows in the flow system of the hollow space 10 which are aimed towards the clitoris 12 and away from the clitoris 12 in a temporally alternating manner, are generated and a pressure field consisting of a pattern of negative and positive pressures which are modulated in relation to normal pressure is generated; and wherein the at least extensively closed flow system extensively or completely avoids a removal of bodily fluid from the pressure field generation device 2, such that the pressure field generated in the flow system of the pressure field generation device 2 stimulates the clitoris 12 for sexual arousal.

By means of the double arrows, the movement directions of small exemplary volume shares of the medium in the flow system according to the invention are depicted in FIG. 21, i.e. the flows according to the invention. Thus, these move forwards and backwards to correspond to the displacement of the flexible wall in parallel to the axis of the alignment 81 of the hollow space 10. Considered as a whole, a kind of media column or air column is thus cyclically moved forwards and backwards in the hollow space, wherein the pressure field according to the invention is formed to be adjacent to or on the clitoris (or clitoral glans). Furthermore, mechanical vibrations starting from the flexible wall 31 (induced by the acting forces and also introduced by the drive unit 6) are transferred via the bracket 32 and the wall 41 of the second chamber 4 in the direction of the body part 41 to be stimulated, which is seen as disturbing in certain circumstances.

Figure 22:
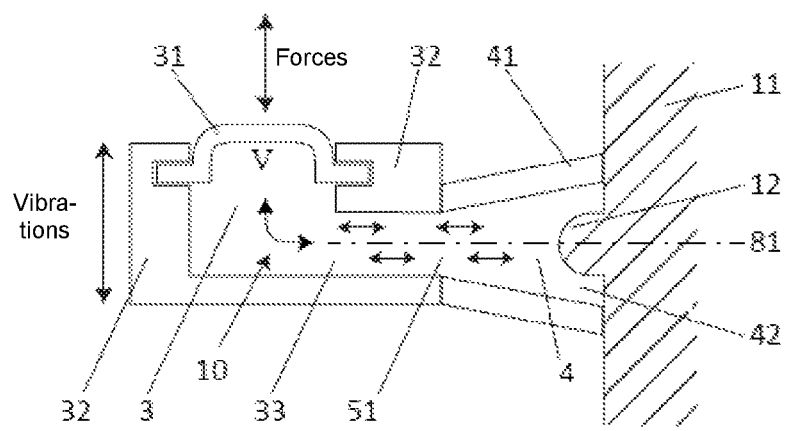
FIG. 22 a schematic cross-section through a pressure field generation device of a further aspect of the present invention.

With reference to FIG. 22, a schematic cross-section through a pressure field generation device of a further aspect of the present invention is explained which addresses the theme of the vibrations explained above.

The flow system of this aspect according to the invention is formed to have an angled shape. Thus, the flexible wall 31 is displaced at a right angle (or alternatively at a different angle of at least 45 degrees) relative to the alignment axis 81 of the hollow space 10. The corresponding vibrations thus no longer propagate in the direction of the body part to be stimulated, for example in the direction of the clitoris, but at an angle to it, as depicted in FIG. 22. When applying this aspect to the first to seventh embodiment, the vibration would thus have a (core) direction which is aligned in the transverse direction of the longitudinal housing 8. As a result, the disturbing vibrations in the longitudinal direction 80 of the stimulation apparatus 1 are reduced in the direction of the front end 90.

Figure 23:
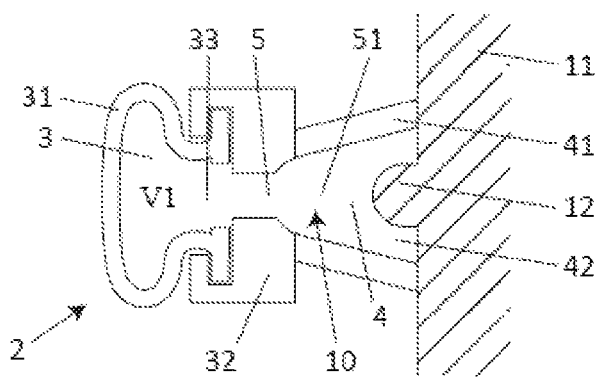
FIG. 23 a cross-section through a pressure field generation device of a further aspect of the present invention in the first state.
Figure 24:
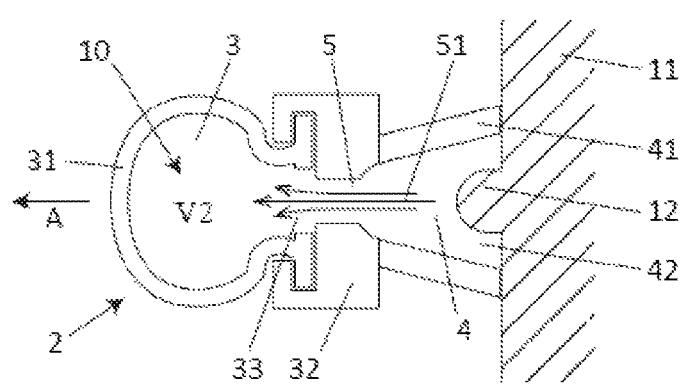
FIG. 24 a cross-section through a pressure field generation device of the aspect of FIG. 23 of the present invention in the second state.
Figure 25:
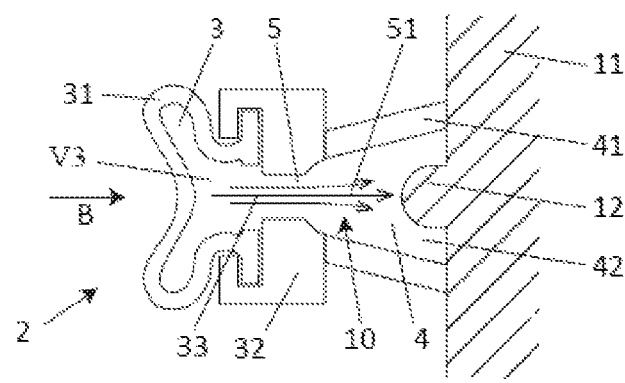
FIG. 25 a cross-section through the pressure field generation device of the aspect of FIG. 23 and FIG. 24 of the present invention in the third state.
Figure 26A:
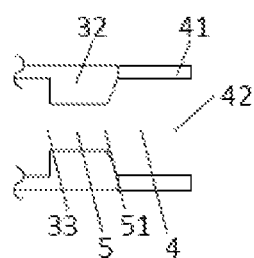
FIGS. 26 a) to e) schematic cross-sectional views through sections of the hollow space according to the invention FIG. 27 schematic cross-sectional views through sections of the hollow space according to the invention FIG. 28 a perspective side view of a pressure field generation device of the stimulation apparatus of the seventh embodiment of the present invention.
Figure 26D:
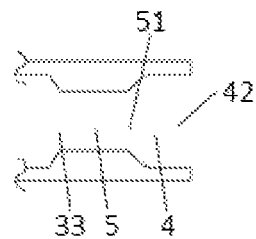
Figure 26B:
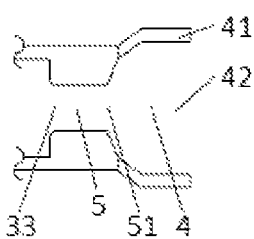
Figure 26E:
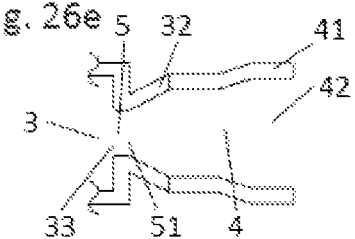
Figure 26C:
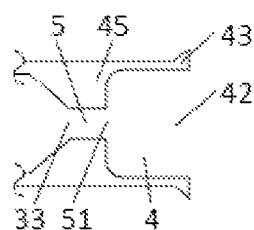

FIGS. 23 to 25 present the principle of the pressure field generation device 2 in detail.

FIG. 23 shows a principle pressure field generation device 2 in a first state, wherein the second chamber 4 is placed on or over the region of skin or body part 11 to be stimulated. Preferably, the second chamber 4 is placed over the erogenous zone which has the female clitoral glans.

The first state of the pressure field generation device 2 is characterised by a neutral displacement of the first chamber 3, i.e. it does not exert an external force, for example from the drive unit, on the first chamber 3. Here, the volume V1 of the first chamber is the standard volume of this chamber 3.

The body part 11 to be stimulated is a region of skin of the body, wherein here, for example, a particularly sensitive erogenous zone, the clitoris 12, is depicted. Thus, the application of the present invention, however, is not fundamentally limited to the female clitoris 11, but the stimulation apparatus 1 can be applied to all body parts or erogenous zones (for example the inside of the upper thigh, groin, neck, nipples, etc.), which can be stimulated by means of media or air pressure massage and/or negative pressure.

The second chamber 4 forms a chamber that is extensively or completely closed to the outside of the pressure field generation device 2 by placement on the body part 11 to be stimulated or because of the placement over the clitoris to be stimulated, said chamber being connected to the second chamber via only the connection element 5, wherein the edges of the chamber 4 ideally close in a sealing manner by means of the surface of the body part 11. In this way, a closed hollow space having two communicating functional units, chambers 3 and 4, emerges, wherein, when changing the volume of one of the chambers 3 or 4, a corresponding pressure equalisation between chambers 3 and 4 takes place via the connection element 5.

A wall 31 of the first chamber 3 is fixed by means of a bracket. The bracket 32 is, in turn, fixed on the housing 8. Furthermore, the wall 41 of the second chamber is mounted on the bracket 32. Two openings in the wall 41 of the second chamber 4 and the bracket 32 which are aligned relative to each other (preferably in the longitudinal direction) together form the connection element 5, which connects the first chamber 3 and the second chamber 4 by means of a channel. This channel runs straight between the first chamber 3 and the second chamber 4, wherein the diameter of the channel broadens or narrows in the direction of the second chamber 4. Here, the wall 31, the bracket 32 and the wall 41 are preferably adhered to one another to be media- or air-proof. Alternatively, these can also be press-fitted to one another (for example by means of sealing regions between the housing 8 and the respective part) or screwed together. Furthermore, the bracket 32 can be adhered or screwed to the housing 8, for example.

The wall 31 of the first chamber 3 consists preferably of a flexible media- or air-impermeable material, for example rubber or silicone. The bracket 32 preferably consists of a rigid plastic, which is also media- or air-impermeable. The wall 41 of the second chamber is preferably produced from a flexible, skin-friendly material, for example from silicone or rubber.

Figure 4:
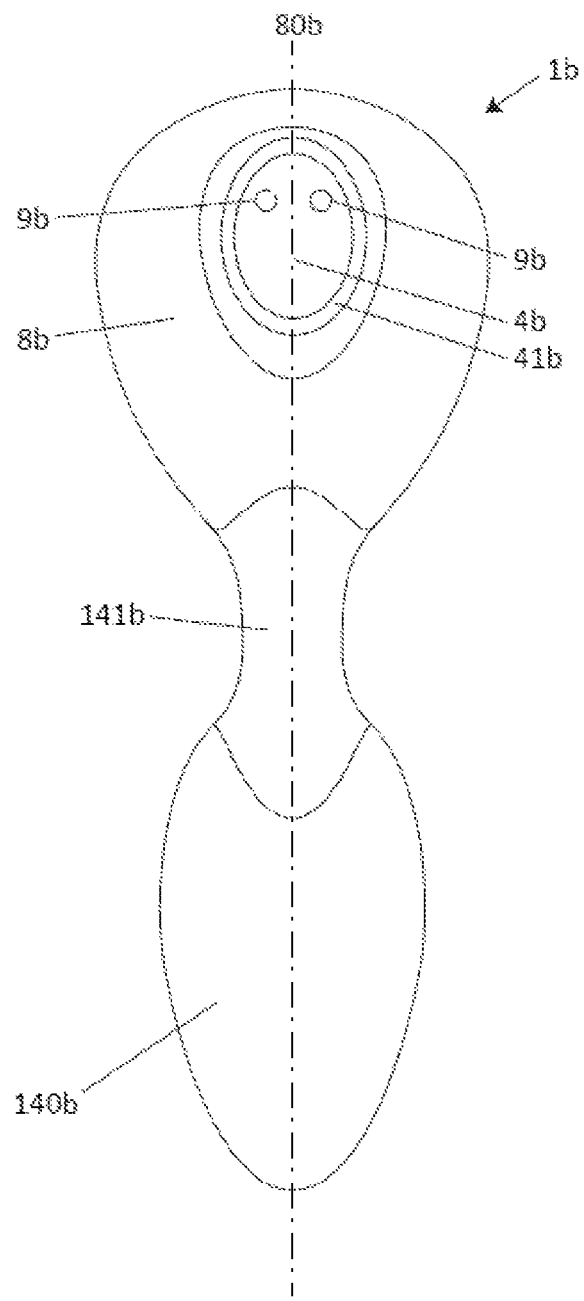
FIG. 4 a front view of a stimulation apparatus of the prior art having an appendage in a straight position.
Figure 5:
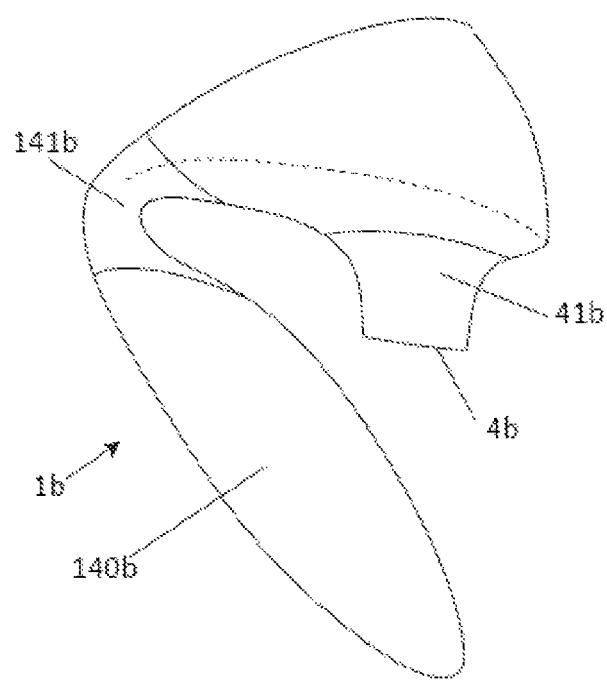
FIG. 5 a side view of a stimulation apparatus of the prior art having the appendage in the bent position.
Figure 6:
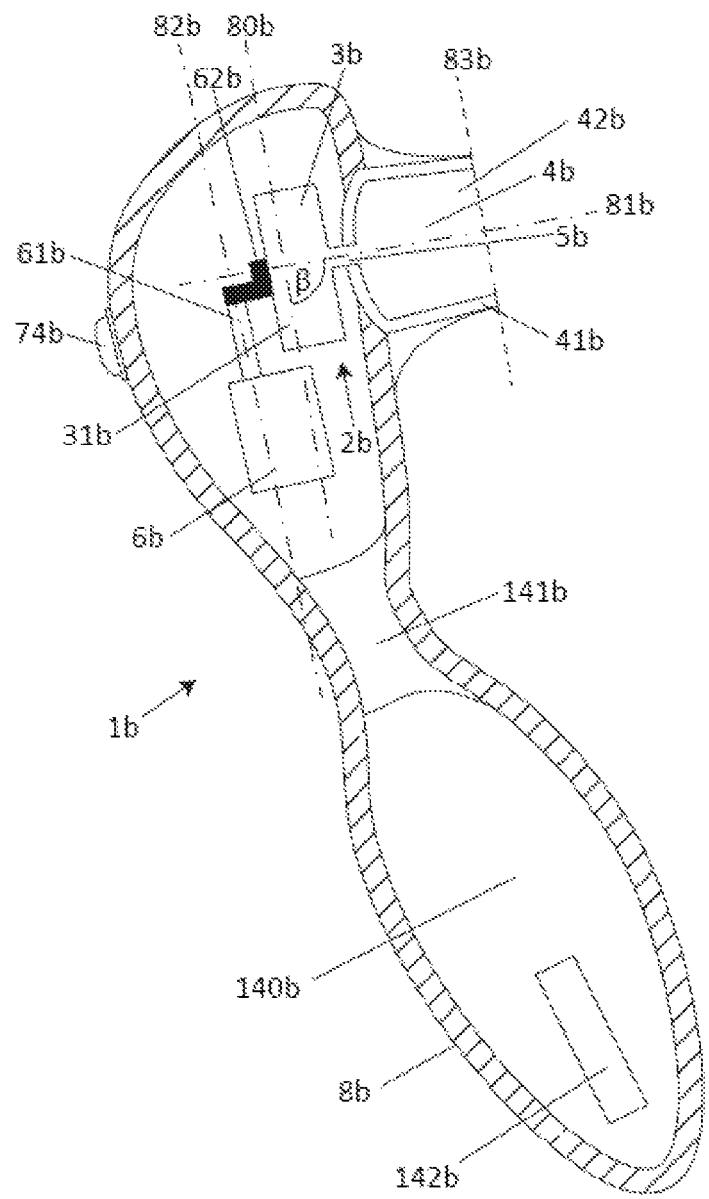
FIG. 6 a schematic cross-section through a stimulation apparatus of the prior art.

FIG. 24 shows the pressure field generation device 2 of FIG. 4 in a second state, wherein, in turn, the second chamber 4 is placed on the body part 11 to be stimulated. The second state is characterised in that a force A acting on the first chamber 3 causes an expansion of the chamber 3. In detail, in this embodiment, the force A pulls the wall 31 of the first chamber 3 in a direction which is aimed away from the second chamber 4.

As a result, the volume V2 of the chamber 3 enlarges, i.e. V2>V1. In order to equalise the arising pressure difference between the chambers 3 and 4, the medium or the air now flows from the second chamber 4 into the first chamber 3.

Assuming that, in the first state, the pressure present in chambers 3 and 4 corresponds to the current prevailing external reference pressure (for example air pressure), the present total pressure in the second state is now lower than the external reference pressure. This negative pressure is formed such that it is preferably lower than the usual systolic blood pressure in the blood vessels of the body part 11. Thus, the blood flow in this region is increased and more blood flows to the clitoris 12 in the second state.

FIG. 25 shows the pressure field generation device 2 in a third state, wherein, in turn, the second chamber 4 is placed on the body part 11 to be stimulated. The third state is characterised in that a force B acting on the first chamber 3 causes a volume reduction or compression of the chamber 3. In detail, the force B is opposed in terms of its direction to the direction of force A and deforms the wall 31 of the first chamber in such a way that the resulting volume V3 of the chamber is smaller than volume V1. The compression of the chamber 3 causes a positive pressure in the chamber 3 which is equalised by a media or air flow through the connection element 5 in the direction of the second chamber 4.

This media flow is now preferably aimed at the body part 11 to be stimulated, in particular at the glans of the clitoris 12, by means of the alignment of the opening 51 and/or the connection element 5. The indirect (pressure) stimulation according to the invention thus takes place by means of the medium flowing in the direction of the erogenous zone. Here, the size (or the cross-sectional surface area) of the opening 51 is preferably sized in such a way that this is small enough in comparison to the volume displaced in the first chamber 3 in order to sufficiently accelerate the medium for a perceptible massage effect. Often (in particular with a clitoral glans), a slight cross-sectional reduction or narrow point in the hollow space is sufficient so that the pressure field according to the invention can develop a targeted stimulation effect.

Furthermore, the type of flow can be advantageously influenced not only by means of the size and the alignment of the opening 51, but also by means of the inner configuration of the connection element. For example, helical grooves in the connection element 5 cause a swirl of the flow according to the invention, wherein the flow profile of the flow develops a "softer" or more turbulent effect on the body part to be stimulated. Alternatively, the pressure field emerging in the second chamber 4 can be adjusted to correspond to the use by means of several openings 51. As a further alternative, a nozzle can be provided as the connection element, which leads to the pressure field being established in the medium preferably adjacent to the clitoris.

In the arrangement shown in FIGS. 23 to 25, it is advantageous that it is hygienically unproblematic (for example because of the avoidance of dead spaces) and simple in terms of construction. For example, no valves or further openings in or on the first chamber 3 are required. It is noted that the basic principles of the pressure field generation of the invention are then also realised when the starting point of the compression and expansion activity of the drive unit 6 is at the maximum volume V2 or the minimum volume V3. Thus, often a pressure equalisation, for example via a gap between the skin and the opening 42, takes place, in which the average pressure in the hollow space will level to a central pressure. In addition, the apparatus 1 is often already switched on before the placement over the erogenous zone. Thus, the pressure field according to the invention is generated independently of the prevailing starting conditions in terms of the displacement of the flexible wall 31 of the first chamber 3.

FIGS. 26a to 26f disclose further aspects in terms of the design, in particular in terms of the (inner) shaping of the connection element 5.

The shaping of the connection element 5 influences the flow-mechanical properties in the pressure field generation device 2. With the throughflow of channels or hollow spaces, flow sounds, in particular with air as the medium, occur which are dependent on the flow speed, on the cross-section of the channel, and on the degree of turbulence. Turbulences are, in turn, caused by sharp edges.

FIG. 26 *a*) shows the connection element 5 in the shape of a straight channel, wherein the opening 33 and the opening 51 each have sharp edges. This leads to turbulences and disturbing flow sounds.

Thus, the pressure loss coefficient, of the arrangement of FIG. 26 *a*) is capable of optimisation. The stimulation effect of the pressure field of the stimulation apparatus 1 can be optimised in accordance with the invention by an improved configuration in terms of flow, as is presented in more detail below.

FIG. 26 *b*) shows the connection element 5 in the form of a straight channel, wherein the edge of the opening 33 (in the direction of the first chamber 3) has rounded corners. This reduces the pressure loss coefficient, of the channel-like configuration according to the invention, which is why the degree of effectiveness of the pressure field generation device according to the invention becomes greater and this becomes quieter. In addition, the second chamber 4 has a larger internal diameter in comparison to the second chamber of FIG. 26 *a*), whereby the pressure field emerges closer to the opening 51, and the second chamber 4 can thus be provided to be comparatively shorter in the longitudinal direction, which saves space and weight.

FIG. 26 *c*) shows the connection element 5 in the shape of a straight channel having a truncated conical opening 33 in the direction of the first chamber 3. This further reduces the pressure loss coefficient, in comparison to the channel-like configurations of FIGS. 26 *a*) and *b*).

FIG. 26 *d*) shows a further improved configuration in terms of flow of the connection element 5. Thus, the first chamber 3 and the second chamber 4 are separated by a marginal (for example by about 15% of the diameter of the first chamber) narrowing or constriction of a channel-shaped connection element 5, wherein the two openings 33 and 51 (on both sides of the channel) have a truncated conical internal shape. As a result of the medium being moved forwards and backwards in the flow system according to the invention, the two openings or sides of the channel are advantageously optimised in terms of flow since the two flow directions are lossy.

Thus, it is possible to optimise the pressure loss coefficient, in comparison to conventional stimulation apparatuses in such a way that a smaller (or weaker powered) electric motor can be used, which saves weight and costs. In addition, the flow sounds are avoided or reduced, which improves the ergonomics of the stimulation apparatus 1.

FIG. 26 *f*) shows a shaping of the second chamber 4. In order to distance the clitoris (or clitoral glans) from the nozzle-like opening 51 further from the clitoris (in order to avoid an overstimulation), it can be necessary that the length of the second chamber is enlarged in the direction of the alignment axis 81 and/or in the direction of the longitudinal axis 80. Thus, the second chamber 4 can be set up in such a way that its diameter (in the cross-sectional direction) is gradually enlarged in a multitude of (preferably two) steps in the direction of the opening 42. Correspondingly, the media flow (when the first chamber 3 is compressed) is gradually decelerated in the direction of the opening 42, while the pressure field is aimed at the erogenous zone to be stimulated in a targeted manner, since the media pressure gradually increases.

Figure 27:
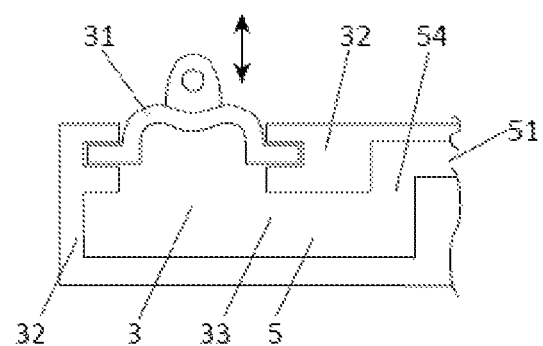

FIG. 27 shows a first chamber 3 having an opening 33 of the first chamber 3 arranged at a right angle to the direction of the displacement of the flexible wall 31, and a channel-shaped connection element 5, which has an S-shaped course. Thus, the channel running in an S-shape forms a damping element 54 according to the invention. Thus, in this aspect, because of the S-shaped course of this aspect, a direct, straight-line expansion of acoustic effects outwards from the first chamber 3 is avoided (i.e. out from the opening 42). Thus, the S-shaped course of the channel of the connection element 5 causes a damping of disturbing sounds from the opening 42.

The embodiments explained above are further implemented by means of subsequent explanations.

Figure 28:
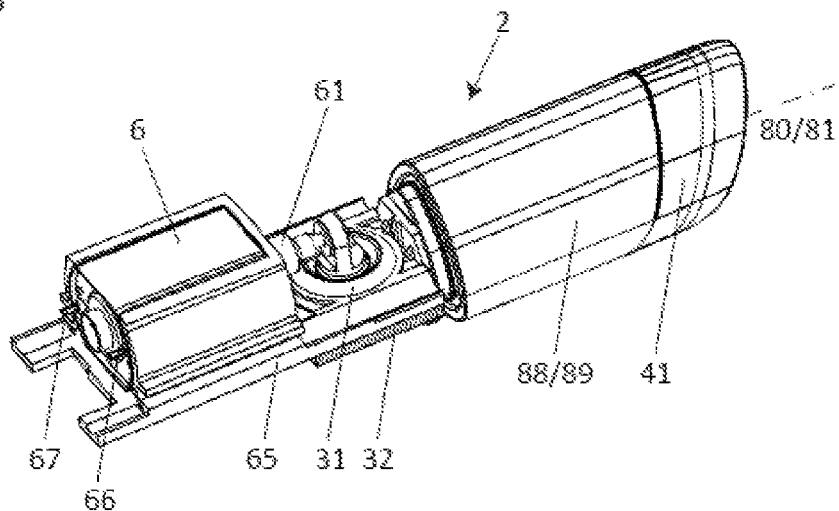

FIG. 28 shows a perspective view of a part of an exemplary internal construction of the stimulation apparatus 1 of the sixth or seventh embodiment. The basic concepts of the invention explained below can be used in each present aspect and in each present embodiment and are correspondingly combined. An eccentric cam is mounted on the axis 61 of an electric motor 6, said eccentric cam engaging in an appendage of a flexible wall 31. The (DC) motor has two poles 67 and 68. Furthermore, the motor 6 is fixed on a motor bracket 65, which has a straight-line course on both sides such that the motor bracket 65 for example can be inserted in a groove-like, internal guide of the housing 8 (preferably from the back). In the same way, the bracket 32 of the first chamber 3 is fixed on the motor bracket 65, for example it is adhered or screwed on (this is labelled in a hatched manner in FIG. 26).

Figure 29:
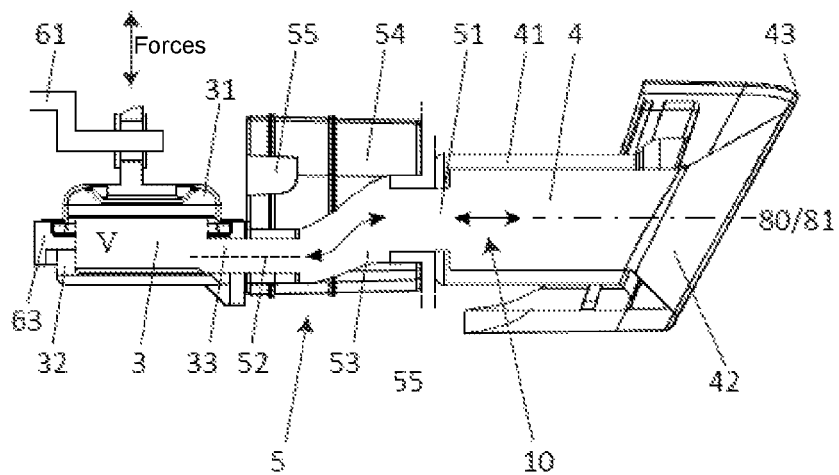
FIG. 29 a schematic sectional view through the pressure field generation device according to the invention of FIG. 28.

FIG. 29 shows a cross-section of the construction of FIG. 28 in the longitudinal direction. The first chamber 3 has a volume V. A lateral or radially arranged opening 33 of the first chamber 3 initially leads into a straight-running channel section of the connection element 5. Furthermore, the channel 53 runs in an S-shaped manner in the direction of the second chamber 4. The material of the damping element 54, in which the S-shaped channel section is formed, is preferably silicone or rubber. The damping element 54 constitutes a section of the connection element 5. Thereafter, the S-shaped channel 53 opens into the second chamber 4 via the opening 51. The second chamber 4 is initially formed to be cylindrical, and opens towards the opening 51 in the direction of the second chamber 4 in a truncated conical manner. Furthermore, the alignment axis 81 is arranged to be at least parallel, preferably coaxial, in relation to the longitudinal axis 80 of the stimulation apparatus 1 (said longitudinal axis preferably being arranged centrally).

Thus, the damping element 54 arranged in the longitudinal direction 80 between the first chamber 3 and the second chamber 4 or the opening 42 not only serves for the flow-related/acoustic damping of noises in the medium in the manner of a silencer, but also for the damping of vibrations or oscillations, which are present in the solid body, for example in the bracket 32 or the motor bracket 65, for example, or are forwarded in these. Here, these vibrations or oscillations are damped in the direction of the opening 42. Thus, the damping element presently has a double function of damping oscillations or vibrations in the fluid and in the solid medium in the direction of the opening 42. Consequently, the ergonomics of the stimulation apparatus 1 according to the invention are improved.

The damping element 54 further has a bracket 55 that can be fitted on for simple insertion in the stimulation apparatus 1.

In this embodiment, the placing region 43 is a comparably narrow surface, which closes the peaked (peripheral) front end 90 of the stimulation apparatus 1.

Figure 30:
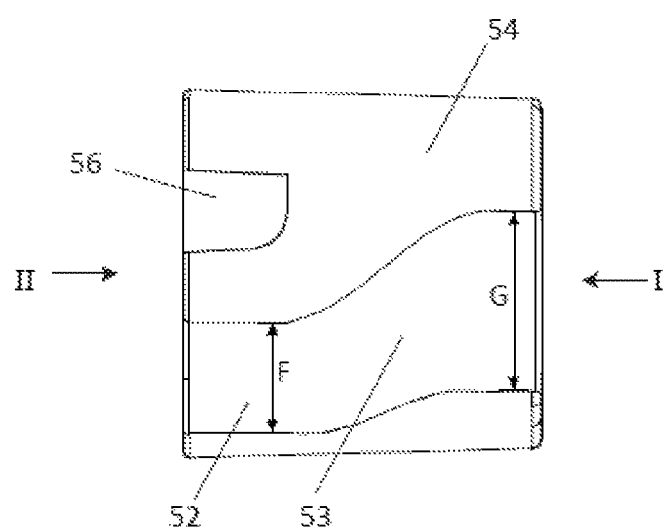
FIG. 30 a sectional view in the longitudinal direction through a damping element of the pressure field generation device of FIG. 28.
Figure 31:
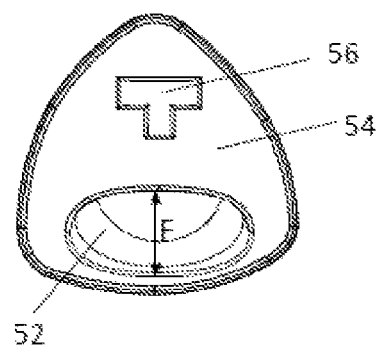
FIG. 31 a view of the damping element of the pressure field generation device of FIG. 28, from behind.
Figure 32:
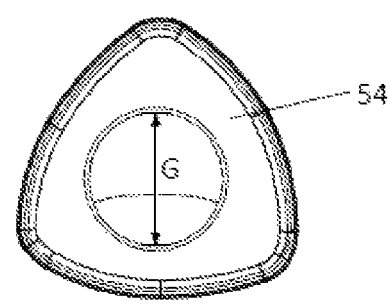
FIG. 32 a view of the damping element of the pressure field generation device of FIG. 28, from the front.

FIGS. 30 to 32 show a cross-sectional view in the longitudinal direction 80, a view from behind and a view from in front of the damping element 54 according to the invention respectively.

In order to keep the housing construction as compact as possible in the cross-sectional direction of the housing 8, the cross-section through the straight-running channel section and the corresponding (back) opening of the damping element 54 on the side II of the first chamber 3 is here formed to be oval. The (front) opening of the damping element 54 on side I of the second chamber 4 is formed to be round. Here, the diameters F and G of the two openings are calculated in such a way that the cross-sectional surface areas of the two openings are (at least approximately) the same. The channel of the damping element 54 thus changes its cross-sectional shape, without changing the cross-sectional surface area. Thus, flow losses are kept as marginal as possible, while the stimulation apparatus 1 can be kept compact in terms of the cross-sectional direction.

Figure 33:
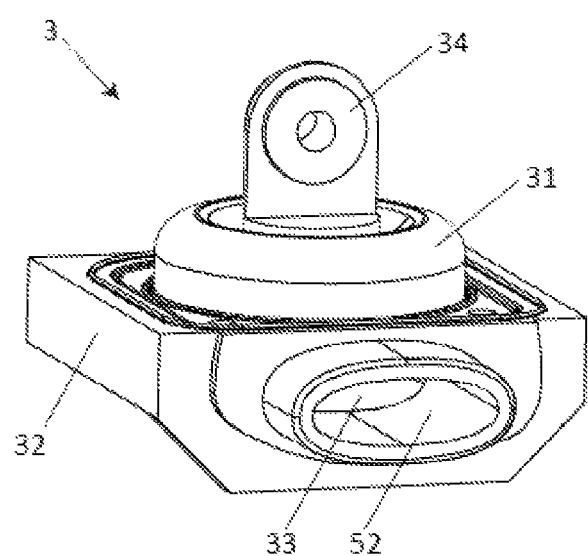
FIG. 33 a perspective view of a section of the hollow space or a first chamber of the pressure field generation device of FIG. 28.

FIG. 33 shows a perspective view of the first chamber 3 of the sixth and seventh embodiment from outside, having the flexible wall 31, having the oval opening 33 (that has already been explained in more detail above) that has the corresponding straight-running channel section 52 and the bracket 32. The flexible wall 31, which consists for example of silicone, has an appendage (protruding upwards in FIG. 33), which has a hole for receiving the eccentric cam appendage. A donut-shaped or ring-shaped transition element 34 is inserted into this hole, said transition element 34 having an internal hole in which the appendage of the eccentric cam is inserted (which is not depicted in more detail). This transition element 34 consists preferably of rubber or a damping silicone. Thus, oscillations or vibrations, which occur on the motor side, are significantly damped before they are transferred into the medium in the first chamber 3 via the flexible wall 31 and would be able to be perceived as disturbing noises outside the stimulation apparatus 1. Thus, it has been shown that the flexible wall 31, similar to a membrane (among other things, because of its flat design), is prone to transferring vibrations or oscillations of the motor axis 61 or the eccentric cam to the medium of the chamber 3. Thus, it is presently advantageous to insert the transition element between the flexible wall 31 and the eccentric cam or the motor shaft 61 in order to dampen disturbing vibrations or oscillations before they are coupled into the medium in the first chamber 3.

Figure 34:
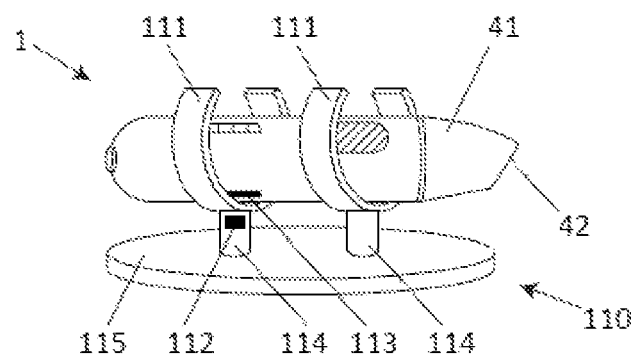
FIG. 34 a schematic view of a bracket according to the invention for a stimulation apparatus of an embodiment, FIG. 35 a schematic sectional view of a cup-shaped bracket according to the invention for a stimulation apparatus of an embodiment.

FIG. 34 shows a system having one of the embodiments of the stimulation apparatus 1 according to the invention. Thus, a bracket 110 has at least two forked bracket arms 111, into which the stimulation apparatus 1 is placed. The bracket arms 111 are connected to bracket foot 115 via bracket legs 114, said bracket foot 115 preferably being formed to be even and flat. In at least one of the bracket legs, there is a bracket-side charging coil or inductor. Correspondingly, the stimulation apparatus 1 according to the invention has a stimulation apparatus-side charging coil or inductor. If the stimulation apparatus 1 is placed in the bracket arms 111, a (known) inductive coupling 1 between the stimulation apparatus and an electronic power device (that is not shown in more detail) can take place via the coils (that are preferably paired). Thus, a battery of the stimulation apparatus 1 can be charged wirelessly or without cables, without a bushing or a connection to or in the housing 8 being required. This simplifies, for example, a waterproof design of the housing 8.

Figure 35:
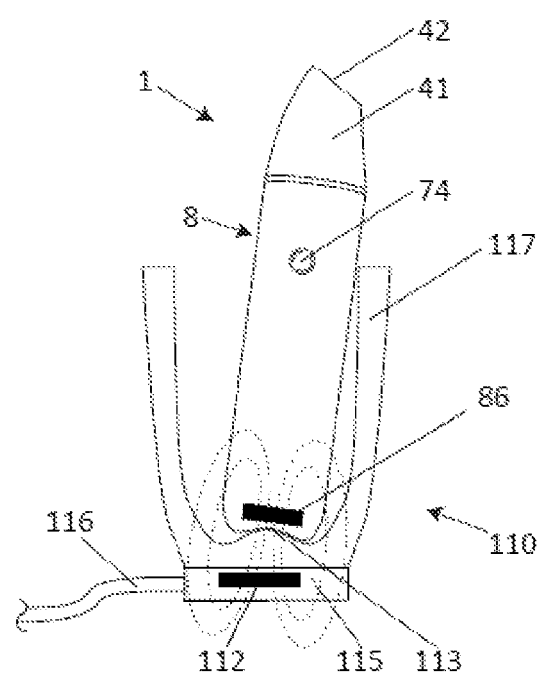

FIG. 35 shows an alternative system having a bracket 110 for charging the stimulation apparatus 1 according to the invention. Here, the stimulation apparatus-side charging coil or inductor can be advantageously housed in the back end 91 of the stimulation apparatus 1. This facilitates a suitable weight distribution and setting of the centre of mass MP of the stimulation apparatus 1. In addition, (economical) coils are preferably formed to be circular, whereby these can be advantageously stored in the housing 8 in a compact manner with the central axis of the coil in coaxial (or alternatively parallel) alignment in respect of the longitudinal axis 88. A cup-shaped device, for example a simple water glass, is provided as the bracket 110, in which the pin-shaped stimulation apparatus 1 can be simply placed. This has the advantage that the bracket 110 can be cleaned quite easily. In the plate or platter-shaped bracket foot 115, the bracket-side loading coil or inductor is housed, on which the bracket 110 is placed. If the stimulation apparatus 1 is placed into the bracket 110, a (known) inductive coupling between the stimulation apparatus 1 and an electronic power device (not shown in more detail) can take place by means of the (preferably paired) coils mentioned above. Correspondingly, the battery of the stimulation apparatus 1 can also be supplied with energy and charged by means of this bracket 110 without cables or in a wireless manner.

Figure 36:
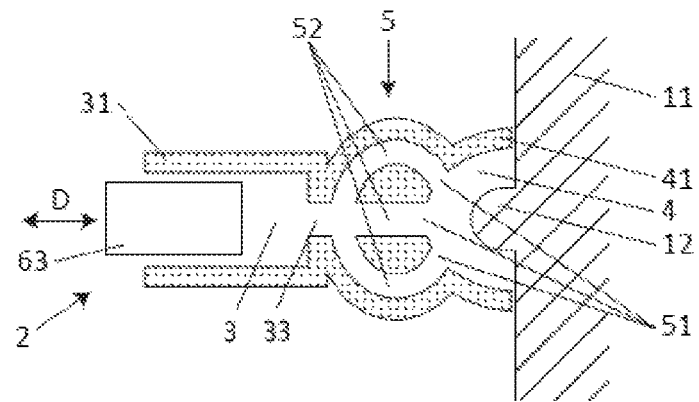
FIG. 36 a cross-section through a pressure field generation device of a further aspect of the present invention.

FIG. 36 shows a fourth aspect of the invention having an alternative construction of the pressure field generation device 2. Here, the second chamber 4, several connection elements 5, and partial sections of the wall 31 of the first chamber 3 are formed to be one piece. Alternatively, the pressure field generation device 2 can also be constructed from individual parts in two or more parts by adhering to the geometric model of FIG. 36, depicted in a similar way to in FIG. 21, 22 or 25.

The volume change of the first chamber 3 here takes place in a manner similar to a piston pump, however, here, possible valves are lacking. Thus, a piston 63 is moved backwards and forwards by the drive unit, for example an electric motor or electromagnet, in the directions of the double arrow D. This kind of drive has the advantage that the volume of the first chamber 3 can be reduced to zero or virtually to zero in a simple manner, and thus the first chamber 3 can be almost completely emptied.

The design of the connection element 5 having several channels 52 and openings 51 leads to a distribution of the pressure field over several concentration points. While the design of the connection element 5 having only one channel, as described in connection with FIG. 25, for forming a significantly concentrated pressure field leads towards a target region, the media or air flow can be distributed over several target regions with the design of the connection element 5 shown in FIG. 36. Thus, the clitoris 11 for example can be blown onto not only on its glans, but from several sides in equal measure. This distribution of the concentration of the air flow over several regions can, depending on the application, help to avoid an overstimulation, and/or help to enlarge the stimulation region.

Figure 37A:
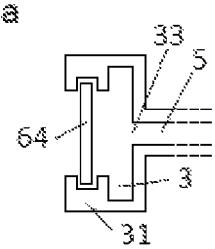
FIGS. 37 *a*), *b*) and *c*) schematic cross-sections through a pressure field generation device of a further aspect of the present invention.
Figure 37B:
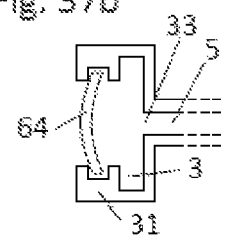

FIGS. 37 *a*) to 37 *c*) show a fifth aspect of the invention having (partial) cross-sections of a construction of the pressure field generation device 2 having a bending element 64 as a drive for changing the volume of the first chamber 3. The bending element 64 can be a conventional piezoelectric bending element, for example, which is deformed or bent after application of a stress. In this aspect of the invention, the wall 31 of the first chamber 3 is constructed to be rigid or stiff, while the bending element 64 is adjusted to the sides of the first chamber 3 in a suitable manner. Here, the transition points between the bending element 64 and the wall 31 are sealed (for example elastically adhered). With this construction, the drive for the pressure field generation device 2 is already integrated into this and an external drive is not necessary. For example, an electric motor having the eccentric cam is not necessary. As a result, among other things, potentially disturbing individual oscillations can be reduced because of the movement of the eccentric cam of the stimulation apparatus.

Figure 37C:
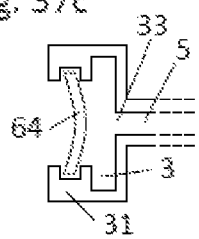
Figure 38A:
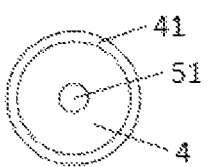
FIG. 38 *a*) to *f*) different views from below and the side of further aspects of a second chamber of the present invention.
Figure 38B:
Figure 38C:
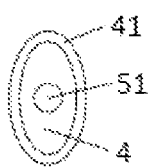
Figure 38D:
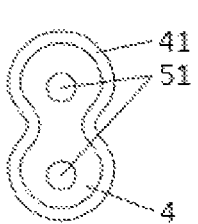
Figure 38E:
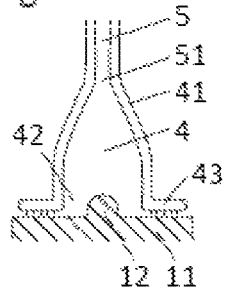
Figure 38F:
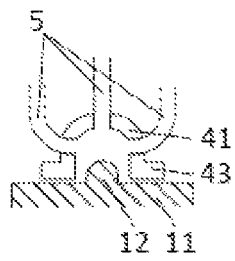

FIG. 37 *a*) shows the pressure field generation device 2 having the bending element 64 in the neutral position in detail. Thus, the volume of the first chamber 3 having the bending element 64 in the neutral position is the standard volume. FIG. 37 *b*) further shows the first chamber 3 having an energised bending element that is successively bent outwards, which is why the volume of the first chamber 3 is enlarged; and, as a result, a negative pressure prevails in the pressure field generation device 2. FIG. 37*c*) shows an opposingly energised bending element of the first chamber 3 in comparison to FIG. 10*b*, which is why the volume of the first chamber 3 is reduced; and in succession, a positive pressure prevails in the pressure field generation device 2.

FIGS. 38 *a*) to 38 *f*) show different views from below and the side of further aspects of the second chamber 4 of the present invention. FIG. 38 *a*) shows in detail a view from below of a circular second chamber 4, having a centrally arranged opening 51; FIG. 38 *b*) shows a view from below of a triangular second chamber 4 having a centrally arranged opening 51; FIG. 38 *c*) a view from below of an oval second chamber 4 having a centrally arranged opening 51; and FIG. 38 *d*) a view from below of an approximately octagonal second chamber 4 having two openings 51 arranged offset relative to the centre. FIG. 38 *e*) further shows a side cross-section through a second chamber 4 according to the invention, wherein the second chamber 4 additionally has an extended contact surface 43 with the skin or resting part 43 or placing region 43 in order to improve the sealing (off) function of the second chamber 4 on the skin. The extended contact surface 43 can additionally have grooves or projections, which yet further improve the sealing function. FIG. 38 *f*) shows a side cross-section through a second chamber 4 having several separated connection elements 5 and an extended contact surface because of the resting part 43 or the placing region 43.

Thus, the shape of the second chamber 4 can be fundamentally adjusted to the anatomy of the erogenous zone to be stimulated. Here, the shape of the chamber 4 of FIG. 38 *a*) is adjusted, for example, to the round shape of the breast, while the shape of the chamber 4 of FIG. 38 *c*) is better adjusted to the shape of the female vulva. Furthermore, the shape of the second chamber 4 additionally also determines the characteristic of the pressure field according to the invention. Thus, the size of the second chamber 4 determines the extent of the achievable negative or positive pressure, in relation to the volume displaced by the first chamber 3. Furthermore, the intensity of the massage effect according to the invention can be set via the proximity of the opening 51 of the connection element 5 to the region of skin to be stimulated. The massage effect can also be distributed across several regions by means of several openings 51, cf. FIG. 38 *d*). Thus, the clitoris, for example, can be stimulated less directly on the very sensitive clitoral glans (cf. FIG. 38 *e*)), but more so on the regions surrounding the clitoral glans, in order to avoid excessive excitation of the clitoris.

Figure 39:
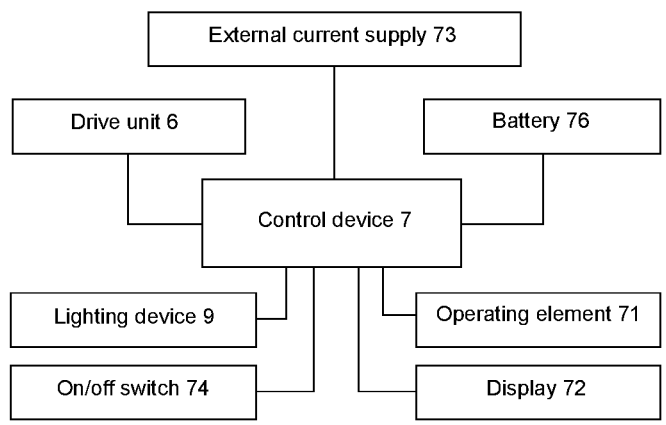
FIG. 39 a block diagram of an aspect of the present invention.

FIG. 39 shows a block diagram of an example of a functional construction of an embodiment of the present invention having a control device 7, a drive unit 6, a lighting device 9, an on/off switch 74, operating elements 71, a battery 76 and an external current supply 73. This basic construction of the control device 7 can fundamentally be used in all disclosed aspects and embodiments.

The control device 7 which has a microcontroller or is hardwired, initially controls the current supply of all users of the stimulation apparatus 1, and optionally a charging/discharging process of the battery 76 and/or battery management. In particular, the control device 7 controls the energisation of the drive unit 6, for example the size of the displacement, the frequency, the modulation, etc.

Optionally provided operating elements 71 serve to set the operating type of the device, i.e. to set the modulation pattern of the pressure field. The operating elements 71 can be implemented, for example, as at least one push button, as at least one rotation switch, or as at least one touch-sensitive switch. Furthermore, the operating elements 71 can provide optical feedback for activation, for example by means of light diodes (LEDs) integrated in the switch.

An optional display 72 serves to inform the user about the device state and/or the setting state. The display 72 can be formed, for example, from a multitude of light diodes or as an LCD display. The information displayed can be, for example, the charging state of an optional battery or the current setting of the modulation pattern.

Furthermore, the control device 7 can have a memory, in which at least one modulation or stimulation pattern (these are explained in more detail below in the context of FIG. 40 *a*) to *c*)) is stored. The drive unit 6 can now be controlled in terms of its energisation depending on the choice of the user of the stimulation apparatus 1 via the operating elements 71 in accordance with this pre-saved stimulation pattern. The stimulation patterns of the pressure field can optionally also be individually constructed and stored by the user via the operating elements.

A bushing (that is not shown in more detail) can serve for external current supply of the stimulation apparatus 1 via an external plug, which is connected, for example, to an external network adaptor. In order to ensure the waterproofing of the stimulation apparatus 1, a magnetic-inductive transformer can also be provided instead of the bushing, which enables a current transfer into the stimulation apparatus 1 without an electric conductive contact. Preferably, the stimulation apparatus 1 also has a battery, for example a rechargeable nickel-metal hydride battery (NiMH) or a rechargeable lithium ion battery, for operation without cables. Alternatively, a (longer) current supply cable can also be guided out of the stimulation apparatus.

Figure 40A:
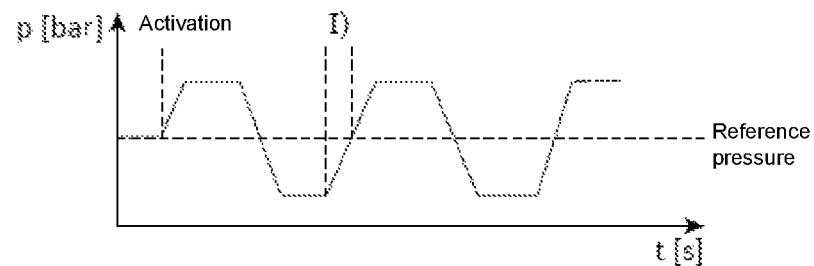
FIG. 40 *a*) to *c*) diagrams of different patterns of the pressure modulations of the present invention.
Figure 40B:
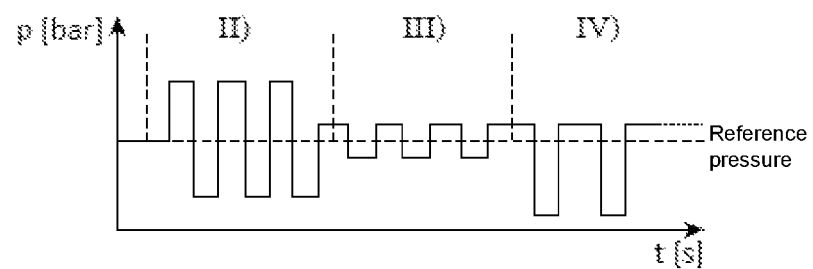
Figure 40C:
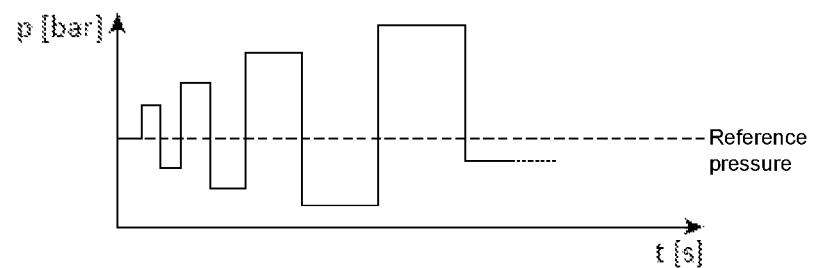

FIG. 40 *a*) shows the temporal course of a total pressure p in the pressure field generation device (2) when using this for stimulation. The dotted line states the reference pressure, for example the currently prevailing atmospheric (air) pressure, which is present outside the pressure field generation device (2). If the second chamber 4 is now placed on the body part 11 to be stimulated, this surrounding pressure prevailing at the start, which is also present in the hollow space 10 of the pressure field generation device (2), is somewhat maintained. From then on, it is assumed that the second chamber 4 is placed, in a largely sealing manner, on the body part to be stimulated. After activating the stimulation apparatus, the drive unit 6 is controlled or energised by the control device 7 according to a pre-stored stimulation pattern. Correspondingly, the volume of the first chamber 3 and thus the pressure and the flows in the pressure field generation device 2 change, wherein the pressure changes are consequently modulated to the reference pressure prevailing at the start or the normal pressure. The pressure or stimulation pattern shown by way of example in FIG. 40 *a*) develops a pulsed, regular pressure field having temporally alternating negative and positive pressures. In phases of the increase of pressure, the erogenous zone to be stimulated is blown on or massaged, while at the time when a negative pressure prevails, the blood flow through the body part 11, for example the clitoris, is encouraged. Thus, time periods exist (labelled with I) in FIG. 40 *a*)) in accordance with the invention in which a negative pressure prevails, while, at the same time, the clitoris is indirectly stimulated.

FIG. 40 *b*) shows three examples of alternative stimulation patterns. Thus, a pulsed stimulation pattern having high amplitude is depicted in the region labelled with II). In the region labelled with III), a pulsed stimulation pattern having low amplitude is depicted. Furthermore, in the region labelled with IV), a stimulation pattern is depicted that is irregular or asymmetric in terms of the temporal sequence and the amplitude. The patterns can be varied depending on bodily effect/use and according to individual wishes.

FIG. 40 *c*) shows a further example of an alternative stimulation pattern. Thus, the strength of the pressure can increase with time in order to adjust to the arousal state of the user.

Figure 3:
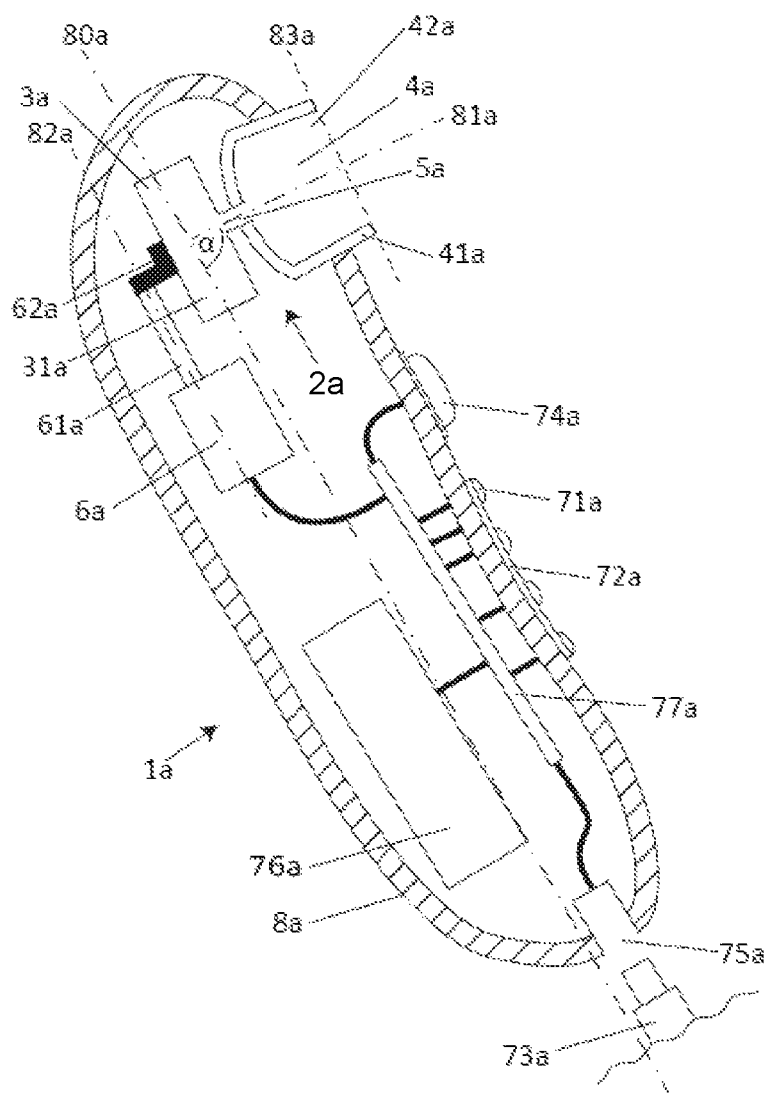
FIG. 3 a cross-section through a stimulation apparatus of the prior art.
Figure 41:
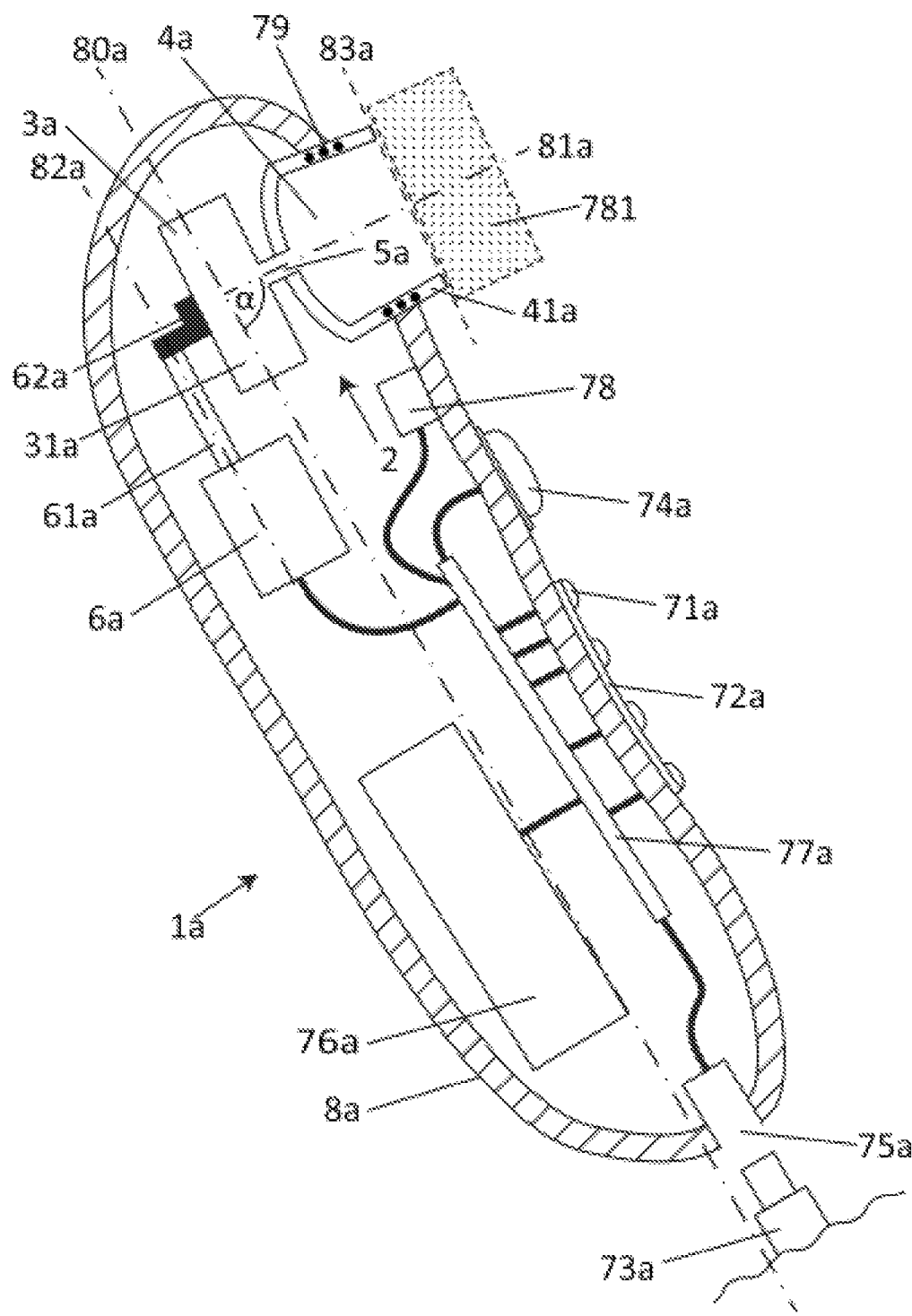
FIG. 41 a cross-section through an embodiment of the stimulation apparatus according to the invention.

FIG. 41 shows an embodiment of an improved stimulation apparatus according to the invention. Those reference numerals that are the same as the reference numerals in FIG. 3 denote like or similar features, wherein these have an identical or similar function. Hereinafter, only the differences between FIG. 41 and FIG. 3 will be described in greater detail.

In this embodiment a sensor device 78 is provided which has a measurement region 781, which is provided at or in front of the opening of the stimulation apparatus 1*a*. A proximity or the existence of a surface or of a body part is determined in this measurement region 781. The clitoris with the surrounding skin regions is thus preferably detected on the basis of the use of the stimulation apparatus.

Once switched on, the stimulation apparatus is in a standby mode. In this standby mode the stimulation apparatus is in operation, since the user has switch it on, but the drive unit 6*a* is deenergised, whereby the stimulation apparatus does not generate a pressure field in accordance with the invention. In addition, the sensor device 78 is in operation in the standby mode and performs measurements or estimations at regular intervals.

More specifically, a capacitive sensor can be used as sensor device 78, wherein a measurement electrode of the sensor device 78 (not shown in greater detail) is preferably arranged inside the housing 8*a*. For example, the capacitance or change in capacitance of the measurement electrode can be determined by the sensor device 78 in order to perform a measurement. Consequently, it is determined whether or not the clitoris is in the vicinity of the opening of the stimulation apparatus, for example by means of a threshold value and by means of a comparison of this threshold value with the determined measurement value. If it is determined that the clitoris is in the vicinity, the sensor device 78 thus generates an activation signal, which is evaluated by the control device 7.

If the control 7 device receives an activation signal of this kind, the drive unit 6*a* is activated, whereby this is active in such a way that the stimulation apparatus 1*a* generates the pressure field according to the invention. In this case the stimulation apparatus is in the active mode. Consequently the stimulation apparatus 1*a* changes its operating mode from the standby mode into the active mode if the control device 7 receives the activation signal from the sensor device 78.

If the stimulation apparatus 1*a* is now distanced again from the clitoris 12 and the clitoris consequently leaves the measurement region 781, this information is thus also transmitted from the sensor device 78 to the control device 7. For example, the sensor device 78 can generate a deactivation signal and transmit it to the control device 7, or the transmission of the above-described activation signal from the sensor device 78 to the control device 7 can be initiated. The stimulation apparatus then changes its operating mode from the active mode into the standby mode. For example, it can be that the user repeatedly puts down the stimulation apparatus 1*a* in operation, for example in order to relax briefly, and then places the stimulation apparatus 1*a* back onto the clitoris 12. As a result, the stimulation apparatus 1*a* is also advantageously silent during such breaks in operation, since it is then in the standby mode, in which the drive unit 6*a* is inactive.

Furthermore, the measurement electrode can be designed in such a way that the resultant measurement region of the sensor device 78 is arranged in front of the opening of the hollow space 10 of the stimulation apparatus. Here, the measurement region can extend from the outer edge of the wall 41a in the direction of the alignment axis 81a, such that the proximity of the clitoris as it enters this measurement region is sensed. For example, the extent of the measurement region from the outer edge of the wall 41a in the direction of the alignment axis can be about 1 cm, particularly preferably 5 mm. Furthermore, the measurement region can preferably be provided in such a way that it completely covers the opening of the stimulation apparatus 1a.

The measurement electrode according to the invention can also be arranged in the immediate vicinity of the hollow space 10 according to the invention or adjacently to the connection element 5.

The measurement electrode according to the invention can be arranged in particular in an annular manner or semi-circular manner about the hollow space 10 or the second chamber 4a, whereby a measurement configuration is created in which the sensor device 78 has a high measurement sensitivity in the direction of the alignment axis 81a of the stimulation apparatus. In this case a virtual surface of the annular measurement electrode is thus perpendicular to the alignment axis 81 and is advantageously arranged approximately parallel to a virtual main surface of the clitoris.

In addition, a guard electrode (not shown in greater detail) can be provided which shields the measurement electrode against undesired interference effects. For example, the guard electrode can be arranged behind the measurement electrode as considered from the opening of the stimulation apparatus, for example so that a hand holding the device is not detected.

Alternatively, a sensor device 78 can be provided in such a way that contact of the clitoris with the wall 41a is detected. For example, the measurement region 781 can be provided in such a way that the extent of the measurement region in the direction of the alignment axis 81a is very small, for example 0.5 mm. In addition, a contact sensor in the wall 41a can also be provided as sensor device 78.

Furthermore, the stimulation apparatus 1a according to the invention can have a heating element 79 which is arranged in the form of a spiraled conductor in the wall 41a. The wall 41a can thus be heated preferably to skin temperature. The heating element for example can be activated by means of an operating element 71a. Alternatively or additionally the heating element 79 can be automatically energized once the stimulation apparatus 1 has been switched on, for example in the standby mode. A temperature-measuring unit (not shown in greater detail) for controlling and in particular limiting the temperature to the usual skin temperature of the clitoris is also preferably provided.

Below, additional developments of the stimulation apparatus 1 are presented. All presently disclosed features, embodiments, aspects and developments of the stimulation apparatus 1 can be combined with one another in any combination, as long as this is technically feasible for the person skilled in the art.

The stimulation apparatus 1 according to a further aspect of the invention can be provided for example in such a way that the connection element 5 is a channel whose opening 33 into the first chamber is oval; and wherein the opening 51 of the channel into the second chamber 4 is round.

The stimulation apparatus 1 according to a further aspect of the invention can be provided for example in such a way that the connection element 5 is at least sectionally an individual straight-running channel; and/or the channel of the connection element 5 is rigid; and/or the at least one connection element 5 is formed in terms of flow in such a way that, when reducing the volume of the first chamber 3, the resulting flow of the medium is aimed at the erogenous zone, preferably at the clitoris 12.

The stimulation apparatus 1 according to a further aspect of the invention can be provided for example in such a way that the connection element 5 has the damping element 54.

The stimulation apparatus 1 according to a further aspect of the invention can be provided for example in such a way that at least one operating element 71 is provided that is provided on the rearward or back end 91 of the housing 8.

The stimulation apparatus 1 according to a further aspect of the invention can be provided for example in such a way that the pressure field generated in the second chamber 4 consists of a pattern of negative and positive pressures, which are modulated to a reference pressure, preferably to the normal pressure.

The stimulation apparatus 1 according to a further aspect of the invention can be provided for example in such a way that the first chamber 3 is connected exclusively to the second chamber 4 in terms of flow.

The stimulation apparatus 1 according to a further aspect of the invention can be provided for example in such a way that the second chamber 4 is produced from a flexible material, preferably from silicone or rubber, and/or is produced from an at least partially transparent material and/or adjusted to the shape of the vaginal labia minora in such a way that this is completely covered by the opening 42 of the second chamber 4, or the opening 42 of the second chamber 4 can be inserted between the vaginal labia minora.

The stimulation apparatus 1 according to a further aspect of the invention can be provided for example in such a way that the second chamber 4 having the connection element 5 and the first chamber 3 is formed to be one piece. The wall of the hollow space 10 can also be provided to be one piece.

The stimulation apparatus 1 according to a further aspect of the invention can be provided for example in such a way that the second chamber 4 of the stimulation apparatus 1 is arranged to be exchangeable.

The stimulation apparatus 1 according to a further aspect of the invention can be provided for example in such a way that the second chamber 4 has a resting part 43 or a placing region 43, which enlarges the contact surface 43 of the second chamber 4 on the skin in order to improve a sealing effect of the second chamber 4.

The stimulation apparatus 1 according to a further aspect of the invention can be provided for example in such a way that the stimulation apparatus 1 has at least one operating element 71, by means of which the modulation of the pressure field can be set.

The stimulation apparatus 1 according to a further aspect of the invention can be provided for example in such a way that the stimulation apparatus 1 has a lighting device 9, preferably an LED lighting device for lighting the second chamber 4.

The stimulation apparatus 1 according to a further aspect of the invention can be provided for example in such a way that the connection element 5 has an inner shaping and an opening to the second chamber 4 which is formed in such a way that the pressure field is modulated in direction and characteristic.

For example, a method for stimulating body parts, in particular the clitoris 12 can be provided, which has the following steps:

establishing a pressure field aimed at the body part 11, wherein the pressure field consists of a pattern of negative and positive pressures, which are modulated to a reference pressure, preferably to the normal pressure.

The method above can be developed by individually influencing the stimulation effect by a modulation of the pressure field.

Furthermore, the pressure field can be pulsed.

By means of the stimulation apparatus according to the invention, a method can further be carried out, for example which has the following steps:

placing the second chamber 4 on the body part 11, preferably over the clitoris 12; and establishing a temporally changing pressure field, which consists of a pattern of negative and positive pressures, which are modulated to a reference pressure, preferably to the normal pressure; and taking the second chamber 4 off the body part 11.

None of the methods explained in this description serve for therapeutic or medical purposes, but instead are only for non-medical and non-therapeutic purposes. Thus, the present method serves for sexual pleasure.

Similarly, a use of the stimulation apparatus 1 as a sex toy for stimulation of the female clitoris is provided.

The invention permits further design principles, along with the embodiments explained. Thus, different arrangements or constructions of the first chamber 3 can be combined in any way with different embodiments of the second chamber 4 or the connection element 5.

Although in all embodiments only one first chamber 3 is depicted, two or more first chambers 3 can also be present, which are then correspondingly driven in a simultaneous or time-delayed manner in such a way that these change their volume in order to establish a pressure field according to the invention.

Although in all embodiments only one opening from the first chamber 3 to the connection element 5 is depicted, several openings for one connection element 5 or even several openings for several connection elements 5 in the first chamber 3 can thus also be present.

Although in all embodiments specific angles and angle regions are stated, these angles and angles regions can thus also be used in each case in different embodiments.

The sensor unit 78 can also be embodied as a mechanical push switch, which is triggered then the wall 41 contacts the skin.

All embodiments can be implemented also only with one chamber.

The stimulation patterns according to the invention can deviate from the patterns shown in FIGS. 40 *a*), *b*) an *c*), as long as these have a temporal sequence of negative and positive pressures. For example, at the start or after activation of the apparatus, initially, a relatively prolonged negative pressure is established (for example, 3 minutes), in order to effectively increase the blood flow to the zone to be stimulated, whereupon pulses of negative and positive pressures that slowly become larger in amplitude follow on.

Furthermore, the features of the described prior art DE 10 2013 110 501 A1 and of DE 20 2015 105 689 U1 can be combined with the present invention in many ways. The proposed improvements can also be applied with the described pin-shaped stimulation apparatus. A combination of individual or several features of these improvements with individual, several, or also all features of the three variants of described stimulation apparatuses is thus possible.

It goes without saying that the sensor unit 78 and the control device 7 can be formed as separate circuits or also as a common circuit. If they are formed as a common circuit they can be received for example on a common printed circuit board. The sensor unit 78 and the control device 7 can also be parts of a software program which are executed in a computing unit.

LIST OF REFERENCE NUMERALS

1 Stimulation apparatus
2 Pressure field generation device
3 First chamber
4 Second chamber
5 Connection element
6 Drive unit
7 Control device
8 Housing
9 Lighting device
10 Hollow space
11 Body part or erogenous zone
12 Clitoris
31 Wall of the hollow space and the first chamber, for example
32 Bracket
33 Opening of the hollow space and the first chamber, for example
34 Transition element
41 Wall of the hollow space and the second chamber, for example
42 Opening of the housing and preferably the hollow space and the second chamber, for example
43 Contact surface or placement region
51 Opening of the connection element to the second chamber
52 Straight-running channel section
53 Channel running in an S-shape
54 Damping element
55 Fixing section of the damping element
61 Drive shaft
62 Eccentric cam
63 Piston
64 Bending element
65 Motor bracket
66/67 Motor connections or motor poles (plus/minus)
71 Operating element
72 Display
73 Current supply
74 On/off switch
75 Bushing for current supply
751 Bushing closure
76 Battery
77 Control circuit board
78 Sensor unit
781 Measurement region
79 Heating element
80 Longitudinal axis
81 Alignment axis
82 Central axis of the motor axis
83 Opening plane
85 Cap
851 Stopping edge of the housing
852 Logo surface
86 Back section
861 Stopping edge of the housing
862 Latching closure
863 Embedded or set-back end surface 88 Central section
89 Gripping surfaces
90 Front end
91 Back end
110 Bracket
111 Bracket arm
112 Bracket-side charging coil
113 Stimulation-apparatus-side charging coil
114 Bracket leg
115 Bracket foot
116 Current supply cable
117 Bracket cup
140 Appendage
141 Joint
142 Vibration apparatus
MA Centre of mass

The invention claimed is:

1. A stimulation apparatus for a clitoris, the stimulation apparatus comprising:
   a housing defining a hollow space;
   an opening to the hollow space, the opening for placing over the clitoris of a human body;
   a drive unit to cause a volume of the hollow space to change to generate a pressure field of temporally alternating negative and positive pressures in the hollow space, the negative pressures below an ambient pressure and the positive pressures above the ambient pressure;
   a control device to control the drive unit; and
   a sensor to:
      detect when a portion of the human body is within a detection region associated with the sensor, the detection region defined in the opening or in front of the opening, and emit an activation signal to the control device in response to the detection of the portion of the human body within the detection region, the control device to activate the drive unit in response to the activation signal; and
      detect when the portion of the human body is outside of the detection region, the control device to deactivate the drive unit in response to the detection of the portion of the human body being outside of the detection region;
   wherein the drive unit, the control device, and the sensor are received in the housing and wherein the stimulation apparatus is a portable hand-held device.

2. The stimulation apparatus according to claim 1, wherein the sensor is a capacitive proximity sensor, an acoustic proximity sensor, or an optical proximity sensor.

3. The stimulation apparatus of claim 1, wherein the sensor is to generate and detect an electromagnetic field proximate to the opening.

4. The stimulation apparatus of claim 1, further including a wall defining the opening, wherein the sensor is to detect contact of at least a portion of the wall with the portion of the human body.

5. The stimulation apparatus of claim 1, further including a wall defining the opening, wherein the detection region is defined in front of the opening, and the detection region extends from an edge of the wall.

6. The stimulation apparatus of claim 1, wherein the sensor is proximate to the hollow space.

7. The stimulation apparatus of claim 1, further including a wall, wherein the drive unit is to cause at least a portion of the wall to move to cause the volume of the hollow space to change.

8. The stimulation apparatus of claim 7, wherein the wall is a portion of a piston.

9. The stimulation apparatus of claim 1, further including a flexible material surrounding the opening.

10. A stimulation apparatus for a clitoris, the stimulation apparatus comprising:
    a wall defining at least a portion of a hollow space and an opening of the hollow space, the opening for placing over the clitoris;
    a drive unit to cause a volume of the hollow space to change to generate a pressure field of temporally alternating negative and positive pressures in the hollow space, the negative pressures below an ambient pressure and the positive pressures above the ambient pressure;
    a control device to control the drive unit;
    a sensor to:
       detect when a portion of the wall defining the opening is within a threshold distance of the clitoris and output an activation signal to the control device in response to the detection of the portion of the wall within the threshold distance of the clitoris, the control device to activate the drive unit in response to the activation signal; and
       detect when the portion of the wall is at a distance outside of the threshold distance of the clitoris, the control device to deactivate the drive unit in response to the portion of the wall being outside of the threshold distance of the clitoris; and
    an elongated housing, the opening being formed in a portion of the wall corresponding to a lateral side of the elongated housing, wherein the drive unit, the control device, and the sensor are received in the housing and wherein the stimulation apparatus is a portable hand-held device.

11. The stimulation apparatus according to claim 10, wherein the wall forms a portion of an outer wall of the housing.

12. The stimulation apparatus of claim 10, wherein the housing is substantially pin-shaped, a longitudinal axis of the housing extending from a front end of the housing to a rear end of the housing, the longitudinal axis of the housing extending through the opening.

13. The stimulation apparatus of claim 10, wherein the drive unit includes an electric motor with a drive shaft, a central axis of the drive shaft arranged substantially parallel, coaxial, or perpendicular to an axis passing through the opening.

14. The stimulation apparatus of claim 10, further including at least one damping element proximate to the drive unit.

15. The stimulation apparatus of claim 10, wherein the housing is waterproof, and wherein a portion of the stimulation apparatus including the hollow space defines an interior waterproof region of the stimulation apparatus.

16. The stimulation apparatus of claim 10, wherein the wall is a first wall, the stimulation apparatus further including:
    a first chamber including a second wall;
    a second chamber defined by the first wall and including the opening; and
    a connection element, the first chamber fluidly coupled to the second chamber via the connection element, wherein the drive unit is to change a volume of the first chamber by displacing the second wall and the pressure field is to be generated in the second chamber via the connection element.

17. The stimulation apparatus according to claim 10, wherein the wall is removable.

18. The stimulation apparatus of claim 10, wherein the wall is a first wall and the stimulation apparatus further includes a second wall, the drive unit to cause the second wall to move relative to the first wall to cause the volume of the hollow space to change.

19. The stimulation apparatus of claim 18, wherein the second wall is a portion of a piston.

20. The stimulation apparatus of claim 10, wherein the wall includes a flexible material.

21. The stimulation apparatus of claim 10, further including a heating element to heat the wall.

22. The stimulation apparatus of claim 21, wherein the heating element is received in the wall or is disposed in the housing proximate to the wall.

23. A stimulation apparatus for a clitoris, the stimulation apparatus comprising:
   a housing defining a hollow space;
   an opening to the hollow space, the opening for placing over the clitoris;
   a drive unit to cause a volume of the hollow space to change to generate a pressure field of a plurality of predefined stimulation patterns in the hollow space, the stimulation patterns including a plurality of temporally alternating negative and positive pressures, the negative pressures below an ambient pressure and the positive pressures above the ambient pressure;
   a control device to control the drive unit, the control device including a random generator, the random generator to randomly set a sequence of the stimulation patterns when the drive unit is activated; and
   a sensor to:
      detect when a portion of the stimulation apparatus defining the opening is within a threshold distance of the clitoris and emit an activation signal to the control device in response to the detection of the stimulation apparatus within the threshold distance of the clitoris, the control device to activate the drive unit in response to the activation signal; and
      detect when the portion of the stimulation apparatus defining the opening is at a distance outside of the threshold distance of the clitoris, the control device to deactivate the drive unit in response to the stimulation apparatus being outside of the threshold distance of the clitoris;
   wherein the drive unit and the control device are received in the housing, and wherein the stimulation apparatus is a portable hand-held device.

24. A stimulation apparatus for a clitoris, the stimulation apparatus comprising:
   a housing defining a hollow space; and
   an opening to the hollow space, the opening for placing over the clitoris of a human body;
   a drive unit to change a volume of the hollow space to generate a pressure field of a plurality of temporally alternating negative and positive pressures in the hollow space, the negative pressures below an ambient pressure and the positive pressures above the ambient pressure;
   a control device to control the drive unit to cause the drive unit to generate the negative and positive pressures of the pressure field randomly; and
   a sensor to:
      detect when a portion of the human body is within a detection region associated with the sensor, the detection region defined at or in front of the opening, and emit an activation signal to the control device in response to the detection of the portion of the human body within the detection region, the control device to activate the drive unit in response to the activation signal; and
      detect when the portion of the human body is outside of the detection region, the control device to deactivate the drive unit in response to the detection of the portion of the human body being outside of the detection region;
   wherein the drive unit and the control device are received in the housing, and wherein the stimulation apparatus is a portable hand-held device.

25. A method comprising:
   detecting, via a sensor of a stimulation apparatus, when a portion of the stimulation apparatus is within a threshold distance of a clitoris, the portion including an opening;
   generating an activation signal in response to the detecting of the portion of the stimulation apparatus within the threshold distance of the clitoris;
   outputting the activation signal to a control device of the stimulation apparatus;
   activating, via the control device, a drive unit of the stimulation apparatus in response to the activation signal;
   generating, via the drive unit, a pressure field of temporally alternating negative and positive pressures at the opening, the negative pressures below an ambient pressure and the positive pressures above the ambient pressure;
   detecting, via the sensor, when the portion of the stimulation apparatus is at a distance outside of the threshold distance of the clitoris; and
   deactivating, via the control device, the drive unit in response to the stimulation apparatus being outside of the threshold distance of the clitoris.

* * * * *

UNITED STATES PATENT AND TRADEMARK OFFICE
CERTIFICATE OF CORRECTION

| | | |
|---|---|---|
| PATENT NO. | : 12,329,710 B2 | Page 1 of 1 |
| APPLICATION NO. | : 16/339969 | |
| DATED | : June 17, 2025 | |
| INVENTOR(S) | : Michael Lenke | |

It is certified that error appears in the above-identified patent and that said Letters Patent is hereby corrected as shown below:

On the Title Page

Item (54) and in the Specification, Column 1, Lines 1, Under Title, Delete "STIMULATION APPARATUS" and Insert --IMPROVED STIMULATION APPARATUS--.

Signed and Sealed this
Twenty-second Day of July, 2025

Coke Morgan Stewart
*Acting Director of the United States Patent and Trademark Office*